US005574934A

United States Patent [19]
Mirashrafi et al.

[11] Patent Number: 5,574,934
[45] Date of Patent: Nov. 12, 1996

[54] PREEMPTIVE PRIORITY-BASED TRANSMISSION OF SIGNALS USING VIRTUAL CHANNELS

[75] Inventors: Mojtaba Mirashrafi; Benjamin Vrvilo, both of Portland; Peter Tung, Beaverton; Krishnan Rajamani, Portland, all of Oreg.

[73] Assignee: Intel Corporation, Santa Clara, Calif.

[21] Appl. No.: 340,173

[22] Filed: Nov. 15, 1994

Related U.S. Application Data

[63] Continuation-in-part of Ser. No. 157,694, Nov. 24, 1993.
[51] Int. Cl.$^6$ .............................. G06F 9/46; G06F 13/36
[52] U.S. Cl. .................. 395/800; 364/231.4; 364/241.2; 364/DIG. 1; 364/DIG. 2; 395/788; 395/561; 340/825.5; 340/825.16; 370/85.4; 379/94; 348/12; 348/15
[58] Field of Search ...................................... 395/800, 125, 395/575, 152, 154, 550, 725, 775, 500, 250, 275, 200, 325, 118, 153, 162, 66, 650, 879, 12, 68; 364/DIG. 1, DIG. 2, 514 C, 514 A; 348/15, 16, 384, 423, 18, 17, 388, 385, 14, 12, 400; 370/62, 58.2, 60, 124, 85.4; 340/825.51, 825.03, 825.5, 825.16; 381/52; 379/94, 95, 96, 206

[56] References Cited

U.S. PATENT DOCUMENTS

| | | | |
|---|---|---|---|
| 4,404,557 | 9/1983 | Grow | 340/825.05 |
| 4,475,193 | 10/1984 | Brown | 370/124 |
| 4,653,100 | 3/1987 | Barnett et al. | 381/52 |
| 4,888,795 | 12/1989 | Ando et al. | 348/18 |
| 4,998,243 | 3/1991 | Kao | 370/62 |
| 5,014,267 | 5/1991 | Tompkins et al. | 390/62 |
| 5,050,161 | 9/1991 | Golestani | 370/60 |
| 5,056,136 | 10/1991 | Smith | 380/10 |
| 5,072,442 | 12/1991 | Todd | 370/62 |
| 5,073,926 | 12/1991 | Suzuki et al. | 348/17 |
| 5,132,966 | 7/1992 | Hayano et al. | 370/79 |
| 5,157,491 | 10/1992 | Kassatly | 348/15 |
| 5,227,876 | 7/1993 | Cucchi et al. | 348/423 |
| 5,231,492 | 7/1993 | Dangi et al. | 348/17 |
| 5,315,633 | 5/1994 | Champa | 348/16 |
| 5,319,793 | 6/1994 | Hancock et al. | 395/800 |
| 5,333,133 | 7/1994 | Andrews et al. | 370/58.2 |

(List continued on next page.)

FOREIGN PATENT DOCUMENTS 0523629  7/1992  European Pat. Off. .

OTHER PUBLICATIONS

Lane, John, "The Integrated Services Digital Network" (ISDN), 1987, pp. 7–12.
Eleftheriadis et al., "Algorithms and Performance Evaluation of the Xphone Multimedia Communication System." ACM Multimedia 93–Proceedings First ACM International Conference on Multimedia, 1 Aug. 1993, Anaheim (US).

(List continued on next page.)

Primary Examiner—Daniel Pan
Attorney, Agent, or Firm—Steve Mendelsohn; William H. Murray

[57] ABSTRACT

A computer system for transmitting two or more types of signals. Each type of signal is assigned a priority level. Signals of a particular type are transmitted as they become ready for transmission, unless signals of a different type having a greater priority become ready for transmission. In that case, the transmission of the low-priority signals is interrupted to allow transmission of the high-priority signals. The transmission of the low-priority signals is resumed after the transmission of the high-priority signals is complete. In a preferred embodiment directed to conferencing systems, audio signals are assigned higher priorities than video, data, and control signals in order to provide a high-quality to the audio portion of a conferencing session.

33 Claims, 41 Drawing Sheets

CONFERENCING API ARCHITECTURE

U.S. PATENT DOCUMENTS

| | | | |
|---|---|---|---|
| 5,335,321 | 8/1994 | Harney et al. | 395/162 |
| 5,343,473 | 8/1994 | Cidon et al. | 370/85.6 |
| 5,367,629 | 11/1994 | Chu et al. | 395/162 |
| 5,374,952 | 12/1994 | Flohr | 348/12 |
| 5,375,068 | 12/1994 | Palmer et al. | 364/514 C |
| 5,384,598 | 1/1995 | Rodriquez et al. | 348/384 |
| 5,384,772 | 1/1995 | Marshall | 370/60 |
| 5,392,223 | 2/1995 | Caci | 364/514 A |

OTHER PUBLICATIONS

Zhang et al., "Video Communication on LANs—Multimedia CSCW Applications." CCECE/CCGEI '93.

Ramanathan et al., "Integrating Virtual Reality, Tele–Conferencing, and Entertainment into Multimedia Home Computers." IEEE Transactions on Consumer Electronics, vol. 38, No. 2, May 1992.

Nakamura et al., "Personal Multimedia Teleconferencing Terminal." IEEE International Conference on Communications ICC 90–Session 211. vol. 1, 15 Apr. 1990, Atlanta (US).

Maeno et al., "Distributed Desktop Conferencing System (Mermaid) Based on Group Communication Architecture." IEICE Transactions, vol. E74, No. 9, Sep. 1991, Tokyo JP.

Tanigawa et al, "Personal Multimedia–Multipoint Teleconference System." IEEE INFOCOM 91–Conference on Computer Communications–Session 9D, vol. 3, 7 Apr. 1991, Bal Harbour (US).

Computer Conferencing: IBM Scientists Demo Prototype of Affordable Computer Conferencing System, Nov. 2, 1992. EDGE, on & about AT&T, V7, n223, p.22.

Chen et al., "A Multimedia Desktop Collaboration System," GLOBECOM 92—EEE Global Telecommunications Conference, vol. 2, 6 Dec. 1992. –9 Dec. 1992. Orlando (US).

Vin et al., "Multimedia Conferencing in the Etherphone Environment." Computer, vol. 24, No. 10, Oct. 1991. Long Beach (US).

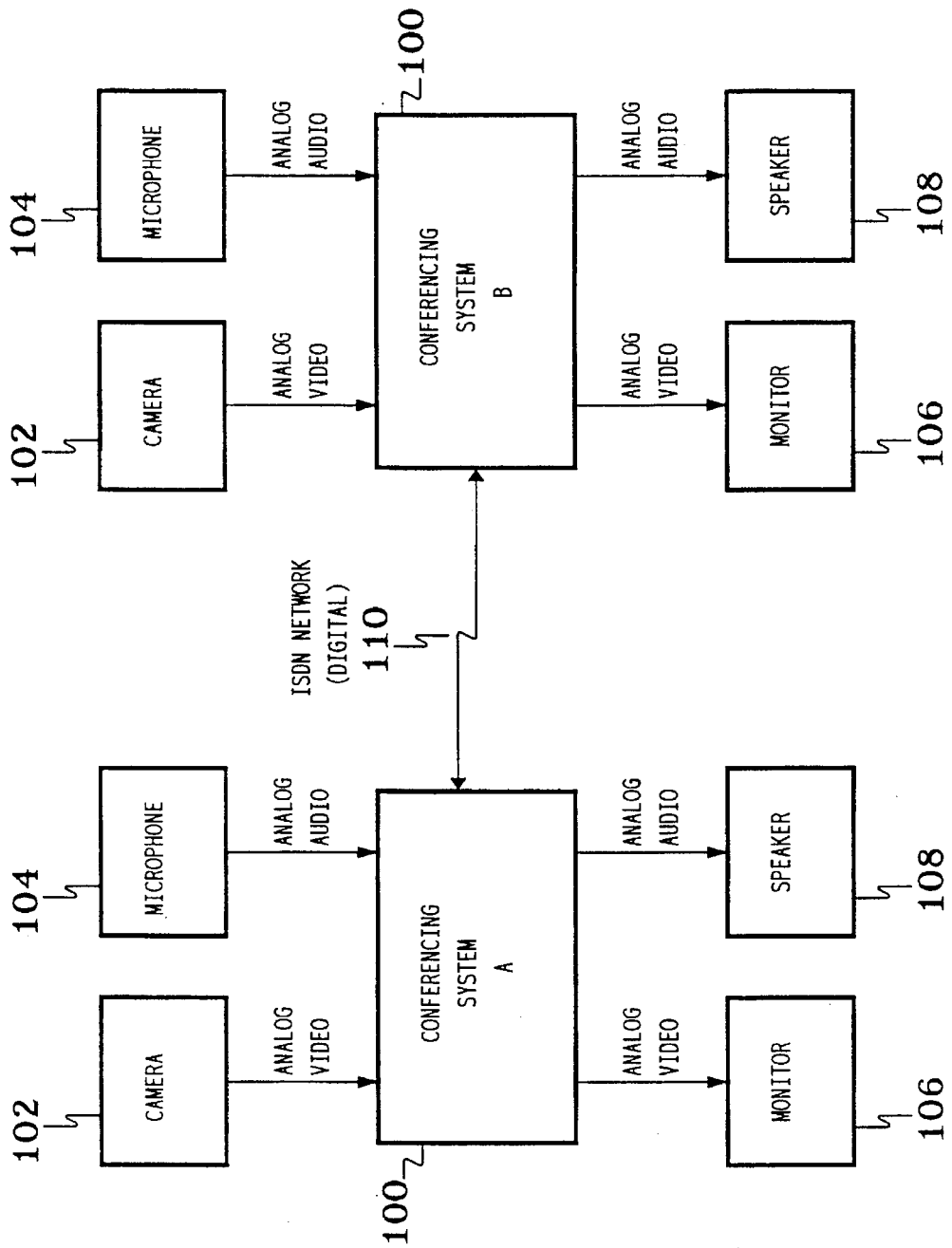
FIG. 1. POINT-TO-POINT CONFERENCING NETWORK

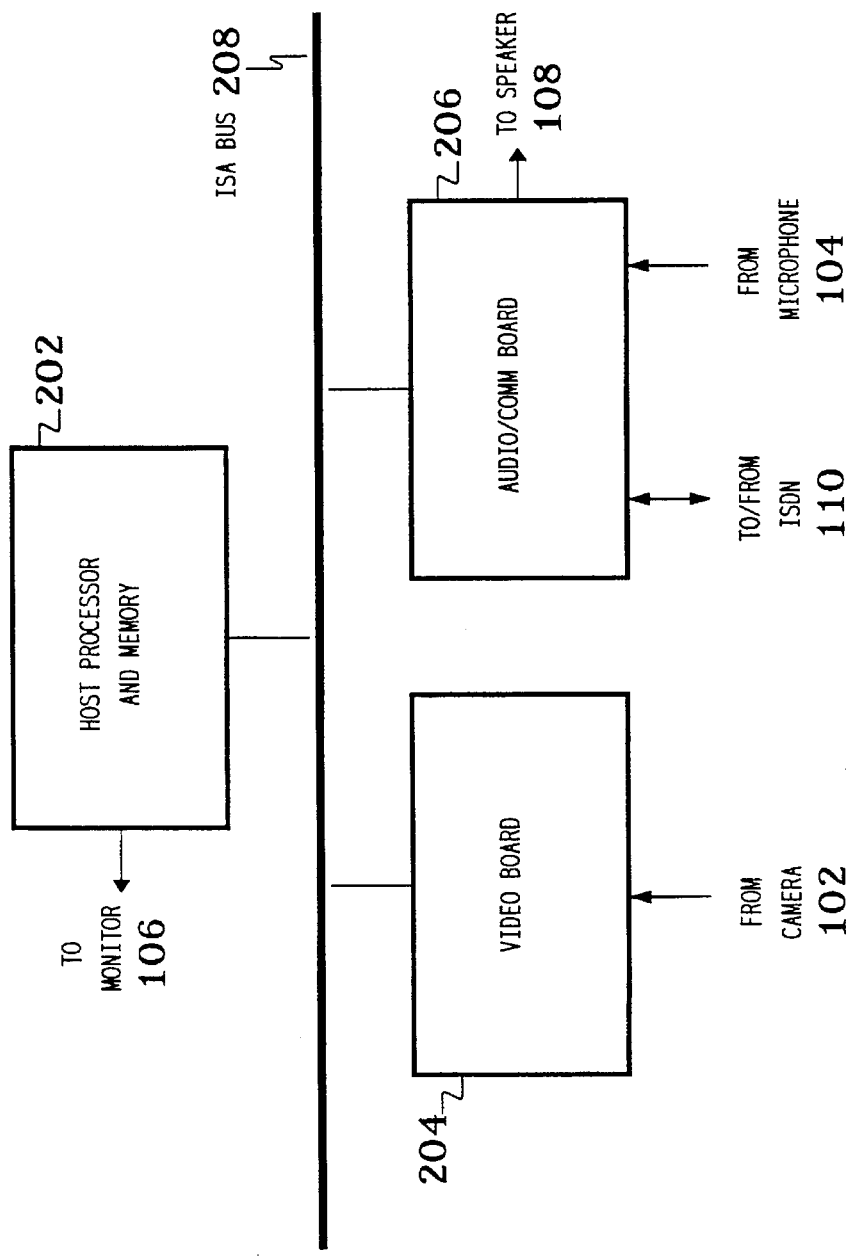
FIG. 2. CONFERENCING SYSTEM HARDWARE CONFIGURATION 100

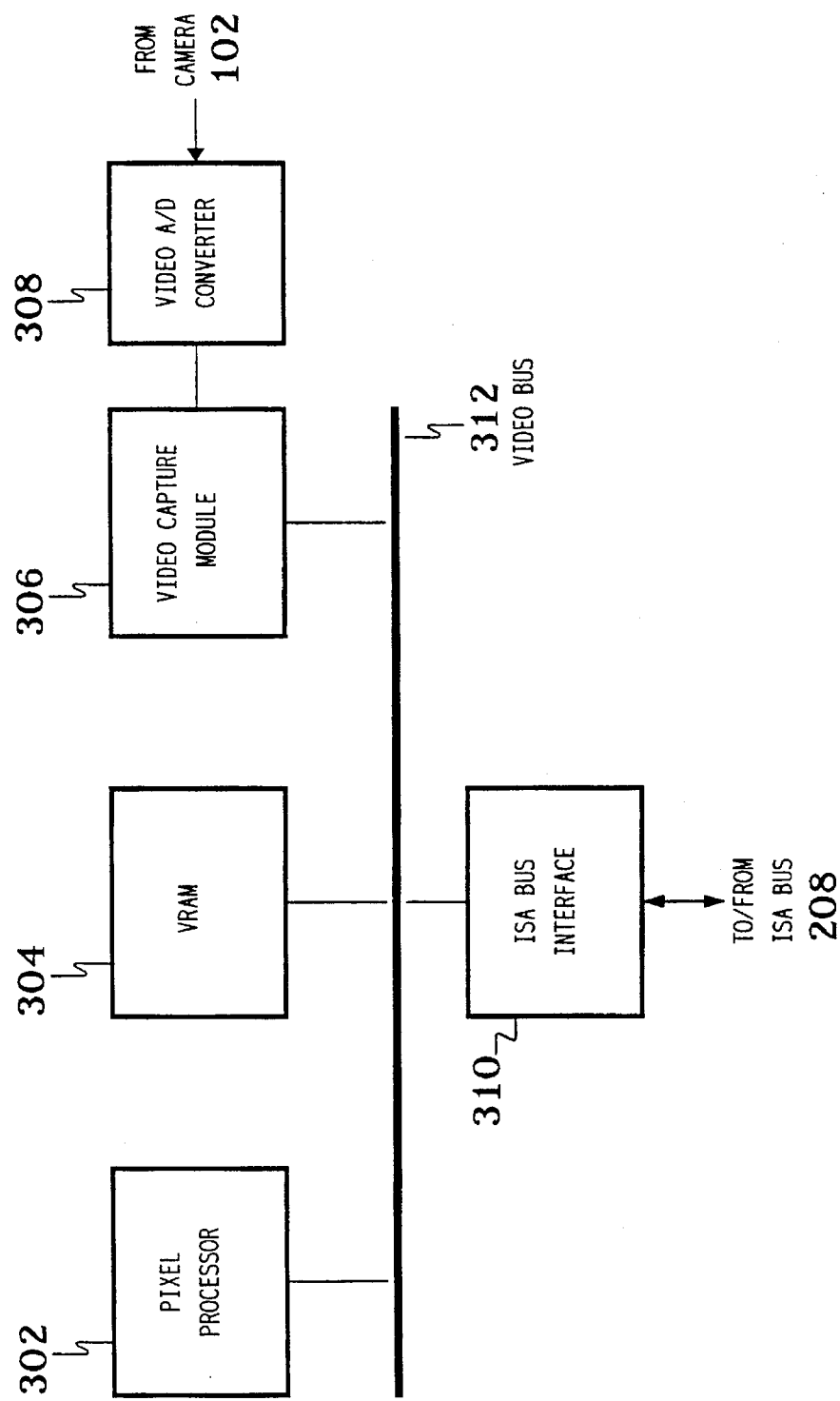
FIG. 3. VIDEO BOARD HARDWARE CONFIGURATION

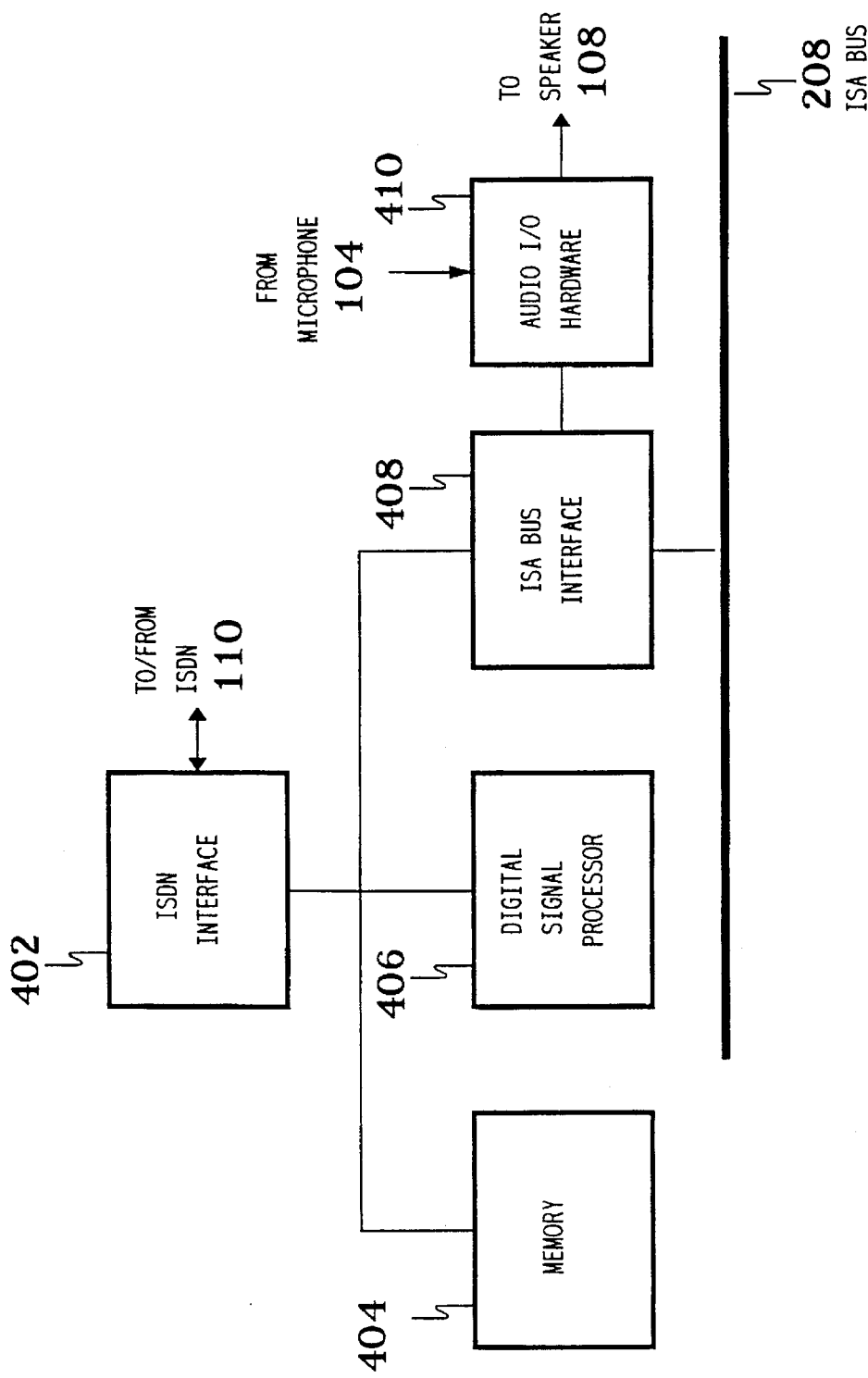
FIG. 4. AUDIO/COMM BOARD HARDWARE CONFIGURATION

FIG. 5. CONFERENCING SYSTEM SOFTWARE ARCHITECTURE
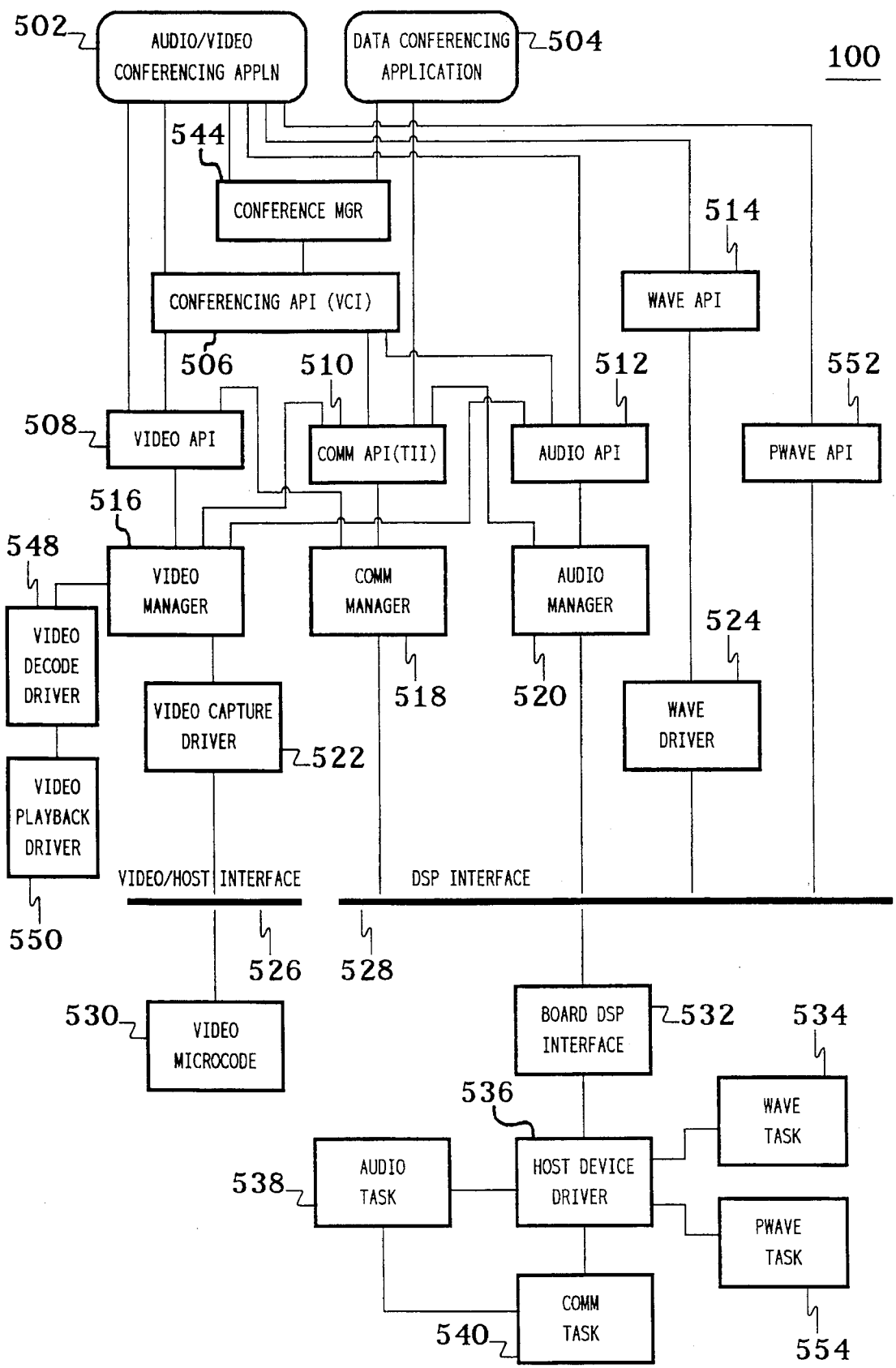

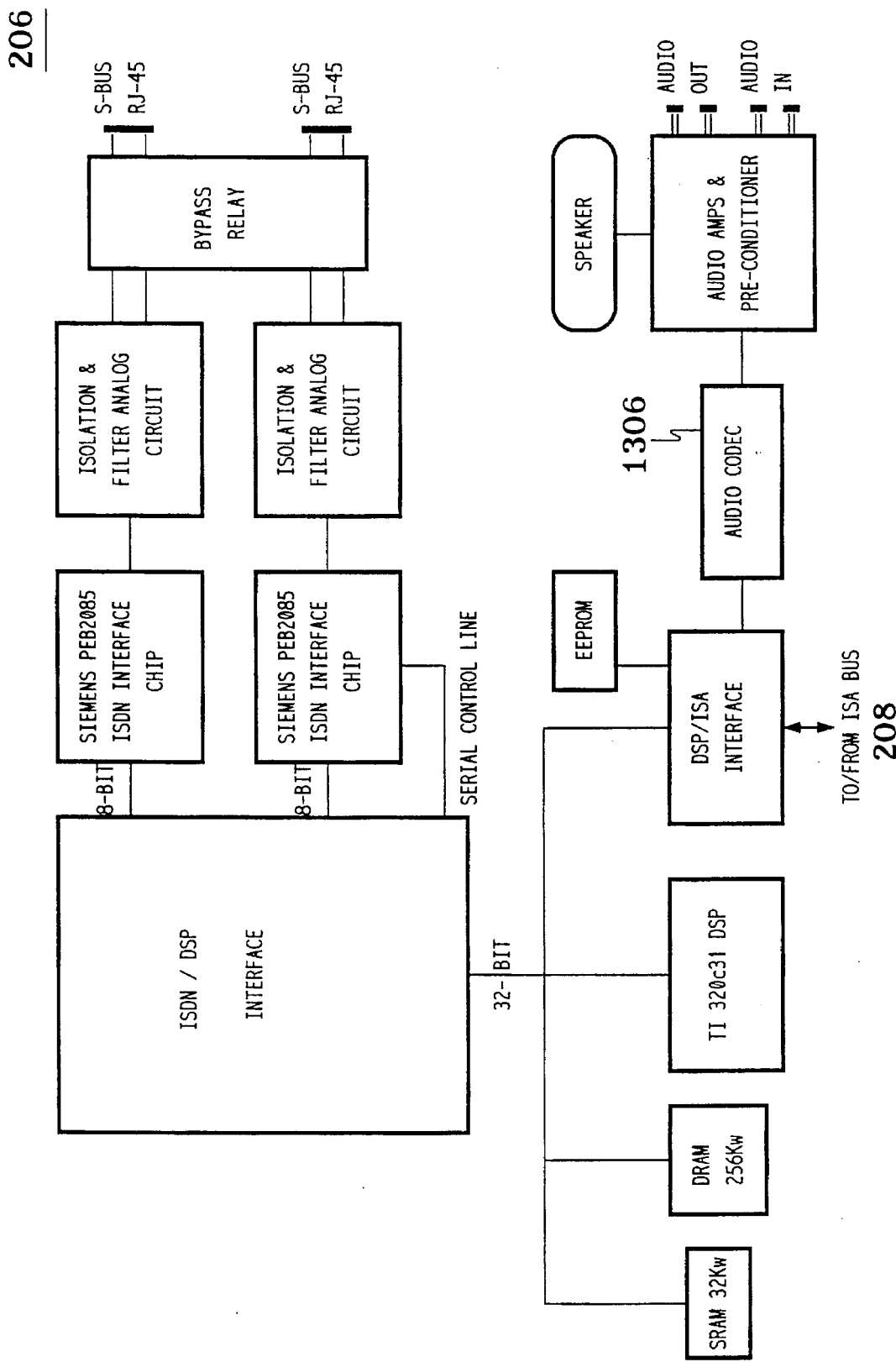
FIG. 6. PREFERRED AUDIO/COMM BOARD HARDWARE CONFIGURATION

FIG. 7. CONFERENCING API ARCHITECTURE
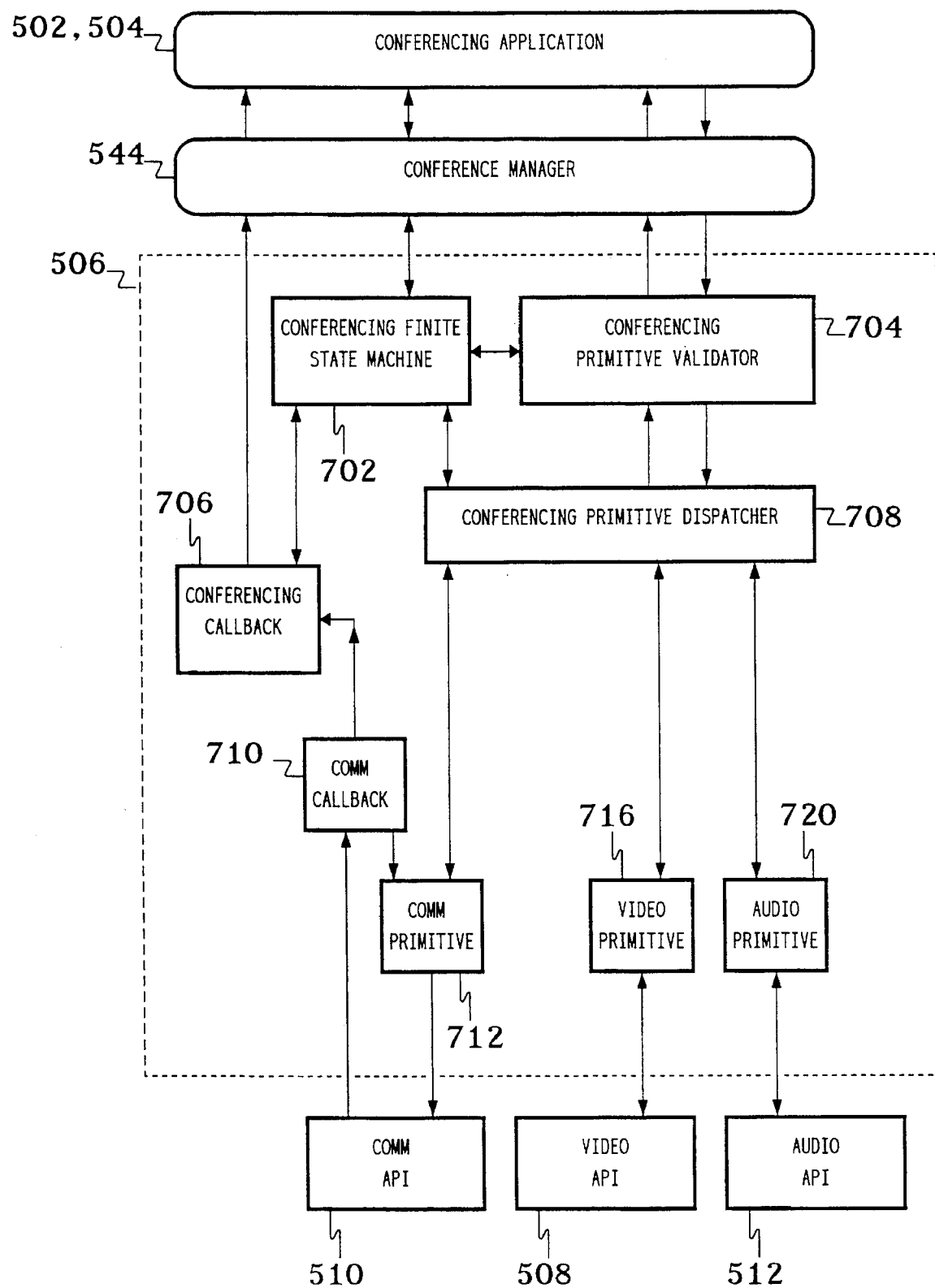

FIG. 11. VIDEO MANAGER COMPONENTS

FIG. 12. WALKING KEY FRAME

FIG. 17. COMM SUBSYSTEM LAYERS

FIG. 24. COMPRESSED VIDEO BITSTREAM FORMAT
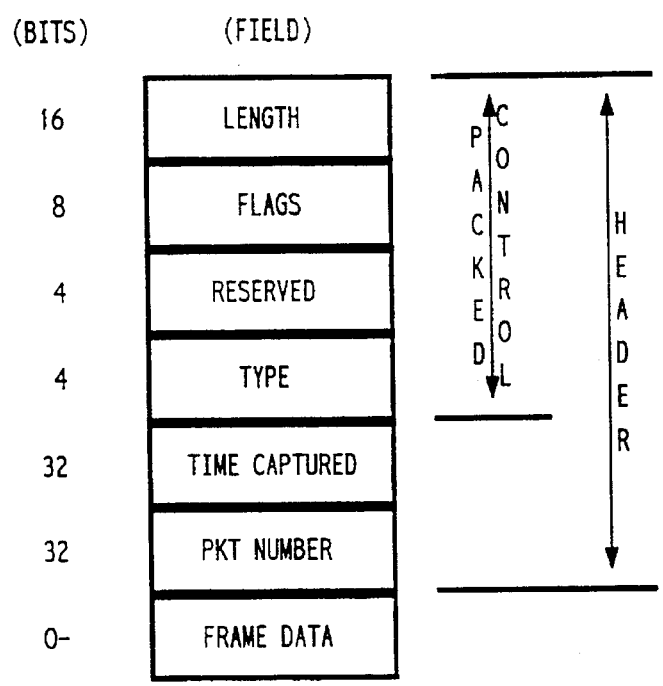

FIG. 25. COMPRESSED VIDEO DATA FIELD
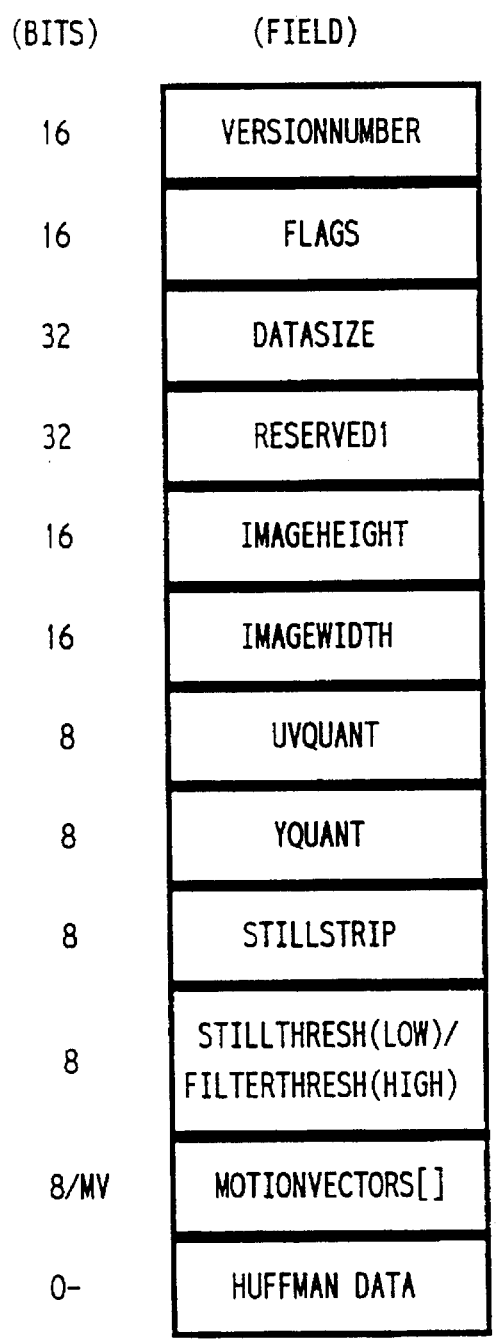

FIG. 26. COMPRESSED AUDIO FORMAT
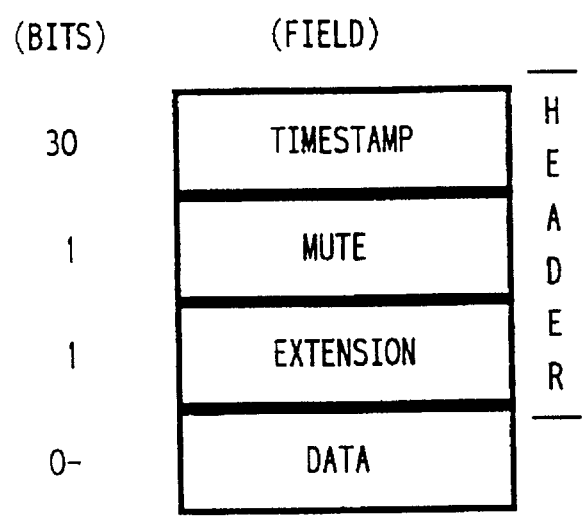

FIG. 27. RELIABLE TRANSPORT COMM PACKET FORMAT
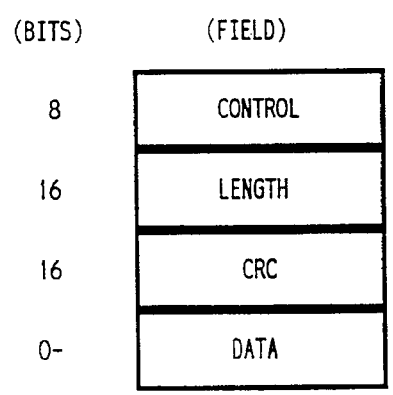

FIG. 28. UNREALIABLE TRANSPORT COMM PACKET FORMAT
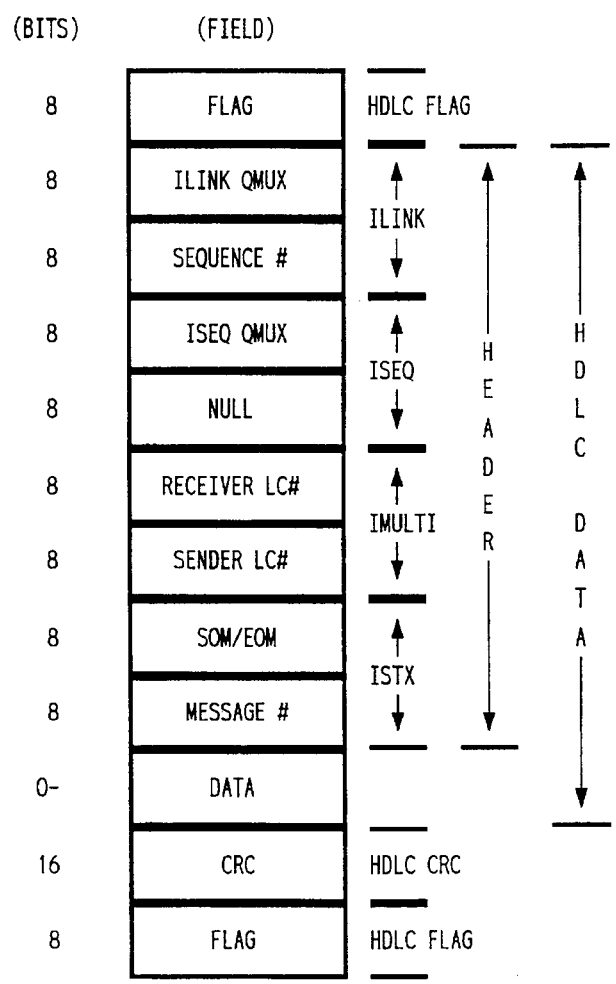

FIG. 33. ON-DEMAND INVOCATION
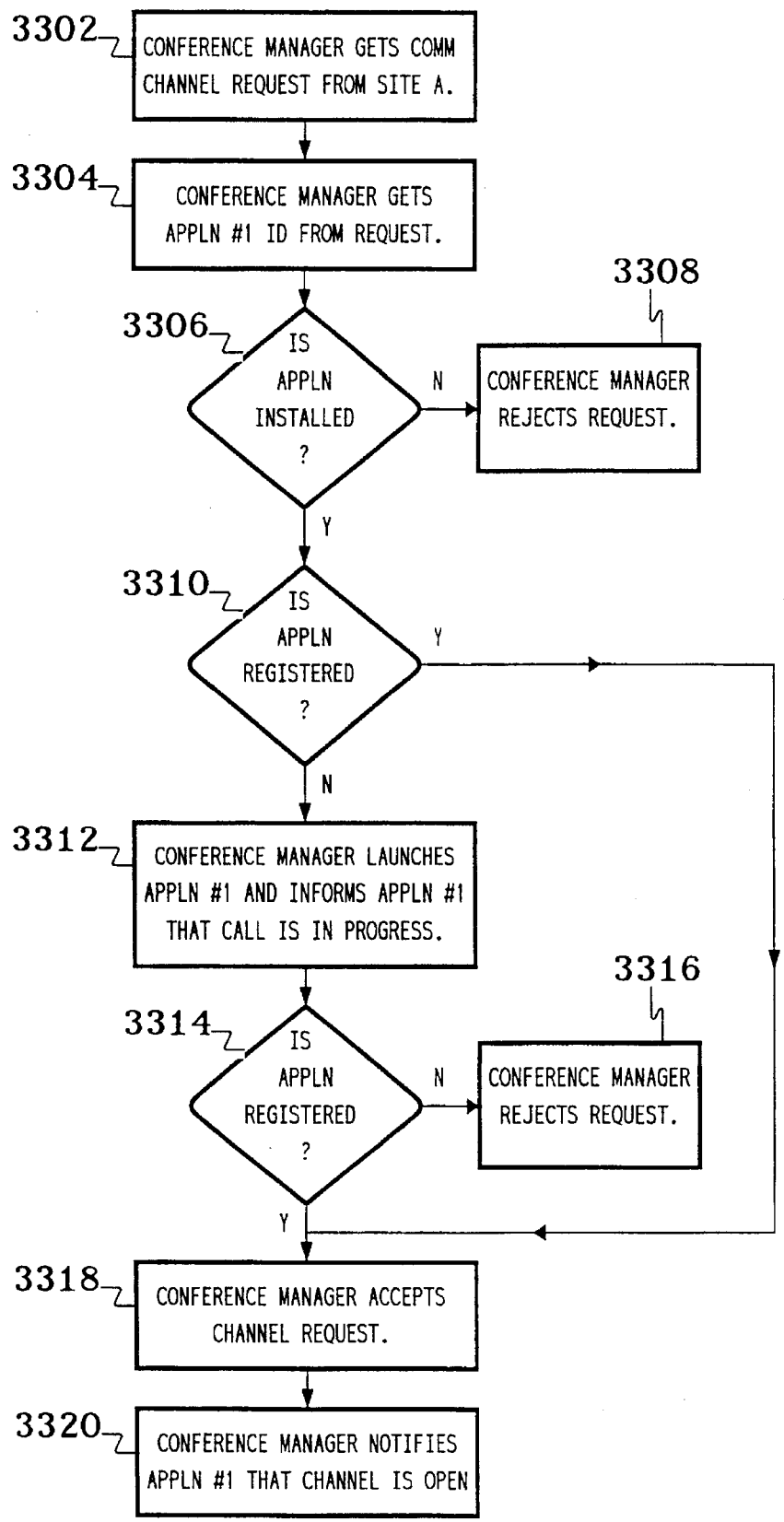

FIG. 34. MANAGING MULTIPLE APPLICATIONS
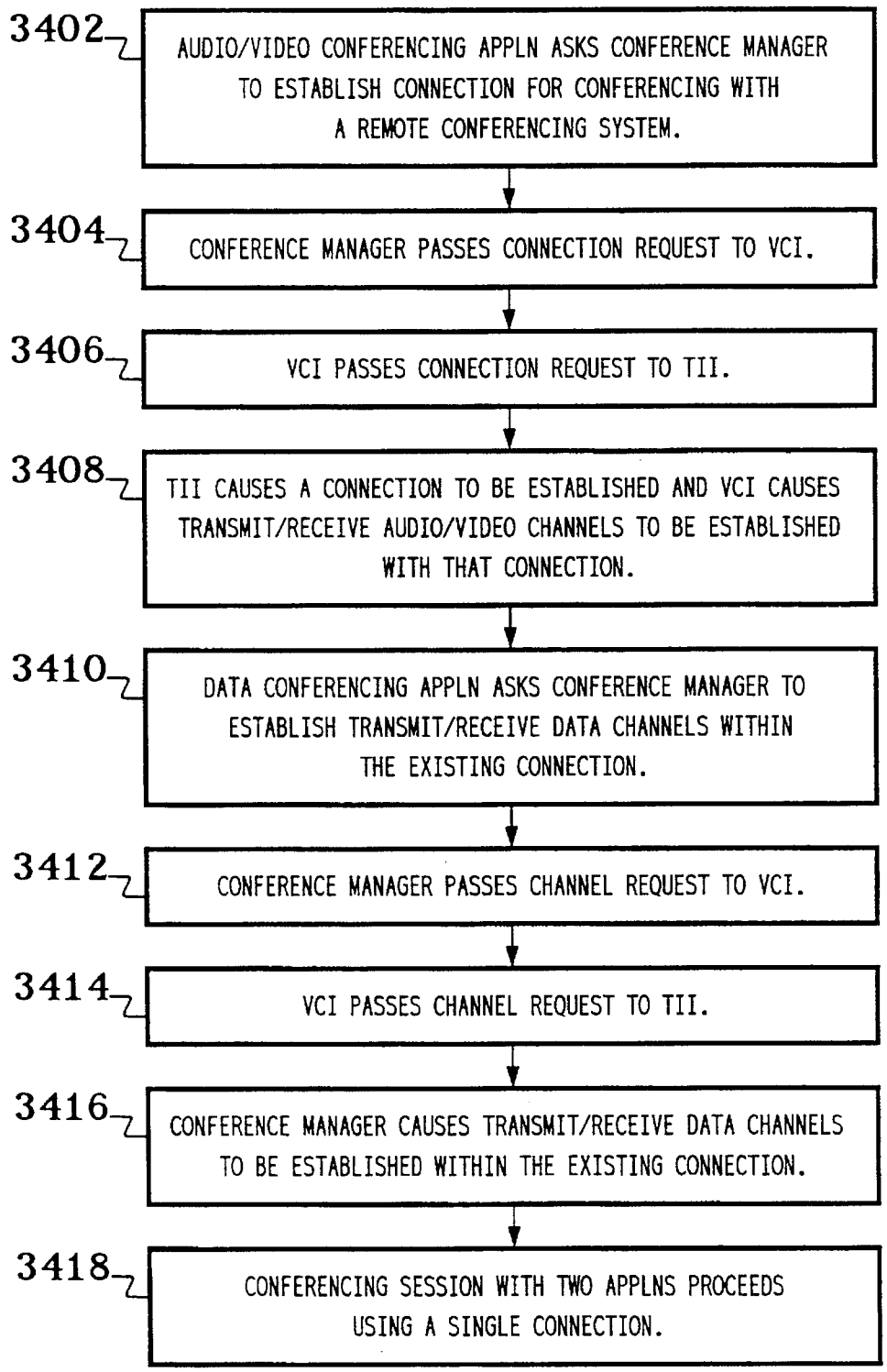

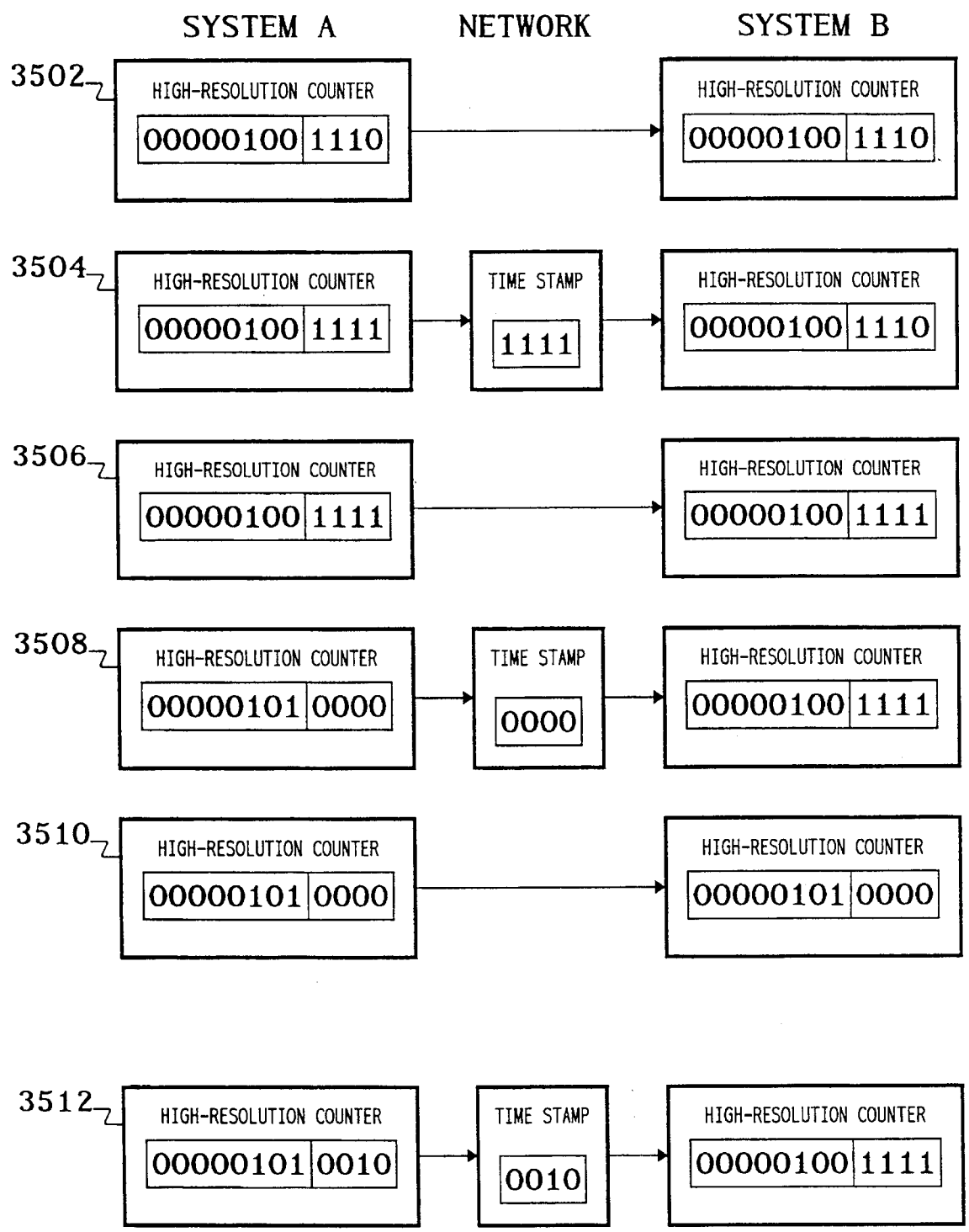
FIG. 35. REMOTE MAINTENANCE OF HIGH-RESOLUTION COUNTERS

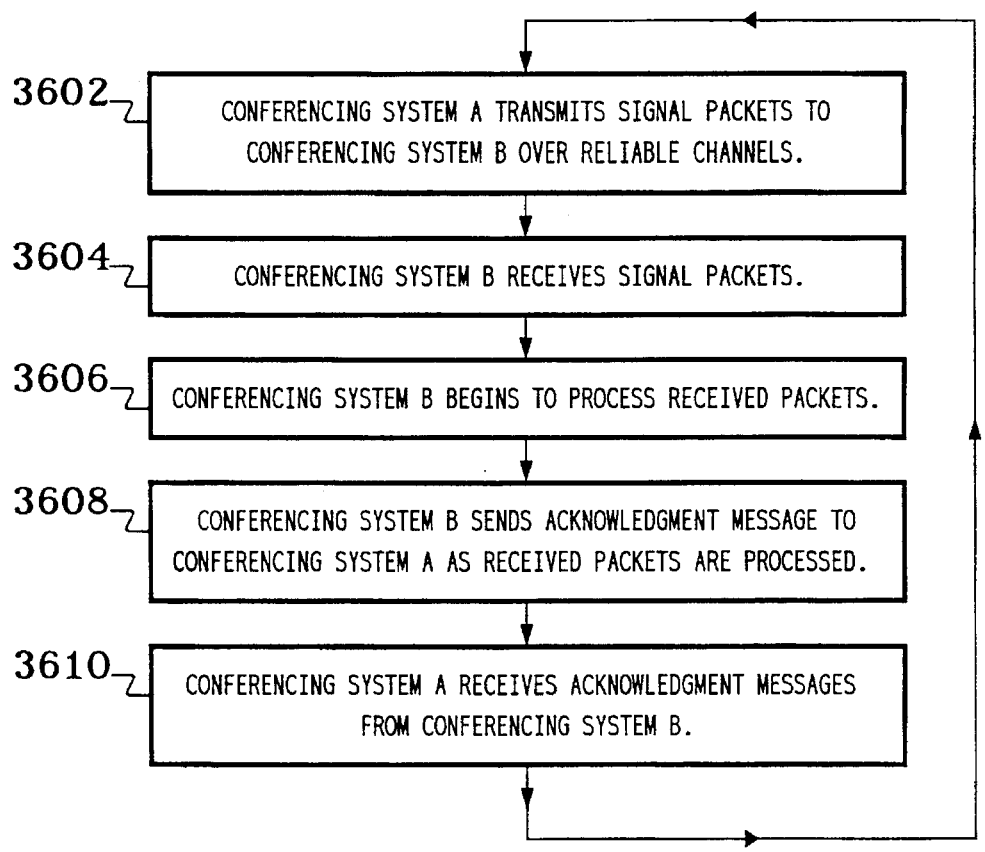
FIG. 36. FLOW CONTROL OVER RELIABLE CHANNELS

FIG. 37. PREEMPTIVE PRIORITY-BASED TRANSMISSION
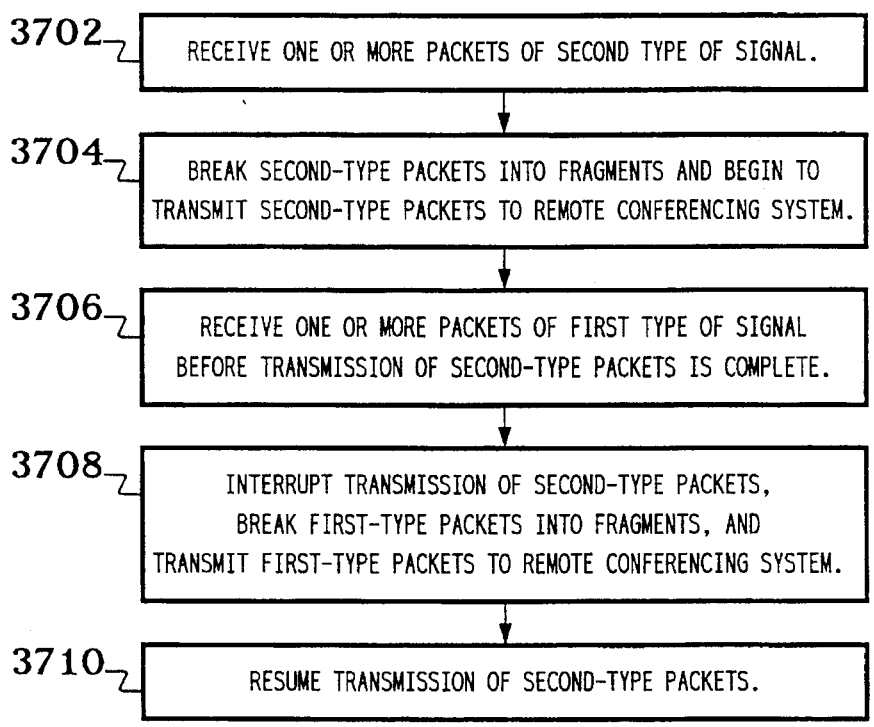

FIG. 38. RATE NEGOTIATION
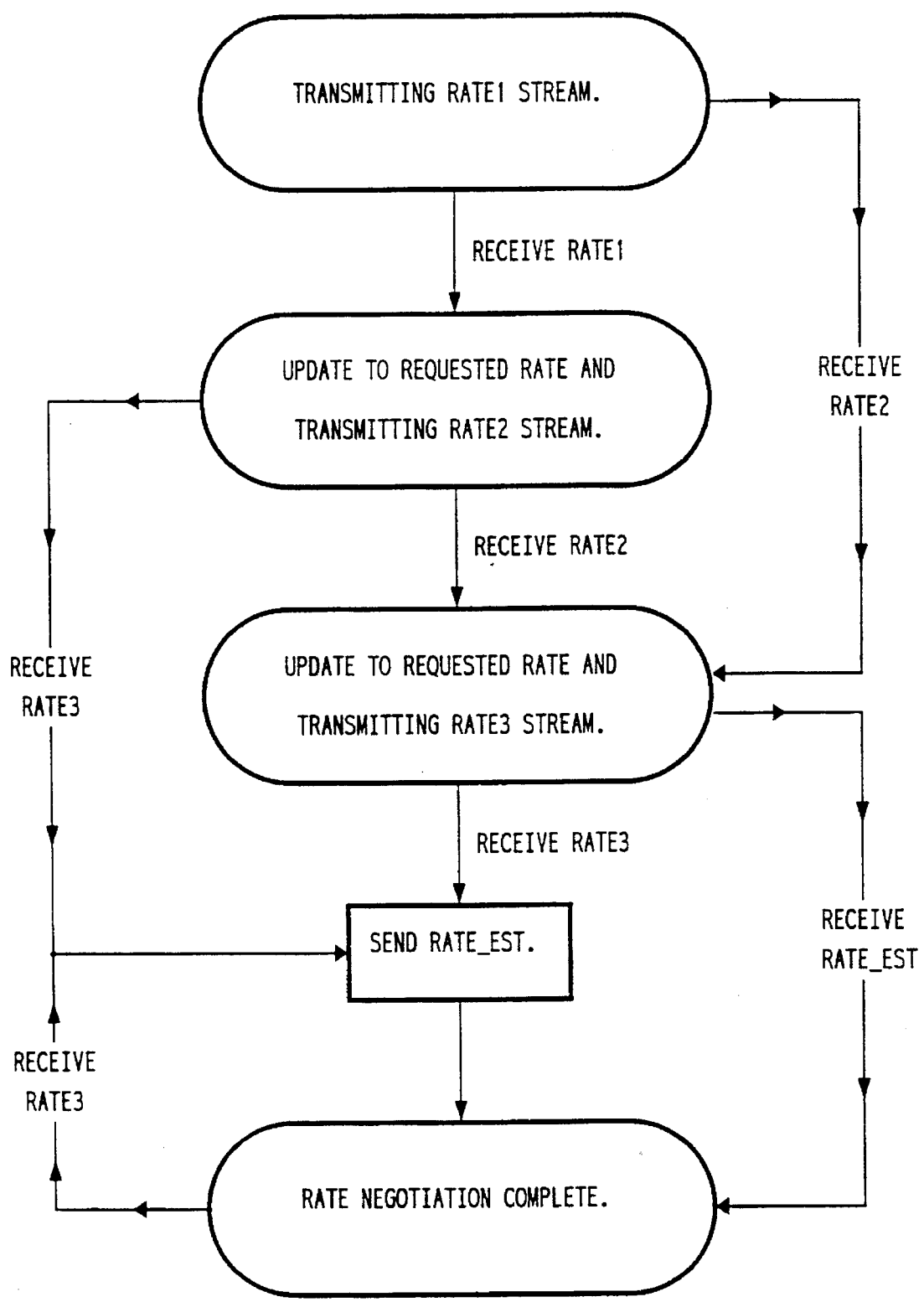

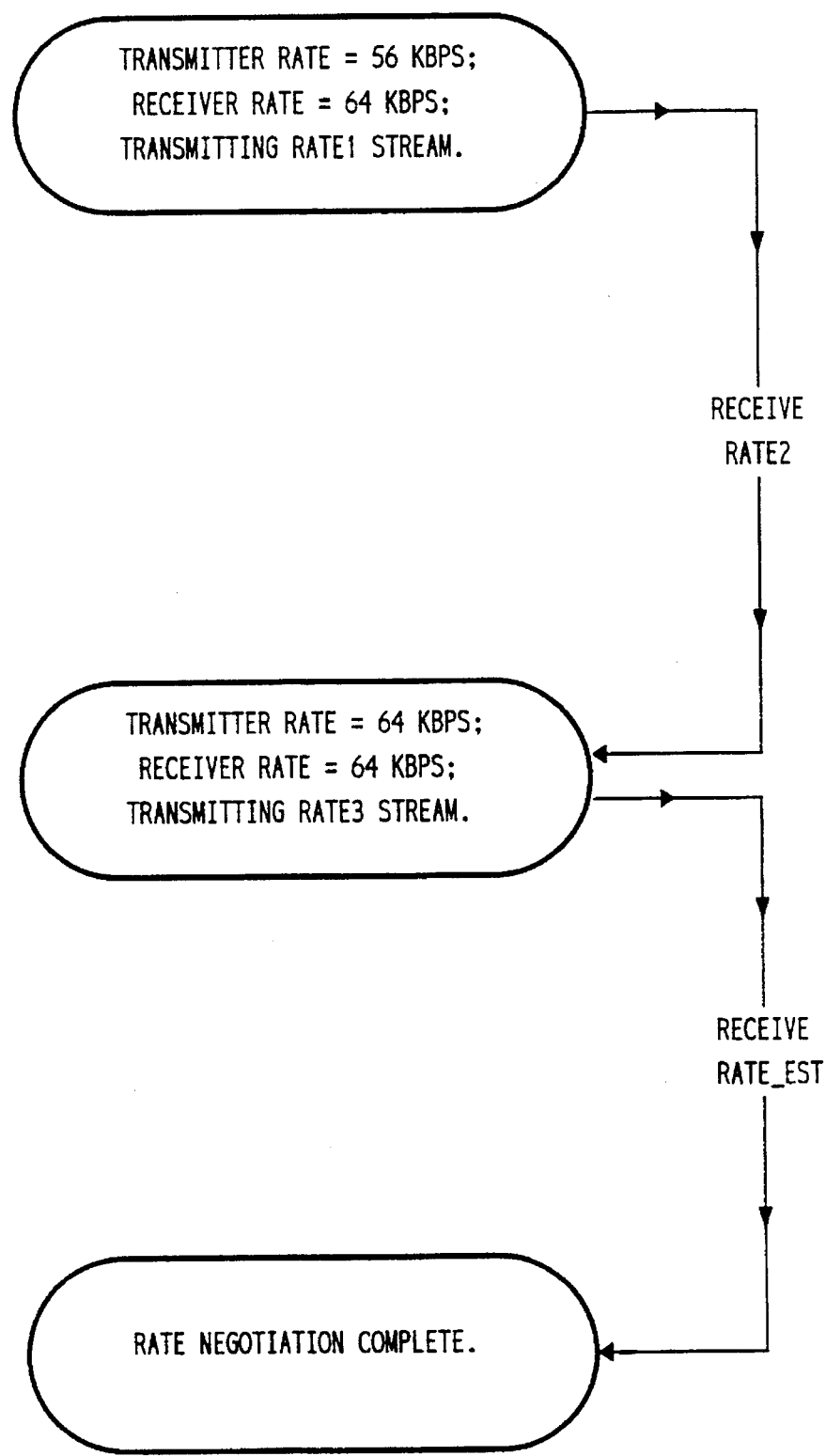
FIG. 39. CALLED NODE PERFORMANCE DURING 64 KBPS UPGRADE.

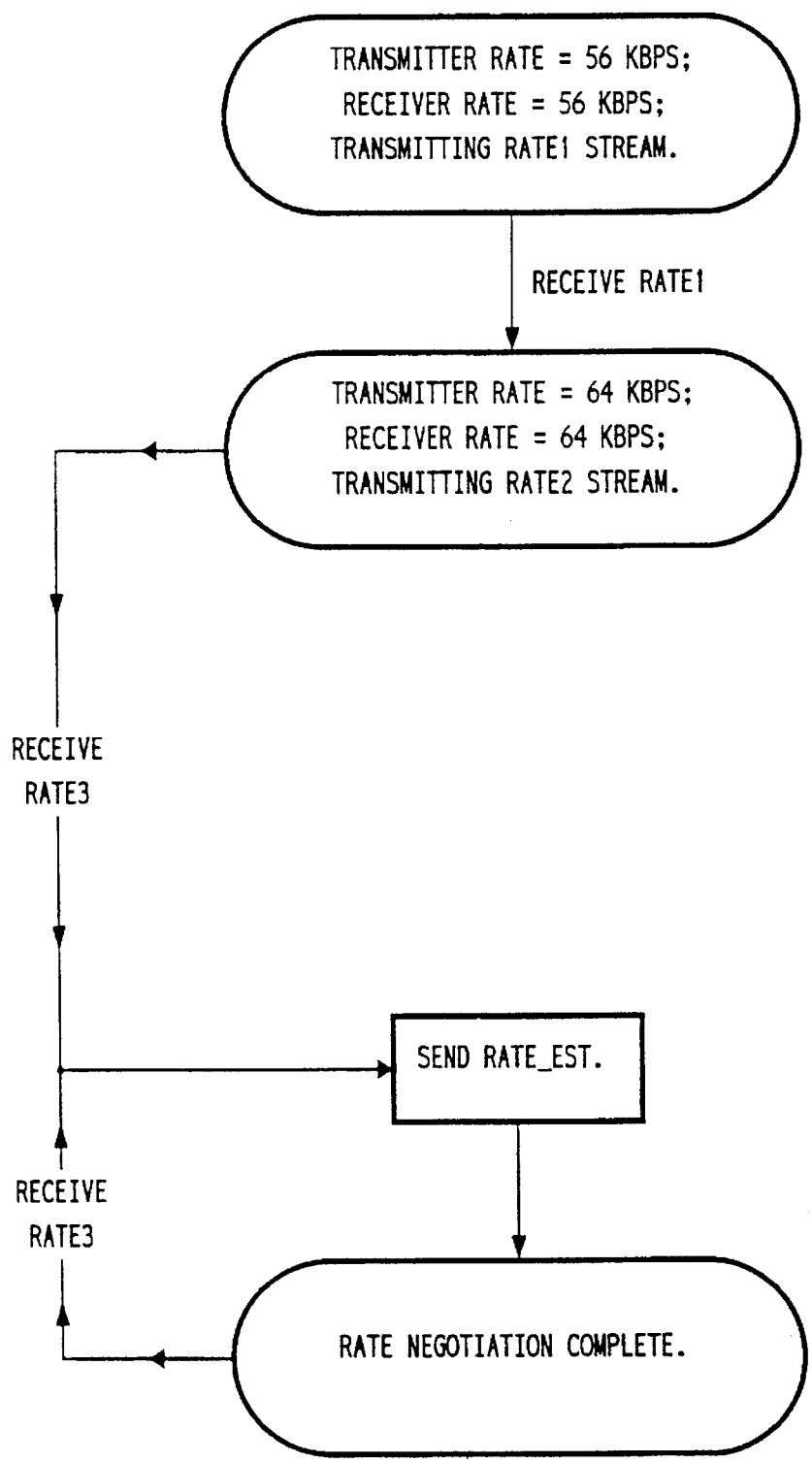
FIG. 40. CALLING NODE PERFORMANCE DURING 64 KBPS UPGRADE.

FIG. 41. LOOPBACK LINE PERFORMANCE DURING 64KBPS UPGRADE.
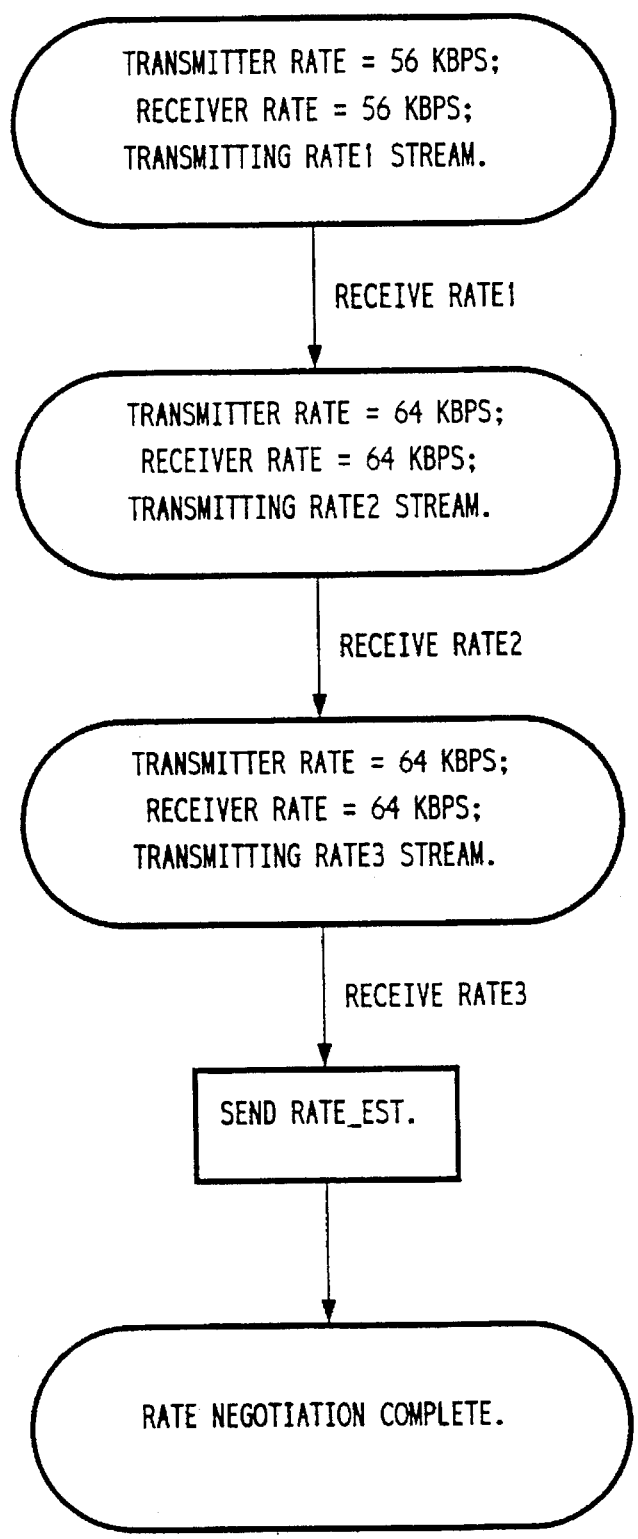

5,574,934

PREEMPTIVE PRIORITY-BASED TRANSMISSION OF SIGNALS USING VIRTUAL CHANNELS

INCORPORATION BY REFERENCE

This application is a continuation-in-part of U.S. patent application Ser. No. 08/157,694, filed Nov. 24, 1993, which is incorporated herein in its entirety by reference. This application is also related to U.S. patent application Ser. No. 08/305,206 (filed Sep. 13, 1994), U.S. patent application Ser. No. 08/137,319 (filed Oct. 14, 1993) now U.S. Pat. No. 5,452,299, and in U.S. patent application Ser. No. 08/170,146 (filed Dec. 20, 1993), which are all incorporated herein in their entireties by reference.

BACKGROUND OF THE INVENTION

1. Field of the Invention

The present invention relates to audio/video conferencing, and, in particular, to systems for real-time audio, video, and data conferencing in windowed environments on personal computer systems.

2. Description of the Related Art

It is desirable to provide real-time audio, video, and data conferencing between personal computer (PC) systems operating in windowed environments such as those provided by versions of Microsoft® Windows™ operating system. There are difficulties, however, with providing real-time conferencing in non-real-time windowed environments.

It is accordingly an object of this invention to overcome the disadvantages and drawbacks of the known art and to provide real-time audio, video, and data conferencing between PC systems operating in non-real-time windowed environments.

It is a particular object of the present invention to provide real-time audio, video, and data conferencing between PC systems operating under a Microsoft® Windows™ operating system.

Further objects and advantages of this invention will become apparent from the detailed description of a preferred embodiment which follows.

SUMMARY OF THE INVENTION

The present invention is a computer-implemented process and a computer system for transmitting two or more types of signals from a local computer system. According to a preferred embodiment, signals of a first type having a first priority are provided and begun to be transmitted. Signals of a second type having a second priority are provided before the transmission of the signals of the first type is complete, wherein the second priority of the second type of signals is greater than the first priority of the first type of signals. The transmission of the signals of the first type is interrupted and the signals of the second type are transmitted. The transmission of the signals of the first type is resumed after the transmission of the signals of the second type is complete.

The present invention is also a local computer system for transmitting signals, comprising (a) first means for generating signals of a first type having a first priority; (b) second means for generating signals of a second type having a second priority, wherein the second priority of the second type of signals is greater than the first priority of the first type of signals; and (c) a communications subsystem, electrically connected to the first means and the second means, for receiving the signals of the first type from the first means and for receiving the signals of the second type from the second means. The communications subsystem interrupts the transmission of the signals of the first type when the signals of the second type are ready for transmission. The communications subsystem resumes the transmission of the signals of the first type after the transmission of the signals of the second type is complete.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 1 is a block diagram representing real-time point-to-point audio, video, and data conferencing between two PC systems, according to a preferred embodiment of the present invention;

FIG. 2 is a block diagram of the hardware configuration of the conferencing system of each PC system of FIG. 1;

FIG. 3 is a block diagram of the hardware configuration of the video board of the conferencing system of FIG. 2;

FIG. 4 is a block diagram of the hardware configuration of the audio/comm board of the conferencing system of FIG. 2;

FIG. 5 is a block diagram of the software configuration of the conferencing system of each PC system of FIG. 1;

FIG. 6 is a block diagram of a preferred embodiment of the hardware configuration of the audio/comm board of FIG. 4;

FIG. 7 is a block diagram of the conferencing interface layer between the conferencing applications of FIG. 5, on one side, and the comm, video, and audio managers of FIG. 5, on the other side;

FIG. 24 is a representation of the structure of a video packet as sent to or received from the comm subsystem of the conferencing system of FIG. 5;

FIG. 25 is a representation of the compressed video bitstream for the conferencing system of FIG. 5;

FIG. 26 is a representation of a compressed audio packet for the conferencing system of FIG. 5;

FIG. 27 is a representation of the reliable transport comm packet structure;

FIG. 28 is a representation of the unreliable transport comm packet structure;

FIG. 33 is a flow diagram of the on-demand application invocation processing of the conferencing system of FIG. 5;

FIG. 34 is a flow diagram of an example of the processing implemented within the conferencing system of FIG. 5 to manage two conferencing applications in a single conferencing session with a remote conferencing system;

FIG. 35 represents the flow of bits between two remote high-resolution counters used to maintain clock values over a conferencing network;

FIG. 36 is a flow diagram of the processing of the conferencing system of FIG. 1 to control the flow of signals over reliable channels;

FIG. 37 is a flow diagram of the preemptive priority-based transmission processing implemented by the communications subsystem of the conferencing system of FIG. 1;

FIG. 38 is a state diagram for the complete rate negotiation processing, according to a preferred embodiment of the present invention;

FIG. 39 is a state diagram for the rate negotiation processing for a called node during a 64 KBPS upgrade;

FIG. 40 is a state diagram for the rate negotiation processing for a calling node during a 64 KBPS upgrade; and FIG. 41 is a state diagram for the rate negotiation processing in loopback mode during a 64 KBPS upgrade.

DESCRIPTION OF THE PREFERRED EMBODIMENT(S)

Point-To-Point Conferencing Network

Figures 8A, 8B:
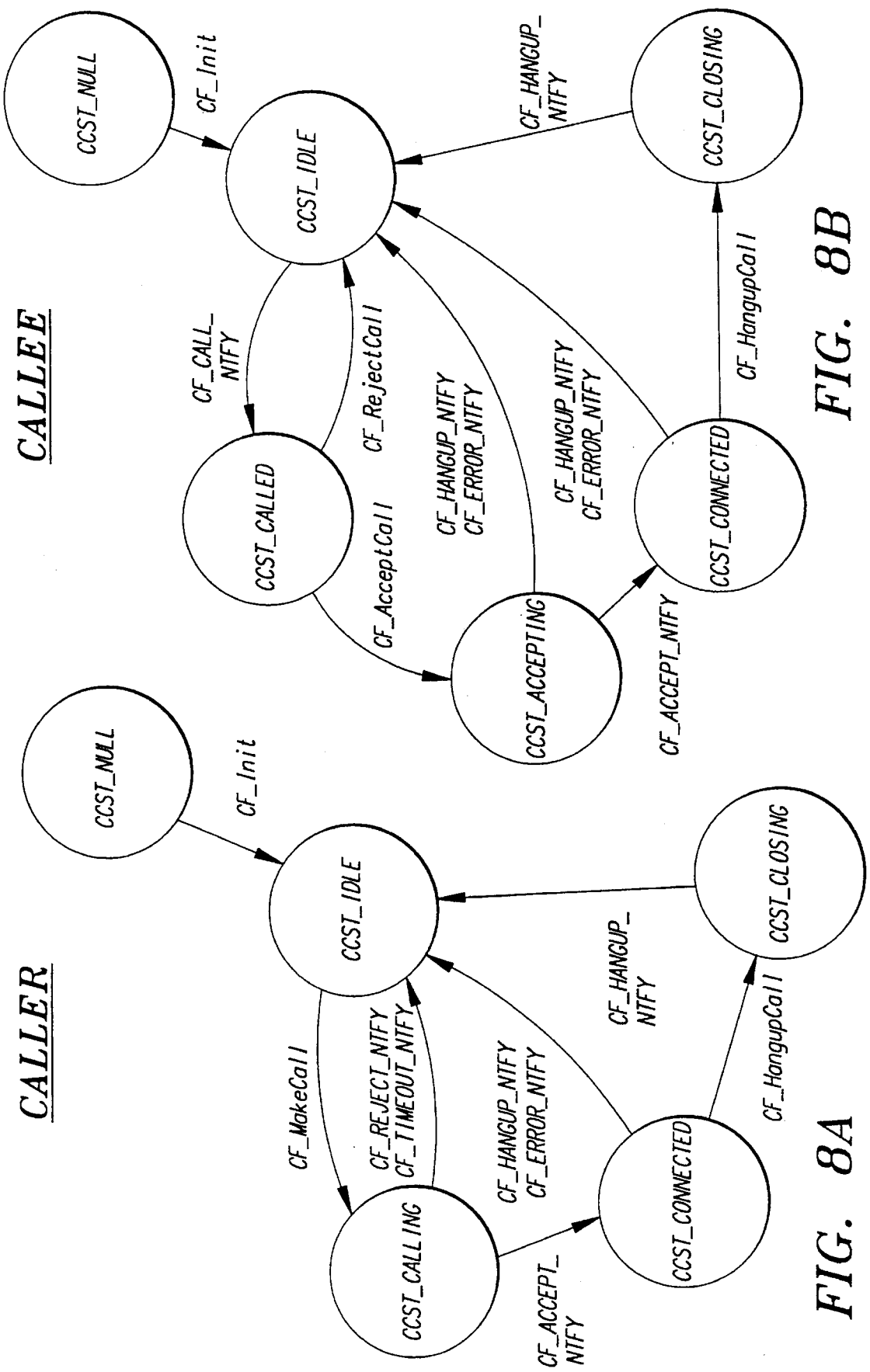
FIG. 8 is a representation of the conferencing call finite state machine (FSM) for a conferencing session between a local conferencing system (i.e., caller) and a remote conferencing system (i.e., callee)

Referring now to FIG. 1, there is shown a block diagram representing real-time point-to-point audio, video, and data conferencing between two PC systems, according to a preferred embodiment of the present invention. Each PC system has a conferencing system 100, a camera 102, a microphone 104, a monitor 106, and a speaker 108. The conferencing systems communicate via an integrated services digital network (ISDN) 110. Each conferencing system 100 receives, digitizes, and compresses the analog video signals generated by camera 102 and the analog audio signals generated by microphone 104. The compressed digital video and audio signals are transmitted to the other conferencing system via ISDN 110, where they are decompressed and converted for play on monitor 106 and speaker 108, respectively. In addition, each conferencing system 100 may generate and transmit data signals to the other conferencing system 100 for play on monitor 106. In a preferred embodiment, the video and data signals are displayed in different windows on monitor 106. Each conferencing system 100 may also display the locally generated video signals in a separate window.

Camera 102 may be any suitable camera for generating NSTC or PAL analog video signals. Microphone 104 may be any suitable microphone for generating analog audio signals. Monitor 106 may be any suitable monitor for displaying video and graphics images and is preferably a VGA monitor. Speaker 108 may be any suitable device for playing analog audio signals and is preferably a headset.

Conferencing System Hardware Configuration

Referring now to FIG. 2, there is shown a block diagram of the hardware configuration of each conferencing system 100 of FIG. 1, according to a preferred embodiment of the present invention. Each conferencing system 100 comprises host processor 202, video board 204, audio/comm board 206, and ISA bus 208.

Referring now to FIG. 3, there is shown a block diagram of the hardware configuration of video board 204 of FIG. 2, according to a preferred embodiment of the present invention. Video board 204 comprises industry standard architecture (ISA) bus interface 310, video bus 312, pixel processor 302, video random access memory (VRAM) device 304, video capture module 306, and video analog-to-digital (A/D) converter 308.

Referring now to FIG. 4, there is shown a block diagram of the hardware configuration of audio/comm board 206 of FIG. 2, according to a preferred embodiment of the present invention. Audio/comm board 206 comprises ISDN interface 402, memory 404, digital signal processor (DSP) 406, and ISA bus interface 408, audio input/output (I/O) hardware 410.

Conferencing System Software Configuration

Referring now to FIG. 5, there is shown a block diagram of the software configuration each conferencing system 100 of FIG. 1, according to a preferred embodiment of the present invention. Video microcode 530 resides and runs on pixel processor 302 of video board 204 of FIG. 3. Comm task 540 and audio task 538 reside and run on DSP 406 of audio/comm board 206 of FIG. 4. All of the other software modules depicted in FIG. 5 reside and run on host processor 202 of FIG. 2.

Video, Audio, and Data Processing

Referring now to FIGS. 3, 4, and 5, audio/video conferencing application 502 running on host processor 202 provides the top-level local control of audio and video conferencing between a local conferencing system (i.e., local site or endpoint) and a remote conferencing system (i.e., remote site or endpoint). Audio/video conferencing application 502 controls local audio and video processing and establishes links with the remote site for transmitting and receiving audio and video over the ISDN. Similarly, data conferencing application 504, also running on host processor 202, provides the top-level local control of data conferencing between the local and remote sites. Conferencing applications 502 and 504 communicate with the audio, video, and comm subsystems using conference manager 544, conferencing application programming interface (API) 506, video API 508, comm API 510, and audio API 512. The functions of conferencing applications 502 and 504 and the APIs they use are described in further detail later in this specification.

During conferencing, audio I/O hardware 410 of audio/comm board 206 digitizes analog audio signals received from microphone 104 and stores the resulting uncompressed digital audio to memory 404 via ISA bus interface 408. Audio task 538, running on DSP 406, controls the compression of the uncompressed audio and stores the resulting compressed audio back to memory 404. Comm task 540, also running on DSP 406, then formats the compressed audio for ISDN transmission and transmits the compressed ISDN-formatted audio to ISDN interface 402 for transmission to the remote site over ISDN 110.

ISDN interface 402 also receives from ISDN 110 compressed ISDN-formatted audio generated by the remote site and stores the compressed ISDN-formatted audio to memory 404. Comm task 540 then reconstructs the compressed audio format and stores the compressed audio back to memory 404. Audio task 538 controls the decompression of the compressed audio and stores the resulting decompressed audio back to memory 404. ISA bus interface then transmits the decompressed audio to audio I/O hardware 410, which digital-to-analog (D/A) converts the decompressed audio and transmits the resulting analog audio signals to speaker 108 for play.

Thus, audio capture/compression and decompression/playback are preferably performed entirely within audio/comm board 206 without going through the host processor. As a result, audio is preferably continuously played during a conferencing session regardless of what other applications are running on host processor 202.

Concurrent with the audio processing, video A/D converter 308 of video board 204 digitizes analog video signals received from camera 102 and transmits the resulting digitized video to video capture module 306. Video capture module 306 decodes the digitized video into YUV color components and delivers uncompressed digital video bitmaps to VRAM 304 via video bus 312. Video microcode 530, running on pixel processor 302, compresses the uncompressed video bitmaps and stores the resulting compressed video back to VRAM 304. ISA bus interface 310 then transmits via ISA bus 208 the compressed video to video/host interface 526 running on host processor 202.

Video/host interface 526 passes the compressed video to video manager 516 via video capture driver 522. Video manager 516 calls audio manager 520 using audio API 512 for synchronization information. Video manager 516 then time-stamps the video for synchronization with the audio. Video manager 516 passes the time-stamped compressed video to communications (comm) manager 518 using comm application programming interface (API) 510. Comm manager 518 passes the compressed video through digital signal processing (DSP) interface 528 to ISA bus interface 408 of audio/comm board 206, which stores the compressed video to memory 404. Comm task 540 then formats the compressed video for ISDN transmission and transmits the ISDN-formatted compressed video to ISDN interface 402 for transmission to the remote site over ISDN 110.

ISDN interface 402 also receives from ISDN 110 ISDN-formatted compressed video generated by the remote site system and stores the ISDN-formatted compressed video to memory 404. Comm task 540 reconstructs the compressed video format and stores the resulting compressed video back to memory 404. ISA bus interface then transmits the compressed video to comm manager 518 via ISA bus 208 and DSP interface 528. Comm manager 518 passes the compressed video to video manager 516 using video API 508. Video manager 516 passes the compressed video to video decode driver 548 for decompression processing. Video decode driver 548 passes the decompressed video to video playback driver 550, which formats the decompressed video for transmission to the graphics device interface (GDI) (not shown) of the Microsoft® Windows™ operating system for eventual display in a video window on monitor 106.

For data conferencing, concurrent with audio and video conferencing, data conferencing application 504 generates and passes data to comm manager 518 using conferencing API 506 and comm API 510. Comm manager 518 passes the data through board DSP interface 532 to ISA bus interface 408, which stores the data to memory 404. Comm task 540 formats the data for ISDN transmission and stores the ISDN-formatted data back to memory 404. ISDN interface 402 then transmits the ISDN-formatted data to the remote site over ISDN 110.

ISDN interface 402 also receives from ISDN 110 ISDN-formatted data generated by the remote site and stores the ISDN-formatted data to memory 404. Comm task 540 reconstructs the data format and stores the resulting data back to memory 404. ISA bus interface 408 then transmits the data to comm manager 518, via ISA bus 208 and DSP interface 528. Comm manager 518 passes the data to data conferencing application 504 using comm API 510 and conferencing API 506. Data conferencing application 504 processes the data and transmits the processed data to Microsoft® Windows™ GDI (not shown) for display in a data window on monitor 106.

Preferred Hardware Configuration for Conferencing System

Figure 30:
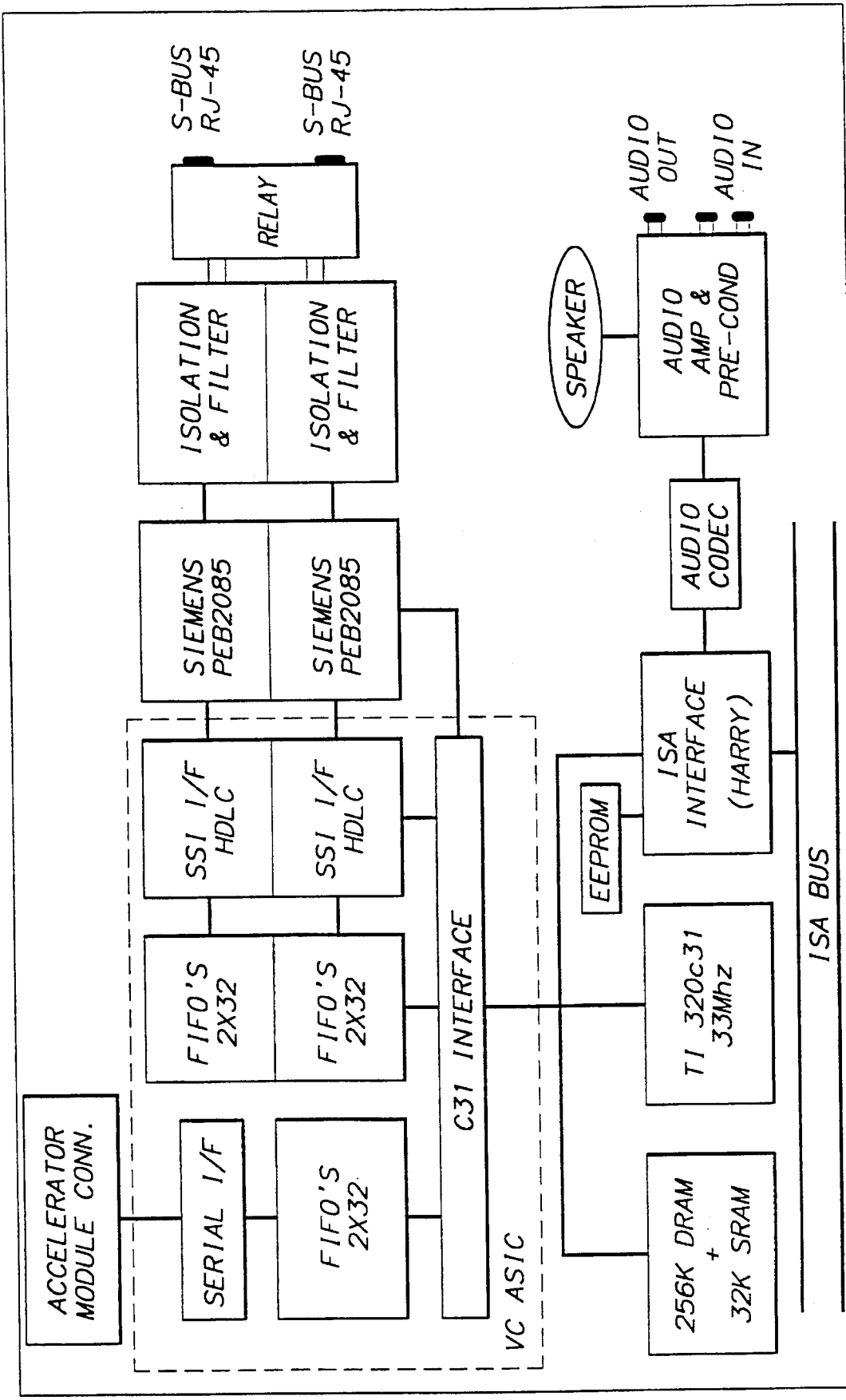
FIGS. 30 and 31 are diagrams of the architecture of the audio/comm board.
Figure 31:
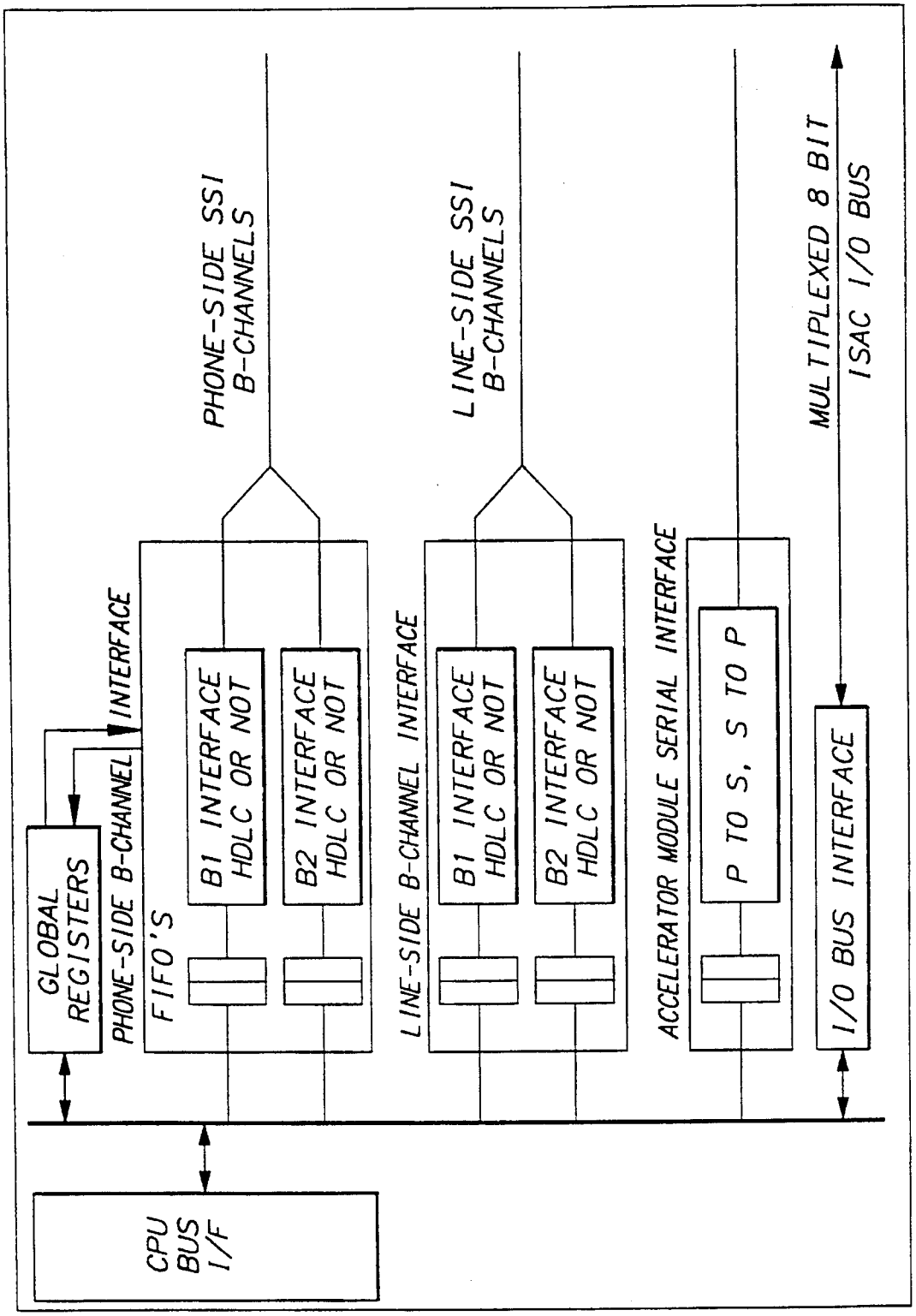
Figure 32:
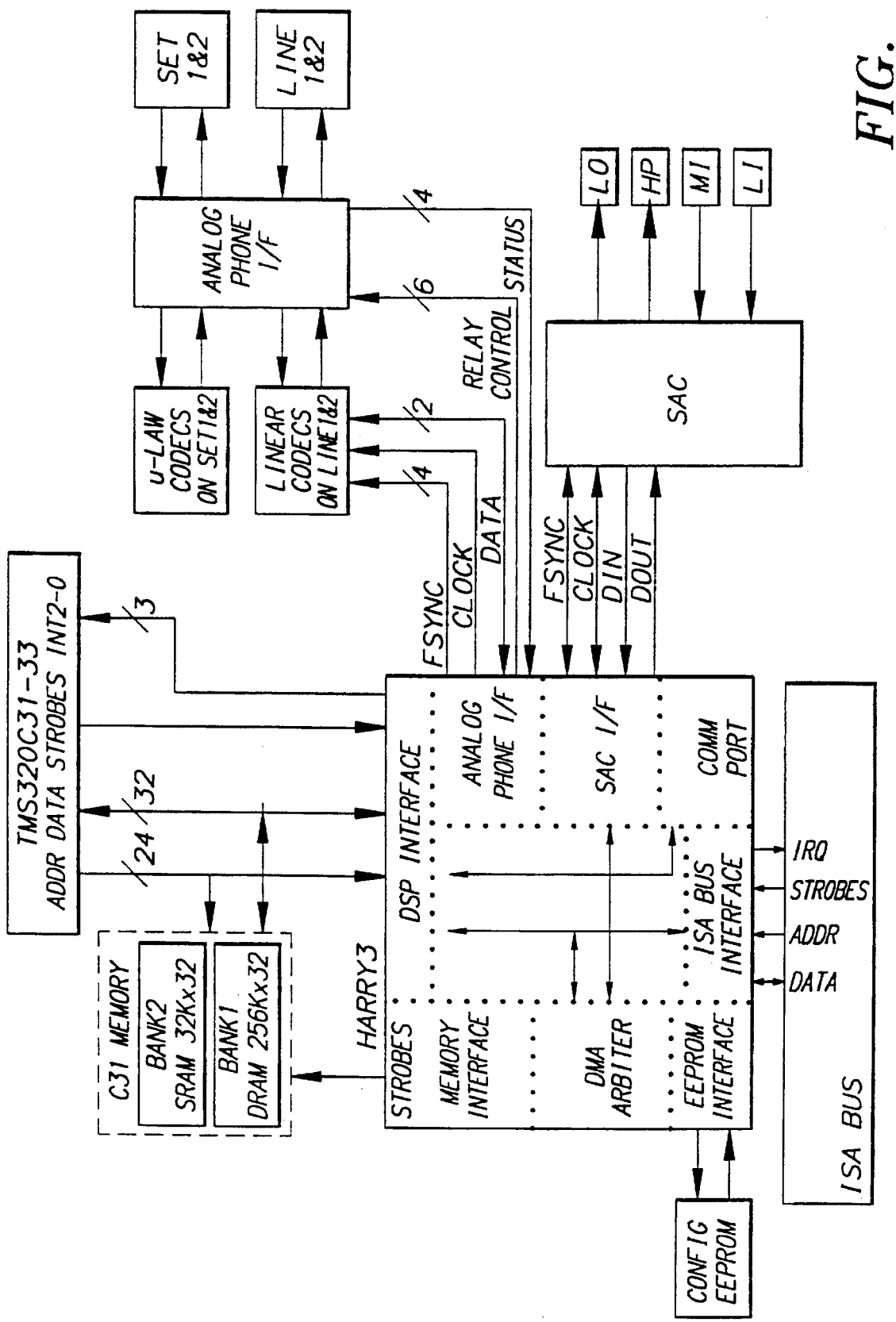
FIG. 32 is a diagram of the audio/comm board environment.

Referring now to FIG. 6, there is shown a block diagram of a preferred embodiment of the hardware configuration of audio/comm board 206 of FIG. 4. Referring now to FIGS. 30 and 31, there are shown diagrams of the architecture of the audio/comm board. Referring now to FIG. 32, there is shown a diagram of the audio/comm board environment. The description for this section is the same as the description for the section of the same name in U.S. patent application Ser. No. 08/157,694.

Software Architecture for Conferencing System

The software architecture of conferencing system 100 shown in FIGS. 2 and 5 has three layers of abstraction. A computer supported collaboration (CSC) infrastructure layer comprises the hardware (i.e., video board 204 and audio/comm board 206) and host/board driver software (i.e., video/host interface 526 and DSP interface 528) to support video, audio, and comm, as well as the encode method for video (running on video board 204) and encode/decode methods for audio (running on audio/comm board 206). The capabilities of the CSC infrastructure are provided to the upper layer as a device driver interface (DDI).

A CSC system software layer provides services for instantiating and controlling the video and audio streams, synchronizing the two streams, and establishing and gracefully ending a call and associated communication channels. This functionality is provided in an application programming interface (API). This API comprises the extended audio and video interfaces and the communications APIs (i.e., conference manager 544, conferencing API 506, video API 508, video manager 516, video capture driver 522, video decode driver 548, video playback driver 550, comm API 510, comm manager 518, Wave API 514, Wave driver 524, PWave API 552, audio API 512, and audio manager 520).

A CSC applications layer brings CSC to the desktop. The CSC applications may include video annotation to video mail, video answering machine, audio/video/data conferencing (i.e., audio/video conferencing application 502 and data conferencing application 504), and group decision support systems.

Audio/video conferencing application 502 and data conferencing application 504 rely on conference manager 554 and conferencing API 506, which in turn rely upon video API 508, comm API 510, and audio API 512 to interface with video manager 516, comm manager 518, and audio manager 520, respectively. Comm API 510 and comm manager 518 provide a transport-independent interface (TII) that provides communications services to conferencing applications 502 and 504. The communications software of conferencing system 100 may be designed to support different transport mechanisms, such as ISDN, SW56, and LAN (e.g., SPX/IPX, TCP/IP, or NetBIOS). The TII isolates the conferencing applications from the underlying transport layer (i.e., transport-medium-specific DSP interface 528). The TII hides the network/connectivity specific operations. In conferencing system 100, the TII hides the ISDN layer. The DSP interface 528 is hidden in the datalink module (DLM). The TII provides services to the conferencing applications for opening communication channels (within the same session) and dynamically managing the bandwidth. The bandwidth is managed through the transmission priority scheme.

In a preferred embodiment in which conferencing system 100 performs software video decoding, video capture driver 522 is implemented on top of video/host interface 526 (the video driver). In an alternative preferred embodiment in which conferencing system 100 performs hardware video decoding, a video display driver is also implemented on top of video/host interface 526.

The software architecture of conferencing system 100 comprises three major subsystems: video, audio, and communication. The audio and video subsystems are decoupled and treated as "data types" (similar to text or graphics) with conventional operations like open, save, edit, and display. The video and audio services are available to the applications through video-management and audio-management extended interfaces, respectively.

In a preferred embodiment, conferencing system 100 is implemented mostly in the C++ computer language using the Microsoft® Foundation Classes (MFC) with portions implemented in the C7.0 computer language.

Audio/Video Conferencing Application

Audio/video conferencing application 502 implements the conferencing user interface. Conferencing application 502 is implemented as a Microsoft® Windows™ 3.1 application. One child window will display the local video image and a second child window will display the remote video image. Audio/video conferencing application 502 provides the following services to conferencing system 100:

Manages main message loop.

Performs initialization and registers classes.

Handles menus.

Processes toolbar messages.

Handles preferences.

Handles speed dial setup and selections.

Connects and hang up.

Handles handset window

Handles remote video.

Handles remote video window.

Handles local video.

Handles local video window.

Handles call notification dialog box.

Plays sounds.

Handles address book lookup for caller identification purposes.

Audio/video conferencing application 502 is made up of six main modules:

(1) ABIF.LIB: An address book class wrapper library.

(2) SUBDLG.LIB: A sub-dialog library.

(3) CMDLL.DLL: A conference manager DLL (shown in FIG. 5 as conference manager 544).

(4) CMIF.LIB: A library with high-level interfaces to CMDLL.DLL and other sub-systems.

(5) PSVIDEO.EXE: An audio/video application proper.

(6) PSNOTIFY.EXE: An incoming call notification application (a listener).

CMIF.LIB

The CMIF.LIB CMIF was created to encapsulate several subsystem APIs: conference manager API 544, conferencing API (VCI) 506, audio API 512, and video API 508. It is a set of (mostly) static classes (data and functions). It consists of 3 classes: CCm, CImageSize, and CImageState. CImageSize encapsulates the various sizes that video images can have. CImageState encapsulates the different attributes and drivers that a video image can have. CCm handles everything not covered by CImageSize and CImageState. CCm includes a callback function to handle notification from CMDLL.

The callback function in CCm can be called in the context of another application (namely VTHREAD.EXE of VCI 506). This is the reason that CMIF is a separate library. By making it a separate library the compile flags are set to use smart callbacks in a way that is compatible with MakeProcInstance( ). MakeProcInstance( ) is used on the callback to force the data segment to point appropriately upon entering the callback function.

CCm

The CCm class simplifies calling routines in subsystem APIs. It has the following capabilities: loading and unloading of the subsystem DLLs, registering and unregistering with CMDLL, call support, channel pair support, stream support, CMDLL callback handler, and NO_VCI support. CCm assumes that there is one video call. This call can be in various different states: disconnected, connecting, connected, and disconnecting. Tests and assertions are performed throughout the code to verify that operations on a call can be carried out during the current call state.

Loading and Unloading

CCm::Load( ) loads the various subsystems. It does so by calling LoadLibrary( ) for each DLL. For each subsystem, after successfully loading the library into memory, CCm::Load( ) loads a table of function pointers for each subsystem by calling GetProcAddress( ). There are macros that allow CCm to call these functions in a manner consistent with implicit linking.

CCm::Unload( ) unloads the various subsystems. It does so by calling UnloadLibrary( ) for each DLL.

Registering and Unregistering

CCm::Register( ) registers CCm::Callback( ) as a callback function with CMDLL 544. It also registers an application window with CMIF to post messages to. It should be called once upon application startup.

CCm::UnRegister( ) unregisters with CMDLL. It should be called once upon application shutdown.

CCm::Install( ) allows an application that is not currently installed in CMDLL's registry to install itself there. This should be called if CCm::Register( ) fails with a return code of CMRC_UNKNOWNAPP. Then, after successfully calling CCm::Install( ), call CCm::Register( ) again.

Call Support

CCm::MakeCall( ) allows the application to place a video call via CMDLL 544. CCm::MakeCall( ) takes a ISDN phone number (of the callee) and a name (of the caller). The name is passed to the callee for display in the caption of the remote video window. Upon successful return from CCm::MakeCall( ), the call will be in the connecting state.

CCm::HangupCall( ) hangs the current call up. If there is no call in progress, it returns an error code. Upon successful return from CCm::HangupCall( ), the call will be in the disconnecting state.

Channel Pair Support

A channel pair is a bi-directional VCI/TII communication channel. It can be used to send and receive data from a peer application during a video call. Channel pairs are established with a peer application (facilitated through registration) and are referred to by an id (0–31). CMDLL 544 provides this channel pair support to CMIF.

CCm::GetChannelPairInfo( ) can be called with a channel pair id. It will return information pertaining to the given channel pair or an error code if it failed.

CCm::GetChannelPair( ) requests a channel pair from CMDLL. The request is completed when CMDLL sends the CMN_CHANNELPAIR callback message. This message indicates whether or not the channel was successfully opened. Once a channel pair is opened it needs to have a channel handler registered for it. This is done by calling CCm::RegisterChanHandler( ) for each channel in the channel pair.

After successfully registering a channel handler for each channel in a channel pair, the channel pair can be used to send and receive data.

CCm::SendData( ) requests that data be sent on the outbound channel within a channel pair. The request is complete when VCI sends the CHAN_DATA_SENT callback message to the channel handler.

CCm::ReceiveData( ) posts a receive buffer to VCI/TII for the inbound channel to receive data into. When data has been successfully received into a buffer for the inbound channel, VCI sends the CHAN_RCV_COMPLETE callback message to the channel handler. This buffer must not be freed until the receive has completed.

When finished using a channel pair, call CCm::CloseChannelPair( ) to request that the resources associated with it be freed. The request is complete when CMDLL sends the CMN_CLOSECHANNELPAIR callback message. After receiving this message do not attempt to use the channels in that channel pair. PSVIDEO encapsulates registering a channel handler and sending and receiving data in a class called CChannelPair.

Stream Support

VCI stream groups contain both an audio data stream and a video data stream. They can be either local or remote. Local stream groups are created by calling CCm::CreateLocalStream( ) and remote stream groups are created by calling CCm::CreateRemoteStream( ). Both take as parameters a window in which to play the video, a size to play the video at, a state to play the video in, and flags specifying whether or not to play the video/audio. Local stream groups do not play audio locally, whereas remote stream groups do. There is preferably only local stream group and one remote stream group.

To start sending the local stream group to the peer video conferencing application, call CCm::SendLocalStream( ). This should be called only once after the video call has been established and the local stream group has been created.

To start and stop sending during a video call, call CCm::SendLocalStreamMute( ). This has the same syntax as the former, but does not stop the audio time stamps from being sent to the peer application. These audio time stamps are preferably continually sent, after they have been started, for the life of a video call.

To start and stop playing either the local stream group or the remote stream group, call CCm::PlayLocalStream( ) or CCm::PlayRemoteStream( ), respectively. These also can be used to play a stream at a different size or state than it was previously being played at before (i.e., the local stream group can be played as an IRV video stream or a YUV video stream).

To change the window in which either the local stream group or the remote stream group is being played, call CCm::RedirectLocalVideo( ) or CCm::RedirectRemoteVideo( ), respectively.

To take a snapshot of either stream, call CCm::SnapStream( ). It will return a device independent bitmap of the given stream group's current video image. It does not matter what the size or state of the video stream is or whether it is the local or remote stream group.

To control the volume of the remote stream group (remember local streams do not play audio), call CCm::SetWaveVolume( ).

To switch the remote stream group in and out of open audio (half-duplex speaker phone), call CCm::SetOpenAudio( ).

To control either stream groups video attributes (color, contrast, brightness, and tint), call CCm::SetColor( ), CCm::SetContrast( ), CCm::SetBrightness( ), and CCm::SetTint( ). However, CCm::SetTint( ) is not preferably supported for the remote stream group.

To adjust the display quality (frequency) of the local stream group, call CCm::SetFRC( ). Also, local stream groups can toggle between mirror and camera views and normal and wide angle views.

To toggle these attributes, call CCm::SetMirrorView( ) and CCm::SetWideAngle( ), respectively.

CCm::Redraw( ) forces the given stream group to redraw itself.

To free the resources allocated for a stream group call CCm::DestroyStream( ).

CMDLL Callback

When registering with CMDLL 544, a callback function is specified. CMIF specifies a procedure instance for CCm::CallBack( ). This callback function may be called in the context of another application. This is why MakeProcInstance( ) is used to generate a procedure instance for the callback. However, smart callbacks (e.g., Microsoft® C8.0 compiler flag /GA) are not compatible with MakeProcInstance( ). Use the old style callbacks (e.g., Microsoft® C8.0 compiler flag /Gw, /GW or /GA/GEea) instead.

This callback function receives the following types of messages from CMDLL 544: call messages (CMN_CALL, CMN_HANGUP, CMN_REJECTED, CMN_PROGRESS), channel pair messages (CMN_CHANNELPAIR, CMN_CLOSECHANNELPAIR), CMDLL shutdown message (CMN_EXIT) and error message (CMN_

ERROR). For each message sent to this callback, a message is posted to the application window that was given during registration.

When a call message is received, the call state is tested to validate whether the message is valid in the current call state or not. When a message is received that does not correspond to the current call state, a debug message is printed out and in some cases an appropriate action is taken to correct the situation. When a CMN_CALL, CMN_HANGUP, or CMN_REJECTED message is received, the call state is updated to reflect the state diagram shown above.

NO VCI Support

The NO_VCI compiler is a user interface (UI) development tool to help UI developers debug and test their code without the subsystems running. Most every function that calls a subsystem has the following code fragment:

```
// code to handle either case
#ifndef NO_VCI
// code to handle the case when calling the subsystem
.
.
.
#else
// code to handle the case when not calling the subsystem
.
.
.
#endif
// code to handle either case
```

As the subsystems change, this flag allows the UI developers to postpone integration with these changes. Also, debugging is sometimes difficult when running with the subsystems enabled.

Miscellaneous

CCm::GetUtilization( ) queries the video subsystem for the cost (as a percent of system utilization) of a single video window with the given characteristics. If there is a failure in getting this cost, the cost returned is 100.

CCm::GetErrorText( ) gets the error text for a given error code from either CMDLL 544 or VCI 506.

CCm::IsLostCallError( ) returns TRUE if the given error code could represent a lost call.

CImageSize

CImageSize encapsulates the image size and display speed attributes of a video stream. It contains operators that allow for iteration through the various sizes. Lastly, it contains member constants that can be queried to see if various image attributes are supported for a given video device driver at the size represented by the object.

CImageState

CImageState encapsulates the image state of a video stream. This state is represented in terms of features that can be turned on or off and various video device drivers (e.g., IRV and YUV). Calling CImageState::AddFlag( ) will turn on or off a given feature in the current image state. To test to see if a feature is on or off, call CImageState::IsFlagSet( ). CImageState also allows the changing of the current video driver.

PSVIDEO.EXE

This section provides details on the objects and class hierarchies in PSVIDEO.EXE. The objects are described in a top down fashion. The class structure is defined with the following two long-term goals:

(1) The architecture is extensible to a multipoint environment.

(2) The architecture is easy to modify. For example, it is easy to rip out all video specific code in order to implement a phone-on-the-screen.

Frame, View, and Image

Three terms are used quite a bit in this section: frame, view, and image windows. The image window corresponds to the area of the display containing just the video image. The view image contains the image window plus a panel which has buttons and controls specific to the view. The frame is the top-most window and contains the local view.

Class Descriptions

This section describes most of the classes in the class hierarchy, as well as their relationships to other classes.

CCyApp

CCyApp is derived from the Microsoft® CWinApp class, which is the base class from which a Microsoft® Windows™ application object is derived in the MFC framework. The CCyApp object provides member functions for initializing the application and for running the application. This object is constructed when other C++ global objects are constructed and is already available when the Microsoft® Windows™ operating system calls the WinMain function, which is supplied by the MFC framework. As required by MFC, the InitInstance member function has been overridden to create the application's main window object.

Many classes in PSVIDEO declare a CSettings class. Each class is responsible for reading, updating, and saving their own settings (e.g., window screen location) or preferences (always on top). They do this through the CSettings class. Each class that requires settings to be saved implements DoSettings(CSettings *). The DoSettings(CSettings *) function gets and puts the settings associated with that class. When settings are loaded, changed, or saved, parent classes are responsible for notifying their children about the setting event. The children then call their children until all the classes in the hierarchy have performed the necessary setting adjustments. Use the Visual C++ browser to look at examples of DoSettings implementations. A preference is a value that is stored in the PSVIDEO.INI file under the [Preferences] section. A setting is a value that is stored in the PSVIDEO.INI file. The difference is that a preference is set in the Preference dialog box, while settings are not. Settings are things like window size and position.

The CSettings class is derived both from ISettings and CCyDialog. ISettings is not derived from any thing. It declares the virtual function DoSetting (which is implemented by classes derived from ISettings). CSettings also provides a dialog box for user preferences.

CCyApp is also responsible for handling <F1> and <Shift-F1> help requests. Because PSVIDEO uses the Microsoft® Viewer for displaying help instead of the standard Microsoft® Windows™ help engine (WinHelp), the void CWinApp::WinHelp function is overridden so that the viewer is called instead of WinHelp.

When the application is invoked, the MFC framework calls CWinApp::InitInstance. When the application is closed, the MFC framework calls CWinApp::ExitInstance.

CCyFrameWnd

CCyFrameWnd is derived from CFrameWnd and is not directly instantiated. The CFrameWnd class provides the functionality of a Microsoft® Windows™ single document interface (SDI) overlapped or pop-up frame window, along with members for managing the window. The main reason for defining CCyFrameWnd is to provide a class with methods common to the three windows in the application (handset, local video, and remote video), including the non-client drawing and system menu handling.

Frame windows have access to the video controller. The main reason for this is that the CAppFrame class (derived from CCyFrameWnd) informs the video controller about certain events (e.g., call started, call ended) and queries the video controller for certain information (e.g., whether the video windows are ready to close).

CCyAppFrame

CCyAppFrame is derived from CCyFrameWnd. This class implements the PSVIDEO main window (which includes the handset) and owns all dialog boxes in the application (except the Preferences . . . dialog box in CSettings, which is available through its reference to CSetting). This class is responsible for handling menu selections and handset button clicks. CMIF contains a callback routine for processing callbacks from CMDLL 544. CMIF passes CMDLL messages on to CAppFrame. CAppFrame implements the following message handlers for the messages passed on from CMIF:

CAppFrame::OnCmCall—A call has started. Notify CHandset so that the appropriate call progress is displayed and the call duration clock starts. Notify CVideoController so that it starts to play the remote video stream. The caller also requests a channel pair from CMDLL. This channel pair is used for sending and receiving control data such as mute on or mute off.

CAppFrame::OnCmHangup—A call has ended. Inform CHandset so that call progress is set correctly and the duration timer stops. Notify CVideoController so that it stops playing the remote video stream.

CAppFrame::OnCmRejected—The call that was placed was rejected by the other side. Inform CHandset so that call progress is set correctly.

CAppFrame::OnCmProgress—Call progress messages originating from VCI 506. Inform CHandset so that call progress is set correctly.

CAppFrame::OnCmChannelPair—A channel pair has been established. Register channel handlers for the input and output channels.

CVideoFrame

CVideoFrame encapsulates properties and methods for a video window. It is derived from CCyFrameWnd and is not directly instantiated. Two classes are based on CVideoFrame: CLocalFrame and CRemoteFrame. The CVideoFrame class' main responsibility is to manage and keep track of frame window size and handle commands specific to video frame windows.

CVideoController

The CVideoController object is derived from CCmdTarget and ISettings. Its main purpose is to manage video windows. In a preferred embodiment of the present invention, there are only two video windows. In alternative preferred embodiments, there may be several video windows and this class will then be extended to keep track of the list of available video windows.

The CVideoController class is also responsible for implementing size and display rate restrictions. When the user resizes a video frame window, CVideoController will determine appropriate size for the "other" window based on system characteristics (CPU and graphics adapter). CVideoController is responsible for sending size messages to the appropriate video window. CVideoController keeps track of state information related to audio and video, e.g., mute, high quality, and open audio.

Auto-Sizing of Video Windows

The audio/video conferencing application 502 has two video windows: one for the local camera video image and one for the remote camera video image. The user of application 502 expects to be allowed to change the size of these video windows. However, the computer system may not have enough processing power to accommodate such a change, due to the demands larger video windows place on the system. Specifically, increasing the size of one of the video windows may exceed an acceptable amount of the computer system's processing power. If the user is allowed to change the size of one of the video windows without any constraints, the video quality may degrade to an unacceptable level. Conferencing application 500 automatically resizes the windows to utilize some acceptable amount of the computer system's processing power. The sizes a video window can be are preferably constrained to an optimized set based on the video subsystem software.

Split and Combined Modes

Conferencing application 502 can be in one of two modes: split or combined. This section explains how the frame, view, image model is used to implement split and combine. In general, a method is provided to convert a single top-level window, W, with more than one child window, w1, . . . , wn, to multiple top-level windows, W1, . . . , Wn, each of which contains one of the child windows w1, . . . , wn. Typically, the window W is the same window as some window Wi, $1<=i<=n$. A top-level window is a window that is the child of the desktop window. The method assumes that in the single window mode, there is a top-level window with several child windows. Each child may have its own children, but this is irrelevant to this discussion. In split windows mode, each child (or a subset of the children) is re-parented and gets its own parent (which is a top-level window). These additional top-level windows can be managed in at least two ways:

(1) Create them upon application start-up. If the application is in combined window mode, then hide the windows. If the application is in split windows mode, then show the windows.

(2) Dynamically create and destroy them as needed.

Switching between combined window mode and split windows mode may be implemented as follows:

SingleToMultiple:

Create top level windows if needed.

Re-parent children that needs to be re-parented.

Show the additional top-level windows.

MultipleToSingle:

Hide the top level windows that are losing their child windows.

Show the children in the single window.

Destroy top-level windows if needed.

In PSVIDEO.EXE, the split/combine code can be found in the file videoctl.cpp in the method CVideoController::SetGrouping.

Control Channel Management

This section describes the application control channel. The control channel enables conferencing application 502 to inform peer of events (e.g., mute on and mute off) and transfer arbitrary size information. In general, the application control channel can be used to transmit any data. For example, conferencing application 502 has an "audio/video mute" feature, which allows a video conferencing participant to click on a button so that he/she is no longer visible to the other conference participant. The peer application must be informed about this operation so that it can discontinue displaying the video image and instead display some indication that the other side turned mute on.

By establishing a control channel and a control structure, peer applications are able to be notified about events that require some action. The control channel assumes reliable transfer of control packets. Conferencing system 100 does not confirm the receipt of control channel messages. This simplifies the implementation. All control channel messages are of the following form:

```
typedef struct tagChanMsgData {
    WORD    wMsg;          // message identifier.
    DWORD   dwMsgParam;    // message specific parameter/value.
    DWORD   dwSequence;    // sequence number for a series of control packets.
    WORD    wBufferSize;   // size of the buffer following the structure.
} ChanMsgData, FAR* LPCHANMSGDATA;
```

In order to send additional data along with a control channel structure, data is arranged following the structure. The size amount of data is specified, in number of bytes, by the dwBufferSize field. Four messages have been defined: mute, high quality snapshot, application launch, and application launch response.

Mute Message

Only wMsg and dwMsgParam are used for the MUTE message.

| | |
|---|---|
| wMsg: | value = 1. |
| dwMsgParam: | LOWORD of dwMsgParam specifies the audio state.<br>0 = audio mute off<br>1 = audio mute on<br>2 = no change<br>HIWORD of dwMsgParam specifies the video state.<br>0 = video mute off<br>1 = video mute on<br>2 = no change |

For example, to mute video without changing the state of audio dwMsgParam would be MAKELONG(2, 1). CVideoController sets the mute state when the user clicks the mute button and informs the peer about its new state using the control channel.

High-Quality Snapshot Message

The SNAPSHOT message is sent to the peer application when a still image capture that disables outgoing video stream is in progress. For example, to achieve a certain still image quality, outgoing video may have to be disabled. In these situations, the SNAPSHOT message is sent to peer application. The message is resent when the flow of outgoing video resumes. Only wMsg and dwMsgParam are used for the SNAPSHOT message.

| | |
|---|---|
| wMsg: | value = 2. |
| dwMsgParam: | LOWORD of dwMsgPam specifies the snapshot state.<br>0 = High-quality mode OFF<br>1 = High-quality mode ON |

Application Launch

The APPLAUNCH message is sent to a remote node to launch an application. The application path is specified in the buffer following the control channel structure. wBufSize holds the size of the buffer. The other fields are not used.

| | |
|---|---|
| wMsg: | value = 101. |

Application Launch Response

The APPLAUNCHRESPONSE message is sent by the remote node that was asked to launch an application. The return code of the Microsoft® Windows™ WinExec function is passed back in dwMsgParam. The other fields are not used.

| | |
|---|---|
| wMsg: | value = 102. |

CChanPair

CVideoController has an instance of a CControlChannel class which is derived from the class CChanPair. CChanPair provides an abstraction of CMDLL and TII services.

Video View Class Relationships

The CVideoView class' main responsibilities are to manage image (video) windows (CImageWindow) and handle the control bar operations available in the video panels (CVideoViewPanel). There exist two classes, CLocalView and CRemoteView, that encapsulate specific functionality of the remote and local windows. The CLocalView and CRemoteView classes have a CLocalImage and CRemoteImage class, respectively. In addition, CLocalViewPanel and CRemoteViewPanel have been derived to contain functionality specific to the local and remote windows.

CVideoView knows about the CVideoController class. When the user selects a function such as size or snapshot in the panels, the CVideoView informs the CVideoController about the user's request. CVideoController is responsible for auto-sizing the video windows.

Handset Class Relationships

As described earlier, the CAppFrame class has an instance of a CHandset. The CHandset class is a window. The controls inside the handset window are specified in a dialog template. This is the reason why CHandset is derived from CDialog. A modeless and borderless dialog box is placed on top of a window, in this case, CAppFrame. CHandset is responsible for handling all button clicks and user interactions in the handset area.

In addition to using several MFC defined classes, CHandset also has a CLcd and a speed dial list, a CSDComboBox. The CLcd class consists of instances of CStatic for call progress information and call duration, and of CEdit for entering the number to dial. CSDComboBox is an owner-drawn listbox that displays the five most recently dialed numbers and also speed dial numbers. Finally, CHandset contains several buttons.

An interface is defined for interactions between CHandset and CSpeedDial. When a number has been dialed, the CHandset informs CSpeedDial about the dialed number. CSpeedDial is then responsible for updating the speed dial list (the CSDComboBox) and the PSVIDEO.INI file.

Dialog Boxes

Conferencing application 502 contains several dialog boxes. The focus of this section is to describe CCyDialog. A special dialog box class is derived from CDialog to avoid problems when dialog boxes are displayed when the application is in split mode and some or all of the topmost windows (handset, local video, remote video, snapshot) are always-on-top. Specifically:

(1) If a dialog is brought up when the application was in split mode (3 Windows) and one of the topmost windows is always-on-top, then portions of the dialog box would otherwise be obscured by the always-on-top window. For example, the Preferences dialog box would be on top of the handset window but underneath the remote window.

(2) When the user brings up a dialog box when the applications is in split mode (3 Windows), the user would otherwise be able to click on the local window and then obscure the dialog box.

The problem with (1) is that the OK and Cancel buttons would often be hidden by the video windows, so the application would be difficult to use. The problem with (2) is that a user could bring up a modal dialog box but perform functions outside of the dialog box before closing it.

To make the application easier to use and more consistent with Microsoft® Windows™ operating system standards, CCyDialog is introduced and the problematic dialog boxes are derived from CCyDialog instead of CDialog. As a result, problems (1) and (2) are fixed. When a dialog box derived from CCyDialog is initialized, if the ProShare application has any visible topmost windows and the dialog box's owner is not topmost (e.g., the local window is topmost, but the owner of the Preferences is the handset window), then the dialog box owner window is made topmost to ensure the dialog is visible. To prevent the user from clicking in other application windows, all other topmost windows are disabled. These operations are reversed when the dialog box is destroyed.

When the user switches between conferencing application 502 and other applications, special care is taken due to the modifications made in CCyDialog::OnInitDialog. When conferencing application 502 is deactivated, CCyDialog::OnActivateApp turns temporary topmost off, and then back on when the application is re-activated. In addition, CCyDialog::OnActivateApp reenables the user interface while conferencing application 502 is deactivated so the user can click on any of the conferencing application's visible windows to get back to the dialog (and re-activate conferencing application 502).

Helper Classes
Dialog Helper

The dialog helper class, CDialogHelper, provides a method for obtaining dialog boxes with exact pixel dimensions in the Microsoft® Windows™ environment. The Microsoft® Windows™ operating system provides support for dialog boxes, both in the API and in the support tools (dialog editors), but the coordinates used for dialog boxes and their elements are not pixels but "dialog units," which are calculated according to the font and display driver in use. Dialog boxes are not created with exact pixel dimensions and coordinates using this support, yet this is often desired, for example, when the position of dialog elements relates to a fixed size live video display (160×120 pixels).

The CDialogHelper class simplifies the manipulation of dialog boxes. If a dialog box is designed with the assumption that 1 dialog unit=1 pixel, CDialogHelper can use a dialog template to resize and position dynamically the dialog elements correctly. The procedure follows:

Create the dialog box initially invisible.
Load the dialog template used to create the dialog box.
For each control referenced in the template,
  Get a handle to the actual control, and
  Use the coordinates from the template to reposition and resize the control.
Use the coordinates from the template to resize the entire dialog box.

Unload the dialog template.
Make the dialog box visible.

By using a dialog template that is a subset of the template used to create the dialog box, it is possible to resize and reposition only some of the controls, enabling a combination of pixel and dialog units to be employed.

Fast Bitmap Buttons

An owner-draw button class, CFastBmpBtn, solves the following problems:

(1) Microsoft® Windows™ operating system provides basic button objects in several styles (particularly push buttons, check boxes, and radio buttons) with a default graphical appearance that is not easily customized. It is possible for an application to use "owner-draw" buttons, but then all distinction between button types is lost and the application must implement check box and radio button functionality itself. The Microsoft® Foundation Classes (MFC) provide a bitmapped button class that allows an application to provide up to four images to represent the various states of a button (up, depressed, with focus, and disabled), but this does not solve the basic problem, and each image must be stored in a separate bitmap, making maintenance difficult.

(2) When a user clicks on a Microsoft® Windows™ button with the mouse cursor, the button takes the input focus even if the user moves the cursor off the button before releasing the mouse button, thereby not generating a button press event. This makes it difficult for an application to keep the input focus in a desired location (e.g., an edit control).

The two problems above are solved in the following manner:

(1) CFastBmpBtn, a C++ class derived from the basic MFC window class, allows the developer to start with generic buttons, specifying the styles as desired, then add only three lines of code and one bitmap per button to obtain a flexible graphical appearance. The class dynamically subclasses the existing button object, taking over all standard button actions, in particular the drawing of the button. The bitmap contains 4, 8 or 12 images arranged vertically in a strict order, each representing a different button state (up, depressed, with focus, and disabled) for each of the possible check states unchecked, checked, and indeterminate check. The appropriate image is used to draw the button in response to system requests and in direct response to user interaction with the mouse. The CFastBmpBtn sends notification messages to the parent window in the same manner as standard buttons.

(2) The CFastBmpBtn::SetButtonFlags function allows an application to set the CFastBmpBtn::RestoreFocus flag for a particular button. When this flag is set, the button will remember which window previously had focus whenever it receives focus due to a mouse click, and will restore the focus to the window when the mouse button is released.

CFastBmpBtn is used to implement the graphical buttons in user interfaces for conferencing system 100. An example is the handset and control panel buttons in the conferencing application 502.

Data Conferencing Application

Data conferencing application 504 implements the data conferencing user interface. Data conferencing application is implemented as a Microsoft® Windows™ 3.1 application. The data conferencing application uses a "shared notebook" metaphor. The shared notebook lets the user copy a file from the computer into the notebook and review it with a remote user during a call. When the user is sharing the notebook (this time is called a "meeting"), the users see the same information on their computers, users can review it together, and make notes directly into the notebook. A copy of the original file is placed in the notebook, so the original remains unchanged. The notes users make during the meeting are saved with the copy in a meeting file. The shared notebook looks like a notebook or stack of paper. Conference participants have access to the same pages. Either participant can create a new page and fill it with information or make notes on an existing page. A preferred embodiment of a data conferencing application is described in U.S. patent application Ser. No. 08/137,319 (filed Oct. 14, 1993) and in U.S. patent application Ser. No. 08/170,146 (filed Dec. 20, 1993).

Conference Manager

Referring again to FIG. 5, audio/video conferencing application 502 supports audio and video conferencing between remote locations, while data conferencing application 504 supports the sharing of data (e.g., documents) between the remote locations. In general, conferencing system 100 is capable of simultaneously supporting multiple applications that support different types of conferencing services (e.g., audio/video conferencing, data sharing, and background file transfer).

When a single telephone line is used as the transport medium, the conference applications may need to share that line. Conference manager 544 (also known as CMDLL) coordinates connection and data channel activities for the conference applications. It provides capabilities to centralize and coordinate dial, hang-up, data channel management activities, and application launching. It enables conference applications to establish and tear down connections. It also provides applications access to already established connections. A connection is established through the conference manager 544 instead of calling the communication software (i.e., comm manager 518 via comm API 510) directly. Data channels are also obtained through the conference manager 544.

Conference manager 544 and conferencing API 506 provide the following advantages to conferencing system 100:

It is application aware (i.e., if application A on conferencing system X attempts to establish a data channel with application A on conferencing system Y, the conference manager 544 will automatically launch application A on system Y if application A is not already running).

It simplifies the establishment of a full duplex channel by providing a single simplified call to establish such a channel.

It allows applications that would normally use a single dedicated connection to share a connection.

It provides an efficient mechanism to inform applications about events such as "connection established" and "connection torn down."

It adds a layer of control for channel management (e.g., when an application with open channels terminates, the open channels are guaranteed to become closed).

The main purpose of conference manager 544 is to provide a set of services that allows several conference applications to share a common connection. The model is that once a connection is established by some application, any conference application can latch on to the connection and establish a full-duplex communication channel with its peer application running on the remote machine. The full duplex channel is implemented as a channel pair, or in TII terms, one outgoing and one incoming channel.

The conference manager services are used in conferencing system 100 to coordinate connection and data channel activities for the audio/video and data conferencing applications. The conference manager software sits between the applications (clients) and the communication software. A connection is established through the conference manager 544 instead of calling the communication software directly. Data channels are also obtained through the conference manager 544. Conference manager 544 also implements an application registry which gives it some intelligence as to which conference applications are running.

This approach has several advantages:

(1) Conference manager 544 is application aware. This means that if application A on computer X attempts to establish a data channel with application A on computer Y, conference manager 544 will automatically launch A on system Y if it is not already running.

(2) It simplifies the establishment of a full duplex channel. It provides a single simplified call to establish such a channel.

(3) It allows applications that would normally use a single dedicated connection to share a connection.

(4) It provides a nice mechanism to inform applications about events such as "connection established" and "connection torn down."

(5) It adds a layer of control for channel management. For example, when an application with open channels terminates, its channels are guaranteed to get closed.

Conference Manager Overview

Conference manager 544 consists of several modules. The most important ones are as follows:

| | |
|---|---|
| cmcall.c | Contains the icmMakeCall and icmHangupCall procedures that are called from the CMIF library. |
| cmchan.c | Contains the implementation of channel related procedures specified in the conference manager API. These are cmGetChannelPair, cmCloseChannelPair, and cmGetChannelPairInfo. |
| cmclntfy.c | Contains dialog box procedures for the dialogs that are displayed on incoming calls. There is one dialog for the case when the caller ID matches a record in the address book, and one dialog for the case when a match is not found. |
| cmdll.c | Contains the LibMain and WEP procedures. Also contains various initialization procedures, including Lib_InitializeCf which loads VCI.DLL and makes the VCI call CF_Init to initialize the comm subsystem and Lib_TerminateCf which calls CF_UnInit and unloads VCI.DLL. This module also contains code for registering and unregistering with the address book services provided by ABDLL.DLL. |
| cmmisc.c | Contains miscellaneous supporting functions used throughout the other |

| | |
|---|---|
| | modules in CMDLL. |
| cmnotify.c | Contains callbacks required by VCI. The callback Lib_CfCallCallBack handles the CFM_* messages such as CFM_CALL_NTFY and CFM_CALL_HANGUP. The callback Lib_CfChanCallBack handles VCI CFM_CHAN_* channel messages such as CFM_CHAN_ACCEPT_NTFY and CFM_CHAN_REJECT_NTFY. |
| cmreg.c | Contains the implementation of the conference manager API functions cmRegister, cmUnregister, and cmInstall. |

Implementation Details

This section describes the implementation details of key areas of CMDLL 544.

Conference Application Installation

In order to make CMDLL 544 aware of conference applications, conference applications are preferably installed. Installed applications are listed in the [Conference Apps] section in the PSVIDEO.INI file. Applications are typically installed directly by an installation program. It is also possible for an application to install itself by calling cmInstall (if, for example, the PSVIDEO.INI file has been corrupted subsequent to installation).

Conference Application Registration

Before a conference application makes use of CMDLL services, it is loaded and registered with the DLL. An application registers with CMDLL 544 by calling cmRegister. This function is in the module cmreg.c. CMDLL 544 keeps track of registered applications, and for each registered application, a CONFAPP structure is filled in. CMDLL 544 has a dynamically allocated array of CONFAPP structures. This array is built based on the applications that are installed (i.e., specified in the [Conference Apps] sections in the PSVIDEO.INI file). If an application attempts to register without being installed cmRegister will fail.

After an application has registered with CMDLL 544, subsequent calls by said application do not require the application ID to be specified. CMDLL 544 keys off of the application's task handle and is able to map a task to an application ID. Registered applications are notified through a callback about certain events such as connection establishment and connection tear-down.

VCI Call Handler Callback

CMDLL 544 is responsible for handling VCI 506 call callback messages. Most messages are generated by the comm subsystem as a result of calls to VCI 506. All calls in VCI 506 are asynchronous, hence the messages in this callback. This callback, Lib_CfCallCallBack, is located in the module cmnotify.c and a pointer to the function is provided to VCI.DLL in the call CF_Init. The Lib_CfCallCallBack callback is defined as follows:

BOOL CALLBACK Lib_CfCallCallBack(IN UINT uiMsg, IN WPARAM wParam, IN LPARAM lParam)

Channel Pair Establishment

CMDLL 544 provides a high-level service, cmGetChannelPair, that enables conference applications to establish easily a channel pair, i.e., one channel for inbound data and one channel for outbound data. The cmGetChannelPair uses VCI services (which in turn use TII services). Applications may establish up to 32 channel pairs. Each channel pair has an associated usage ID which is defined by the application. In this way, when an application establishes a channel pair, its peer (or peers in a multipoint environment) will know the purpose of channel pair. For example, one channel pair could be established for file transfer and another channel pair for control data. Appropriate channel handlers (e.g., TII/VCI) can thus be specified for different channels.

As noted earlier, CMDLL 544 keeps track of each application with an array of CONFAPP structures. A CONFAPP structure contains an array of structures of the type CHANNELPAIR, which is defined as follows:

```
typedef struct tagCHANNELPAIR
{
    HCHAN        hChanIn;      // input (recieve) channel
    HCHAN        hChanOut;     // output (send) channel
    WORD         wState;       // channel pair state (CPS_*)
    CMCHAN_INFO  cmChanInfo;   // channel info struct
} CHANNELPAIR;
In turn, each channel pair contains a CMCHAN_INFO structure, which is
defined as follows:
typedef struct tagCMCHAN_INFO
{
    HCHAN        hChanIn;      // input (read) channel
    HCHAN        hChanOut;     // output (send) channel
    CHAN_INFO    chanInfo;     // channel information
    DWORD        dwTransId;    // transaction id
    BYTE         byUsageId;    // usage id
    BOOL         bOpener;      // TRUE if initiator of cmGetChannelPair, else FALSE
} CMCHAN_INFO;
```

This structure, in turn, contains the CHAN_INFO structure defined by TII 510. When a channel pair is established, certain information is transferred between the peer CMDLLs. This information is transferred in the CHAN_INFO structure. Successful channel pair establishment happens as follows. First a connection is established. The application on Site A calls cmGetChannelPair. CMDLL then handles all the VCI details of establishing outbound and inbound data channels using the CF_OpenChannel and CF_AcceptChannel VCI calls. Once the two channels have been established at the CMDLL level, CMDLL calls the applications back with the channel handles.

Once the application receives the channel handles through the CMN_CHANNELPAIR message, the application registers a channel handler using the VCI call CF_RegisterChanHandler. The cmGetChannelPair procedure fills in the Id field of the CHAN_INFO structure and then calls CF_OpenChannel. The rest of the processing for setting up the channel pairs takes place in the channel manager callback Lib_CfChanCallBack. The Id field is important in that it identifies:

Which application is establishing a channel pair (which is important for CMDLL on the remote site so that it knows which application to notify).

The usage id for the channel pair (which is important for the remote application so that it knows what to do with the channel pair).

Whether the channel that is being opened is inbound or outbound.

Critical Sections

One of the key elements of CMDLL 544 is that it notifies conference applications of several events that take place in the comm subsystem, e.g., an incoming call. CMDLL 544 is also responsible for calling the comm subsystem in response to user-initiated events, e.g., hang up a call. CMDLL 544 is also responsible for starting and stopping playback of audio feedback through the PWave interface. CMDLL 544 may be interrupted by the comm subsystem while it is in the process of handling events initiated by the user. For example, while CMDLL 544 is in icmHangupCall processing, it may be interrupted by a CFM_REJECT_NTFY notification message from the comm subsystem. The critical section code prevents re-entrancy problems. It prevents the application from having to deal with call rejection messages when in fact it is already in the process of hanging up. Three global variables are declared in cmmisc.c for the purpose of critical sections:

```
UINT         G_nProgressCriticalSection = 0;
UINT         G_nHangupCriticalSection = 0;
UINT         G_nRejectCriticalSection = 0;
```

These variables are manipulated and examined in cmcall.c in icmHangupCall and in the handling of the CFM_REJECT_NTFY and CFM_PROGRESS_NTFY messages in the VCI call callback routine Lib_CfCallCallBack in cmnotify.c.

Call Notification and Caller ID

CMDLL 544 is responsible for listening for incoming calls, notifying the user of incoming calls, and for rejecting or accepting the incoming call as specified by the user. On incoming calls, VCI 506 calls the Lib_CfCallCallBack with the CFM_CALL_NTFY message. As outlined in the VCI Call Handler Callback section, if caller ID is available (through the lParam of the callback message), then the callback function performs a series of address book queries to determine the name and additional information of the caller.

Once the series of address book queries have been completed, the procedure CallNotifyDlg_Do is called. It is responsible for calling one of two dialog box procedures: one if caller ID is unavailable from the comm subsystem or if the address book query failed, and a different dialog box if the address book query produced a match.

This procedure is also responsible for disabling all top-level windows (handset, remote, local, and snapshot). This is done to prevent the user from accessing other features when an incoming call is pending. Accessing other features when a call is pending causes re-entrancy problems.

```
BOOL CallNotifyDlg_Do(
    IN HWND hWndOwner,      // owner of dialog windows (handset window)
    IN HAB_REC hAbRec,      // address book record, possibly NULL
    IN LPSTR lpszCallerID   // caller ID string from comm subsystem
)
```

Audible Call Progress

CMDLL 544 is responsible for providing audible call progress. CMDLL 544 uses the PWave services for starting and stopping playback of wave files. PWave can play a sound both synchronously and asynchronously. In the synchronous case, the number of times to play a file is specified, and the StartWavePlayback procedure does not return until it is finished playing the file the specified number of times. In the asynchronous case, the StartWavePlayback procedure returns immediately. In this case, PWave allows CMDLL to stop wave file playback at any time. Audible call progress is provided in the following situations:

Incoming call:

The RINGIN.WAV wave file starts playing asynchronously in the WM_INITDIALOG case in the call notification dialog boxes. Playback ends when the user accepts the call, rejects the call, or the caller hangs up.

Incoming call in auto answer mode:

The AABEEP.WAV file is played once when a call comes in and the application is in auto-answer mode.

Outgoing call:

The RINGOUT.WAV file is played on the callers machine. This wave file is played to the caller to inform that the callee's machine is ringing. The RINGOUT.WAV file starts playing asynchronously when the comm subsystem calls the callback Lib_CfCallCallBack with the CFM_PROGRESS_NTFY message (with LOWORD(lParam) equal to CF_CALL_RINGING). Playback stops if the caller hangs up, or the callee accepts or rejects the call.

Busy signal:

The BUSY.WAV file is played once on the caller's machine if the callee is already in a video conference.

Error signal:

The PROBLEM.WAV file is played once in response to the CFM_REJECT_NTFY message in the callback Lib_CfCallCallBack.

The RINGIN.WAV file is the default wave file for incoming call notification. The user may optionally select a different wave file. This is done with a video preferences dialog box. If a different wave file has been selected, the PSVIDEO.INI file will contain the following entries:

```
[Preferences]

AudioPreference = 1        ; 0 means use default
WavePath = c:\myring.wav   ; if AudioPreference is 1, use
                           ; this wave file for incoming calls
```

The selected wave file meets the following criteria: sampled at 8 kHz, 8 bits, mono, and it is no larger than 64K.

On Demand Application Invocation

Conventional electronic conferencing applications require that both sites be running versions of the conferencing application prior to initiating the sharing of information (i.e., conferencing). As a result, users must confirm (e.g., via an independent telephone call) that the appropriate applications are running before sharing information.

In a conferencing network comprising preferred embodiments of conferencing system 100, only one site need be running a conferencing application before information sharing can be initiated. Moreover, if possible, the same application on the remote site is launched to complete the sharing. Conference manager 544 of FIG. 5 provides these capabilities. Conference manager 544 allows an application to install, register/unregister, make/hang-up calls, and establish/destroy communication channels. After successfully placing a call to a remote site, a conferencing application may try to establish a communication channel. In the process of establishing communication channels, the application is capable of being launched remotely if it is necessary. To accomplish this, all conferencing applications are assigned a unique application ID (i.e., APPID).

When an attempt to establish a communication channel is made, the application ID is used to identify the application for that channel. The conference manager 544 uses the APPID to determine (a) if the application is installed and (b) if the application is currently running. If the answer is yes to both of these questions, then the communication channel can be established immediately. If the answer is yes to (a) and no to (b), then the conference manager 544 is able to launch the desired application (via the Microsoft® WinExec function) and poll for registration. If the answer is no to both (a) and (b), then the communication channel will fail to be created.

Referring now to FIG. 33, there is shown a flow diagram of the on-demand application invocation processing of conferencing system 100 of FIG. 5, according to a preferred embodiment of the present invention. On-demand application invocation applies when a conferencing application (App #1) running in one conferencing system (Site A) attempts to establish a conference with another conferencing system (Site B), where App #1 is installed but not currently running in Site B. App #1 in Site A starts the process by causing a request for a comm channel to be sent to Site B to establish communication between Site A and Site B. The comm channel request identifies the application running in Site A (e.g., APPID for App #1).

As shown in FIG. 33, the conference manager 544 of Site B receives the comm channel request from Site A (step 3302). The conference manager 544 of Site B retrieves the application ID for App #1 from the comm channel request and determines whether App #1 is installed in Site B (step 3304). If App #1 is not installed in Site B (step 3306), then the requested conference cannot proceed and the conference manager 544 of Site B causes the comm channel request of Site A to be rejected (step 3308).

Otherwise, if App #1 is installed in Site B (step 3306), then the conference manager 544 of Site B determines whether App #1 is registered, indicating that App #1 is already running in Site B. If App #1 is registered (step 3310), then processing continues to step 33 18 as described below. Otherwise, if App #1 is not registered (step 3310), then the conference manager 544 of Site B attempts to synchronously launch App #1 (by calling the WinExec function of the Microsoft® Windows™ operating system) and thereby inform App #1 of Site B that a call is in progress (step 3312).

After attempting to launch App #1, the conference manager 544 of Site B checks to see whether App #1 was successfully launched by determining whether App #1 is now registered. If App #1 is still not registered (step 3314), then something went wrong in launching App #1 in Site B and again the conference manager 544 of Site B causes the comm channel request of Site A to be rejected (step 3316). Otherwise, if App #1 is now registered (step 3314), then the conference manager 544 of Site B accepts the comm channel request from Site A (step 3318) and notifies App #1 of Site B that the comm channel is open (step 3320) allowing conferencing to proceed.

The pseudocode for the local site communication channel establishment (Site A) is as follows:

```
request a communication channel
get notified when it has been established (or failed)
The pseudocode for the remote site communication channel
establishment (Site B) is as follows:
    get a communication channel request
    get the appid from the request
    if the application is not installed then
        reject the communication channel request
    elseif the application is not registered then
        WinExec the application
        inform the application there is a call in progress
        if the application is still not registered then
            reject the communication channel request
        accept the communication channel request
        notify application that comm channel is open
```

Through this on-demand invocation of applications, one conferencing system running a conferencing application can cause a remote conferencing system to invoke a corresponding application at the remote site. Those skilled in the art will understand that this capability alleviates the requirement for arranging for a conference by external means (e.g., via telephone) to coordinate the parallel independent launching of the corresponding conferencing applications in the remote sites.

Managing Multiple Applications

Comm API (i.e., transport independent interface (TII)) 510 of FIG. 5 establishes connections with remote conferencing systems for conferencing sessions. TII 510 also establishes one or more channels within each connection for use by conferencing applications (such as 502 and 504). These channels are used by the applications for transmitting or receiving different types of information with the remote conferencing systems. For example, audio/video conferencing application 502 uses four channels; to transmit and receive audio and video signals to and from a remote conferencing system. Similarly, data conferencing application 504 uses two channels to transmit and receive data signals to and from a remote conferencing system.

The conference manager 544 of FIG. 5 provides the capability for two or more conferencing applications to share a single connection in a single conferencing session with a remote conferencing system. This capability allows two or more conferencing applications to participate in the same conferencing session simultaneously using a single connection between the local and remote conferencing systems.

Referring now to FIG. 34, there is shown a flow diagram of an example of the processing implemented within conferencing system 100 of FIG. 5 to manage two conferencing applications in a single conferencing session with a remote conferencing system, according to a preferred embodiment of the present invention. The processing of FIG. 34 begins with the audio/video conferencing application 502 by asking the conference manager 544 to establish a connection for conferencing with a remote conferencing system (step 3402). Application 502 makes this request by calling the cmMakeCall function of the conference manager 544.

The conference manager 544 passes the connection request to the conferencing API (VCI) 506 by calling the CF_MakeCall( ) function (step 3404). VCI 506 in turn passes the connection request to TII 510 by calling the MakeConnection function (step 3406). TII 510 causes the connection with the remote conferencing system to be established and also establishes four channels (i.e., transmit/receive audio/video) within that connection for the audio/video conferencing application 502 to use (step 3408). As part of this step, VCI 506 causes handles for the four channels to be passed back to application 502. TII 510 causes the connection and channels to be established by communicating with the peer TII 510 of the remote conferencing system.

Data conferencing application 504 then asks the conference manager 544 to establish channels within the established connection for transmitting and receiving data signals with the remote conferencing system (step 3410). Data conferencing application 504 knows that the connection has been established, because application 504 has already registered with the conference manager 544 and the conference manager 544 informs all registered applications of connections by sending the CMN_CALL message. Since data conferencing application 504 already knows that the connection has been established, application 504 makes the channel request by calling the cmGetChannelPair function of the conference manager 544.

The conference manager 544 then passes the channel request to the VCI 506 (by calling CF_OpenChannel) (step 3412). VCI 506 in turn passes the channel request to TII 510 (by calling OpenChannel) (step 3414). Conference manager 544 establishes the two requested channels for data conferencing application 504 within the already established connection with the remote conferencing system (step 3416). As part of this step, conference manager 544 causes handles for the two channels to be passed back to application 504.

The conferencing session is then able to proceed with both applications 502 and 504 using a single connection with the remote conferencing system for its different channels (step 3418).

Conferencing API

Conferencing API 506 of FIG. 5 (also known as video conferencing interface (VCI)) facilitates the easy implementation of conferencing applications 502 and 504. Conferencing API 506 of FIG. 5 provides a generic conferencing interface between conferencing applications 502 and 504 and the video, comm, and audio subsystems. Conferencing API 506 provides a high-level abstraction of the services that individual subsystems (i.e., video, audio, and comm) support. The major services include:

Making, accepting, and hanging-up calls.

Mediating conference requirements between peers.

Establishing and terminating multiple communication channels for individual subsystems.

Instantiating and controlling local video and audio.

Sending video and audio to a remote site through the network.

Receiving, displaying, and controlling the remote video and audio streams.

Conferencing applications 502 and 504 can access these services through the high-level conferencing API 506 without worrying about the complexities of low-level interfaces supported in the individual subsystems.

In addition, conferencing API 506 facilitates the integration of individual software components. It minimizes the interactions between conferencing applications 502 and 504 and the video, audio, and comm subsystems. This allows the individual software components to be developed and tested independent of each other. Conferencing API 506 serves as an integration point that glues different software components together. Conferencing API 506 facilitates the portability of audio/video conferencing application 502.

Conferencing API 506 is implemented as a Microsoft® Windows™ Dynamic Link Library (DLL). Conferencing API 506 translates the function calls from conferencing application 502 to the more complicated calls to the individual subsystems (i.e., video, audio, and comm). The subsystem call layers (i.e., video API 508, comm API 510, and audio API 512) are also implemented in DLLs. As a result, the programming of conferencing API 506 is simplified in that conferencing API 506 does not need to implement more complicated schemes, such as dynamic data exchange (DDE), to interface with other application threads that implement the services for individual subsystems. For example, the video subsystem will use window threads to transmit/receive streams of video to/from the network.

Conferencing API 506 is the central control point for supporting communication channel management (i.e., establishing, terminating channels) for video and audio subsystems. Audio/video conferencing application 502 is responsible for supporting communication channel management for the data conferencing streams.

Referring now to FIG. 7, there is shown a block diagram of conference manager 544 and conferencing API 506 between conferencing applications 502 and 504, on one side, and comm API 508, video API 510, and audio API 512, on the other side, according to a preferred embodiment of the present invention. Conferencing API 506 comprises conferencing finite state machine (FSM) 702, conferencing primitive validator 704, conferencing primitive dispatcher 708, conferencing callback 706, comm primitive 712, comm callback 710, video primitive 716, and audio primitive 720 of FIG. 7.

Conferencing primitive validator 704 validates the syntax (e.g., checks the conferencing call state, channel state, and the stream state with the conferencing finite state machine (FSM) 702 table and verifies the correctness of individual parameters) of each API call. If an error is detected, primitive validator 704 terminates the call and returns the error to the application immediately. Otherwise, primitive validator 704 calls conferencing primitive dispatcher 708, which determines which subsystem primitives to invoke next.

Conferencing primitive dispatcher 708 dispatches and executes the next conferencing API primitive to start or continue to carry out the service requested by the application. Primitive dispatcher 708 may be invoked either directly from primitive validator 704 (i.e., to start the first of a set of conferencing API primitives) or from conferencing callback 706 to continue the unfinished processing (for asynchronous API calls).

After collecting and analyzing the completion status from each subsystem, primitive dispatcher 708 either (1) returns the concluded message back to the conferencing application by returning a message or invoking the application-provided callback routine or (2) continues to invoke another primitive to continue the unfinished processing.

There are a set of primitives (i.e., comm primitives 712, video primitives 716, and audio primitives 720) implemented for each API call. Some primitives are designed to be invoked from a callback routine to carry out the asynchronous services.

The subsystem callback routine (i.e., comm callback 710) returns the completion status of an asynchronous call to the comm subsystem to conferencing callback 706, which will conduct analysis to determine the proper action to take next. The comm callback 710 is implemented as a separate thread of execution (vthread.exe) that receives the callback Microsoft® Windows™ messages from the comm manager and then calls VCI DLL to handle these messages.

Conferencing callback 706 returns the completion status of an asynchronous call to the application. Conferencing callback 706 checks the current message/event type, analyzes the type against the current conferencing API state and the next primitive being scheduled to determine the actions to take (e.g., invoke another primitive or return the message to the application). If the processing is not complete yet, conferencing callback 706 selects another primitive to continue the rest of the processing. Otherwise, conferencing callback 706 returns the completion status to the application. The conferencing callback 706 is used only for comm related conferencing API functions; all other conferencing API functions are synchronous.

The major services supported by conferencing API 506 are categorized as follows:

Initialization and Call Services (establish/terminate a conference call).

Stream Services (capture, play, record, link, control the multimedia audio and video streams, and access and manipulate data from the streams).

Channel Services (establish/terminate channels on the call, and send/receive data on the channels).

Interfacing with the Comm Subsystem

Conferencing API 506 supports the following comm services with the comm subsystem:

Comm initialization—initialize a session in the comm subsystem on which the call will be made.

Call establishment—place a call to start a conference.

Channel establishment—establish two comm channels for video conferencing control information, two comm channels for audio (incoming/outgoing), four comm channels for video (incoming data and control and outgoing data and control).

Call termination—hang up a call and close all active channels.

Comm Initialization/Uninitialization

Initialization of a session in the comm subsystem on which a call may be made by the user of conferencing system A of FIG. 1 and the user of conferencing system B of FIG. 1 is implemented as follows:

Conferencing APIs A and B call BeginSession to initialize their comm subsystems.

Conferencing APIs A and B enter a PeekMessage loop waiting for a SESS_BEGIN callback from the comm subsystem.

Uninitialization of a session in the comm subsystem is implemented as follows:

Conferencing APIs A and B call EndSession to uninitialize their comm subsystems.

Conferencing APIs A and B receive a SESS_CLOSED callback from the comm subsystem.

Conferencing APIs A and B then notify the conferencing applications with a CFM_UNINIT_NTFY callback.

Call Establishment

Establishment of a call between the user of conferencing system A of FIG. 1 and the user of conferencing system B of FIG. 1 is implemented as follows:

Conferencing API A calls MakeConnection to dial conferencing API B's number.

Conferencing API B receives a CONN_REQUESTED callback from the comm subsystem.

Conferencing API B sends the call notification to the graphic user interface (GUI) with a CFM_CALL_NTFY callback; and if user B accepts the call via the GUI, conferencing API B proceeds with the following steps.

Conferencing API B calls AcceptConnection to accept the incoming call from conferencing API A.

Conferencing APIs A and B receive CONN_ACCEPTED callback from the comm subsystem.

Conferencing API A calls OpenChannel to open its outgoing conferencing control channel.

Conferencing API B receives the CHAN_REQUESTED callback for the incoming control channel and accepts it via AcceptChannel. Then Conferencing API B calls OpenChannel to open its outgoing conferencing control channel.

Conferencing API A receives the CHAN_ACCEPTED callback for its outgoing control channel and calls RegisterChanHandler to receive channel callbacks from the comm subsystem. Then Conferencing API A receives the CHAN_REQUESTED callback for the incoming control channel and accepts it via AcceptChannel.

Conferencing API B receives the CHAN_ACCEPTED callback for its outgoing control channel and calls RegisterChanHandler to receive channel callbacks from the comm subsystem.

Conferencing API A sends a Login Request on the control channel, which Conferencing API B receives.

Conferencing API B sends a Login Response on the control channel, which Conferencing API A receives.

Conferencing API A sends a Capabilities Request on the control channel, specifying conference requirements, which Conferencing API B receives.

Conferencing API B sends a Capabilities Response on the control channel, accepting or modifying conference requirements, which Conferencing API A receives.

Conferencing API A calls OpenChannel to open its outgoing audio channel.

Conferencing API B receives the CHAN_REQUESTED callback for the incoming audio channel and accepts it via AcceptChannel.

Conferencing API A receives the CHAN_ACCEPTED callback for the outgoing audio channel.

The last three steps are repeated for the video data channel and the video control channel.

Conferencing API B then turns around and repeats the above 4 steps (i.e., opens its outbound channels for audio/video data/video control).

Conferencing API A sends Participant Information on the control channel, which Conferencing API B receives.

Conferencing API B sends Participant Information on the control channel, which Conferencing API A receives.

Conferencing APIs A and B then notify the conferencing applications with a CFM_ACCEPT_NTFY callback.

Channel Establishment

Video and audio channel establishment is implicitly done as part of call establishment, as described above, and need not be repeated here. For establishing other channels such as data conferencing, the conferencing API passes through the request to the comm manager, and sends the comm manager's callback to the user's channel manager.

Call Termination

Termination of a call between users A and B is implemented as follows (assuming user A hangs up):

Conferencing API A unlinks local/remote video/audio streams from the network.

Conferencing API A then calls the comm manager's CloseConnection.

The comm manager implicitly closes all channels, and sends Chan_Closed callbacks to conferencing API A.

Conferencing API A closes its remote audio/video streams on receipt of the Chan Closed callback for its inbound audio/video channels, respectively.

Conferencing API A then receives the CONN_CLOSE_RESP from the comm manager after the call is cleaned up completely. Conferencing API A notifies its application via a CFM_HANGUP_NTFY.

In the meantime, the comm manager on B would have received the hangup notification, and would have closed its end of all the channels, and notified conferencing API B via Chan_Closed.

Conferencing API B closes its remote audio/video streams on receipt of the Chan_Closed callback for its inbound audio/video channels, respectively.

Conferencing API B unlinks its local audio/video streams from the network on receipt of the Chan_Closed callback for its outbound audio/video channels, respectively.

Conferencing API B then receives a CONN_CLOSED notification from its comm manager. Conferencing API B notifies its application via CFM_HANGUP_NTFY.

Interfacing with the Audio and Video Subsystems

Conferencing API 506 supports the following services with the audio and video subsystems:

Capture/monitor/transmit local video streams.

Capture/transmit local audio streams.

Receive/play remote streams.

Control local/remote streams.

Snap an image from local video stream.

Since the video and audio streams are closely synchronized, the audio and video subsystem services are described together.

Capture/Monitor/Transmit Local Streams

The local video and audio streams are captured and monitored as follows:

Call AOpen to open the local audio stream.

Call VOpen to open the local video stream.

Call ACapture to capture the local audio stream from the local hardware.

Call VCapture to capture the local video stream from the local hardware.

Call VMonitor to monitor the local video stream.

The local video and audio streams are begun to be sent out to the remote site as follows:

Call ALinkOut to connect the local audio stream to an output network channel.

Call VLinkOut to connect the local video stream to an output network channel.

The monitoring of the local video stream locally is stopped as follows:

Call VMonitor(off) to stop monitoring the local video stream.

Receive/Play Remote Streams

Remote streams are received from the network and played as follows:

Call AOpen to open the local audio stream.

Call VOpen to open the local video stream.

Call ALinkIn to connect the local audio stream to an input network channel.

Call VLinkIn to connect the local video stream to an input network channel.

Call APlay to play the received remote audio stream.

Call VPlay to play the received remote video stream.

Control Local/Remote Streams

The local video and audio streams are paused as follows:

Call VLinkout(off) to stop sending local video on the network.

Call AMute to stop sending local audio on the network.

The remote video and audio streams are paused as follows:

If CF_PlayStream(off) is called, conferencing API calls APlay(off) and VPlay(off).

The local/remote video/audio streams are controlled as follows:

Call ACntl to control the gains of a local audio stream or the volume of the remote audio stream.

Call VCntl to control such parameters as the brightness, tint, contrast, color of a local or remote video stream.

Snap an Image from Local Video Streams

A snapshot of the local video stream is taken and returned as an image to the application as follows:

Call VGrabframe to grab the most current image from the local video stream. Conferencing API 506 supports the following function calls by conferencing applications 502 and 504 to the video, comm, and audio subsystems:

| | |
|---|---|
| CF_Init | Reads in the conferencing configuration parameters from an initialization file; loads and initializes the software of the comm, video, and audio subsystems by allocating and building internal data structures; allows the application to choose between the message and the callback routines to return the event notifications from the remote site. |
| CF_MakeCall | Makes a call to the remote site to establish a connection for conferencing. The call is performed asynchronously. |
| CF AcceptCall | Accepts call initiated from the remote site based on information received in the CFM_CALL_NTFY message as delivered to the graphical user interface. |
| CF_RejectCall | Rejects incoming call, if appropriate, upon receiving a CFM_CALL_NTFY message as delivered to the GUI. |
| CF_HangupCall | Hangs up a call that was previously established; releases all resources, including all types of streams and data structures, allocated during the call. |
| CF_GetCallInfo | Returns the information about the specified call, including its current state. |
| CF_CapMon | Starts the capture of analog video signals from the local camera and displays the video in the local video window which is preopened by the application. This function allows the user to preview his/her appearance before sending the signals out to the remote site. |

| | |
|---|---|
| CF_PlayRcvd | Starts the reception and display of remote video signals in the remote video window, which is preopened by the application; starts the reception and play of remote audio signals through the local speaker. |
| CF_DestroyStream | Destroys the specified stream group that was created by CF_CapMon or CF_PlayRcvd. As part of the destroy process, all operations (e.g., sending/playing) being performed on the stream group will be stopped and all allocated system resources will be freed. |
| CF_Mute | Uses AMute to turn on/off the mute function being performed on the audio stream of a specified stream group. This function will temporarily stop or restart the related operations, including playing and sending, being performed on this stream group. This function may be used to hold temporarily one audio stream and provide more bandwidth for other streams to use. |
| CF_SnapStream | Takes a snapshot of the video stream of the specified stream group and returns a still image (reference) frame to the application buffers indicated by the hBuffer handle. |
| CF_ControlStream | Controls the capture or playback functions of the local or remote video and audio stream groups. |
| CF_SendStream | Uses ALinkOut to pause/unpause audio. |
| CF_GetStreamInfo | Returns the current state and the audio video control block (AVCB) data structure, preallocated by the application, of the specified stream groups. |
| CF_PlayStream | Stops/starts the playback of the remote audio/video streams by calling APlay/VPlay. |
| CF_GetAudVidStream | Returns the audio and video stream handles for the specified stream group. |
| CF_RegisterChanMgr | Registers a callback or an application window whose message processing function will handle notifications generated by network channel initialization operations. This function is invoked before any CF_OpenChannel calls are made. |
| CF_OpenChannel | Requests to open a network channel with the peer application. The result of the action is given to the application by invoking the callback routine specified by the call to CF_RegisterChanMgr. The application specifies an ID for this transaction. This ID is passed to the callback routine or posted in a message. |
| CF_AcceptChannel | A peer application can issue CF_AcceptChannel in response to a CFM_CHAN_OPEN_NTFY message that has been received. The result of the CF_AcceptChannel call is a one_way network channel for receiving data. |
| CF_RejectChannel | This routine rejects a CFM_CHAN_OPEN_NTFY from the peer. |
| CF_RegisterChanHandler | This function registers a callback or an application window whose message processing function will handle notifications generated by TII network channel IO activities. The channels that are opened will receive TII CFW_DATA_SENT notifications, and the channels that are accepted will receive TII CHAN_RCV_COMPLETE notifications. |
| CF_CloseChannel | This routine will close a network channel that was opened by CF_AcceptChannel or CF_OpenChannel. The handler for this channel is automatically de-registered. |
| CF_SendData | Send data to peer. If the channel is not reliable and there are no receive buffers posted on the peer machine, the data will be lost. |
| CF_RecvData | Data is received through this mechanism. Normally this call is issued in order to post receive buffers to the system. When the system has received data in the given buffers, the Channel Handler will receive the TII CHAN_RCV_COMPLETE notification. |
| CF_GetChanInfo | This function will return various statistical information about a channel. For example: bandwidth information, number of sends/second, number of receives/second, etc. |

These functions are defined in further detail later in this specification in APPENDIX A entitled "Conference Manager API."

In addition, conferencing API 506 supports the following messages returned to conferencing applications 502 and 504 from the video, comm, and audio subsystems in response to some of the above-listed functions:

Referring now to FIG. 8, there is shown a representation of the conferencing call finite state machine (FSM) for a conferencing session between a local conferencing system (i.e., caller) and a remote conferencing system (i.e., callee), according to a preferred embodiment of the present invention. The possible conferencing call states are as follows:

| | |
|---|---|
| CFM_CALL_NTFY | Indicates that a call request initiated from the remote site has been received. |
| CFM_PROGRESS_NTFY | Indicates that a call state/progress notification has been received from the local phone system support. |
| CFM_ACCEPT_NTFY | Indicates that the remote site has accepted the call request issued locally. Also sent to the accepting application when CF_AcceptCall completes. |
| CFM_REJECT_NTFY | Indicates that the remote site has rejected or the local site has failed to make the call. |
| CFM_HANGUP_NTFY | Indicates that the local or remote site has hung up the call. |
| CFM_UNINIT_NTFY | Indicates that uninitialization of comm subsystem has completed. |
| CFM_ERROR_NTFY | Indicates that a SESS_ERROR was received from comm subsystem. |

| | |
|---|---|
| CCST_NULL | Null State - state of uninitialized caller/callee. |
| CCST_IDLE | Idle State - state of caller/callee ready to make/receive calls. |
| CCST_CALLING | Calling state - state of caller trying to call callee. |
| CCST_CALLED | Called state - state of callee being called by caller. |
| CCST_ACCEPTING | Accepting state - state of accepting call from caller. |
| CCST_CONNECTED | Call state - state of caller and callee during conferencing session. |
| CCST_CLOSING | A hangup or call cleanup is in progress. |

At the CCST_CONNECTED state, the local application may begin capturing, monitoring, and/or sending the local audio/video signals to the remote application. At the same time, the local application may be receiving and playing the remote audio/video signals.

Figure 9:
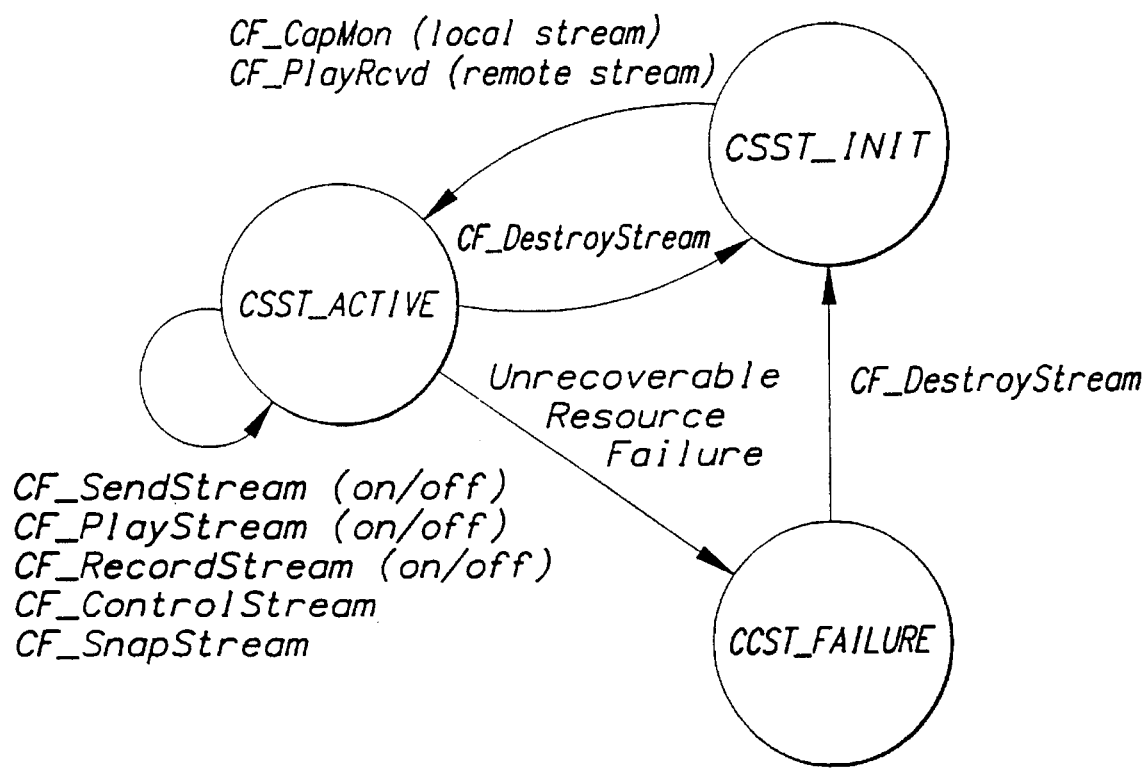
FIG. 9 is a representation of the conferencing stream FSM for each conferencing system participating in a conferencing session.

Referring now to FIG. 9, there is shown a representation of the conferencing stream FSM for each conferencing system participating in a conferencing session, according to a preferred embodiment of the present invention. The possible conferencing stream states are as follows:

| | |
|---|---|
| CSST_INIT | Initialization state - state of local and remote streams after CCST_CONNECTED state is first reached. |
| CSST_ACTIVE | Capture state - state of local stream being captured. Receive state - state of remote stream being received. |
| CSST_FAILURE | Fail state - state of local/remote strewn after resource failure. |

Conferencing stream FSM represents the states of both the local and remote streams of each conferencing system. Note that the local stream for one conferencing system is the remote stream for the other conferencing system.

In a typical conferencing session between a caller and a callee, both the caller and callee begin in the CCST_NULL call state of FIG. 8. The conferencing session is initiated by both the caller and callee calling the function CF_Init to initialize their own conferencing systems. Initialization involves initializing internal data structures, initializing communication and configuration information, and verifying the local user's identity. The CF_Init function takes both the caller and callee from the CCST_NULL call state to the CCST_IDLE call state. The CF_Init function also places both the local and remote streams of both the caller and callee in the CSST_INIT stream state of FIG. 9.

Both the caller and callee call the CF_CapMon function to start capturing local video and audio signals and playing them locally, taking both the caller and callee local stream from the CSST_INIT stream state to the CSST_ACTIVE stream state. Both the caller and callee may then call the CF_ControlStream function to control the local video and audio signals, leaving all states unchanged.

The caller then calls the CF_MakeCall function to initiate a call to the callee, taking the caller from the CCST_IDLE call state to the CCST_CALLING call state. The callee receives and processes a CFM_CALL_NTFY message indicating that a call has been placed from the caller, taking the callee from the CCST_IDLE call state to the CCST_CALLED call state. The callee calls the CF_AcceptCall function to accept the call from the caller, taking the callee from the CCST_CALLED call state to the CCST_ACCEPTING call state. The caller and callee receive and process a CFM_ACCEPT_NTFY message indicating that the callee accepted the call, taking the caller and callee from the CCST_CALLING/CCST_ACCEPTING call states to the CCST_CONNECTED call state.

Both the caller and callee then call the CF_PlayRcvd function to begin reception and play of the video and audio streams from the remote site, leaving all states unchanged.

Both the caller and callee call the CF_SendStream function to start sending the locally captured video and audio streams to the remote site, leaving all states unchanged. If necessary, both the caller and callee may then call the CF_ControlStream function to control the remote video and audio streams, again leaving all states unchanged. The conferencing session then proceeds with no changes to the call and stream states. During the conferencing session, the application may call CF_Mute, CF_PlayStream, or CF_SendStream. These affect the state of the streams in the audio/video managers, but not the state of the stream group.

When the conferencing session is to be terminated, the caller calls the CF_HangupCall function to end the conferencing session, taking the caller from the CCST_CONNECTED call state to the CCST_IDLE call state. The callee receives and processes a CFM_HANGUP_NTFY message from the caller indicating that the caller has hung up, taking the callee from the CCST_CONNECTED call state to the CCST_IDLE call state.

Both the caller and callee call the CF_DestroyStream function to stop playing the remote video and audio signals, taking both the caller and callee remote streams from the CSST_ACTIVE stream state to the CSST_INIT stream state. Both the caller and callee also call the CF_DestroyStream function to stop capturing the local video and audio signals, taking both the caller and callee local streams from the CSST_ACTIVE stream state to the CSST_INIT stream state.

This described scenario is just one possible scenario. Those skilled in the art will understand that other scenarios may be constructed using the following additional functions and state transitions:

If the callee does not answer within a specified time period, the caller automatically calls the CF_HangupCall function to hang up, taking the caller from the CCST_CALLING call state to the CCST_IDLE call state.

The callee calls the CF_RejectCall function to reject a call from the caller, taking the callee from the CCST_CALLED call state to the CCST_IDLE call state. The caller then receives and processes a CFM_REJECT_NTFY message indicating that the callee has rejected the caller's call, taking the caller from the CCST_CALLING call state to the CCST_IDLE call state.

The callee (rather than the caller) calls the CF_HangupCall function to hang up, taking the callee from the CCST_CONNECTED call state to the CCST_IDLE call state. The caller receives a CFM_HANGUP_

NTFY message from the callee indicating that the callee has hung up, taking the caller from the CCST_CONNECTED call state to the CCST IDLE call state. The CF_GetCallInfo function may be called by either the caller or the callee from any call state to determine the current call state without changing the call state.

During a conferencing session, an unrecoverable resource failure may occur in the local stream of either the caller or the callee causing the local stream to be lost, taking the local stream from the CSST_ACTIVE stream state to the CSST_FAILURE stream state. Similarly, an unrecoverable resource failure may occur in the remote stream of either the caller or the callee causing the remote stream to be lost, taking the remote stream from the CSST_ACTIVE stream state to the CSST_FAILURE stream state. In either case, the local site calls the CF_DestroyStream function to recover from the failure, taking the failed stream from the CSST_FAILURE stream state to the CSST_INIT stream state.

The CF_GetStreamInfo function may be called by the application from any stream state of either the local stream or the remote stream to determine information regarding the specified stream groups. The CF_SnapStream function may be called by the application for the local stream in the CSST_ACTIVE stream state. All of the functions described in this paragraph leave the stream state unchanged.

Video Subsystem

The video subsystem of conferencing system 100 of FIG. 5 comprises video API 508, video manager 516, video capture driver 522, video decode driver 548, video playback driver 550, and video/host interface 526 running on host processor 202 of FIG. 2 and video microcode 530 running on video board 204. The following sections describe each of these constituents of the video subsystem.

Video API

Figure 10:
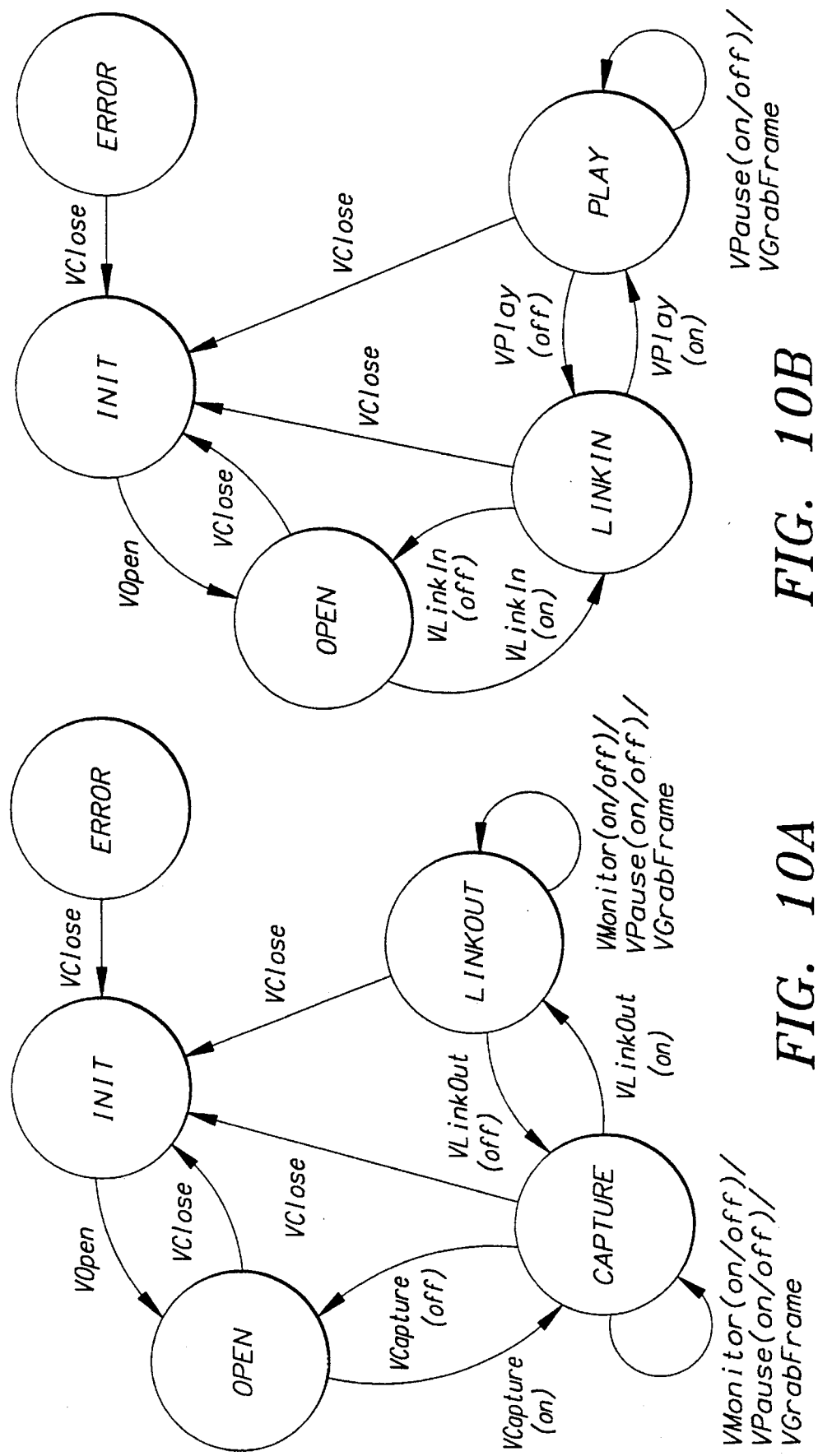
FIG. 10 is a representation of the video FSM for the local video stream and the remote video stream of a conferencing system during a conferencing session.

Referring now to FIG. 10, there is shown a representation of the video FSM for the local video stream and the remote video stream of a conferencing system during a conferencing session, according to a preferred embodiment of the present invention. The description for this section is the same as the description for the section of the same name in U.S. patent application Ser. No. 08/157,694. One difference is the addition of the following function calls supported by video API 508:

VReOpen Re-opens a video stream.

VReportStats Grabs the statistics which are being updated periodically.

Video Manager

Figure 11:
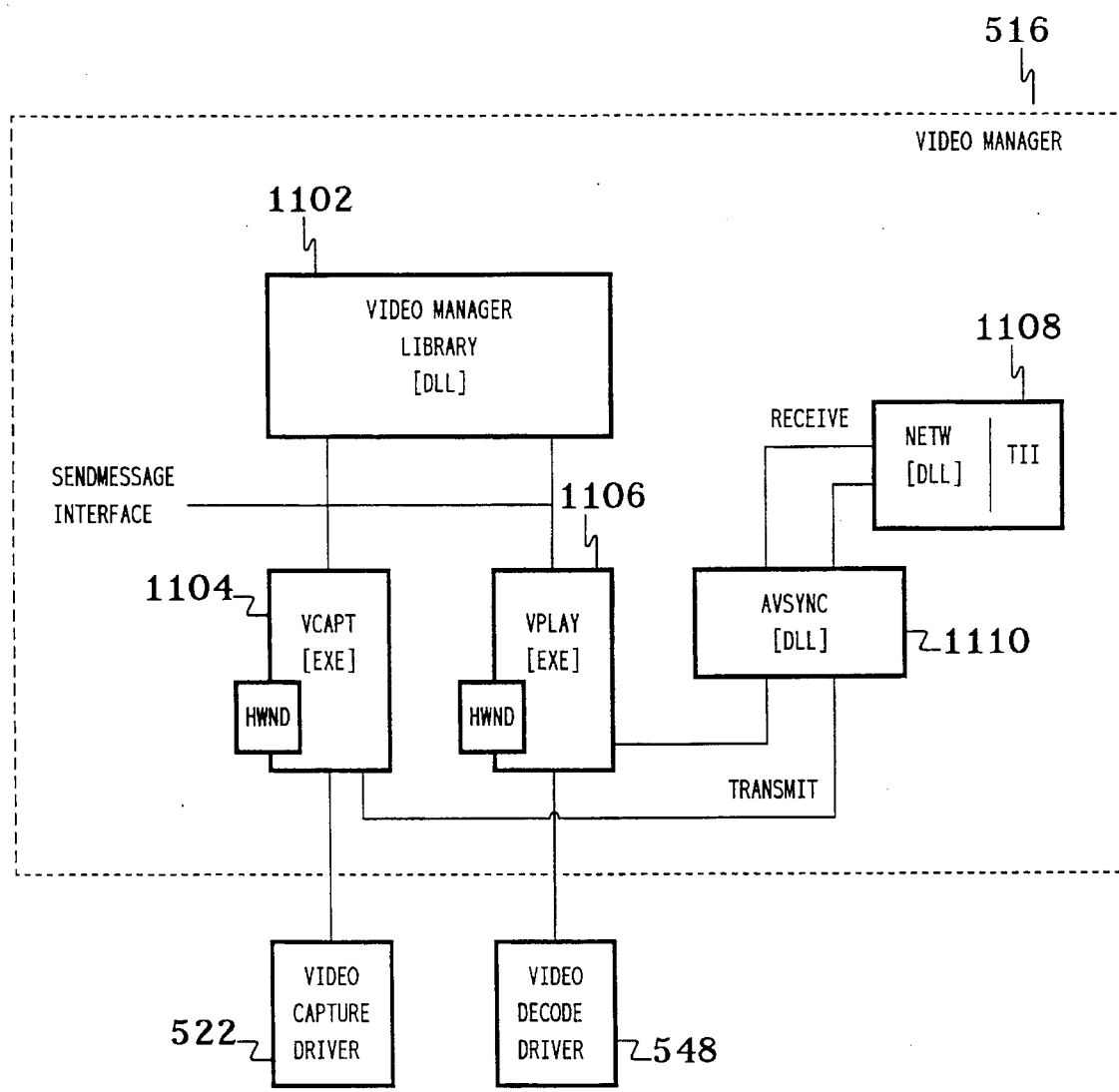
FIG. 11 is a block diagram of the software components of the video manager of the conferencing system of FIG. 5.

Referring now to FIG. 11, there is shown a block diagram of the software components of video manager (VM) 516 of FIG. 5, according to a preferred embodiment of the present invention. The description for this section is the same as the description for the section of the same name in U.S. patent application Ser. No. 08/157,694.

Capture/Playback Video Effects

The description for this section is the same as the description for the section of the same name in U.S. patent application Ser. No. 08/157,694.

Video Stream Restart

Figure 12:
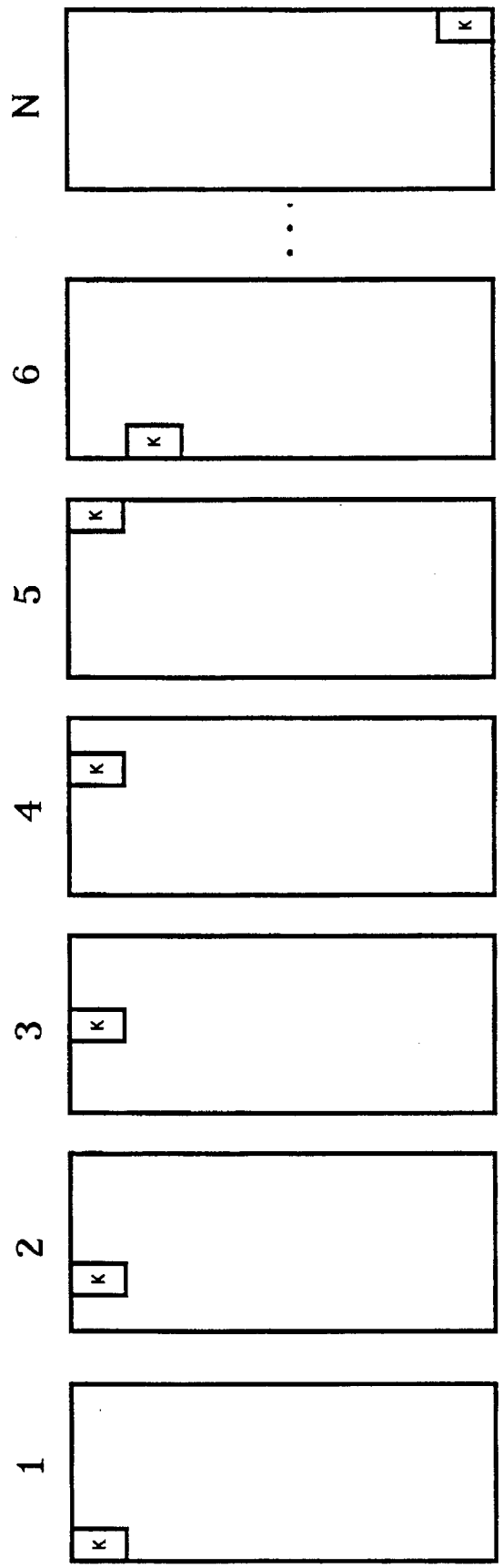
FIG. 12 is a representation of a sequence of N walking key frames.

Referring now to FIG. 12, there is shown a representation of a sequence of N walking key frames. The description for this section is the same as the description for the section of the same name in U.S. patent application Ser. No. 08/157,694.

Audio/Video Synchronization

The description for this section is the same as the description for the section of the same name in U.S. patent application Ser. No. 08/157,694. In addition, the time period $\delta_1$ is a configuration-defined value with a preferred default setting of 400 milliseconds. Experiments indicate that, at 10–15 fps, if the audio and video streams drift by greater then 400 milliseconds, then a loss of lip synchronization is readily detected by the user.

The time period $\delta_2$ may be defined based on the following criteria:

(1) It is made a function of $\delta_1$, so as to reduce the number of configuration parameters.

(2) It is large enough that the network transfer time of a restart key frame does not cause the restart sequence (key frame and follow-on delta frame) to be way-out-of-sync. Assuming IRV key frames of approx. 6 KB, and a network transfer time of 84 kbps, a key frame transfer takes approximately 600 msecs. Given the first criterion, $\delta_1$ should be selected carefully. The follow-on delta frame is generated (and time-stamped for lip-sync) after a bit-rate throttle of the IRV capture driver to account for key frame size, and this throttle is concurrent with the key frame transmission.

(3) It is large enough that once audio and video have drifted to such an extent, a stream can not be effectively re-synchronized with the use of codec hurry-up logic; i.e., that it is more expedient to re-sync with a key frame (restart stream).

In a preferred embodiment, $\delta_2 = 2*\delta_1$.

In a preferred embodiment, the capture latency is not used and the playback latency default is 200 milliseconds. This value was experimentally determined. In fact, because this is a latency adjustment that corrects for the video capture interface to the host-to-network interface path, it may be a function of host performance, and as such should be derived as a function of the host calibration process.

Codec Hurry-up is also used when the playback display frequency is lowered. The video manager has the option, in order to decrease host utilization, of scaling the display rate. For example, only displaying every other, every third, etc. frame. If a display frequency less than one is specified, codec Hurry-up is used, as the stream does not require a color conversion for purposes of display.

Alternative Timestamp Driver

In a typical video conferencing scenario, the video frames generated at local conferencing system A will be time-stamped according to the capture clock at system A. The video frames will then be transmitted over a network to remote conferencing system B, which will maintain a playback clock. Although it is desirable to maintain high-resolution clocks (e.g., 32-bit time values) at both sites, the limited bandwidth of the communications network between the two sites may make transmission of entire clock values impractical. To satisfy both goals, remote system B preferably maintains its own version of the capture clock of local system A in a high-resolution counter in system B. This high-resolution counter is maintained by system B with information received from system A, where the information comprises a subset of the bits that represent each high-resolution clock value. This process is described in the context of the example depicted in FIG. 35.

At step 3502 of FIG. 35, the 12-bit (i.e., high-resolution) counters of systems A and B are synchronized. In step 3504, system A increments its 12-bit counter and sends the 4 low-order bits (e.g., as a time stamp for a video frame) to system B. In step 3506, system B adjusts its 12-bit counter based on the 4-bit value received from system A. At step 3506, systems A and B are again synchronized. In step 3508, system A again increments its 12-bit counter and sends the appropriate 4-bit time stamp to system B. In step 3510, when system B receives a 4-bit value of (0000), it recognizes that the counter has rolled over. In response, system B adds one to its counter causing it to carry a one into the high-order bits (i.e., the non-transmitted bits). Once again, system A and B are synchronized after step 3510.

Step 3512 demonstrates an error condition. System B is able to detect an error condition, because it knows what value to expect next. When it receives a value other than what it expects, system B recognizes that values have been dropped. In order to recover, system B updates its counter value using the received value, taking into account any required carry into the high-order bits.

Error conditions are a primary reason for transmitting more than one bit in the time stamp. Enough bits are preferably transmitted to ensure that at least one transmitted packet is received before a bit pattern is sent twice. If it can be guaranteed that the transmission is reliable, then only one bit is needed to keep remote versions of a counter of any resolution.

The process of FIG. 35 may be generalized for any two distinct memory areas that need to track a single incrementing or decrementing number across some limited bandwidth medium. Those skilled in the art will understand that the process may be generalized to clocks and time stamps of different sizes.

Bit Rate Throttling

The description for this section is the same as the description for the section of the same name in U.S. patent application Ser. No. 08/157,694. In addition, a throttle rate is the percentage rate at which a bit stream data rate will be modified. For example, a throttle rate of 10 will decrease or increase a bit rate by 10%. A throttle down rate is a throttle rate for decreasing a bit stream data rate, and a throttle up rate is a throttle rate for increasing a bit stream data rate. A bit rate filter, for the purposes of this specification, is a function which takes as input a number of bit rate values (typically, the bit rates from some number of previous samples) and outputs a single bit rate. The specifics of the filter implementation are provided below.

The bit rate throttling algorithm is described as follows:
Immediately after posting N bits to the network for transmission:

---
bits_Outstanding += N;
if (bits_outstanding > bit rate filter*throttle down latency) then
    current_bit_rate = current_bit_rate*throttle up rate
    <program the capture driver with current_bit_rate>
end if
---

Immediately after the completion of transmission of N bits on the network:

---
bits_outstanding = N;
if (bits_outstanding < bit rate filter*throttle up latency) then
    current_bit_rate += current_bit_rate*throttle up rate
    <program the capture driver with current bit rate>
end if
---

The bit rate filter, for frame N, referred to as $br_N$ is defined as follows:

$$br_N = (br_N = (br_{N-1} + br_{N-2})/2,$$

where $br_0 = br_1 =$ default bit rate.

Multiple Video Formats

Conferencing system 100 presents both a local monitor display and a remote playback display to the user. A digital video resolution of (160×120) is preferably used as capture resolution for ISDN-based video conferencing (i.e., the resolution of a coded compressed video stream to a remote site). (160×120) and (320×240) are preferably used as the local monitor display resolution. (320×240) resolution may also be used for high-resolution still images. Generating the local monitor display by decorepressing and color convening the compressed video stream would be computationally expensive. The video capture driver 522 of FIG. 5 simultaneously generates both a compressed video stream and an uncompressed video stream. Video manager 516 makes use of the uncompressed video stream to generate the local monitor display. Video manager 516 may select the format of the uncompressed video stream to be either YUV-9 or 8-bits/pixel (bpp) RGB—Device Independent Bitmap (DIB) format. For a (160×120) local monitor, the uncompressed DIB video stream may be displayed directly. For a (320×240) monitor, a (160×120) YUV-9 format is used and the display driver "doubles" the image size to (320×240) as part of the color conversion process.

In the RGB and YUV-9 capture modes, RGB or YUV data are appended to capture driver IRV buffers, so that the capture application (VCapt EXE 1104) has access to both fully encoded IRV frames and either RGB or YUV data. Conferencing system 100 has custom capture driver interfaces to select either RGB capture mode, YUV capture mode, or neither.

Consider the overhead of the playback subsystem, assuming all video frames are displayed (full frame rate).

(1) A frame is decompressed using inter- and intra-frame decompression algorithms.

(2) The frame is color-convened from the color space of the decompressed stream to the color space of the display subsystem; e.g., from YUV to RGB.

(3) The frame is displayed by copying it to a display memory (e.g., via Microsoft® Windows™ GDI).

The first and second steps may be eliminated if RGB data is used as a video format. The first step may be eliminated if YUV data is used as a video format. These are important savings, in that step (2) may cost as much (or almost as much) as the first step and, depending on the graphics subsystem, the third step may be small compared to steps (1) and (2).

The technique of sending uncompressed video, in an RGB or YUV format, to the host for local monitoring, in order to eliminate steps (1) and/or (2), is referred to herein as Looking Glass. RGB or YUV data is used for the local monitor only, and is typically not appropriate for network transmission. To make for an efficient implementation, Looking Glass RGB or YUV frames are piggybacked behind the IRV stream, so that the number of frame complete callbacks is not increased at the host.

(160×120) resolution is used as the capture resolution for ISDN-based video conferencing; i.e., it is the resolution of a coded compressed video stream to a remote site. (160×120) is also used as a display resolution, and is referred to herein as the "normal" resolution. (320×240) resolution is used to provide a "quarter" screen (relative to 640×480 VGA) video display (and as a capture resolution for high-quality still images).

Normal Display Resolution

At 10 fps, a (160×120) 8-bits/pixel (bpp) capture resolution generates approximately 1.5 Mbits/sec (=192 KBytes/sec) data stream. For video conferencing, the (160×120) uncompressed (8 or 9 bpp) format is not excessive for ISA bus 208 of FIG. 2. Given the benefits of eliminating an IRV decode by host processor 202, as described above, it is advantageous to implement a local monitor using an uncompressed (160×120) video stream.

Because VRAM 304 of video board 204 of FIG. 3 contains the current decoded frame (used to produce the next encoded delta frame), uncompressed video frames are available to the host for local monitoring. In addition, the video board 204 has the capability to color convert (i.e., YUV to RGB) the decoded, uncompressed frame, as needed. For a (160×120) monitor, an RGB (palletized, 8 bpp) format is preferably used. Using RGB eliminates all decode and color conversion overhead at playback.

Consider a specific example. Assume the host processor 202 of FIG. 2 is an Intel® 486DX2™ 66 MHz processor. IRV decode ranges, based on the difficulty (amount of motion) of the video, from approximately 12–24 milliseconds. On the other hand, the transfer rate of ISA bus 208 is approximately 2 Mbytes/sec. A (160×120) RGB frame is (160×120)=19.2 KBytes, so its transfer takes approximately 10 msecs. Thus, using RGB data saves the host from 2–14 msecs/frame. At 10 fps, this is a 2–14% utilization improvement. Slower host processors show a more substantial improvement.

Quarter Display Resolution

At 10 fps, a quarter-display (320×240) 8-bits/pixel capture resolution generates four times the data, or approximately 6 Mbits/sec (=768 MBytes/sec), as the normal case. For video conferencing, the (320×240) un-encoded (8 or 9 bpp) format is considered excessive for ISA bus 208. Thus, uncompressed video frame data is preferably transferred using at most a (160×120) resolution.

One option for achieving quarter-display resolution is to use the Microsoft® GDI StretchBlt function. In many cases, however using the StretchBlt function, from a normal to quarter resolution, is expensive. As a result, using the GDI to achieve a (320×240) display at 10 fps is not generally feasible.

Another option is to perform special-purpose codec "doubling" from normal to quarter resolution. Since, in a preferred embodiment of the present invention, there is no RGB interface to the codec for the purposes of the special-purpose doubling feature, doubling is supported at the YUV interface only. An (160×120) color convert with "doubling" to (320×240) using an Intel® 486DX2 66 MHz processor takes approximately 8 msecs. A color convert with doubling plus quarter bit is generally much faster than a GDI normal to quarter stretch.

Thus, for a quarter screen (320×240) monitor, a (160× 120) YUV-9 Looking Glass format is used, and the codec "doubles" the data. (160×120) YUV-9 also generates approximately 192 KBytes/sec (10 fps). Using YUV-9 data means that the IRV decode step of the playback can be eliminated.

Video Frame Format/Capture Interface

The format of the IRV/Looking Glass piggy-backed data is defined as follows:

The Microsoft® VideoHdr structure is augmented as follows:

(1) lpData references a combined IRV and Looking Glass (RGB or YUV) data array. If Looking Glass data is present, then it immediately follows (on the next byte boundary) the IRV data. Looking Glass data is either in an RGB DIB 8 bpp format, or YUV-9 format. The YUV9 format can be used as input the IRV codec for purposes of color conversion (with optional doubling).

(2) If Looking Glass data is present, the dwReserved[1] is non-zero and equals the number of Looking Glass RGB or YUV bytes.

(3) If dwReserved[1] is non-zero, then VideoHdr->lp-Data+VideoHdr->dwBytesUsed references the first byte of the Looking Glass data.

Playback Implementation

Given that Looking Glass data may be present for monitor playback and IRV data is used for remote playback, the playback application, VPlay, must be aware of Looking Glass usage and take a different path of monitor and remote playback. VPlay executes the following cases for monitor playback (from within the ProcessPlayFrame proc):

```
if capture format is IRV then
    if Looking Glass is disabled then
            DecompressFrame
    else    // Looking Glass is enabled.
            if display window size is quarter then
                    ColorConvertFrame      // YUV data.
            else
                    FastCopy   // RGB data copied directly to output
                               display buffer.
else    // YUV snapshot capture format.
...
```

Referring again to FIG. 5, the video microcode 530 on video board 204 of FIG. 2 captures local video signals as raw captured YUV bitmaps and compresses the raw captured YUV bitmaps to generate a compressed video bitstream. As part of the compression processing, video microcode 530 uses the compressed video bitstream signals to generate decompressed YUV bitmaps. In order to display a representation of the local video signals in a local monitor window, the video playback software 550 on host processor 202 of FIG. 2 transmits RGB bitmaps to the monitor 106 of FIG. 1. In preferred embodiments of the present invention, conferencing system 100 provides different options for providing video signals from the video board 204 to the host processor 202 for local monitoring.

Under option #1, only the compressed video bitstream signals are transmitted from the video board 204 to the host processor 202. Under this option, the video manager 516 directs (1) the video decode driver 548 to decompress the compressed video bitstream to generate decompressed YUV

| | |
|---|---|
| lpData | Long pointer to the video frame data buffer. |
| dwBufferLength | Length of the data buffer pointed to by lpData, in bytes. |
| dwBytesUsed | Length of bytes used in the data buffer. |
| dwTimeCaptured | Time, in milliseconds, between the current frame and the beginning of the capture session. |
| dwUser | Reserved for application use. |
| dwFlags | Information about the data buffer. |
| dwReserved[0] | Reserved. |
| dwLGBytesUsed | Number of bytes used for Looking Glass data. |
| dwReserved[2] | Reserved. |
| dwReserved[3] | Reserved. |
| bIRVData[ ] | Compressed IRV data for video frame. |
| bLGData[ ] | Looking Glass data for video frame. | bitmaps and (2) the video playback driver 550 to color convert the YUV bitmaps to generate RGB bitmaps for display on the monitor 106.

Under option #2, the decompressed YUV bitmaps generated on the video board 204 are transmitted to the host processor with the compressed video bitstream. Under this option, the video manager 516 directs the video playback driver 550 to color convert the YUV bitmaps to generate RGB bitmaps for display on the monitor 106.

Under option #3, the decompressed YUV bitmaps are color converted on the video board 204 to generate RGB bitmaps. These RGB bitmaps are then transmitted from the video board 204 to the host processor 202 with the compressed video bitstream. Under this option, the video manager 516 directs the video playback driver 550 simply to display the RGB bitmaps on the monitor 106.

Under option #4, the raw captured YUV bitmaps are transmitted from the video board 204 to the host processor 202 with the compressed video bitstream. Under this option, the video manager 516 directs the video playback driver 550 to color convert the YUV bitmaps to generate RGB bitmaps for display on the monitor 106.

Under option #5, the raw captured YUV bitmaps are color converted on the video board 204 to generate RGB bitmaps. These RGB bitmaps are then transmitted from the video board 204 to the host processor 202 with the compressed video bitstream. Under this option, the video manager 516 directs the video playback driver 550 simply to display the RGB bitmaps on the monitor 106.

In addition to these video format options, video conferencing system 100 also preferably provides video resolution options. Under the video resolution options, when bitmaps (either YUV or RGB) are transmitted from the video board 204 to the host processor 202, the video conferencing system 100 provides the ability to transmit the bitmaps at at least two different resolutions. For example, under video format option #2, the decorepressed YUV bitmaps could be transmitted at either a (160×120) resolution or a (320×240) resolution.

Those skilled in the art will understand that these video format and video resolution options provide the ability to optimize the video conferencing performance of video conferencing system 100. The different options differ from one another in three significant areas: (1) processing load to the host processor 202, (2) transmission bandwidth between the video board 204 and the host processor 202, and (3) quality of the displayed image.

Removing the decode processing from the host processor 202 reduces the host processing load, but increases the transmission bandwidth. In addition, removing the color conversion processing from the host processor 202 further reduces the host processing load, but also increases the transmission bandwidth further still (since the color converted RGB bitmaps are preferably full-resolution bitmaps while the YUV bitmaps are preferably subsampled YUV4:1:1 bitmaps). Using the raw captured video signals provides greater quality of the local video display than using the decompressed video signals. On the other hand, using the raw captured video signals implies different levels of quality between the local monitor video display and the display of the video signals received from the remote conferencing system and decoded by the host processor 202. In addition, increasing the video resolution not only increases the quality of the local monitor video display, but also increases (1) the transmission bandwidth between the video board 204 and the host processor 202 and (2) the processing load to the host processor 202.

Video conferencing system 100 is preferably able to select automatically particular video format and video resolution options to achieve video conferencing of a desired level of quality based on transmission bandwidth, processor performance, video resolution, and video format (YUV, RGB, etc.).

In alternative preferred embodiments, under options #3 and #5, the video board 204 generates the RGB bitmaps in 8 bits per pixel (bpp), color look-up table (CLUT) format. In these embodiments, the transmission bandwidth is less than that for the YUV4:1:1 bitmaps (options #2 and #4) which have an average of 9 bpp.

Self-Calibration

The description for this section is the same as the description for the section of the same name in U.S. patent application Ser. No. 08/157,694. In addition, a goal of self-calibration is to ensure that, during a conference call, the video decode and display overhead does not consume the participants' entire PC, making either the data conferencing portion of his application or the video itself impractical. Even without concurrent data conferencing, it is conceivable that a video stream that consumes more than 100% of a host CPU could cause the video stream to fall behind the audio stream repeatedly and generate repeated video stream restarts. The outcome would be poor quality video, as measured by a decreased and inconsistent frame rate. It is advantageous that the user not reach this state accidentally, due to window re-sizing options that are generally available via the user interface.

In order to normalize the video decode overhead, file-based IRV and YUV frames are used. This video has been selected to provide "average" difficulty IRV decode. Because display timings are independent of content, display overhead can be measured with any of the IRV or YUV sequences. The PSVIDEO.INI configuration file is used to direct the self-calibration measurement and to store results. There are .INI sections for the following values:

(1) File names of the files containing the IRV and YUV video frames. These are AVI files. A FOURCC code is input to determine specify a file.

(2) The name of the SYSTEM.INI boot description display driver. This string is compared to the SYSTEM.INI entry. If a mis-compare results, then it is assumed the display driver has been changed, and self-calibration is re-run. Self-calibration should also be re-run following a processor upgrade, e.g., an Over-Drive upgrade. However, self-calibration will not detect this, and the user must re-run self-calibration manually, in this case. There is a Control Panel applet for this purpose. A processor upgrade is considered a fairly rare event.

(3) Decompress calibration timings. Values for IRV local (Looking Glass), IRV remote and YUV (160×120) and (320×240) (snapshot format) are written following the calibration measurement, and later referenced in order to construct VCost function output.

(4) Display calibration timings. Values for iconic (36×36), normal (160×120), and quarter (320×240) resolution are written following the calibration measurement, and later referenced in order to construct VCost function output.

Measurement

The proc videoMeasure in module VCOST is used to perform video decode and display measurements. Results are saved in the PSVIDEO.INI entries described above. There following delineates the different measurement cases and describes the measurement steps for each case:

Iconic IRV Decode. This is not a unique case. The Normal IRV decode timing is used.

Normal IRV Decode. This is the case for remotely encoded video received over the network and displayed at normal resolution. Decode measurement is implemented by disabling Looking Glass on a local stream, causing full IRV decode to take place. An IRV AVI file is used to simulate network frames.

Quarter IRV Decode. This is the case for remotely encoded video received over the network and displayed at quarter resolution. Decode measurement is implemented by using the Looking Glass disabled local stream (previous case) and resizing the monitor window to quarter size in order to trigger codec doubling as part of the decode. An IRV AVI file is used to simulate network frames.

Iconic IRV Decode. This is not a unique case. The Normal Looking Glass timing is used.

Normal Looking Glass Decode. This is the case for local video received in RGB format from the capture hardware. Decode measurement can not actually be made, because there is no decode/color conversion in this case. Decode measurement is implemented by using a Looking Glass enabled local stream. Looking Glass can be enabled/disabled at a local stream dynamically. Because internally, normal Looking Glass frames are copied from a capture buffer to an output display buffer at monitor playback time, a copy buffer timing is used as the normal Looking Glass decode timing. An IRV AVI file is used, but the decode timing is ignored in place of an in-line (160×120×8) byte buffer copy, which simulates normal looking glass operation in this case.

Quarter Looking Glass Decode. This is the case for local video received in YUV format from the capture hardware. Decode measurement is implemented using the Looking Glass enabled local stream (previous case). Decode measurement is implemented by measuring the YUV-to-RGB color conversion step. The monitor window is resized to quarter size in order to trigger codec doubling as part of the color conversion. A YUV9 (160×120) file is used to simulate capture hardware YUV Looking Glass frames.

Because Looking Glass frames are transferred from the capture hardware to host memory in an uncompressed format (RGB or YUV9), they are relatively large in size (either 160×120×8 or 160×120×9/8 bytes=approximately 20 KBytes). Assuming a video board-to-host ISA transfer rate of 2MBytes/sec, then Looking Glass frames will take approximately 10 msec/frame. This value is added to IRV Looking Glass decode timings to account for the system utilization impact of the Looking Glass frame transfers. In addition, so that the calibration process itself will not fully utilize the host processor, a decreased frame rate of 5 fps is used to calibrate IRV (local and remote).

Normal YUV-9 Snapshot Decode. Measures decode overhead for YUV9 (160×120) capture resolution. A YUV-9 (160×120) file is used to simulate capture hardware YUV frames.

Quarter YUV-9 Snapshot Decode. Measures decode overhead for YUV9 (320×240) capture resolution. A YUV-9 (320×240) file is used to simulate capture hardware YUV frames.

Because YUV-9 frames are transferred from the capture hardware to host memory in an uncompressed format, they are relatively large in size (either 160×120×9/8 bytes= approximately 20 KBytes or 320×240×9/8=approximately 80 KBytes). Assuming a video board-to-host ISA transfer rate of 2 MBytes/sec, then YUV-9 frames will take approximately 10 reset/frame (160×120) or 40 msec/frame (320× 240). This value is added to YUV-9 decode (color convert) timings to account for the system utilization impact of the YUV-9 frame transfers. In addition, so that the calibration process itself will not fully utilize the host processor, a decreased frame rate of 3 fps is used to calibrate YUV-9 snapshots. Also, because YUV-9 color convert is independent of video content (motion) and is simply a function of frame size, the same frame is repeatedly used to get an average timing.

Iconic Display. The monitor window is sized to (36×36) prior to monitor function invocation.

Normal Display. The monitor window is sized to (160× 120) prior to monitor function invocation.

Quarter Display. The monitor window is sized to (320× 240) prior to monitor function invocation.

When decode and display timings are derived, they are compared against values that are too much larger than the times expected on the slowest Intel® i486™ processor. For example, given that an IRV decode costs 12–24 msecs on a Intel® i486DX2™ 66 MHz processor, IRV decode times are compared against an upperbound of greater than 150 msecs. If any timings are found to be out-of-bounds, then it is assumed either another application or interrupt routine (e.g., network stack) has interfered with the calibration. In this case, an error code is returned to video manager initialization, which informs the user interface to issue a message indicating calibration should be re-run with the PC in a "quiescent" state.

File-Based Capture (File Playback)

The VInfo structure, used to specify stream attributes when a stream is opened, contains the field wCaptureSource, which can be used to specify indirectly a file-based capture for a local stream. If wCaptureSource specifies CAPT_SOURCE_AVI_FILE (as opposed to CAPT_SOURCE_DRIVER), then the dwCaptureDriver FOURCC code is used to specify a file of AVI frames in the PSVIDEO.INI file. CAPT SOURCE DRIVER is the default so if the value in wCaptureSource is not valid, CAPT_SOURCE_DRIVER will be assumed.

In the processing of the WM_VCAPTURE_CALL message to the capture task, the VINFO structure is obtained for the current stream and the wCaptureSource field is checked to determine whether to do real time video capture of AVI file based playback. This is the point, WM_VCAPTURE_CALL, where the flow of control diverges for the capture and file playback. If capture is specified, EnableCapture is called to start the capture driver, otherwise EnableAVIFilePlayback is called to open the file for playback.

After capture has begun or the file has been opened, the capture is driven by capture callbacks, and the playback is driven by a timer message, (ID_AVI_FILE_PLAYBACK) which is processed by the play task's window procedure.

EnableAVIFilePlayback executes the following:

(1) Open the correct AVI file and ascend it to the first video frame (perform file/type validation in the process).

(2) Allocate frame buffers for the capture callback.

(3) Start a timer with ID, ID_AVI_FILE_PLAYBACK, and VCapt's window handle. When the WM_TIMER message arrives, and the timer ID is equal ID_AVI_FILE_PLAYBACK, the proc ReadAFrame is used to get the next video frame. The AVI "auto repeat" control is used to read a file repeatedly that consists of a limited number of frames (e.g., 1). ReadAFrame does its own frame processing without calling the capture callback function. This separation keeps messages from being sent to the driver when it was not open. The VCapt procs DisableCapture and DisableAVIFilePlayback are called from the WM_VCAPTURE_CALL code to stop capture and file playback, respectively.

Playback Statistics

Once the capture source and display windows are sized appropriately for a specific calibration and VMonitor is called to begin the decode/display of the video stream, videoMeasure executes the following sequence:

SendMessage is used to send the VPlay app hwnd a WM_MEASURE_BEGIN message. A handle to the stream being measured is passed as the wParam.

The videoMeasure thread is delayed, using a PeekMessage loop for a duration specified (function of the stream being measured).

SendMessage is used to send the VPlay app hwnd a WM_MEASURE_END message. A handle to the stream being measured is passed as the wParam, and a long pointer to a measurement structure is passed as the lParam. VPlay will fill-in the measurement structure, consisting of decode and display timings for the duration of the BEGIN/END interval, in response to the WM_MEASURE_END message.

The VPlay statistics support measures decode and display overhead by summing the total decode/display times and then dividing the sums by the total number of frames processed. Because the statistics do not assume a frame rate or total number of frames, the videoMeasure begin/end sequence returns correct values.

VCost Function

As part of VInit, video manager initialization, the PSVIDEO.INI file is read for the measured calibration values and placed in a global data structure. When VCost is called, an internal proc videoCost is used to calculate system utilization. int videoCost

```
(   IN WORD     wResolution,    // iconic, nominal, quarter
    IN WORD     wDispFreq,      // 1 = every frame, 2 = every other, etc.
    IN WORD     wFrameRate,     // 10, 15, etc.
    IN WORD     wFormat,        // IRV or YUV
    IN DWORD    dwFlags)        // specifies local or remote stream
``` videoCost first selects the correct decode (decompcost) and display (dispcost) costs, based on the wResolution. wFormat, and dwFlags parameters. It then calculates system utilization as follows:

```
decompcost = decompcost * wFrameRate;
dispcost = (dispcost * wFrameRate)/wDispFreq;
costinmsecs = decompcost + dispcost;
// Return %
return(costinmsecs/10);
```

VM DLL

The description for this section is the same as the description for the section of the same name in U.S. patent application Ser. No. 08/157,694.

VCapt EXE

The description for this section is the same as the description for the section of the same name in U.S. patent application Ser. No. 08/157,694.

VPlay EXE

The description for this section is the same as the description for the section of the same name in U.S. patent application Ser. No. 08/157,694.

Palette Creation

The IRV palette is preferably established if conferencing application 502 is the active application (or one of its child video windows is active) and the IRV palette is preferably mapped into the system palette, if other windows have higher Z-order. In a preferred embodiment, IRV palette creation includes the following steps:

(1) Get the IRV color table from the IRV Codec.

(2) Create a Microsoft® Windows™ operating system palette from the IRV colors.

(3) Select the palette into the display window's DC.

(4) Set the display window to the active window (when VPlay is executing, its window is active, not the display window, which was supplied via the UI/VCI).

(5) Realize the palette.

Steps (4) and (5) ensure that the foreground indices (mapping used when the window is active) are set correctly.

In an alternative embodiment, the following steps are used:

(1) Create a palette with all palette entry flags set to PC_RESERVED. The PC_RESERVED flag indicates that the palette entry is "animated"; i.e., the system entry (actually the hardware CLUT entry) may be changed underneath Microsoft®Windows™ palette management. With the PC_RESERVED flag in a system palette entry, Microsoft® Windows™ operating system will not use it to map a logical palette entry. Creating a (new) palette with all palette entry flags set to PC_COLLAPSE is not sufficient (PC_COLLAPSE indicates a palette entry should not be mapped through an existing system palette entry), although this is what might be expected.

In fact, palette realization will begin at the first free system palette entry, if the system palette has free palette entries. Then, if more than the number of free entries are needed, system palette changes continue (wrap-around) with the first non-static entry (10th). Microsoft® Windows™ palette management does this in order to allow applications that require less than 236 system palette entries to share the system palette without re-mapping indices with every RealizePalette. However, IRV uses a full 236 color palette and IRV decode produces DIBs with a color table equal to the IRV color table. If its foreground indices have been wrapped (K-to-235, 10-[K−1], where K is the first free system palette entry), then its color display will not be correct.

(2) Set the display window to the active window.

(3) Realize the palette created above. This will set the system palette to a palette with all entries marked PC_RESERVED. A subsequent RealizePalette (Step 4), with an active window, will begin with the 10th (first non-static) entry, and logical palette entries will be identity mapped.

(4) Create and realize the IRV palette.

After this adjustment VPlay has:

(1) Established a complete and unmodified IRV color table as the logical palette for the display window.

(2) Established identity foreground palette indices for the display window. Both are desired for correct palettized color displays.

Extra RealizePalette Logic

A palette-aware application preferably performs the following actions in response to palette messages:

(2) There is a peculiarity in Microsoft® Windows™ palette managment: If a desktop bitmap is used that requires non-static palette entries, and an icon is dragged across the desktop, then the desktop is realized in the foreground and without a WM_PALETTECHANGED message broadcast. Thus, RealizePalette is used immediately before each display bit (same as preceding case) to account for this case. In

```
case WM_PALETTECHANGED:
    if ((HWND) wparam == hWnd)
    {
        return (0);
    }
case WM_QUERYNEWPALETTE:
if (lpVidObj->hPalette NULL) ==
{
    DbgMsg ("vplay-vplay", VERR, "no palette to realize.");
    break;
}
SelectPalette (lpVidObj->hDC, lpVidObj->hPalette, FALSE);
changes = RealizePalette (lpVidObj->hDC);
if (message==WM_PALETTECHANGED)
    DbgMsg("vplay-VidhookProc(WM_PALETTECHANGED)", VDBG,
    "NUMBER PALETTE ENTRIES CHANGED = %d", changes);
} else {
    DbgMsg("vplay-VidhookProc(WM_QUERYNEWPALETTE)", VDBG,
    "NUMBER PALETTE ENTRIES CHANGED = %d", changes);
}
// Do realize for MSVIDEO DrawDib, too.
DrawDibSetPalette(lpVidObj->hDDC, lpVidObj->hPalette);
changes = DrawDibRealize(lpVidObj->hDDC, lpVidObj->hDC, FALSE);
if (message==WM_PALETTECHANGED) {
    DbgMsg("vplay-VidhookProc(WM_PALETTECHANGED)", VDBG,
    "NUMBER PALETTE ENTRIES CHANGED for DrawDibDraw = %d",
    changes);
} else {
    DbgMsg("vplay-VidhookProc(WM_QUERYNEWPALETTE)", VDBG,
    "NUMBER PALETTE ENTRIES CHANGED for DrawDibDraw = %d",
    changes);
}
return((message == WM_QUERYNEWPALETTE) ? changes: 0);
```

The use of RealizePalette here is enough for the program; i.e., it is not used at the actual point of a display (bit) because either the program has been realized in the foreground, or it has been realized in some Z-order and has received all the system entries it requires or has its logical palette mapped into pre-existing system palette entries (using the Microsoft® Windows™-defined best fit algorithm).

In practice, this may not be the case. Exceptions are:

(1) A non-active RealizePalette does not always take effect. However, if a RealizePalette is made immediately before display, then a display to a window that does not have focus will be made with a correct logical-to-system mapping. Thus, although Microsoft® Windows™ palette management should not require it, RealizePalette is called immediately before every display bit. An unacceptable performance penalty has not been measured in this regard.

addition to the normal palette calls, the DrawDibSetPalette and DrawDibRealize are used in parallel with SelectPalette and RealizePalette, to cause (msvideo.dll's) DrawDibDraw to use the same color palette.

There is another case where palette logic preferably has support. In the proc that has hooked the display window, if a palette changed message is received, it is first determined if the display window is iconified. Because if the display window icon is moved across a desktop bitmap, an infinite loop of RealizePalette calls may result. That is, the iconified window receives a palette changed message from the desktop, which causes a realize for the iconified window, which causes the desktop to receive a palette changed message again. Because the desktop has temporary precedence in the Z-order, an infinite loop can result. This case is eliminated with the following logic, which precedes the typical palette management logic:

```
if (message==WM_PALETTECHANGED || message==WM_QUERYNEWPALETTE){
    hFirstParentWnd = hParentWnd = GetParent(hWnd);
    if (hParentWnd){
        do {
            hOldestParentWnd = hParentWnd;
        } while (hParentWnd = GetParent(hParentWnd));
    } else {
        hOldestParentWnd = hFirstParentWnd;
    }
```

-continued

```
        if (hOldestParentWnd != hFirstParentWnd) {
            if (IsIconic(hOldestParentWnd)) {
                DbgMsg("vplay-vidwndhookproc", VDBG, "RETURN -- ICONIC
                PARENT");
                return (CallWindowProc (lpVidObj->OldHookProc, hWnd, message,
                wParam, lParam));
            }
        }
    }
}
```

Netw DLL

The description for this section is the same as the description for the section of the same name in U.S. patent application Ser. No. 08/157,694. In addition, the SUPERVIDEOHEADER structure is defined as follows:

```
    o           MSVideoHdr
                    -       lpData
                    -       dwBufferLength
                    -       dwBytesUsed
                    -       dwTimeCaptured
                    -       dwUser
                    -       dwFlags
                    -       dwReserved[4]
    o           Cntl
                    -       uType, uMessage
                    -       dwPktNumber
                    -       hVStrm
    o           CompactVideoHdr
                    -       dwPackedCntl
                    -       dwTimeCaptured
                    -       dwPktNumber
    o           bFrameData
```

Only CompactVideoHdr and bFrameData are sent over the network. The CompactVideoHdr fields are defined as follows:

| dwPackedCntl | |
|---|---|
| wBytesUsed | 16-bit word (bits 0–15 of dwPackedCntl) containing the length of the video frame data (bFrameData . . . ). |
| bFlags | The low-order byte (bits 16–23 of dwPackedCntl) of the Microsoft ® Video for Windows ™ defined VIDEOHDR flags 32-bit word. Currently, only one flag value is used to mark a video frame if it is a key or reference frame. A video key frame data packet is specified as VHDR_KEYFRAME (=8). As leftover from the VfW capture driver, bFlags bits 0 and 1 will also be set, indicating a previously prepared header and frame capture complete state. These are not cleared by NETW and can be ignored by the receiver. |
| nbType | 8 bits of type information (bits 24–31 of dwPackedCntl). Currently supported types are:<br>    VDATA (=0x01=b00000001) Video data packet.<br>    VCNTL (=0x02=b0000010) Video control packet.<br>If VDATA, then the message contains either a key or delta frame. If VCNTL, then the message is a control message. Control types and messages are defined by bits 2,3:<br>    VCNTL_RESTART (=0x06=b00000110) Restart control. |
| dwTimeCaptured | This field contains the video stream capture time, as derived from the source audio stream, and is used to synchronize audio and video frames at the playback site. |
| dwPktNumber | A packet sequence number, which is a monotonically increasing, unsigned integer, beginning with a value of 0 for the first frame captured. |

The VideoHdr is used at the capture and playback sites, but is not sent over the network. The VideoHdr provides a consistent header for the capture driver, VCapt, and VPlay. VideoHdr. lpData is established once a network frame is received, and is relative to the receiver's address space.

The VideoHdrCntl adds information to the VideoHdr to support control messages between playback and capture sites. The concatenation of VideoHdr and VideoHdrCntl is referred to as the SuperVideoHdr in the Video Manager.

The CompactVideoHdr is a compact representation of the VideoHdr and VideoHdrCntl. Assuming an average IRV 1.0 delta frame size of 1000 bytes, then a 12-byte CompactVideoHdr represents an approximate 1% overhead (versus almost 5% if the SuperVideoHdr were used straightaway).

The internal procs SuperToCompact and CompactToSuper are used to translate to/from a SuperVideoHdr to a CompactVideoHdr.

AVSync DLL

The description for this section is the same as the description for the section of the same name in U.S. patent application Ser. No. 08/157,694.

Video Capture Driver

The description for this section is the same as the description for the section of the same name in U.S. patent application Ser. No. 08/157,694.

Custom APIs for Video Capture Driver

The description for this section is the same as the description for the section of the same name in U.S. patent application Ser. No. 08/157,694.

Video Microcode

The video microcode 530 of FIG. 5 running on video board 204 of FIG. 2 performs video compression. The preferred video compression technique is disclosed in later sections of this specification starting with the section entitled "Compressed Video Bitstream."

Audio Subsystem

Figure 13:
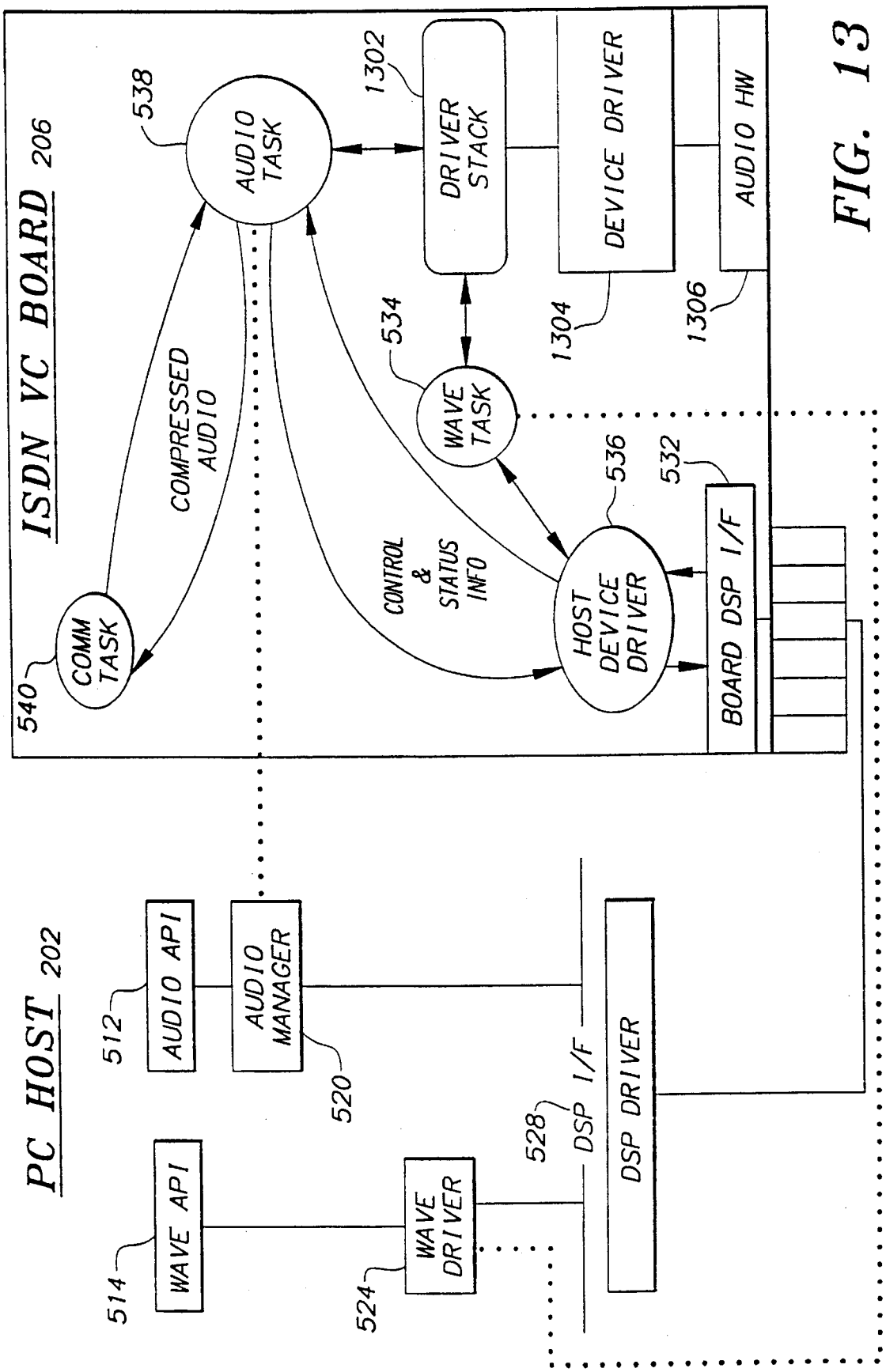
FIG. 13 is a representation of the audio FSM for the local audio stream and the remote audio stream of a conferencing system during a conferencing session.

Referring now to FIG. 13, there is shown a block diagram of the architecture of the audio subsystem, according to a preferred embodiment of the present invention. The description for this section is the same as the description for the section of the same name in U.S. patent application Ser. No. 08/157,694.

Audio API

Figures 14A, 14B:
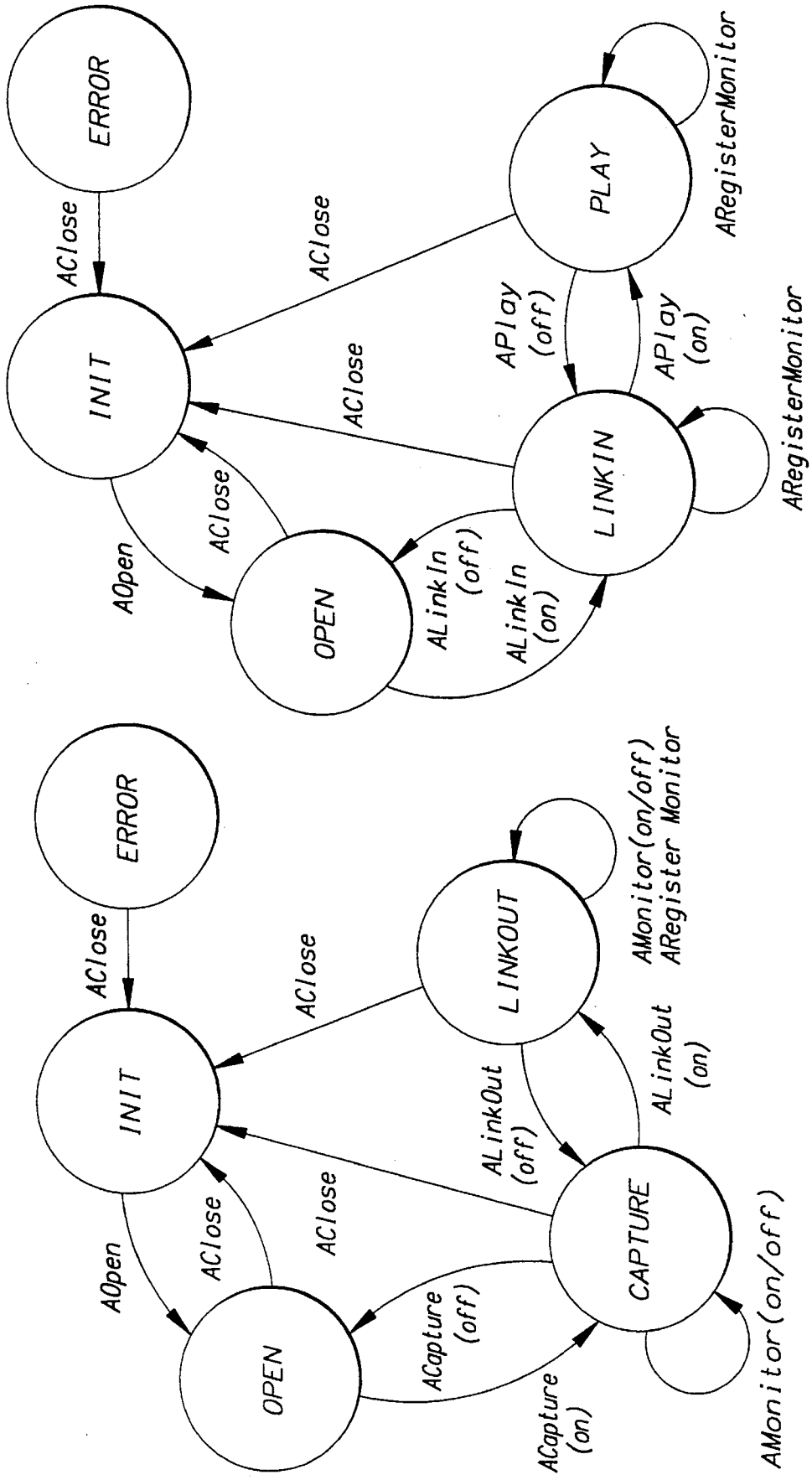
FIG. 14 is a block diagram of the architecture of the audio subsystem of the conferencing system of FIG. 5.

Referring now to FIG. 14, there is shown a representation of the audio FSM for the local audio stream and the remote audio stream of a conferencing system during a conferencing session, according to a preferred embodiment of the present invention. The description for this section is the same as the description for the section of the same name in U.S. patent application Ser. No. 08/157,694.

Audio Manager

The description for this section is the same as the description for the section of the same name in U.S. patent application Ser. No. 08/157,694.

Audio Manager Device Driver Interface

The description for this section is the same as the description for the section of the same name in U.S. patent application Ser. No. 08/157,694.

Audio Manager Interface with the DSP Interface

The description for this section is the same as the description for the section of the same name in U.S. patent application Ser. No. 08/157,694.

Host Processor to Audio/Comm Board Messages

The description for this section is the same as the description for the section of the same name in U.S. patent application Ser. No. 08/157,694.

Audio/Comm Board to Host Processor Messages

The description for this section is the same as the description for the section of the same name in U.S. patent application Ser. No. 08/157,694.

Wave Audio Implementation

The description for this section is the same as the description for the section of the same name in U.S. patent application Ser. No. 08/157,694.

Audio Subsystem Audio/Comm Board-Resident Implementation

The description for this section is the same as the description for the section of the same name in U.S. patent application Ser. No. 08/157,694.

Audio Task Interface with Host Device Driver

The description for this section is the same as the description for the section of the same name in U.S. patent application Ser. No. 08/157,694.

Audio Task Interface with Audio Hardware

Figure 15:
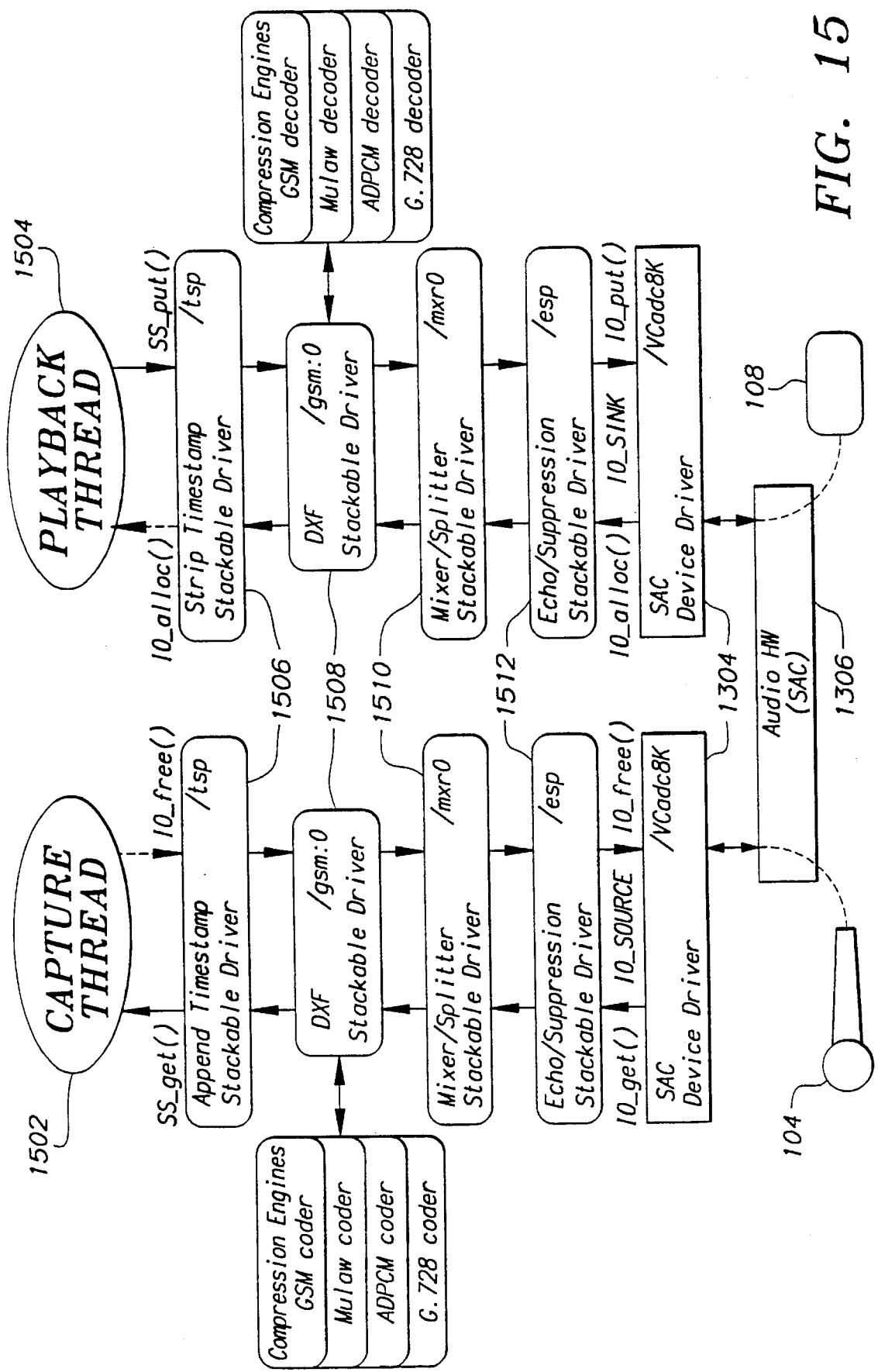
FIG. 15 is a block diagram of the interface between the audio task of FIG. 5 and the audio hardware of audio/comm board of FIG. 2.

Referring now to FIG. 15, there is shown a block diagram of interface between the audio task 538 and the audio hardware of audio/comm board 206 of FIG. 13, according to a preferred embodiment of the present invention. The description for this section is the same as the description for the section of the same name in U.S. patent application Ser. No. 08/157,694.

Timestamp Driver

The description for this section is the same as the description for the section of the same name in U.S. patent application Ser. No. 08/157,694.

(De)Compression Drivers

The description for this section is the same as the description for the section of the same name in U.S. patent application Ser. No. 08/157,694.

Mixer/Splitter Driver

The description for this section is the same as the description for the section of the same name in U.S. patent application Ser. No. 08/157,694.

Mixer Internal Operation

The description for this section is the same as the description for the section of the same name in U.S. patent application Ser. No. 08/157,694.

Echo Suppression Driver

The echo suppression driver (ESP) 1512 is responsible for suppressing echoes prevalent when one or both users use open speakers (rather than headphones) as an audio output device. The purpose of echo suppression is to permit two conferencing systems 100 connected by a digital network to carry on an audio conversation utilizing a particular microphone and a plurality of loudspeaker device choices without having to resort to other measures that limit or eliminate acoustic feedback ("coupling") from loudspeaker to microphone.

Specifically, measures obviated by the ESP include:

- An audio headset or similar device to eliminate acoustic coupling.
- A commercial "speakerphone" attachment that would perform the stated task off the
- PC and would add cost and complexity to the user.

The ESP takes the form of innovations embedded in the context of art known variously as "halfduplex speakerphones" or "half-duplex hands-free telephony" or "echo suppression." The ESP does not relate to art known as "echo cancellation."

The general ideas of "half-duplex hands-free telephony" are current practice. Electronic hardware (and silicon) exist that embody these ideas. The goal of this technology is to eliminate substantially acoustic coupling from loudspeaker to microphone by arranging that substantial microphone gain is never coincident with substantial speaker power output when users are speaking.

The fundamental idea in current practice is the following: Consider an audio system consisting of a receiving channel connected to a loudspeaker and a transmitting channel connected to a microphone. If both channels are always allowed to conduct sound energy freely from microphone to network and from network to loudspeaker, acoustic coupling can result in which the sound emanating from the loudspeaker is received by the microphone and thus transmitted back to the remote station which produced the original sound. This "echo" effect is annoying to users at best and at worst makes conversation between the two stations impossible. In order to eliminate this effect, it is preferable to place an attenuation device on each audio channel and dynamically control the amount of attenuation that these devices apply by a central logic circuit. This circuit senses when the remote microphone is receiving speech and when the local microphone is receiving speech. When neither channel is carrying speech energy, the logic permits both attenuators to pass audio energy, thus letting both stations receive a certain level of ambient noise from the opposite station. When a user speaks, the logic configures the attenuators such that the microphone energy passes through to the network and the network audio which would otherwise go to the speaker is attenuated (this is the "talk state"). When on the other hand speech is being received from the network and the local microphone is not receiving speech, the logic configures the attenuators conversely, such that the network speech is played by the speaker and the microphone's acoustic energy is muted by the attenuator on that channel (this is the "listen state"). If both the local user and the remote user speak at the same time, the logic allows the speaker who is talking the loudest over their threshold to speak.

The ESP operates without a separate dedicated speakerphone circuit device. The ESP operates over a network featuring an audio codec that is permitted to distort signal energies without affecting the performance of the algorithm.

The ESP effectively distributes computational overhead such that redundant signal processing is eliminated.

The ESP is a distributed digital signal processing algorithm. In the following, the algorithm is spoken of as "distributed," meaning that two instantiations of it reside on the two conferencing systems connected by a digital network, and their operation is interdependent). "Frame energy" means a mean sum of the squares of the digitized audio samples within a particular time segment called a "frame."

The instantaneous configuration of the two attenuations is encoded as a single integer variable, and the attenuations are implemented as a fractional multiplier as a computational function of the variable.

In order to classify a signal as speech, the algorithm utilizes a frame energy threshold which is computed as an offset from the mathematical mean of a histogram in which each histogram bin represents the count of frames in a particular energy range. The mean is used only if the frame is classified as noise based on the standard deviation of the histogram. The threshold varies dynamically over time as it is recalculated. There exists a threshold for each of the two audio channels.

Since both stations need access to the threshold established at a particular station (in that one station's transmit stream becomes the other station's receive stream), the threshold is shared to both instantiations of the algorithm as an out-of-band network signal. This obviates the need for both stations to analyze the same signal, and makes the stations immune to any losses or distortion caused by the audio codec.

The energy of a transmitted audio frame is embedded within a field of the communication format which carries the digitally-compressed form of the frame. In this way, the interactive performance of the station pair is immune from any energy distortion or losses involved in the audio codec.

The ESP makes possible hands-free operation for video teleconferencing products. It is well-known that hands-free audio conversation is a much more natural conferencing usage model than that of an audio headset. The user is freed from a mechanical attachment to the PC and can participate as one would at a conference table rather than a telephone call.

Audio Task Interface with Comm Task

The description for this section is the same as the description for the section of the same name in U.S. patent application Ser. No. 08/157,694.

Message Protocol

Figure 16:
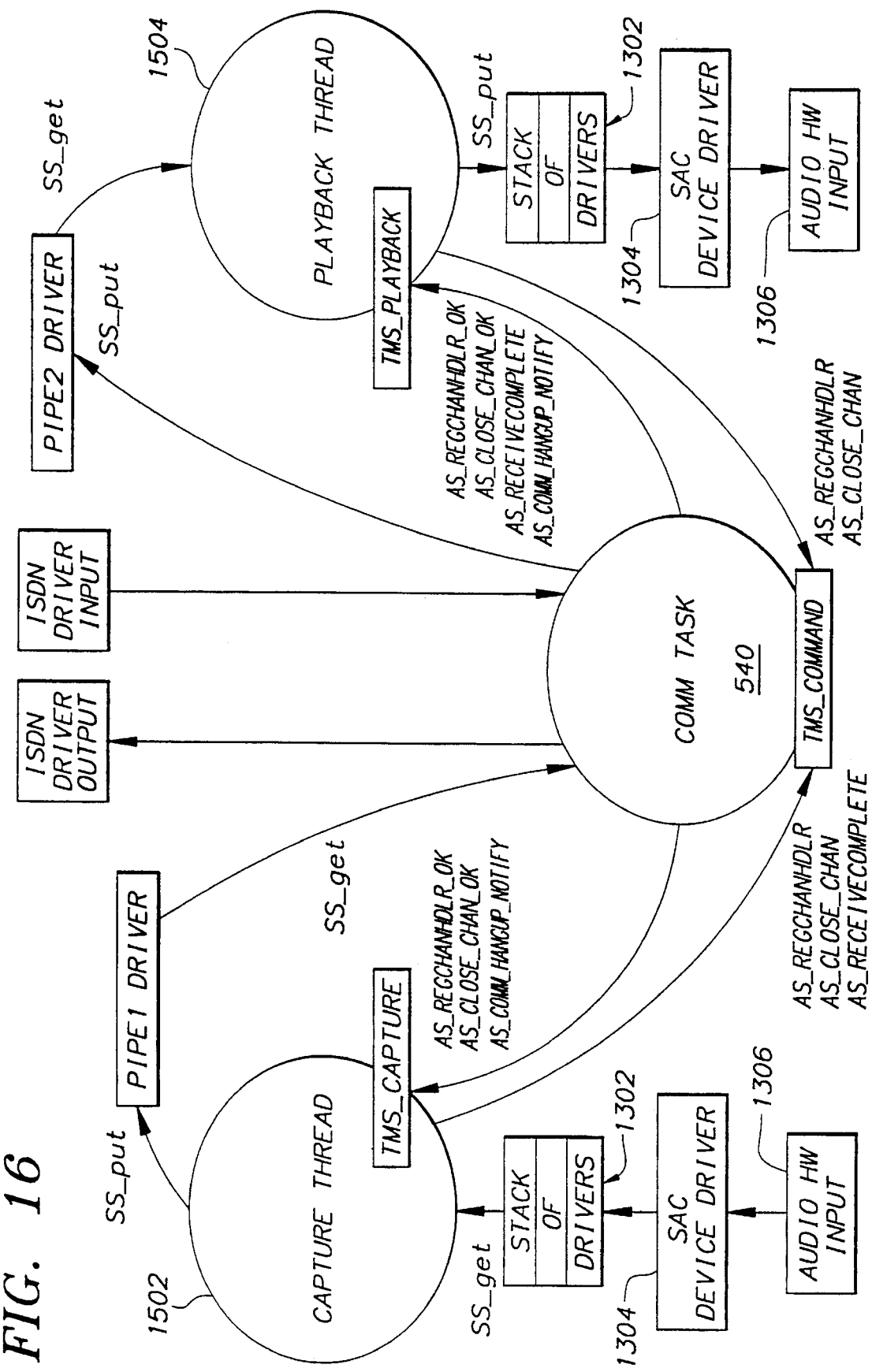
FIG. 16 is a block diagram of the interface between the audio task and the comm task of FIG. 5.

Referring now to FIG. 16, there is shown a block diagram of the interface between the audio task 538 and the comm task 540 of FIGS. 5 and 13, according to a preferred embodiment of the present invention. The description for this section is the same as the description for the section of the same name in U.S. patent application Ser. No. 08/157, 694.

Global Data Package

The description for this section is the same as the description for the section of the same name in U.S. patent application Ser. No. 08/157,694.

NULLDEV Driver

The description for this section is the same as the description for the section of the same name in U.S. patent application Ser. No. 08/157,694.

PWave Subsystem

The PWave subsystem provides high-priority playback of digital audio signals contained in Microsoft® standard Wave files.

PWave API

PWave API 552 of FIG. 5 is a Microsoft® Windows™ operating system DLL that accepts calls (PWave API calls) and translates them into messages sent to an onboard task (high priority playback task 554 of FIG. 5) to playback audio. This API gives the caller the ability to select a Wave file for playback at a higher priority other Wave files. By using the API, the application has control of the number of times the file is played back and when playback stops playing. The application gets notification of playback complete.

High Priority Playback Task

The high-priority playback task executes in the environment of audio/comm board 206 and is distinct from the host processor 202 and operating system where the PWave API 552 is called. This task preempts other Wave files from being played back, sets up the board for playback (board setup includes volume control and output device selection) of its Wave file, and plays back the file until it is halted or the specified number of playback loops has been reached.

PWave Protocol

All strings used in defining the PWave protocol below are NUL ('\0') terminated ASCI strings. The following mnemonics are used in the protocol description below. Their integer values are defined as follows.

| Mnemonic Translation | |
|---|---|
| POPEN_TMSG | 100 |
| PLAYDONE_TMSG | 101 |
| TMB_EXIT_IP_SUCCESS | 100 |
| PERR_BADFILE | 101 |
| PERR_NOTWAVEFILE | 103 |
| PERR_UNSUPPORTED_RATE | 104 |
| PERR_NOTMONO | 105 |
| PERR_DEVBUSY | 106 |
| PERR_NOTRIFF | 107 |
| PERR_UNRECOGIZABLE_WAVE | 108 |
| PERR_UNSUPPORTED_SAMPLE | 109 |
| PERR_RESOURCE_FAILURE | 110 |
| PERR_FILEACCESS | 111 |

The PWave task can be opened in two ways: (1) to test a Wave file for compatibility with the implementation and (2) to playback a file. Method (1) takes a single parameter on the command line of the high-priority task. That parameter is a string specifying the full path name to the file. The message passed back from the board is of the following format:

| MESSAGE | Parameter | Meaning |
|---|---|---|
| POPEN_TMSG | P_SUCCESS | File is valid. |
| POPEN_TMSG | PERR_BADFILE | Unexpected file data. |
| POPEN_TMSG | PERR_NOTMONO | Invalid audio type. |
| POPEN_TMSG | PERR_NOTWAVEFILE | Invalid file type. |
| POPEN_TMSG | PERR_UNRECOGIZABLE_WAVE | Bad format type. |
| POPEN_TMSG | PERR_NOTRIFF | Bad header type. |
| POPEN_TMSG | PERR_RESOURCE_FAILURE | On board resource error. |
| POPEN_TMSG | PERR_UNSUPPORTED_RATE | Sample too slow/fast. |
| POPEN_TMSG | PERR_UNSUPPORTED_SAMPLE | Wrong number of bits per sample. |
| POPEN_TMSG | PERR_DEVBUSY | High priority audio channel in use. |
| POPEN_TMSG | PERR_FILEACCESS | Can't open file. |

Playing back the file requires five parameters on the high priority task's command line. All parameters are strings passed to the task, and converted and interpreted in that environment. The indexes are as follows:

(1) The file name. This is a full path to the Wave file to be played by the "High Priority Playback" task. This path is a NUL terminated ASCII string.

(2) Number of times to loop on the file. If the number to loop is non-zero, the file is played that many times. If the number to loop is specified as zero, the file is played indefinitely (until the caller stops it). The number is a string specified with any number of the following digit concatenated together: 0, 1, 2, 3, 4, 5, 6, 7, 8, 9. It is converted to a 32-bit unsigned integer.

(3) Ignored parameter.

(4) The volume to playback the Wave file. This is a string composed of one or more of the following digits: 0, 1, 2, 3, 4, 5, 6, 7, 8, 9, and at most one ".". It is converted to a 32-bit floating point number that the audio samples are multiplied by before being played.

(5) Output device specification. An integer string that is any of the following numbers added together 1, 2, 4 as integers and converted to a string. The integers have the following specifications:

1 specifies the on-board speaker.

2 specifies the line-out device.

4 specifies the head phone device.

If the call is accepted, the following message will be sent to the host:

| MESSAGE | Parameter | Meaning |
| --- | --- | --- |
| POPEN_TMSG | P_SUCCESS | File is valid. |
| Error conditions returned to the host are as follows: | | |
| POPEN_TMSG | PERR_FILEACCESS | Can't open file. |
| POPEN_TMSG | PERR_BADFILE | Unexpected file data. |
| POPEN_TMSG | PERR_NOTMONO | Invalid audio type. |
| POPEN_TMSG | PERR_NOTWAVEFILE | Invalid file type. |
| POPEN_TMSG | PERR_UNRECOGIZABLE_WAVE | Bad format type. |
| POPEN_TMSG | PERR_NOTRIFF | Bad header type. |
| POPEN_TMSG | PERR_RESOURCE_FAILURE | On board resource error. |
| POPEN_TMSG | PERR_UNSUPPORTED_RATE | Sample too slow/fast. |
| POPEN_TMSG | PERR_UNSUPPORTED_SAMPLE | Wrong number of bits per sample. |
| POPEN_TMSG | PERR_DEVBUSY | High priority audio channel in use. |

To stop audio playback, the following message is passed from the host to the board via the boards device driver:

| MESSAGE | Parameter | Meaning |
| --- | --- | --- |
| TMB_EXIT | None | Stop execution. |

At the completion of playing this file for any reason (i.e., application request or number of times played), the following message is sent back to the host:

| | | |
| --- | --- | --- |
| PLAYDONE_TMSG | P_SUCCESS | File is done. Task cleanup complete. |

Comm Subsystem

The communications (comm) subsystem of conferencing system 100 of FIG. 5 comprises comm API 510, comm manager 518, and DSP interface 528 running on host processor 202 of FIG. 2 and comm task 540 running on audio/comm board 206. The comm subsystem provides connectivity functions to the conferencing application programs 502 and 504. It maintains and manages the session, connection, and the virtual channel states. All the connection control, as well as data communication are done through the communication subsystem.

Figure 17:
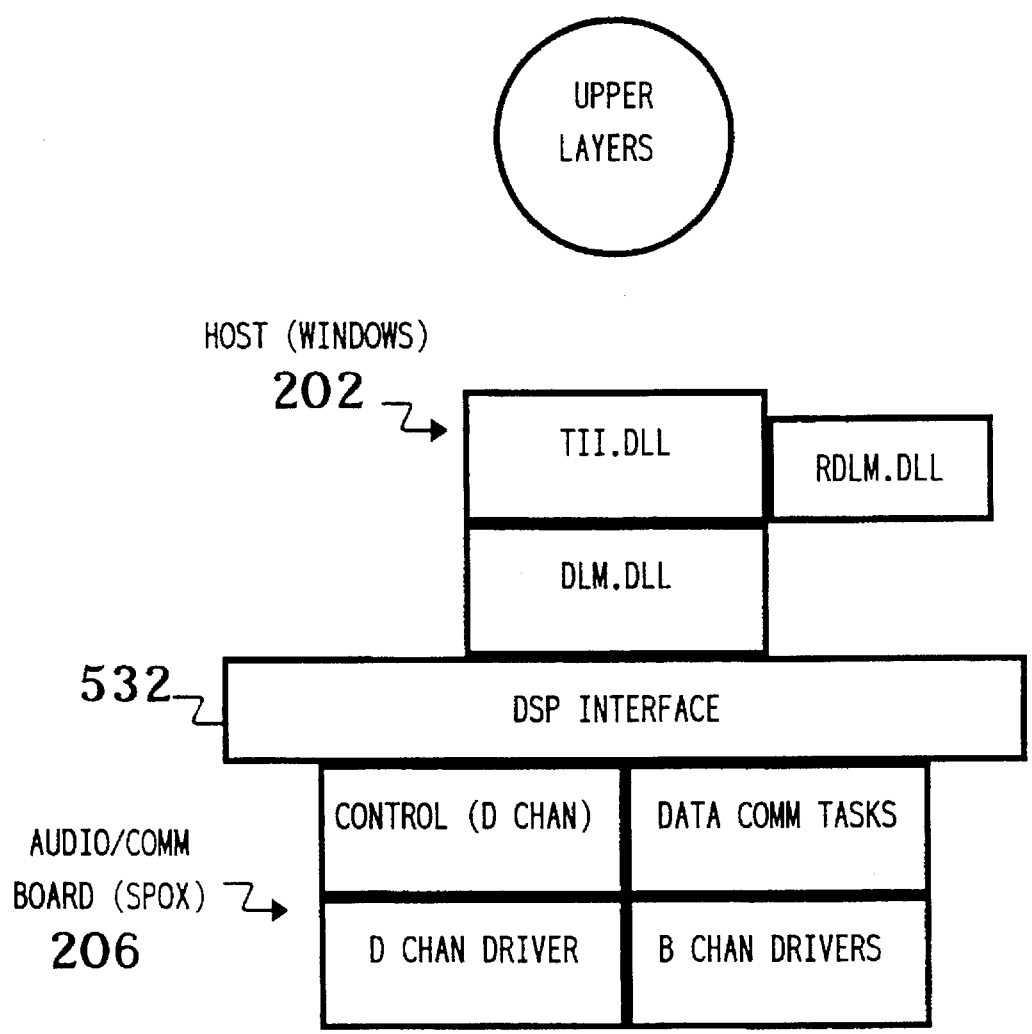
FIG. 17 is a block diagram of the comm subsystem of the conferencing system of FIG. 5.

Referring now to FIG. 17, there is shown a block diagram of the comm subsystem of conferencing system 100 of FIG. 5, according to a preferred embodiment of the present invention. The comm subsystem consists of the following layers that reside both on host processor 202 and the audio/comm board 206:

Transport independent interface (TII.DLL),

Datalink module (DLM.DLL+KPDAPI.DLL, where KPDAPI.DLL is the back-end of the DLM which communicates with the DSP interface), and Reliable datalink module (RDLM.DLL).

TII.DLL and RDLM.DLL reside entirely on the host processor. Datalink module comprises DLM.DLL residing on the host processor, and control (D channel), D channel driver, data comm tasks, and B channel drivers residing on audio/comm board 206.

The comm interface provides a "transport independent interface" for the conferencing applications. This means that the comm interface hides all the network dependent features of the conferencing system. In a preferred embodiment, conferencing system 100 uses the ISDN Basic Rate Interface (BRI) which provides 2*64 KBits/sec data (B) channels and one signaling (D) channel (2B+D). Alternative preferred embodiment may use alternative transport media such as local area networks (LANs) as the communication network.

Figure 18:
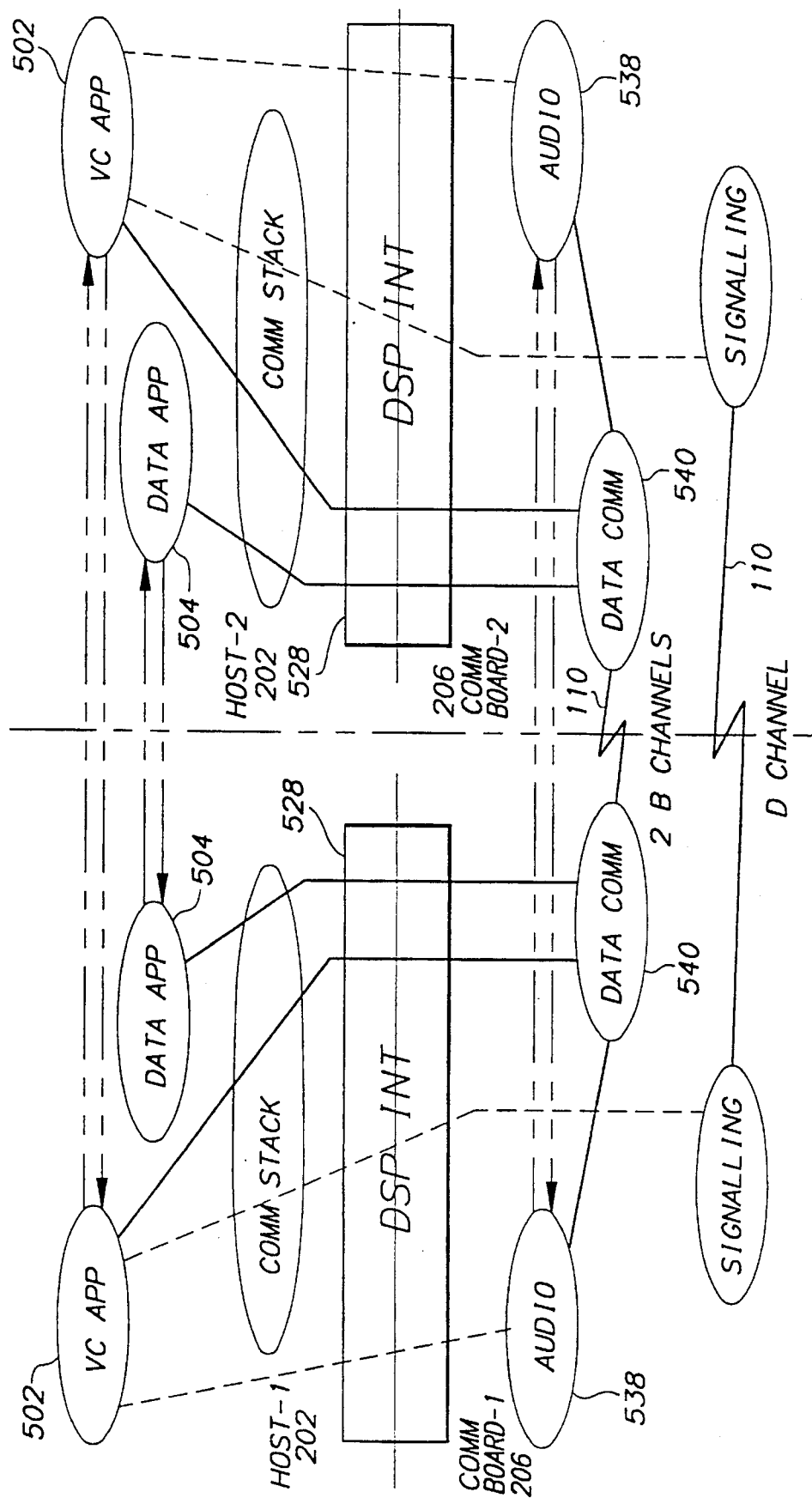
FIG. 18 is a block diagram of the comm subsystem architecture for two conferencing systems of FIG. 5 participating in a conferencing session.

Referring now to FIG. 18, there is shown a block diagram of the comm subsystem architecture for two conferencing systems 100 participating in a conferencing session, according to a preferred embodiment of the present invention. The comm subsystem provides an asynchronous interface between the audio/comm board 206 and the conferencing applications 502 and 504.

The comm subsystem provides all the software modules that manage the two ISDN B channels. The comm subsystem provides a multiple virtual channel interface for the B channels. Each virtual channel is associated with transmission priority. The data queued for the higher priority channels are transmitted before the data in the lower priority queues. The virtual channels are unidirectional. The conferencing applications open write-only channels. The conferencing applications acquire read-only channels as a result of accepting a open channel request from the peer. The DLM supports the virtual channel interface.

During a conferencing session, the comm subsystem software handles all the multiplexing and inverse multiplexing of virtual channels over the B channels. The number of available B channels (and the fact that there is more than one physical channel available) is not a concern to the application.

The comm subsystem provides the D channel signaling software to the ISDN audio/comm board. The comm subsystem is responsible for providing the ISDN B channel device drivers for the ISDN audio/comm board. The comm subsystem provides the ISDN D channel device drivers for the ISDN audio/comm board. The comm software is preferably certifiable in North America (U.S.A., Canada) and Europe. The signaling software is compatible with NI1, AT&T Custom, and Northern Telecom DMS-100.

The comm subsystem provides an interface by which the conferencing applications can gain access to the communication hardware. The goal of the interface is to hide the implementation of the connectivity mechanism and provide an easy to use interface. This interface provides a very simple (yet functional) set of connection control features, as well as data communication features. The conferencing applications use virtual channels for data communication. Virtual channels are simplex, which means that two virtual channels are open for full duplex communication between peers. Each conferencing application opens its outgoing channel which is write-only. The incoming (read-only) channels are created by "accepting" an "open channel" request from the peer.

qMUX MULTIPLE CHANNEL STREAMING MODULE

The description for this section is the same as the description for the section of the same name in U.S. patent application Ser. No. 08/157,694.

Comm API

The description for this section is the same as the description for the section of the same name in U.S. patent application Ser. No. 08/157,694.

Transport-Independent Interface

The description for this section is the same as the description for the section of the same name in U.S. patent application Ser. No. 08/157,694. Comm API 510 supports calls to three different types of transport-independent interface functions by conferencing applications 502 and 504 to the comm subsystem: connection management functions, data exchange functions, session management, and communications statistics functions. Connection management functions provide the ULM with the ability to establish and manage virtual channels for its peers on the network. Data exchange functions control the exchange of data between conferencing systems over the network. Communications statistics functions provide information about the channels (e.g., reliability, priority, number of errors, number of receives and transmissions). These functions are as follows:

| Connection Management Functions | |
|---|---|
| RegisterChanMgr | Registers a callback or an application window whose message processing function will handle low-level notifications generated by data channel initialization operations. This function is invoked before any OpenChannel calls are made. |
| RegisterChanHandler | Registers a callback or an application window whose message processing function will handle low-level notifications generated by data channel input/output (I/O) activities. The channels that are opened will receive CHAN_DATA_SENT, and the accepted channels will receive CHAN_RECV_COMPLTE. |
| OpenChannel | Requests a sub-channel connection from the peer application. The result of the action is given to the application by |

| Connection Management Functions | |
|---|---|
| | invoking the callback routine specified in the RegisterChanHandler. The application specifies an ID for this transaction. This ID is passed to the callback routine or posted in a message. Note: All Connection requests are for establishing connections for sending data. The receive channels are opened as the result of accepting a ConnectChannel request. |
| AcceptChannel | A peer application can issue AcceptChannel in response to a CHAN_REQUEST (OpenChannel) message that has been received. The result of the AcceptChannel call is a one-way communication sub-channel for receiving data. Incoming data notification will be sent to the callback or window application (via PostMessage) to the ChannelHandler. |
| RejectChannel | Rejects an OpenChannel request (CHAN_REQUEST message) from the peer. |
| CloseChannel | Closes a sub-channel that was opened by AcceptChannel or ConnectChannel. |
| Data Exchange Functions | |
| SendData | Sends data. Data is normally sent via this mechanism. |
| ReceiveData | Receives data (normally received through this mechanism). Call is normally issued in response to a DATA_AVAILABLE message. |
| Communications Statistics Functions | |
| GetChanInfo | Returns channel information. |
| GetChanStats | Returns various statistical information about a channel. |
| GetTiiStats | Returns various statistical information about a TII channel. |

These functions are defined in further detail later in this specification in APPENDIX E entitled "Comm API."

In addition, comm API 510 supports three types of messages and callback parameters returned to conferencing applications 502 and 504 from the comm subsystem in response to some of the above-listed functions: session messages, connection messages, and channel messages. Session messages are generated in response to change of state in the session. Connection messages are generated in response to the various connection-related functions.

Message and Callback Parameters

The description for this section is the same as the description for the section of the same name in U.S. patent application Ser. No. 08/157,694.

Session Handler Messages

The description for this section is the same as the description for the section of the same name in U.S. patent application Ser. No. 08/157,694. One difference is in the CONN_ACCEPTED message, which is defined as follows:
CONN_ACCEPTED Response to MakeConnection or
AcceptConnection request.
    wParam    Connection handle
    lParam Pointer to connection information structure:
        {
        DWORD    TransId (specified by user in earlier request)
        LPCONN_CHR    Pointer to connection attributes
        LPBYTE    Itone string
        }

Channel Manager Messages

The description for this section is the same as the description for the section of the same name in U.S. patent application Ser. No. 08/157,694.

Channel Handler Messages

The description for this section is the same as the description for the section of the same name in U.S. patent application Ser. No. 08/157,694.

iTone

The iTone version string is a C (null-terminated) string that contains version information for the product. This string is in the first packet sent over the iTone channel after it is opened. In a preferred embodiment, the iTone message is transmitted and received over a channel (e.g., channel 15) different from the control channel to avoid interference with control channel messages. The iTone message is sent even before the control channel is opened. Since iTone is the first packet placed on the wire, this ensures that no other messages are sent until iTone transmission is complete. To guarantee delivery of the iTone message, an acknowledgment method is employed in which the iTone packet itself is used for acknowledgement.

The generic format for the string is:

"iTone rev company.product.version copyrightyear"

where:
- o  company  company ID (5 characters, zero-filled)
- o  product  company product ID (4 characters, zero-filled)
- o  version  product version ID (4 characters, zero-filled)
- o  year     copyright year The quotes are not part of the string. All spaces in the string are single spaces, and the company, product, and version IDs are separated by a period. Preferred company IDs are as follows:

| Company | iTone Company Number |
|---------|---------------------|
| Intel   | 00001               |
| VTel    | 00002               |

Preferred product IDs are as follows:

| Company | iTone Company Number |
|---------|---------------------|
| Intel Video Conferencing (XXXXXXXX) | 0001 |
| Intel Data Conferencing (XXXXX) | 0002 |
| VTel Video Conferencing | 0003 |

Preferred company.product.version IDs are as follows:

| Company | Product | Shipping Version | iTone Number |
|---------|---------|------------------|--------------|
| Intel   | VC      | 1.0              | 00001.0001.0000 |
| Intel   | VC      | 1.6              | 00001.0001.0006 |
| Intel   | VC      | 1.8              | 00001.0001.0008 |
| Intel   | VC      | 2.0              | 00001.0001.0020 |

For example, the preferred iTone string for version 1.6 of the Intel Video Conferencing product is as follows:

"iTone rev 00001.0001.0006 copyright 1994"

The iTone acknowledgment scheme has three goals:

1. Guarantee that the iTone message is delivered.
2. Accommodate delays in non-end-to-end digital calls, but do not penalize end-to-end digital callers with a delay.
3. Use the iTone packet itself as the acknowledgment medium, to guarantee synchronization between both participants in the call.

To use the iTone packet for acknowledgment, one octet within the stream is used as a state flag. (Note that this octet is not a part of the iTone version string.) This state flag has three possible values. For the sake of this description, these values and the packets in which they reside are called iTone1, iTone2, and iTone3. The following is a description of a typical scenario of iTone transmissions for a preferred acknowledgment method:

1. With caller and callee in iTone1 state, caller transmits first iTone stream (iTone1) to callee. (Callee may also be transmitting iTone1 to caller at the same time.)
2. Callee receives iTone1 from caller and callee switches to iTone2 state.
3. Callee transmits second iTone packet (iTone2) to caller.
4. Caller receives iTone2 from callee and caller switches to iTone2 state.
5. Caller transmits third iTone packet (iTone3) to callee and caller switches to iTone3 state.
6. Callee receives iTone3 from caller and callee switches to iTone3 state.

Once iTone acknowledgment completes, TII saves the iTone version pointer string and proceeds with the rest of connection establishment. If iTone acknowledgment does not complete within a specified time period (e.g., 20 seconds), the session establishment fails and the connection between VC systems is not completed.

During the iTone Channel Open callback, a buffer large enough to receive the iTone packet is posted. TII then begins transmitting iTone1 packets at preferably 200 millisecond intervals. During iTone1 and iTone2 processing, packets are sent at preferably 200 millisecond intervals.

The ConAce structure within the SESS_CB structure contains a long pointer field (called "lpItone"). This structure is used during TII's callback to VCI. When the session is established and the CONN_ACCEPT callback is sent to VCI, the pointer to the version string is included in this structure.

The SESS_CB structure with the lpItone member is as follows:

```
// lParam structure for Session handler
// (in cases where multiple parameters are returned via lParam)
typedef struct tagSESS_CB {
    union tagSESS_EV {
        struct tagConReq {
            HSESS          hSess;
            LPTADDR        lpCallerAddr;
            LPCONN_CHR     lpAttributes;;
        } ConReq;
        struct tagConAcc {
            DWORD          dwTransId;
            LPCONN_CHR     lpAttributes;
            LPBYTE         lpItone;
        } ConAcc;
    } SESS_EV;
} SESS_CB, FAR *LPSESS_CB;
```

When VCI receives the CONN_ACCEPT callback from TII, the pointer to the iTone version string (lpItone) is saved.

The V_ConAcc structure within the LPV_CBACK structure contains a long pointer field (lpItone). This structure is used during VCI's callback to the application. When the session is established and the CFM_ACCEPT_NTFY callback is sent to the application, the pointer to the version string is included in this structure. The LPV_CBACK structure with the lpItone member is as follows:

```
// lParam structure for Callbacks
// (in cases where multiple parameters are returned via lParam)
typedef struct tagV_CBACK {
    union tagV_EV {
        struct tagV_ConReq {
            LPTADDR         lpCallerAddr;
            LPCONN_CHR      lpAttributes;
        } V_ConReq;
        struct tagV_ConAcc {
            LPCONN_CHR      lpAttributes;
            LPABBUSCARDINFO lpABCard;
            LPMTYPE         lpMedia;
            LPBYTE          lpItone;
        } V_ConAcc;
        struct tagV_ChanReq {
            DWORD           dwTransId;
            HCONN           hCall;
            LPCHAN_INFO     lpChanInfo;
        } V_ChanReq;
    } V_EV;
} V_CBACK, FAR *LPV_CBACK;
```

When the application receives its CFM_ACCEPT_NTFY callback, it preferably looks at the new lpItone pointer within the LPV_CBACK structure it receives. lpItone is the address of a buffer that contains the iTone version string. The buffer may be parsed to extract the iTone version information. Parsing preferably follows the syntax for iTone version strings as described earlier in this section. If the contents of the buffer do not follow this exact syntax, the version string is assumed to be invalid.

The following code defines the iTone sub frame and the buffers used for sending and receiving iTone. In addition, the bit positions of the three major iTone components are defined. These components are the version string and the iTone state flag, as well as the bit rate flag.

```
// iTone data pattern for a sub_multiframe
//
#define    FAS_0    0x00
#define    FAS_1    0x01
#define    BAS_0    0x00
static BYTE ItoneSubFrame[] =
{
    FAS_0, FAS_0, FAS_0, FAS_1, FAS_1, FAS_0, FAS_1, FAS_1, BAS_0, BAS_0, BAS_0,
    BAS_0, BAS_0, BAS_0, BAS_0, BAS_0, 'i', 'T', 'o', 'n', 'e', '', 'r', 'e', 'v', '', '0', '0',
    '0', '0', '1', '.', '0', '0', '0', '1', '.', '0', '0', '0', '6', '', 'c', 'o', 'p', 'y', 'r', 'i', 'g', 'h', 't',
    '1', '9', '9', '4', NULL, NULL, NULL, NULL, NULL, NULL, NULL, NULL, NULL,
    NULL, NULL, NULL, NULL, NULL, NULL, NULL, NULL, NULL, NULL, NULL, NULL,
    NULL, NULL, NULL, NULL, FAS_0, FAS_1, FAS_0, FAS_1, FAS_1, FAS_0, FAS_1,
    FAS_1, BAS_0, BAS_0, BAS_0, BAS_0, BAS_0, BAS_0, BAS_0, BAS_0, 'i', 'T', 'o', 'n',
    'e', '', 'r', 'e', 'v', '', '0', '0', '0', '0 ', '1', '.', '0', '0 ', '0 ', '1', '.', '0, '0', '0', '6', '', 'c',
    'o', 'p', 'y', 'r', 'i', 'g', 'h', 't', '1', '9', '9', '4', NULL, NULL, NULL, NULL, NULL,
    NULL, NULL, NULL, NULL, NULL, NULL, NULL, NULL, NULL, NULL, NULL, NULL,
    NULL, NULL, NULL, NULL, NULL, NULL, NULL, NULL
};
//
// Position of "iTone" string inside first sub-multiframe
//
#define ITONE_ID_POS              16
//
// Position of state flag inside first sub-multiframe
//
#define ITONE_STATE_POS           56
//
// Position of bit rate flag inside first sub-multiframe
//
#define ITONE_BITRATE_POS         57
//
// Size of each iTone sub_multiframe
//
#define ITONE_SUB_FRAMESIZE       sizeof(ItoneSubFrame)
#define NUM_SUBFRAMES             5
//
// Size of HDLC hardware-imposed trailer (2 byte flag + 2 byte checksum)
//
#define ITONE_HW_TRAILER_SIZE 4
//
// Size of combined iTone message for both ISDN B channels.
// This will be split into two fragments, one for each B channel.
// Each fragment will be preceded by the HDLC header and QMUX header.
// Each fragment will be trailed by the HDLC trailer (flag+checksum).
//
#define ITONE_MSGSIZE             (ITONE_SUB_FRAMESIZE*NUM_SUBFRAMES-
                                   ITONE_HW_TRAILER_SIZE) * 2
//
// Buffer used to fill and send iTone
//
static BYTE ItoneBuf [ITONE_MSGSIZE+ITONE_HW_TRAILER_SIZE*2];
```

```
//
// Buffer used to receive iTone
//
static BYTE ItoneRecvBuf [ITONE_MSGSIZE + ITONE_HW_TRAILER_SIZE*2 ];
//
// iTone Stream State (per connection)
//
#define    ITONE_STREAM_1    0x01
#define    ITONE_STREAM_2    0x02
#define    ITONE_STREAM_3    0x03
//
// Rate Negotiation State (per connection)
//
#define    RATE_STREAM_1     0x02
#define    RATE_STREAM_2     0x03
#define    RATE_STREAM_3     0x04
#define    RATE_ESTAB        0xff
``` iTone as implemented by an iTone data handler (H.221) on the board is a simple step of transmitting iTone1 until it receives iTone1 (or times out). If the iTone handler (H.221) detects iTone1, it abandons iTone1 transmission/reception and just informs the host that iTone was detected. Subsequently, TII starts the 3 phases of iTone all over again in QMUX mode. If any of these assumptions is not correct, H.221 will not be able to talk to R1.6.

The iTone packet does not have 2 HDLC octets preceding the "iTone.." ASCII string; so the ASCII string is transmitted and received right after the 16 FAS/BAS octets. A single HDLC header and QMUX header is transmitted preceding the 6 iTone frames. (1 HDLC flag octet, plus 8 QMUX header octets). The above QMUX header ensures the receipt of iTone. There is an arbitrary number of HDLC flags in between these "super" iTone messages (each of which has 6 consecutively packed iTone frames).

Further description of the iTone string and its use may be found in U.S. patent application Ser. No. 08/305,206, filed Sep. 13, 1994.

Data Structures

Figure 19:
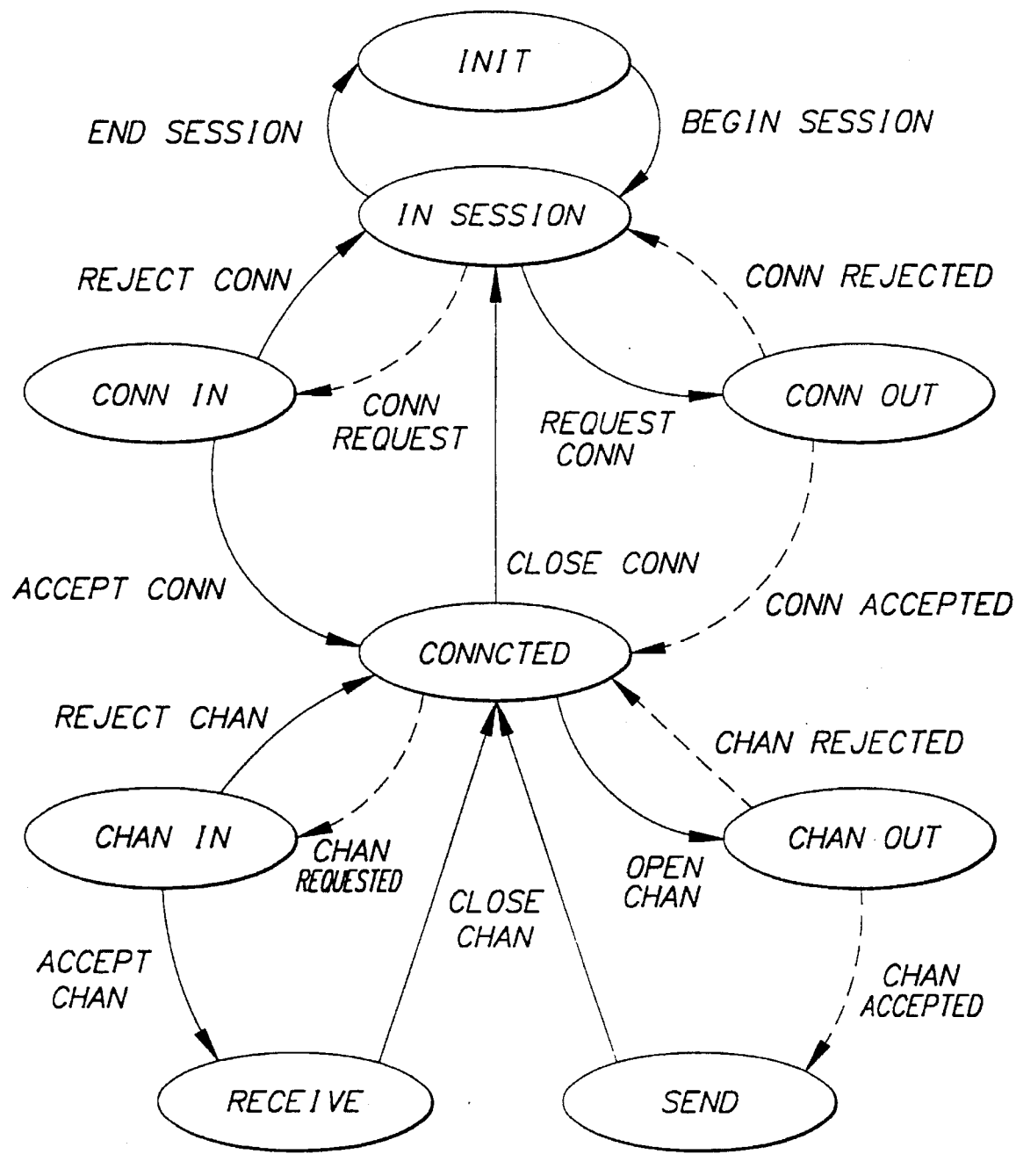
FIG. 19 is a representation of the comm subsystem application FSM for a conferencing session between a local site and a remote site.
Figure 20:
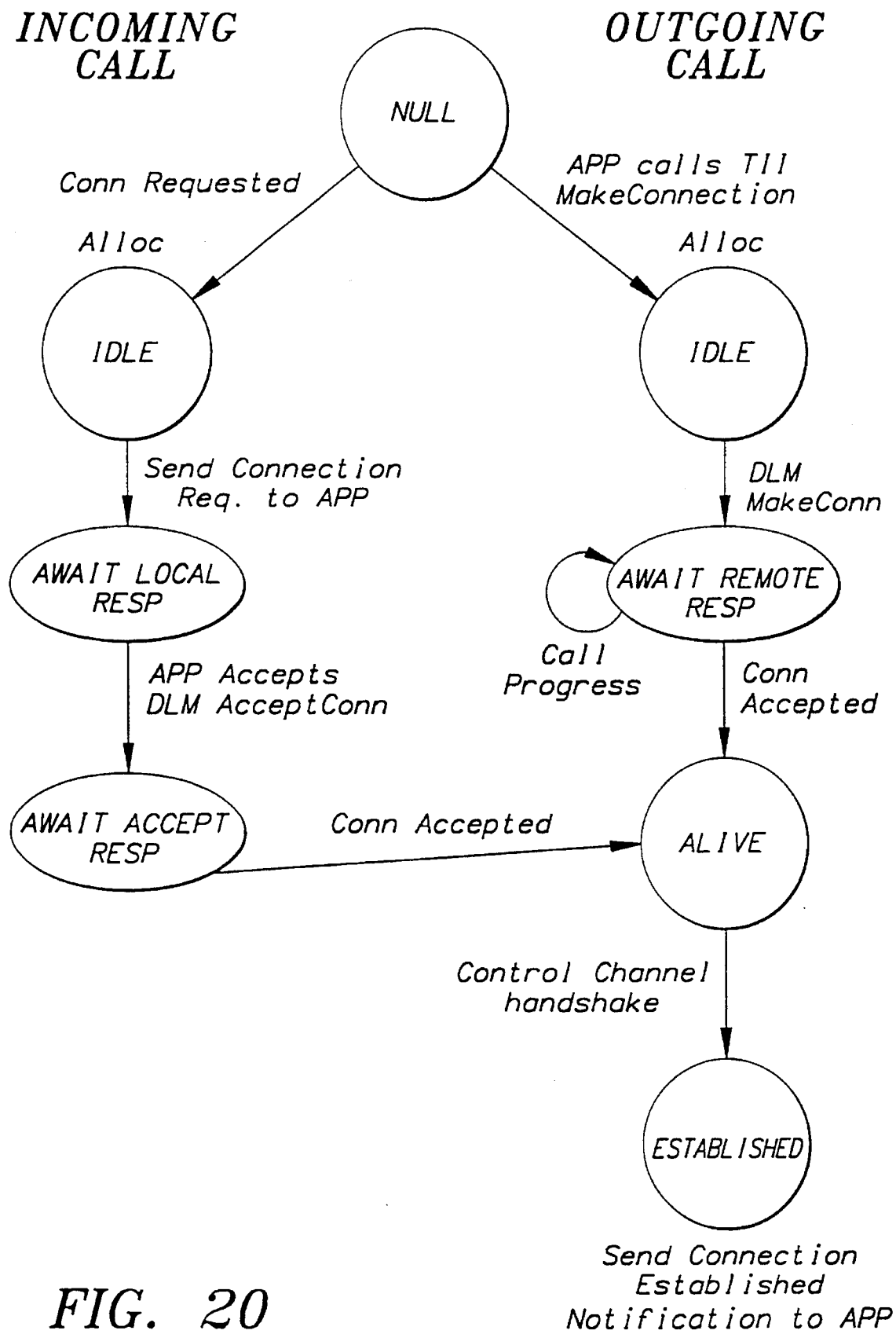
FIG. 20 is a representation of the comm subsystem connection FSM for a conferencing session between a local site and a remote site.
Figure 21:
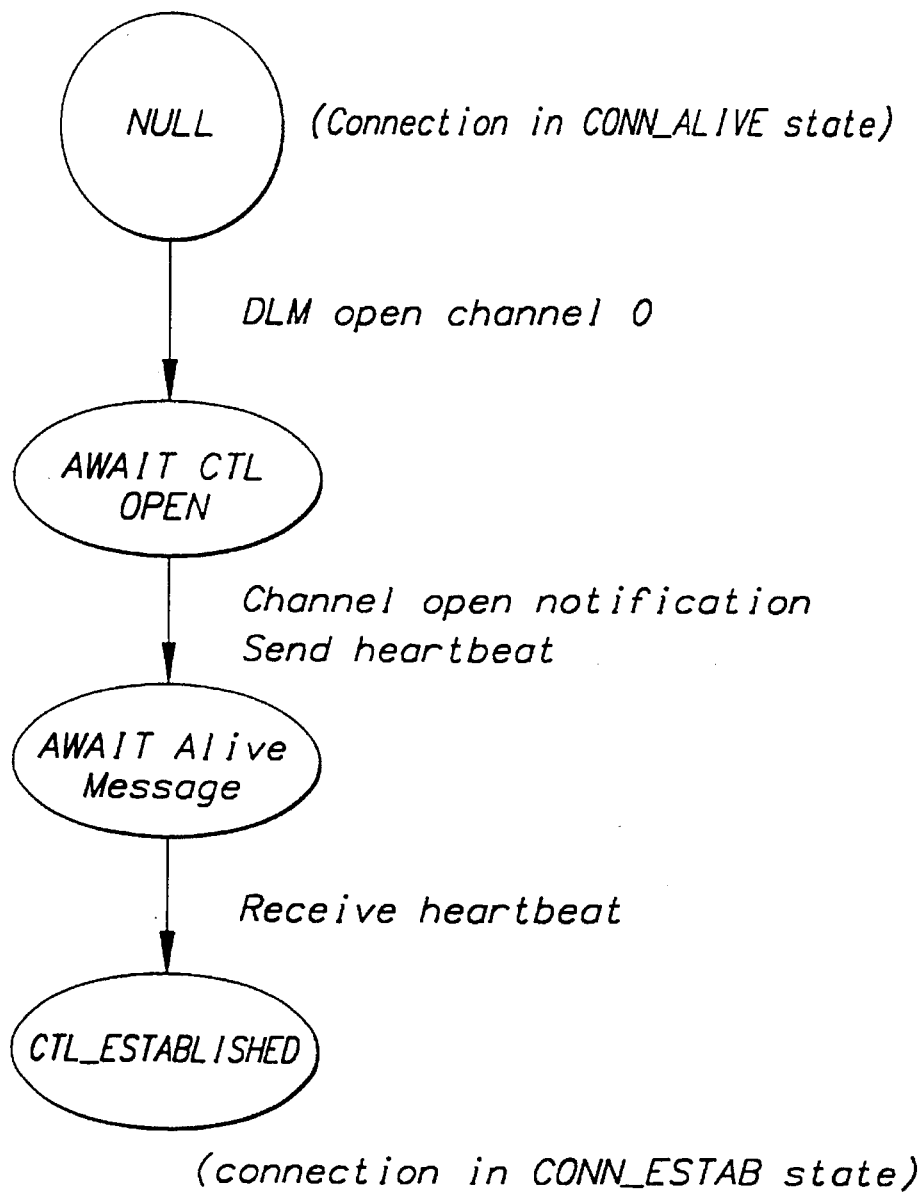
FIG. 21 is a representation of the comm subsystem control channel handshake FSM for a conferencing session between a local site and a remote site.
Figure 22:
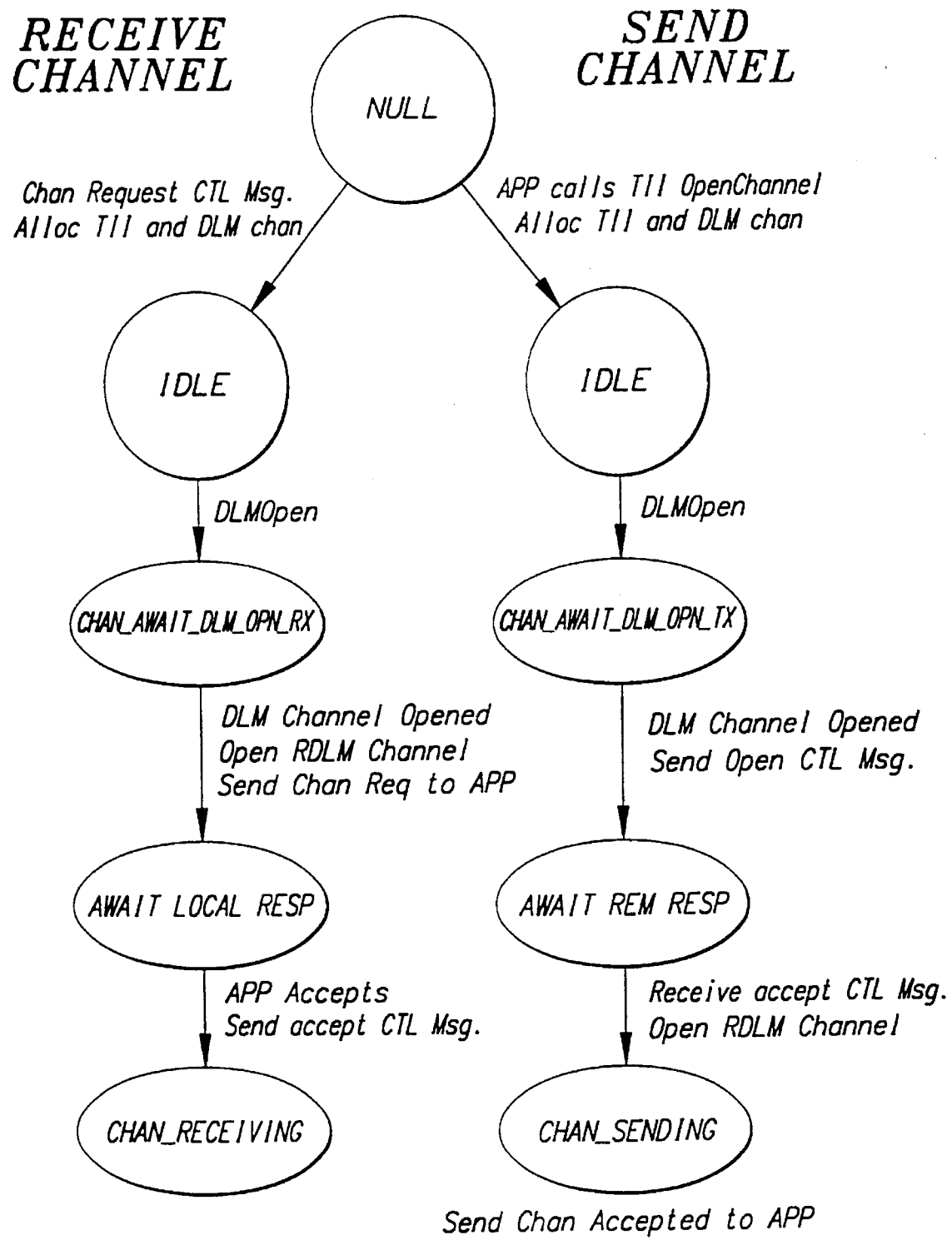
FIG. 22 is a representation of the comm subsystem channel establishment FSM for a conferencing session between a local site and a remote site.
Figure 23:
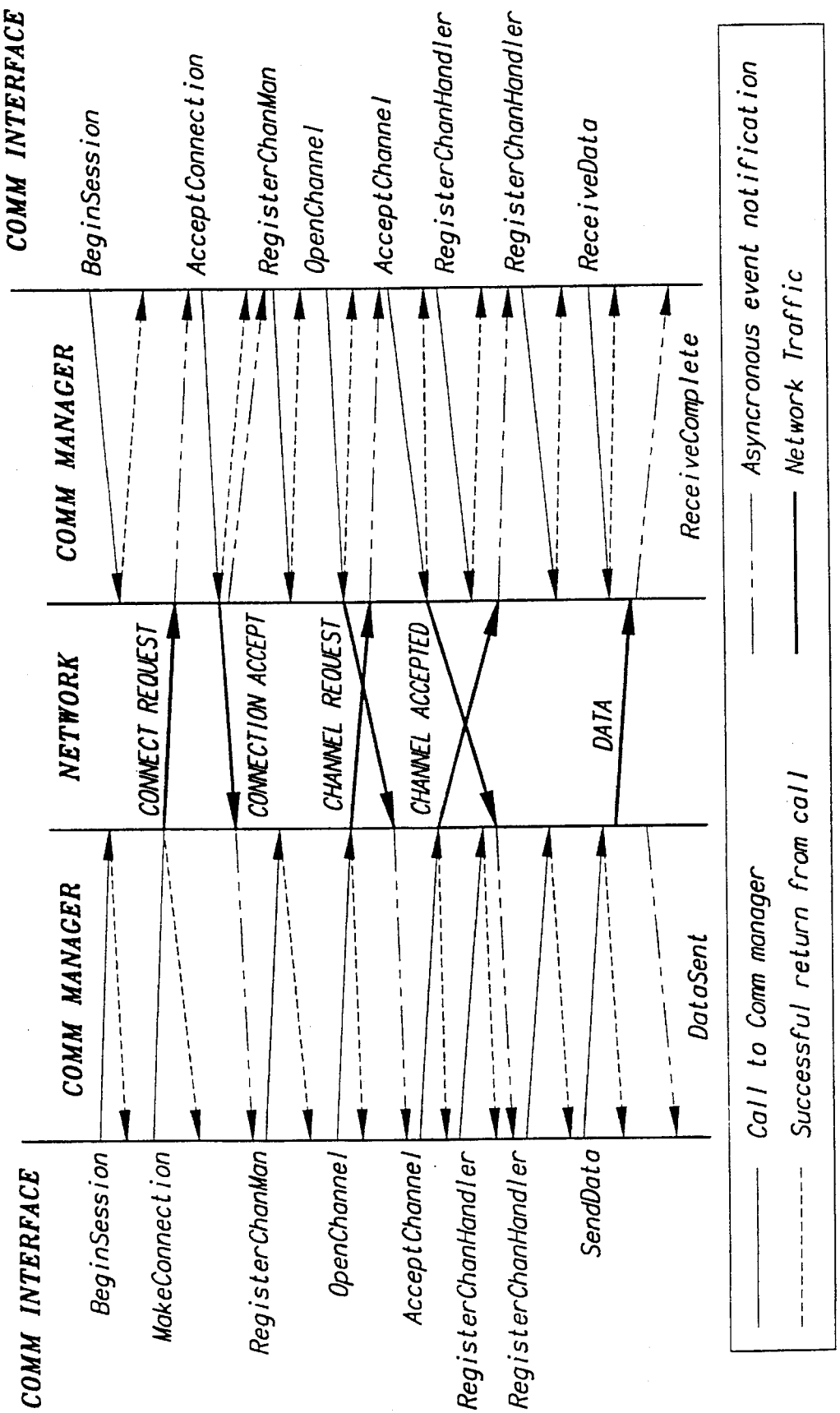
FIG. 23 is a representation of the comm subsystem processing for a typical conferencing session between a caller and a callee.

Referring now to FIG. 19, there is shown a representation of the comm subsystem application finite state machine (FSM) for a conferencing session between a local conferencing system (i.e., local site or caller) and a remote conferencing system (i.e., remote site or callee), according to a preferred embodiment of the present invention. Referring now to FIG. 20, there is shown a representation of the comm subsystem connection FSM for a conferencing session between a local site and a remote site, according to a preferred embodiment of the present invention. Referring now to FIG. 21, there is shown a representation of the comm subsystem control channel handshake FSM for a conferencing session between a local site and a remote site, according to a preferred embodiment of the present invention. Referring now to FIG. 22, there is shown a representation of the comm subsystem channel establishment FSM for a conferencing session between a local site and a remote site, according to a preferred embodiment of the present invention. Referring now to FIG. 23, there is shown a representation of the comm system processing for a typical conferencing session between a caller and a callee, according to a preferred embodiment of the present invention. The description for this section is the same as the description for the section of the same name in U.S. patent application Ser. No. 08/157,694.

Comm Manager

The description for this section is the same as the description for the section of the same name in U.S. patent application Ser. No. 08/157,694.

Data Link Manager

Figure 29A:
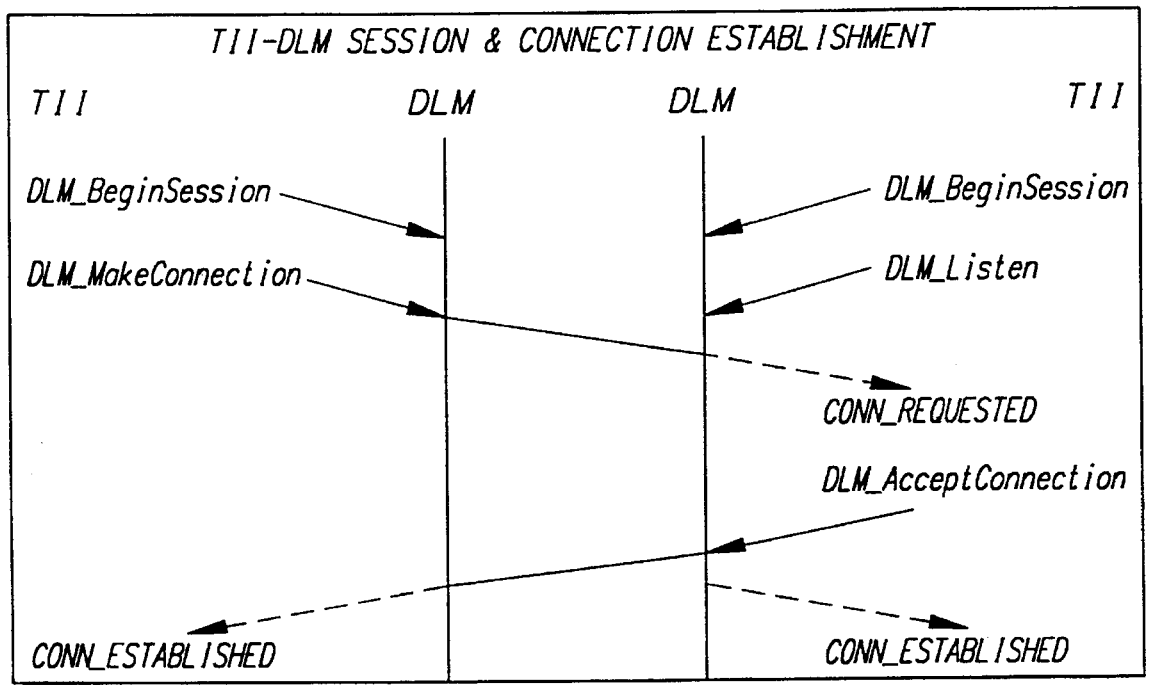
FIG. 29 are diagrams indicating typical connection setup and teardown sequences.
Figure 29B:
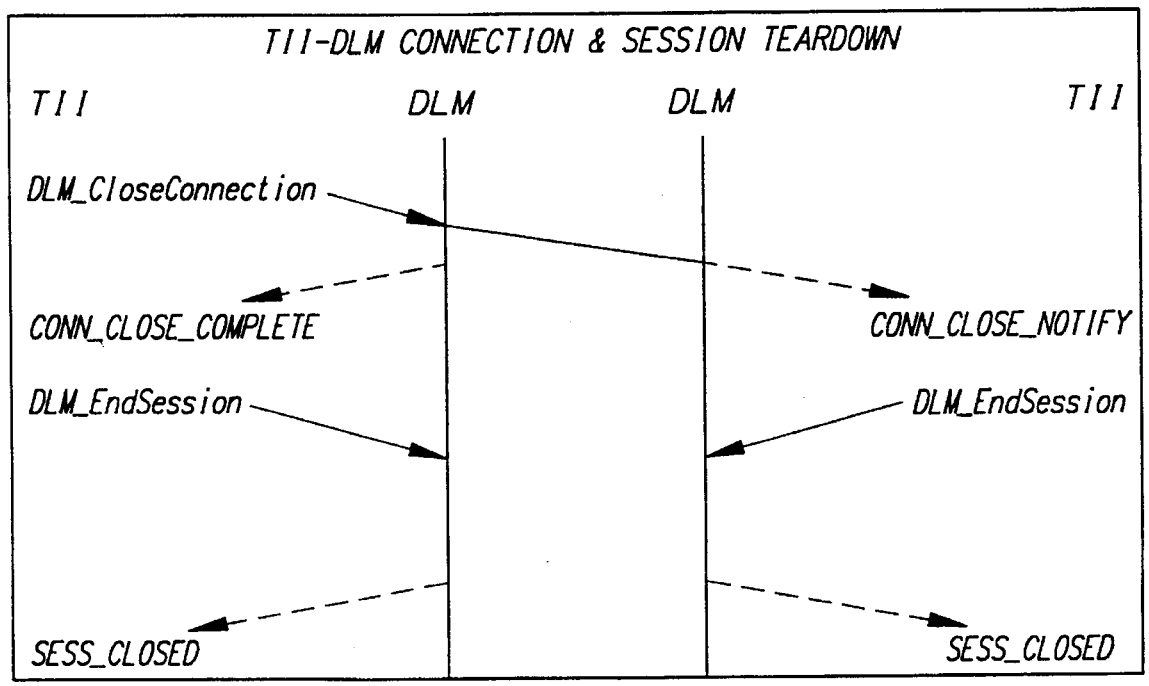

Referring now to FIG. 29, there are shown diagrams indicating typical connection setup and teardown sequences. The description for this section is the same as the description for the section of the same name in U.S. patent application Ser. No. 08/157,694. One difference is the addition of the DLM_ChangeBitRate function, which is defined as follows:

```
WORD DLLEXP DLM_ChangeBitRate(
    DWORD DlmConnId,        // Connection handle
    DWORD CallReference,    // Connection Call reference
    DWORD ReceiveBitRate,   // BITRATE_112KB or BITRATE_128KB
    DWORD TransmitBitRate)  // BITRATE_112KB or BITRATE_128KB
```

The DLM_ChangeBitRate function directs the low level comm software to change bit rate on the B channel for receiving and transmission of data.

Interfaces—Channel Management & Data Transfer

The description for this section is the same as the description for the section of the same name in U.S. patent application Ser. No. 08/157,694.

DSP Interface

The description for this section is the same as the description for the section of the same name in U.S. patent application Ser. No. 08/157,694.

Comm Task

The description for this section is the same as the description for the section of the same name in U.S. patent application Ser. No. 08/157,694.

Application-Level Protocols

The application-level protocols for conferencing system 100 of FIG. 5 are divided into those for the video, audio, and data streams.

Video Protocol

Referring now to FIG. 24, there is shown a representation of the structure of a video packet as sent to or received from the comm subsystem, according to a preferred embodiment of the present invention. Source video is video that is captured (and optionally monitored) on the local conferencing system and sent to the comm subsystem for transmission to a remote system. Sink video is video that is captured remotely, received from the comm subsystem, and played back on the local system. The video packet fields are defined as follows:

| | |
|---|---|
| Length | 16-bit word containing the length of the video frame data in octets. |
| Flag | Used to mark a video frame if it is a key (i.e., reference) frame. When key frames are transmitted in slices, each slice has this field set to indicate a key frame. A key frame is indicated by:<br>VHDR_KEYFRAME(=8): Video key frame data packet.<br>A delta frame is indicated by:<br>VHDR_DELTAFRAME(=0): Video delta frame data packet. |
| Reserved | 4 bits reserved for future expansion. |
| Type | Defines the type of the frame. Preferably set to:<br>VDATA(=1): Video data packet. |
| TimeCaptured | Set to the time, in milliseconds, between the beginning of the capture session and the current frame. In a preferred embodiment, this field is used to carry a time stamp used to synchronize audio and video frames at the receiving node. |
| PktNumber | A packet sequence number, which is a monotonically increasing, unsigned integer, beginning with a value of 0 for the first frame captured in the capture session. |
| FrameData | The compressed video data which may represent either a key frame or a delta frame. This field is only present if the packet type is VDATA. |

A video data frame containing compressed video generated with the Intel® Indeo C™ compression algorithm preferably does not exceed 8192 octets in length. For this reason, key frames at the (320×240) resolution may be transmitted in slices.

A conferencing node may request a key frame from a remote note by sending the Video Request Key Frame control message through the video control channel (i.e., a virtual circuit). This control message is defined as follows:

| Length (Bits) | Field |
|---|---|
| 28 bits | Reserved |
| 4 bits | Type |
| 8 octets | Reserved |

Type defines the type of the frame and is preferably set to:

VCNTL(=2): Video control packet.

The Reserved fields are all reserved for future extension and are preferably all zero.

Compressed Video Bitstream

Referring now to FIG. 25, there is shown a representation of the compressed video bitstream for conferencing system 100, according to a preferred embodiment of the present invention. The description for this section is the same as the description for the section of the same name in U.S. patent application Ser. No. 08/157,694.

Video Decoding Procedure

The description for this section is the same as the description for the section of the same name in U.S. patent application Ser. No. 08/157,694.

Intra/Inter Decision Rules

The description for this section is the same as the description for the section of the same name in U.S. patent application Ser. No. 08/157,694.

Post Reconstruction Loop Filtering

The description for this section is the same as the description for the section of the same name in U.S. patent application Ser. No. 08/157,694.

Adaptive Loop Filter Switching Criteria

The description for this section is the same as the description for the section of the same name in U.S. patent application Ser. No. 08/157,694.

Design of Quantization Tables

The description for this section is the same as the description for the section of the same name in U.S. patent application Ser. No. 08/157,694.

Adaptive Transform Coefficient Scanning

The description for this section is the same as the description for the section of the same name in U.S. patent application Ser. No. 08/157,694.

Spatially Adaptive Quantization

The description for this section is the same as the description for the section of the same name in U.S. patent application Ser. No. 08/157,694.

Fast Statistical Decode

The description for this section is the same as the description for the section of the same name in U.S. patent application Ser. No. 08/157,694.

Contrast, Brightness, and Saturation Controls

The description for this section is the same as the description for the section of the same name in U.S. patent application Ser. No. 08/157,694.

Audio Protocol

Referring now to FIG. 26, there is shown a representation of a compressed audio packet for conferencing system 100, according to a preferred embodiment of the present invention. Source audio is audio that is captured (and optionally monitored) at the local system and sent to the comm subsystem for transmission. Sink audio is audio that is received from the comm subsystem for playback on the local system. Audio is preferably handled on audio/comm board 206 and not on host processor 202. The compressed audio packet of FIG. 26 is that which is actually sent/received from the communications subsystem and not necessarily that manipulated by an application on the host processor. The audio packet fields are defined as follows:

| | |
|---|---|
| Timestamp | 30-bit value used to synchronize audio and video frames at the receive endpoint. The audio stream preferably generates timestamps as a master clock that are copied to the captured video frames before transmission. |

| | |
|---|---|
| Mute | Bit indicates whether or not the audio stream is muted or not. The audio is muted when the bit is set. When the Mute bit is set, no audio data is sent. |
| Extension | Extension bit (preferably 0). |
| Data | Compressed audio data. |

The length of the audio data is not explicitly specified in the packet header. A receiving endpoint's comm subsystem reassembles an audio packet and therefore implicitly knows the length and can report it to its application. The length of an audio packet is a run-time parameter and depends on the compression method and the amount of latency desired in the system. The preferred audio compression/decompression method implementation has 100-millisecond latency, which translates to 180 bytes of compressed audio data per packet.

Compressed Audio Bitstream

The preferred audio stream for conferencing system 100 is a modification of the European Groupe Speciale Mobile (GSM). GSM was developed in the context of the standardization of the European digital mobile radio. It resulted from the combination of the Regular-Pulse Excitation/Linear-Predictive-Coding codec developed by Philips (Germany) with the Multi-Pulse-Excitation/Linear-Predictive-Coding codec devised by IBM (France). For further information, see the ETSI-GSM Technical Specification, GSM 06.10, version 3.2.0, UDC 621.396.21, published by the European Telecommunication Standards Institute in Valbonne Cedex, France.

The data rate of the standard GSM codec is 13.0 kbits/sec. The preferred GSM implementation for conferencing system 100 has a bit rate of 16 kbits/sec. The mean opinion score (MOS) quality rating of the preferred GSM implementation is 3.54. It is not prone to rapid quality degradation in the presence of noise. The relative complexity is about 2 MOPSs/s. Due to implementation processing considerations, the standard GSM implementation is adjusted to yield the preferred GSM implementation. In addition, headers are added to provide extra control information, such as frame counting and muting.

In order to save processing, the 260-bit audio frame is not packed. This results in a 320-bit frames. These frames occur every 20 milliseconds. This increases the bit rate from 13 kbits/sec to 16 kbits/sec. The composition of the preferred audio frame is as follows:

```
typedef struct    {unsigned int lar1: 6;   /* stp parameters */
                   unsigned int lar2: 6;
                   unsigned int lar3: 5;
                   unsigned int lar4: 5;
                   unsigned int lar5: 4;
                   unsigned int lar6: 4;
                   unsigned int lar7: 3;
                   unsigned int lar8: 3;  } STP;
typedef struct    {unsigned int lag 7;
                   unsigned int gain 2;   /* ltp parameters */
                   unsigned int grid 2;   /* rpe parameters */
                   unsigned int xmax 6;
                   unsigned int x0 3;     /* pulse amplitude */
                   unsigned int x1 3;
                   unsigned int x2 3;
                   unsigned int x3 3;
                   unsigned int x4 3;
                   unsigned int x5 3;
                   unsigned int x6 3;
                   unsigned int x7 3;
                   unsigned int x8 3;
                   unsigned int x9 3;
                   unsigned int x10 3;
                   unsigned int x11 3;
                   unsigned int x12 3;  } LTP_RPE
typedef struct    {STP              frame;
                   LTP_RPE          subframe(4); } GBMBITS;
```

The result of not packing these structures on a Texas Instruments® C31 DSP, a 32-bit processor, is a 320-bit frame. At a frame rate of 50 frames/sec, the data rate is 16.0 kbits/sec.

A header has also been added to groups of frames. The length of the header is one 32-bit word. The MSB is an extension bit reserved for future extension. Bit 30 is a mute flag (1=mute). The remaining bits represent a timestamp. This time stamp is not actually time, but is preferably a frame counter. The initial value of it is arbitrary. It is therefore a relative number representing the progress of audio frames and useable for synchronization.

Data Protocol

Data packets are inside TII packets. The data conferencing application will have its own protocol inside the TII protocol stack. Data conferencing application 504 is described in greater detail in U.S. patent application Ser. No. 08/137,319 (filed Oct. 14, 1993) and in U.S. patent application Ser. No. 08/170,146 (filed Dec. 20, 1993).

Communication-Level Protocols

The description for this section is the same as the description for the section of the same name in U.S. patent application Ser. No. 08/157,694.

Reliable Transport Comm Protocols

Referring now to FIG. 27, there is shown a representation of the reliable transport comm packet structure, according to a preferred embodiment of the present invention. The description for this section is the same as the description for the section of the same name in U.S. patent application Ser. No. 08/157,694.

Unreliable Transport Comm Protocols

At the lowest layer of conferencing system 100, an unreliable protocol is preferably used to transport data on the ISDN B-channels. For those applications requiring reliability, the reliable protocol discussed in the previous section is added on top of the unreliable protocol discussed in this section. The unreliable protocol sits atop of HDLC framing which the unreliable protocol uses for actual node-to-node transport of packets. Even though HDLC framing is used, a data link protocol is not implemented. In particular, there is no guarantee that data packets will be delivered or that they will be uncorrupted at the receive node of a link. The CRC validation of the HDLC is used to detect corrupted data.

The unreliable protocol provides for logical channels and virtualization of the two Basic Rate ISDN B-channels. Logical channels are local site entities that are defined between the DLM and TII is layer and the client (i.e., application program) using them. The logical channels provide the primary mechanism clients use to send multiple data types (e.g., audio, video, data). The layer services multiplex these data types together for transmission to the remote sites.

In a preferred embodiment, logical channel zero is used as a control channel. Site peers (i.e., two conferencing systems in a conferencing session) use this control channel to exchange information on their use of other logical channels. Logical channels are half-duplex. Therefore, two channels are necessary to send and receive data. A priority attribute is associated with a logical channel (and therefore with a data type). The unreliable protocol asserts that higher priority data will always be sent ahead of lower priority data when both are pending. Priorities are assigned by an API call to the TII services. Audio has the highest priority, then data, and last video.

Although the ISDN Basic Rate Interface (BRI) defines two physical 64 kbit/second B-channels for data, the services at both DLM and TII virtualize the separate B-channels as a single 128 kbit/second channel. Client data types, defined by their logical channels, are multiplexed into a single virtual stream on this channel. In a preferred embodiment, this inverse multiplexing is accomplished by breaking all packets into an even number of fragments and alternating transmission on the two physical B-channel connections. Initially, after channel establishment, the first fragment is sent on the B1-channel, the second on the B2-channel, etc. At the receiving site, fragments are collected for reassembly of the packet.

Referring now to FIG. 28, there is shown a representation of the unreliable transport comm packet structure, according to a preferred embodiment of the present invention. The fields of the preferred unreliable transport comm packet are defined as follows:

system. The following steps show the sequence of how the connection and different channels are set up in a typical conference.

(1) Caller makes an ISDN call to the remote conference node.
(2) Callee rejects or accepts the call. If callee rejects the call, then processing terminates; otherwise, processing continues to next step.
(3) Caller opens a reliable control channel of type CFI_CTRL_TYPE(=0).
(4) Callee accepts the control channel request.
(5) Callee opens a reliable control channel of type CFI_CTRL_TYPE(=0).
(6) Caller accepts the control channel request.
(7) Conference login is implemented.
(8) Capability negotiation is started.
(9) Capability negotiation is completed with agreement as to audio, video, and data conferencing capabilities.
(10) Caller opens audio channel of type CFI_AUD_TYPE(=1).
(11) Callee accepts audio channel request.
(12) Caller opens video channel of type CFI_VID_TYPE(=2).
(13) Callee accepts video channel request.
(14) Caller opens reliable video key frame control channel of type CFI_VIDKEY_TYPE (=3).
(15) Callee accepts video key frame channel request.
(16) Callee opens an audio channel of type CFI_AUD_TYPE(=1).
(17) Caller accepts audio channel request.
(18) Callee opens video channel of type CFI_VID_TYPE(=2).
(19) Caller accepts video channel request.
(20) Callee opens reliable video key frame control channel of

| | |
|---|---|
| Flag | Standard HDLC Flag field. |
| iLINK | Link layer header specific to network. Most significant bit (MSB) = 1; next most significant bit (NMSB) = 0. The low octet of the 16-bit iLINK field is equal to the QMUX sequence number. |
| iSEQ | Multilink layer for joining multiple links (e.g., channels B1 and B2 in an ISDN call). MSB = 1; NMSB = 0. The low octet of the 16-bit iSEQ field is null. |
| iMULTI | Multipoint addressing and routing of data streams. If iSEQ == QMUX, then the high octet of the 16-bit iMULTI field the receiver logical channel number (LC#) and the low octet is the sender LC#. |
| iSTX | Virtual circuit addressing. If iSEQ == QMUX, then the high octet of the 16-bit iSTX field == start of message (SoM) / end of message (EoM) and the low octet is the message number (lower six bits). |
| Data | The data field. |
| CRC | Standard HDLC CRC field. |
| Flag | Standard HDLC Flag field. |

Feature and Capability Negotiation
Conferencing Management

This section describes the messages and protocols for conferencing management functions. During the initiation of a conference call, the conference manager 544 of FIG. 5 establishes a connection with its peer at the remote conference node utilizing the underlying communication mechanism (shown as TII 510 in FIG. 5). The conference manager 544 will then open a pair of reliable control channels (one incoming and one outgoing channel) with its peer to carry out conferencing management functions. These conferencing management function include conference login, capability negotiation, unreliable audio/video channels and subsystems setup, reliable video key frame control channels setup, and participant information exchange.

Connection Management
Connection and Channel Setup

The conference manager 544 makes an ISDN call to its peer on a remote conference node. The conference manager 544 then sets up two one-way reliable control channels (one outgoing and one incoming channel) by accessing the communication services provided by the communication sub- -continued type CFI_VIDKEY_TYPE (=3).
(21) Caller accepts video key frame channel request.
(22) Participant information exchange is implemented.

Connection Shutdown and Error Handling

The connection between two conference nodes can be shutdown using the normal call hang-up process at any time. The typical process to shutdown the connection involves:

Terminating the conference (initiated by either conference node).

Leaving the conference (initiated by the conference node that leaves the conference).

Errors (initiated by either or both conference nodes of the connection, when an unrecoverable error is encountered at any time).

The correct sequence to shut down a connection is to free up all local resources, close all channels, and then hang up the call. However, every conference node is expected to clean up local resources and recover from errors whenever a call hang-up request is received from the remote node or initiated by the local node. Among errors that would result in a hang-up is a time-out imposed by the conferencing application on the period required to complete connection and channel setup.

Conference Login

After the physical call connection and logical reliable control channels are established, the conference manager 544 of the caller will start the conference login process (step #7 above). Conference login, which is implemented after the connection and control channels have been established, involves the following steps:

(a) Caller sends a login request message, identifying the caller node type and (optionally) the caller user name.

(b) If the login request is accepted, then callee sends a positive login response, identifying the callee node type and (optionally) the callee user name. If the login request is rejected, then callee sends a negative login response, identifying the reason for the rejection.

After successful conference login, the conference nodes are ready for capability negotiation. The format for the login request message is as follows:

| Field | Data Type | Description |
| --- | --- | --- |
| Message Number | 16-bit integer | 100 |
| Node Type | 16-bit integer | 2 |
| NameLength | 16-bit integer | Length of name (0 => no name is provided) |
| Name | 256 characters (maximum length) | User name |
| Reserved | 40 characters | Reserved for future extension |

The format for the login positive response message is as follows:

| Field | Data Type | Description |
| --- | --- | --- |
| Message Number | 16-bit integer | 101 |
| Node Type | 16-bit integer | 2 |
| NameLength | 16-bit integer | Length of name (0 => no name is provided) |
| Name | 256 characters (maximum length) | User name |

The format for the login negative response message is as follows:

| Field | Data Type | Description |
| --- | --- | --- |
| Message Number | 16-bit integer | 102 |
| Reason | 16-bit integer | 0 => unspecified<br>1 => unauthorized user ID<br>2 => unsupported node type |

Capability Negotiation

Capability negotiation (step #8 above) allows two conference nodes to agree upon a set of basic capabilities and subsystem protocols to be used during a conference. Negotiation is based upon a simple message protocol initiated by the caller and terminated by the callee. Messages contain a Request/Response field followed by a Capabilities structure.

Capabilities Structure

The Capabilities structure begins with a length and personal conferencing specification (PCS) version ID fields. The remaining fields in the structure are defined by the PCS version ID. In PCS 1.0, the Capabilities structure is as follows:

| Field | Data Type | Description |
| --- | --- | --- |
| lLen | 32-bit integer | Length of this structure |
| PCSVersion | 32-bit integer | PCS version ID; 1 => Version 1.0 |
| Product | 32 characters | Vendor/product name |
| Version | 6 characters | Product version (e.g., V1.6, V2.0) |
| AudioCaps | 32-bit integer | Bit-wise-OR of supported audio capabilities<br>0×1 => no audio<br>0×2 => PCS GSM v1.0 |

-continued

| Field | Data Type | Description |
| --- | --- | --- |
| VideoCaps | 32-bit integer | Bit-wise-OR of supported video capabilities<br>0x1 => no video<br>0x2 => Intel ® Indeo C ™ v2.0 |

The audio and video capability fields are bit masks that can be set by a conferencing node to advertise all protocols and capabilities supported by the node. Alternatively, a node can set one bit in each field thereby defining the specific protocols the node wants to use during the conference. The Capabilities structure is defined to contain a unique set if only one bit is set in each of the capability fields. Bits in the AudioCaps and VideoCaps fields represent bit stream protocols supported by the node's audio and video subsystems, respectively. For example, AudioCaps bit 0x2 maps to the audio bit stream GSM protocol defined in Appendix B of PCS. VideoCaps bit 0x2 represents the Intel® Indeo C™ v2.0 bit stream defined in Appendix C of PCS with (160× 120) base resolution, a maximum of 10 frames per second, and 84 kbps data rate.

Requests and Responses

The Request/Response field that prefixes the Capabilities structure is a 16-bit integer. The following requests and responses are preferably supported in capability negotiation.

CallerCapRequest

The caller sends the CallerCapRequest message to begin capability negotiation. The caller's Capabilities structure is set up to identify either (1) all capabilities and protocols supported by the conferencing node or (2) the unique set of capabilities the node wants to use for the conference. If the structure is unique, the caller expects the callee to accept or reject the unique configuration via the CalleeCapAccept or CalleeCapReject responses, respectively. Otherwise, when the set is not unique, the caller expects the callee to return a subset (possibly unique) of these capabilities via CalleeCapResponse. The CallerCapRequest/CalleeCapResponse process continues until a unique set of capabilities is chosen by a node. The negotiation terminates when the callee acknowledges this set via the CalleeCapAccept response. The format for the CallerCapRequest message is as follows:

| Field | Data Type | Description |
| --- | --- | --- |
| Message Number | 16-bit integer | 500 |
| Capabilities | Structure | See Capabilities structure defined above. |

CallerCapCancel

If an error in the protocol is detected, the caller sends the CallerCapCancel message to terminate the negotiation The callee does not respond to this request. The caller can send this message in response to a CalleeCapAccept message received with unexpected capabilities. The format for the CallerCapCancel message is as follows:

| Field | Data Type | Description |
| --- | --- | --- |
| Message Number | 16-bit integer | 501 |
| Capabilities | Structure | See Capabilities structure defined above. |

CalleeCapAccept

The callee sends the CalleeCapAccept message to accept the caller's proposed or negotiated unique conference capability configuration thereby terminating the capability negotiation process. The format for the CalleeCapAccept message is as follows:

| Field | Data Type | Description |
| --- | --- | --- |
| Message Number | 16-bit integer | 502 |
| Capabilities | Structure | See Capabilities structure defined above. |

CalleeCapReject

The callee sends the CalleeCapReject message to reject the caller's unique conference capability configuration. This terminates the capabilities negotiation process. The callee returns in the message its capabilities thereby allowing the caller to note incompatibilities. In addition, the callee can use this message to terminate the negotiation if an error in the protocol is detected.

| Field | Data Type | Description |
| --- | --- | --- |
| Message Number | 16-bit integer | 503 |
| Capabilities | Structure | See Capabilities structure defined above. |

CalleeCapResponse

The callee sends the CalleeCapResponse to return to the caller a subset derived from among the alternative capabilities presented by the previous CallerCapRequest message. If a unique set is returned, the caller is expected to acknowledge this selection with a CallerCapRequest message. Otherwise, the request/response process will repeat until a unique set of capabilities is chosen by a node. When a unique set is finally received from the caller, the CalleeCapAccept message will be returned by the callee thereby terminating the negotiation.

| Field | Data Type | Description |
| --- | --- | --- |
| Message Number | 16-bit integer | 504 |
| Capabilities | Structure | See Capabilities structure defined above. |

The following list of steps illustrates the use of these messages in a first possible scenario for capabilities negotiation:

(1) Caller begins negotiation by sending a CallerCapRequest message with a unique set of capabilities.

(2) Callee responds by sending either (1) a CalleeCapAccept message with an acknowledgment of the accepted unique set of capabilities or (2) a CalleeCapReject message identifying the callee's capabilities. In either case, negotiation is now complete.

The following list of steps illustrates the use of these messages in a second possible scenario for capabilities negotiation:

(1) Caller begins negotiation by sending a CallerCapRequest message with a non-unique set of capabilities.

(2) Callee responds by sending a CalleeCapReject message identifying the callee's capabilities. Negotiation is now complete.

The following list of steps illustrates the use of these messages in a third possible scenario for capabilities negotiation:

(1) Caller begins negotiation by sending a CallerCapRequest message with a non-unique set of capabilities.
(2) Callee responds by sending a CalleeCapResponse message identifying a subset of the caller's capabilities.
(3) Caller sends a CallerCapRequest message identifying a subset of the capabilities identified by callee in step (2).
(4) Callee responds by sending a CalleeCapResponse message identifying a subset of the capabilities identified by caller in step (3).
(5) Caller sends a CallerCapRequest message identifying a unique set of capabilities which is also a subset of the capabilities identified by callee in step (4).
(6) Callee responds by sending a CalleeCapAccept message with an acknowledgment of the accepted unique set of capabilities. Negotiation is now complete.

Inclusion of the product name and version fields in the Capabilities structure allows for two nodes to recognize each other as peers after the first request and response. In such cases, the nodes could optionally continue negotiation using their own custom protocol. Adding support for new audio or video protocols or data capabilities is as simple as defining new bits in the AudioCaps and VideoCaps fields. Extending the bit definitions does not require a revision of the protocol.

Participant Information Exchange

Once a conference has been established, the caller sends a Conference Participation Information (CPI) message to the callee. Upon receiving the caller's CPI, the callee responds by sending its own CPI back to the caller. This message exchange occurs across the TII control channel. The structure of the CPI message is as follows:

| Field | Data Type | Description |
| --- | --- | --- |
| User Id | 16-bit | Unique user Id in a conference |
| Title | 10 chars | Mr., Ms., Mrs., Dr., etc. |
| Last Name | 64 characters | User's last name |
| First Name | 64 characters | User's first name |
| Job position | 64 characters | e.g., President, Manager, Engineer |
| Company Name | 64 characters | User's company name |
| Street | 80 characters | Street name |
| City | 32 characters | City name |
| State/Province | 32 characters | State or province name |
| Postal Code | 32 characters | Zip code or postal code |
| Country | 32 characters | Country name |
| Email | 64 characters | Email address |
| Telephone #1 | 32 characters | Office phone number |
| Telephone #2 | 32 characters | Office phone number |
| Fax # | 32 characters | Fax number |

Conference Participation Messages

The caller sends the ConferenceAnnouncePresence message to the callee to announce the presence of the conference. The callee responds by returning the same message containing its own CPI. The User ID field in the CPI structure is undefined in the point-to-point conference case. The structure of the ConferenceAnnouncePresence message is as follows:

| Field | Data Type | Description |
| --- | --- | --- |
| Message Number | 16-bit integer | 600 |
| CPI | Structure | See CPI structure defined above. |

Flow Control Over Reliable Channels

When conferencing signals are transmitted over reliable channels from a conferencing system A to a conferencing system B of FIG. 1 during a conferencing session, conferencing system B transmits an acknowledgment message to notify conferencing system A of the receipt of each signal packet. The acknowledgment message informs conferencing system A that the signal packet it previously sent was received by conferencing system B. Conferencing system A may also use the acknowledgment message as authorization to send additional signal packets to conferencing system B.

If conferencing system B sends acknowledgment messages as soon as it receives signal packets, but before it has had a chance to process those signal packets, then conferencing system B runs the risk of being inundated with subsequent signal packets that it may not be able to handle. If conferencing system B drops one or more signal packets, then conferencing system A will have to retransmit those signal packets. To help alleviate this problem, in a preferred embodiment of the present invention, conferencing system B does not send acknowledgment messages until it knows it can handle the subsequent signal packets that may be sent by conferencing system A in response to the acknowledgment messages.

Referring now to FIG. 36, there is shown a flow diagram of the processing of conferencing systems A and B of FIG. 1 to control the flow of signals over reliable channels, according to a preferred embodiment of the present invention. As shown in FIG. 36, conferencing system A transmits signal packets to conferencing system B over the reliable channels (step 3602) and conferencing system B subsequently receives those signal packets from conferencing system A (step 3604). Rather than sending the acknowledgment messages for the received signal packets right away, conferencing system B begins to process the received signal packets (step 3606). Conferencing system B sends the acknowledgment messages to conferencing system A as the received signal packets are processed (step 3608). Conferencing system A receives the acknowledgment messages from conferencing system B (step 3610) and uses those acknowledgment messages as authorization to send additional signal packets and repeat the processing of steps 3602 to 3610.

By delaying the transmission of the acknowledgment messages until the signal packets are processed, conferencing system B reduces the chances that it will not be able to handle the additional signal packets that may be sent by conferencing system A in response to the acknowledgment messages.

Preemptive Priority-Based Transmission

Conferencing system 100 of FIG. 1 is able to transmit different types of signals during a conferencing session with a remote conferencing system. For example, a conferencing session using both audio/video conferencing application 502 and data conferencing application 504 involves the transmission of audio signals, video signals, and data signals. In addition, the following different types of control signals may be transmitted:

TII control A signals—used by TII 510 for rate negotiation.

TII control B signals—used by TII 510 to establish other channels.

User interface control signals—used by conference manager 544 to exchange information about current status of conferencing applications.

VCI control signals—used by VCI 506 to exchange identification information about users.

Video control signals—used to ask for key frames.

Although these different signals are transmitted through different virtual channels, they are all preferably transmitted over the same physical connection (e.g., the same IDSN line).

In order to provide high quality audio conferencing, it is important to have a steady flow of audio signals between the conferencing systems. If the flow of audio signals is not steady enough, then the playback of audio signals may be interrupted causing the quality of the audio playback to be adversely affected. The audio subsystem of conferencing system 100 is designed to generate packets of compressed audio signals at a rate sufficient to provide high quality audio playback.

Since audio channels share the same connection with video channels (as well as channels for other types of signals), special handling is preferably performed to avoid the unnecessary interruption of the flow of audio signals over the connection. If signals were transmitted in the order in which they were generated, then the quality of at least the audio portion of the conferencing session may be adversely affected. For example, conferencing system 100 generates audio packets more frequently than video packets and the video packets are typically larger than the audio packets. If the transmission of a relatively large video packet were allowed to complete before any subsequently generated audio packets were transmitted, then the delay in transmitting the audio packets may adversely affect the quality of the audio playback.

To reduce the chances of such adverse affects to conference quality, in a preferred embodiment of the present invention, each different type of signal is assigned a priority level and the order of transmitting those signals is based on the relative priority levels.

Referring now to FIG. 37, there is shown a flow diagram of the preemptive priority-based transmission processing implemented by the communications subsystem of conferencing system 100 of FIG. 1, according to a preferred embodiment of the present invention. FIG. 37 demonstrates the transmission processing for two types of signals, where the first type of signals has a higher priority than the second type of signals. The processing shown in FIG. 37 begins when the comm subsystem receives one or more packets of the second type of signals (step 3702). If those packets are too large to be transmitted over the connection intact, then the comm subsystem breaks the packets into smaller fragments for transmission and begins to transmit the fragments over the connection to the remote conferencing system (step 3704).

In the processing of FIG. 37, it is assumed that the comm subsystem receives one or more packets of the first type of signals before the transmission of all of the fragments of the second type of signals is complete (step 3706). In response, since the priority of the first type of signals is higher than the priority of the second type of signals, the comm subsystem interrupts the transmission of the packets of the second type of signals, breaks the packets of the first type of signals into fragments (if necessary), and transmits all of the packets of the first type of signals (step 3708). After the transmission of the packets of the first type of signals is complete, the comm subsystem resumes the transmission of the packets of the second type of signals (step 3710).

In a preferred embodiment, where a packet of the second type of signals is broken into two or more fragments, the comm system may interrupt the transmission of the packet between fragments. For example, if a video packet is broken into 8 fragments and an audio packet becomes available for transmission after 3 of the 8 video fragments have been transmitted, then the comm subsystem preferably transmits all of the fragments of the audio packet before resuming the transmission of the video fragments with the fourth video fragment.

Those skilled in the art will understand that the processing of FIG. 37 can be extended to three or more types of signals were the different types of signals have different levels of priority. In a preferred embodiment, the different types of signals have the following priority levels assigned to them, where higher priority levels imply higher priority for transmission:

| | | |
|---|---|---|
| o | Audio signals: | Priority level 15 |
| o | TII control A signals: | Priority level 14 |
| o | TII control B signals: | Priority level 14 |
| o | User interface control signals: | Priority level 14 |
| o | VCI control signals: | Priority level 13 |
| o | Data signals: | Priority level 12 |
| o | Video control signals: | Priority level 12 |
| o | Video signals: | Priority level 10 |

If two different types of signals have the same priority level, then the relative order for transmission of those signals is the order in which they are generated.

It will also be understood that the preemptive priority-based transmission of signals according to the present invention eliminates the need for bandwidth reservation for different types of signals. It will be further understood that the worst-case latency for conference system 100 may be controlled by adjusting the size of the fragments into which the signal packets are broken.

Rate Negotiation

Some telecommunications switches may deliver a 64 kilobit per second (KBPS) data call as 56 KBPS without notifying the calling node. The calling node assumes that a clear 64 KBPS channel connection has been made, but the called node has a 56 KBPS connection. This data rate mismatch prevents any HDLC data exchange on the B channels.

According to a preferred embodiment of the present invention, both nodes (i.e., the calling node and the called node) initially configure their B channels at 56 KBPS. This is done even if the switch presents a 64 KBPS clear channel to the calling node. The product identification packet is exchanged between the two nodes at 56 KBPS. One octet within the product identification packet indicates the call rate. For the calling node, this octet indicates the rate at which the call was placed. For the called node, the octet is the rate at which the call was presented. By the time the exchange of product identification packets is complete, both nodes know what each other considers to be the call rate.

If either party believes that the call rate is 56 KBPS, then no rate negotiation takes place. Since the product identification packets are exchanged at 56 KBPS, and since one or both nodes believes that the call rate is 56 KBPS, then no rate negotiation is needed. The remainder of the call remains at 56 KBPS.

If, however, at the end of the exchange of the product identification packets, both nodes believe that the call is at 64 KBPS, then rate negotiation begins. B channel rate negotiation occurs in-band starting at 56 KBPS. A four-way message handshake ensures that both sides may upgrade their B channels and successfully communicate at 64 KBPS.

The rate negotiation preferably begins immediately after the product identification packets have been exchanged at 56 KBPS. Negotiation messages are sent as QMUX messages on channel 15, which is the same channel used for the product identification packets. These messages are exchanged only if both sides believe that 64 KBPS data exchange is possible.

The upgrade to 64 KBPS data exchange preferably occurs via a four-way message handshake as follows:

(1) The called node upgrades its B channel receiver to 64 KBPS. Both nodes begin transmitting a stream of Rate_Request(rate1) messages at 56 KBPS. The streams consist of messages sent at an interval of 200 milliseconds.

(2) When the calling node receives a Rate_Request message, it upgrades its B channel transmitter and receiver to 64 KBPS. The calling node stops its stream of Rate_Request messages at 56 KBPS and begins transmitting a Rate_Response(rate2) message stream at 64 KBPS.

(3) Upon receiving a Rate_Response message, the called node upgrades its B channel transmitter to 64 KBPS, stops transmitting its Rate_Request messages at 56 KBPS, and begins transmitting a Rate_Confirm(rate3) message stream at 64 KBPS.

(4) Upon receiving a Rate_Confirm message, the calling node stops transmitting its Rate_Response messages and transmits a single Rate_Established(rate_est) message. Upon receiving a Rate_Established message, the called node stops transmitting its Rate_Confirm messages.

After this four-way message handshake, rate negotiation is complete for both nodes and control channel initialization may begin. Rate_Request messages are transmitted at 56 KBPS. Any extra transmissions after the calling party has upgraded to 64 KBPS will be ignored (e.g., as bad HDLC frames). Rate_Response, Rate_Confirm, and Rate_Established messages are exchanged at 64 KBPS.

The calling node is free to transmit any message after it has sent a Rate_Established message. However, the calling node continues to acknowledge further Rate_Confirm messages with Rate_Established messages.

If rate negotiation does not successfully complete within 10 seconds, both nodes will revert to 56 KBPS. Rate negotiation will restart, but the contents of the messages would indicate that the B channels be retained at 56 KBPS by both nodes. Under normal circumstances, rate negotiation will then complete successfully at 56 KBPS. If, for some reason, rate negotiation at 56 KBPS is unsuccessful (e.g., due to switch problems), then the call will be terminated with an error indicating that rate negotiation timed out.

Video conferencing systems according to a preferred embodiment of the present invention are capable of operating in a loopback mode. In loopback mode, when a called node receives an call from a calling node, the called node forwards the call back to the calling node. In that way, the calling node also becomes a called node. Rate negotiation is designed such that most of its implementation does not distinguish between calling and called nodes, since each node may have to perform as both a calling node and a called node. Most actions within the rate negotiation disregard whether the receiver is the calling or called node. The response to a given rate negotiation message usually depends on the message received. There are two exceptions to this role-independence, neither of which affect loopback operations. First, only the called node performs the initial 64 KBPS upgrade. Second, the called node takes precautions to ignore rate1. If rate1 is not ignored, then the called node may hamper negotiations during rare race conditions. If the called node actually responded to rate1 by upgrading its transmitter and receiver to 64, then it will lose communication with the calling node which is still at 56, and may not yet have seen rate1.

Referring now to FIGS. 38–41, there are shown state diagrams for the rate negotiation processing, according to a preferred embodiment of the present invention. FIG. 38 shows the state diagram for the complete rate negotiation processing. FIG. 39 shows the state diagram for the rate negotiation processing for a called node during a 64 KBPS upgrade. FIG. 40 shows the state diagram for the rate negotiation processing for a calling node during a 64 KBPS upgrade. FIG. 41 shows the state diagram for the rate negotiation processing in loopback mode during a 64 KBPS upgrade.

Certain state transitions shown in FIG. 38 are missing from FIGS. 39 and 40. This is because Rate1 is ignored by the called node, and in fact may not be received due the mismatch between rates at startup. In that case, Rate2 will not be transmitted by the called node; Rate3 will then not be transmitted by the calling node; and Rate_Est will then not be transmitted by the called node. Unlike standard calls, the loopback line of FIG. 41 goes through all the states from Rate1 through Rate_Est.

In a preferred embodiment, TII is presented with a single virtual call that combines two physical B channel calls. TII then conducts a single rate negotiation for both B channels simultaneously. A rate upgrade to 64 KBPS occurs only if the calls on both B channels were originated and delivered as 64 KBPS. Otherwise, both B channels will be used at 56 KBPS and the extra 8 KBPS that may be available on one of the B channels is not used.

The preferred rate negotiation messages are defined by the following structure:

```
typedef struct tagRATE_REQUEST {
        BYTE                Type;
        BYTE                ProtocolId;
        DWORD               Rate;
} RATE_REQUEST, FAR *LPRATE_REQUEST;
```

The fields are defined as follows:

Type: the type of rate message currently being sent. During the exchange process, this type will have the following defined values:

| #define | RATE_STREAM_1 | 0x02 |
| #define | RATE_STREAM_2 | 0x03 |
| #define | RATE_STREAM_3 | 0x04 |
| #define | RATE_ESTAB    | 0xff |

ProtocolId: the version protocol of TII. The preferred defined value for this field is as follows:

| #define | TII_PROTOCOLID | 0 |

Rate: the current rate under negotiation. The defined values are as follows:

| #define | BITRATE_112KB | 0 |
| #define | BITRATE_128KB | 2 |

In a preferred embodiment, rate negotiation may be disabled using ICOMM.INI. To disable negotiation, the RateHandling entry in the TII section is used. The preferred values for RateHandling are as follows:

| Flag | Effect |
|---|---|
| 0 | Enable rate negotiation (default) |
| 1 | Disable rate negotiation; use rate of call as made/presented |
| 2 | Disable rate negotiation; use 56 KBPS |
| 3 | Disable rate negotiation; use 64 KBPS |
| >3 | Disable rate negotiation; use rate of call as made/presented |

Alternative Embodiments

The description for this section is the same as the description for the section of the same name in U.S. patent application Ser. No. 08/157,694.

It will be further understood that various changes in the details, materials, and arrangements of the parts which have been described and illustrated in order to explain the nature of this invention may be made by those skilled in the art without departing from the principle and scope of the invention as expressed in the following claims.

APPENDIX A: Conference Manager API

This section describes the application programming interface (API) for conference manager 544 of FIG. 5. The conference manager API is implemented in a dynamic link library (DLL) (called CMDLL.DLL). It is responsible for:

Making calls and establishing a connection to its peer (which is already invoked on the remote site).

Exchanging information with the remote conference manager.

Invoking and establishing channels for conferencing applications supported on the local and remote sites, upon request from local or remote users.

Invoking applications upon request from a peer conference manager.

A conferencing application, such as 502, 504 of FIG. 5, is a regular Microsoft® Windows™ operating system application that follows a relatively small set of rules. For example, upon startup conference applications load the CMDLL.DLL dynamic link library. Conferencing applications are installed and listed in the [Conference Apps] section of a initialization (.ini) file called CM.INI.

Creating a Conference application

A conferencing application for a preferred embodiment of the present invention is a regular Microsoft® Windows™ 3.1 operating system program that adheres to the following rules:

A conferencing application includes the CMAPI.H header file which includes declarations for conference manager functions, messages, and data types.

A conferencing application can be invoked by the conference manager 544. This may happen during a conference when a participant wants to begin sharing and the desired application is not already running. Upon startup, the conferencing application loads CMDLL.DLL.

A conferencing application registers by calling the function cmRegister. Conferencing applications will specify a callback which is used for receiving messages from the conference manager 544.

When the conferencing application closes, it informs the conference manager 544 by calling cmUnregister.

Callback and Messages

Callback Function

The conference manager 544 communicates with a conferencing application through a callback function provided by the conferencing application in the call to cmRegister. The callback parameter specifies the procedure-instance address of the application-supplied callback function. The address is created by using the Microsoft® Windows™ operating system SDK MakeProcInstance function. The function name is exported. The callback function handles the messages described in the next section of this specification. The format of the callback function is as follows:

BOOL CALLBACK CnfAppCallback(UINT uiMsg, WPARAM wParam, LPARAM lParam) The uiMsg parameter contains one of the messages listed below. The wParam and lParam parameters contain message-dependent values.

Messages

The callback function described in the previous section of this specification responds to the following messages:

| Message | Description |
|---|---|
| CMN_CALL | Sent to a conferencing application when a new call is established. |
| CMN_HANGUP | Sent to a conferencing application when a call has been terminated. |
| CMN_CHANNELPAIR | Sent to a conferencing application when a channel pair has been established. |
| CMN_CLOSECHANNELPAIR | Sent to a conference application when a channel pair has been closed. |

Installing a New Conferencing Application

Most of the conferencing application information is stored in CM.INI. The applications are listed in the [Conference Apps] section of the CM.INI file. The information is stored as follows:

```
...
[Conference Apps]
<szExe> = <wAppId>, <szApplication>
where:
    szExe          The executable name of the conferencing application (e.g., CY.EYE).
    wAppId         Application ID. Each conferencing application has a unique identifier.
                   Application ids range from 0 to 1023, where the id for audio/video
                   conferencing application 502 is preferably 0 and the id for data conferencing
                   application 504 is preferably 1.
    szApplication  The full path name of the conferencing application (e.g.,
                   C:©YBORG©Y.EXE).
```

When a conferencing application is installed, the above information is added to the CM.INI section. An application ID is assigned to all conferencing applications that want to work with the conference manager 544. A conferencing application is installed by calling cmInstall.

Functions

This section describes the functions for the conference manager 544 of FIG. 5.

cmCloseChannelPair

The cmCloseChannelPair function is used to close a channel pair created by calling the cmGetChannelPair function and is defined as follows:

---

```
       CM_RETCODE cmCloseChannelPair( [i]byUsageId )
Parameters:
       BYTE byUsageId
              Specifies the application specific channel pair usage ID. The five low-order bits
              specify the usage id. The three high-order bits are ignored.
Return Value:
       Returns CMRC_SUCCESS if the function was successful. Otherwise, one of the following
       errors is returned:
              CMRC_INVALUSAGEID       The channel usage ID is out of range or not currently
                                     being used.
              CMRC_NOCALL             There is no call currently in progress.
              CMRC_NOTREGISTERED      The calling application is not registered.
              CMRC_VCIERROR           VCI returned an error while closing the channel pair.
```

---

This call is asynchronous. It is completed when CMN_CLOSECHANNELPAIR is received for the given byUsageId. Channel pairs not closed in this manner will be closed by CMDLL.DLL when CMN_HANGUP are sent to conferencing application or when the conferencing application calls cmUnregister. See also cmGetChannelPair, cmGetChannelPairInfo, CMN_CHANNELPAIR, and CMN_CLOSECHANNELPAIR. The cmCloseChannelPair function does the following:

Determine if the application is registered in the global LIB data structure by looking up the current task ID. If not, return CMRC_NOTREGISTERED.

Verify that there is a conference call in progress.

Verify that the channel pair has at least one of the channels open.

Call CN_CloseChannel( ) for the second channel of the pair (output). The first channel (input) will be closed when a notify is sent to the conference manager 544 indicating the second channel is closed.

cmGetChannelPair

The cmGetChannelPair function is used to request a new channel pair and is defined as follows:

channel ID number passed in by the application in the CHAN_INFO structure will be ignored. The Conference Manager combines the application ID provided in cmRegister to form a channel ID. See also cmCloseChannelPair, CMN_CHANNELPAIR, and CMN_CLOSECHANNELPAIR. The cmGetChannelPair function does the following:

Validate the Usage ID and the Channel Info variables.

Determine if the application is registered in the global LIB data structure by looking up the current task ID. If not, return CMRC_NOTREGISTERED.

Verify there is a free Channel Pair for this Usage ID, and that there is a conference call in progress.

Call CN_OpenChannel( ) to open the first channel (input). The second channel of the pair (output) will be opened when a notify is sent to the conference manager 544 indicating the first channel is open. Set the channel pair state to CPS_OPENING.

cmGetChannelPairInfo

The cmGetChannelPairInfo function is used to get information about a currently open channel pair and is defined as follows:

---

```
       CM_RETCODE cmGetChannelPair( [i]byUsageId, [i]lpCmChanInfo )
Parameters:
       BYTE                    byUsageId
              Specifies the application specific channel pair usage ID. The five low-order bits
              specify the usage id. The three high-order bits are ignored.
       LPCMCHAN_INFO           lpCmChanInfo
              Pointer to a channel information structure filled in by the application.
              The channel ID number passed in by the application will be ignored. The
              conference manager 544 combines the application ID provided in cmRegister to
              form a channel ID.
Return Value:
       Returns CMRC_SUCCESS if the function was successful. Otherwise, one of
       the following errors is returned:
              CMRC_NOCALL             There is no call currently in progess.
              CMRC_NOTREGISTERED      The calling application is not registered.
              CMRC_INVALUSAGEID       The channel usage ID is out of range or is
                                     currently being used.
              CMRC_INVALCMCHANINFO    The LPCMCHAN_INFO is invalid.
              CMRC_VCIERROR           VCI returned an error while closing the
                                     channel pair.
```

---

This function is asynchronous. The channel is sent to the application via the CMN_CHANNELPAIR message. The

```
    CM_RETCODE cmGetChannelPairInfo( [i]byUsageId, [o]lpCmChanInfo )
Parameters:
    BYTE            byUsageId
        Specifies the application specific channel pair usage ID. The five low-order bits
        specify the usage Id. The three high-order bits are ignored.
    LPCMCHAN_INFO   lpCmChanInfo
        Pointer to a channel information structure filled in by the function.
Return Value:
    Returns CMRC_SUCCESS if the function was successful. Otherwise, one of the
    following errors is returned:
        CMRC_NOCALL             There is no call currently in progress.
        CMRC_NOTREGISTERED      The calling application is not registered.
        CMRC_INVALUSAGEID       The channel usage ID is out of range or is
                                not currently being used.
        CMRC_INVALCMCHANINFO    The LPCMCHAN_INFO is invalId.
        CMRC_VCIERROR           VCI returned an error while closing the
                                channel pair.
```

See also cmGetChannelPair and CMN_CHANNELPAIR. The cmGetChannelPairInfo function does the following:

Determine if the application is registered in the global LIB data structure by looking up the current task ID. If not, return CMRC_NOTREGISTERED.

Verify that there is a conference call in progress.

Verify that the channel pair has at least one of the channels open.

Call CN_GetChanInfo( ) to get VCI 506 info about the channel pair.

cmInstall

The cmInstall function is used to install a conferencing application and is defined as follows:

```
    CM_RETCODE cmInstall( [i]wAppId, [i]lpcszApp,
        [i]lpcszPath )
Parameters:
    WORD    WappId
        The application ID.
    LPCSTR  lpcszApp
        The executable name for the conferencing applica-
        tion (e.g., CY.EXE).
    LPCSTR  lpcszPath
        The path for the conferencing application path (e.g.,
        C:\CYBORG).
Return Value:
    Returns CMRC_SUCCESS if the function was successful.
    Otherwise, one of the following errors is returned:
        CMRC_BUFTOOLARGE    One of the given
                            buffers was too large.
        CMRC_INVALAPPID     The application ID
                            is out of range.
        CMRC_INVALPTR       One of the given
                            pointers was invalid.
        CMRC_INVALAPP       The given application
                            is invalid (i.e., not an
                            executable).
        CMRC_NOMEM          There was insufficient
                            memory to complete
                            the function call.
```

A conferencing application will not be recognized by the conference manager 544 unless it is properly installed. If an application with the specified ID is already installed, then the current information in the .INI file is overwritten by the new information. Application IDs range from 0 through 1023. See also cmRegister. The cmInstall function determines if the application has already been installed in the global LIB data structure by comparing the application ID. If so, the function updates with the application name and path. If not, the function adds the application to the global LIB data structure.

cmRegister

The cmRegister function is used to register a conferencing application and is defined as follows:

```
    CM_RETCODE cmRegister( [i]wAppId, [i]lpfnCallBack )
Parameters
    WORD            wappId
        The application ID. This ID corresponds to the ID
        specified in the CM.INI file.
    CM_CALLBACK     lpfnCallBack
        Specifies the conferencing application's callback
        function.
Return Value:
    Returns CMRC_SUCCESS if the function was successful.
    Otherwise, one of the following errors is returned:
        CMRC_UNKNOWNAPP     The application is
                            unknown in that it
                            is not registered in
                            the CM.INI file.
        CMRC_INVALAPPID     The application
                            ID is out of
                            range.
        CMRC_INVALCALLBACK  The given
                            callback was not
                            valid.
```

Conferencing applications call this function when they are invoked. If the ID specified by wAppID is not found in the CM.INI file, then the CMRC_UNKNOWAPP error code is returned. The conferencing application calls the function cmInstall and then calls cmRegister again. Application IDs range from 0 through 1023. The callback parameter specifies the procedure-instance address of the application-supplied callback function. See also cmInstall and cmUnregister. The cmRegister function does the following:

If VCI 506 has not been initialized, then call Lib_InitializeCf( ).

Determine if the application has been installed in the global LIB data structure by comparing the application ID. If so, update with the CallBack pointer and the current task handle. If there is a conference call in progress, send the CMN_CALL message to the application.

If the application was installed, notify the conference manager 544 that an application has registered with the CMN_REGISTER message.

If the application was not installed, return CMRC_UNKNOWNAPP.

cmUnregister

The cmUnregister function is used to unregister a conferencing application and is defined as follows:

```
CM_RETCODE cmUnregister( void )
Parameters: None
Return Value:
    Returns CMRC_SUCCESS if the function was successful.
    Otherwise, the following error is returned:
        CMRC_NOTREGISTERED    The calling
                              application is not
                              registered.
```

Conferencing applications call this function before shutting down. This will cause CMDLL.DLL to close all open channel pairs for the application. See also cmInstall, cmRegister, and CMN_CLOSECHANNELPAIR. The cmInregister function does the following:

Determine if the application is registered in the global LIB data structure by looking up the current task ID. If so, clear the application entry. If there is a call in progress, close all open channels. Notify the conference manager 544 that an application has unregistered with the CMN_UNREGISTER message.

If there are no more applications registered, call Lib_TerminateCn( ).

Return CMRC_SUCCESS if the application was found, CMRC_NOTREGISTERED otherwise.

icmRegister

The icmRegister function registers the conference manager application and is defined as follows:

CM_RETCODE icmRegister(IN CM_CALLBACK lpfnCallBack)

The icmRegister function does the following:

If the Connection Manager has not been initialized, call Lib_InitializeCn( ).

Save the Conference Manager CallBack routine in the global LIB data structure.

icmUnregister

The icmUnregister function unregisters the conference manager application and is defined as follows:

CM_RETCODE icmUnregister( )

The icmUnregister function does the following:

Clear the conference manager CallBack routine in the global LIB data structure.

If there are no more applications registered, call Lib_TerminateCn( ).

Return CMRC_SUCCESS.

icmIsRegistered

The icmIsRegistered function determines if the passed application is currently registered and is defined as follows:

BOOL icmIsRegistered(IN WORD wAppid)

The icmIsRegistered function does the following:

Look up the application ID in the global LIB data structure. If the application is installed and registered, return TRUE. Otherwise return FALSE.

icmMakeCall

The icmMakeCall function is called when the DIAL button is pressed in the user interface. The icmMakeCall function makes the conference call and is defined as follows:

CM_RETCODE icmMakeCall(IN LPADDR lpRemoteAddr, IN LPCONN_CHR lpConnChr,

IN LPABBUSCARDINFO lpLocalCard, IN LPMTYPE lpMediaType)

The icmMakeCall function does the following:

Verify that no call is already in progress. If so, return CMRC_CALLINPROGRESS.

Get the handle of the current task and determine if the calling application has registered with VCI 506.

Get the .INI file path for the calling application. Look up in the .INI file the TimeOut time.

Start the phone ringing sound.

Call CF_MakeCall( ). If failure, stop the phone ringing sound and return CMRC_VCIERROR. Otherwise, return CMRC_SUCCESS.

icmHangupCall

The icmHangupCall function is called when the HANGUP button is pressed in the user interface. It terminates the conference call and is defined as follows:

CM_RETCODE icmHangupCall( )

The icmHangupCall function does the following:

If the phone is ringing, stop it.

Verify there is a call in progress. If not, return CMRC_NOCALL.

Call CF_HangupCall( ). If failure, return CMRC_VCIERROR. Otherwise, return CMRC_SUCCESS.

LibMain

The LibMain function is the entry point into the conference manager DLL and is defined as follows:

int LibMain(IN HINSTANCE hInst, IN WORD wDataSeg, IN WORD wHeapSize, IN LPSTR lpszCmdLine)

The LibMain function does the following:

Initialize to NULL the LIB global data structure.

Call Lib_Initialize( ).

Lib Initialize

The Lib_Initialize function initializes the conference manager DLL and is defined as follows:

BOOL Lib_Initialize(INOUT LPLIB lpLib)

The Lib_Initialize function does the following:

Get the .INI file path for the calling application.

Look up all application names and identifiers in the .INI file.

Call Lib_AddApplication( ) for each application found.

Lib AddApplication

The Lib_AddApplication function adds the passed application to the application list stored in the LIB global data structure and is defined as follows:

BOOL Lib_AddApplication(INOUT LPLIB lpLib, IN WORD wAppId, IN LPCSTR lpcszAppPath)

The Lib_AddApplication function does the following:

Allocate space for the new application info.

Initialize the application info.

Lib Terminate

The Lib_Terminate function is defined as follows: void Lib_Terminate(INOUT LPLIB lpLib)

Lib InitializeCn

The Lib_InitializeCn function registers the passed application with the conferencing API (VCI) 506. It is called when applications are registered and is defined as follows:

BOOL Lib_InitializeCn(INOUT LPLIB lpLib, IN WORD wAppId)

The Lib_InitializeCn function does the following:

Get the .INI file path for the calling application.

Change the current working directory to the home directory of the passed application.

Load the VCI DLL (VCI.DLL) and the PWAVE.DLL.

Change the current working directory back to its original value.

Look up the local address in the .INI file.

Set connection characteristics.

Register with VCI 506, CN_Init( ).

Lib TerminateCn

The Lib_TerminateCn function unregisters with VCI 506. It is called when applications are unregistered and is defined as follows:

void Lib_TerminateCn(INOUT LPLIB lpLib)

The Lib_TerminateCn function does the following:

Call CN_Uninit( ) and wait for completion.

Free VCI.DLL and PWAVE.DLL.

Lib InitializeAb

The Lib_InitializeAb function registers with the Address Book interface and is defined as follows:

BOOL Lib_InitializeAb(INOUT LPLIB lpLib)

The Lib_InitializeAb function does the following:

Get the Address Book DLL path from the .INI file.

Load the Address Book DLL.

Call abRegister( ).

Lib TerminateAb

The Lib_TerminateAb function unregisters with the Address Book interface and is defined as follows:

void Lib_TerminateAb(INOUT LPLIB lpLib)

The Lib_InitializeAb function does the following:

Call abUnregister( ).

Lib CnCallCallBack

The Lib_CnCallCallBack routine is the VCI 506 interface. All messages sent to the conference manager from VCI 506 are sent here. The Lib_CnCallCallBack routine is defined as follows:

BOOL Lib_CnCallCallBack(IN UINT uiMsg, IN WPARAM wParam, IN LPARAM lParam)

The following messages are handled in the following manner:

CNM_CALL_NTFY: indicates a peer is attempting to call the local user.

Get the .INI file path for the current application.

Determine from the .INI file if calls should be automatically answered.

If the call should be automatically answered, create a business card for the local user, and call CN_AcceptCall( ) to accept the call.

If the call is not automatically answered, attempt to look up the caller in the address book. Notify user of the incoming call. If call is accepted by the user, create a business card for the local user, and call CN_AcceptCall( ) to accept the call. If the call is rejected by the user, call CN_RejectCall( ) to reject the call.

CNM_ACCEPT_NTFY: indicates the peer has accepted the call.

If the phone is ringing, stop it.

Notify all registered applications of the call with message CMN_CALL.

Establish the channel management callback for VCI 506 by calling CN_RegisterChanMgr( ).

CNM_PROGRESS_NTFY: indicates call progress.

Notify the calling application of progress with message CMN_PROGRESS.

CNM_REJECT_NTFY: indicates a call has been rejected by the peer.

If the phone is ringing, stop it.

Notify the calling application of the rejection with message CMN_REJECTED.

CNM_HANGUP_NTFY: indicates the call has been hung up.

If the phone is ringing, stop it.

Clear the channels for this call in the global LIB data structure.

Notify the calling application of the hang up with message CMN_HANGUP.

CNM_UNINIT_NTFY: indicates that VCI 506 has completed uninitialization.

Set a flag indicating this message has been received. This indicates that Lib_TerminateCn( ) may continue.

Lib CnChanCallBack

The Lib_CnChanCallBack routine is the channel manager for channels established by the conference manager 544. VCI 506 sends messages to this callback routine for all channels it establishes for applications. The Lib_CnChanCallBack routine is defined as follows:

BOOL Lib_CnChanCallBack(IN UINT uiMsg, IN WPARAM wParam, IN LPARAM lParam)

The following messages are handled in the following manner:

CNM_CHAN_ACCEPT_NTFY: indicates a peer has accepted an open channel request.

Determine which application requested the channel pair.

Store the channel handle as the outgoing channel.

If the incoming channel has already been established, get channel info for the incoming channel by calling CN_GetChanInfo( ). Update the channel pair state to CPS_OPEN and notify the requesting application with CMN_CHANNELPAIR/CMRC_SUCCESS.

CNM_CHAN_REJECT_NTFY: indicates a peer has rejected an open channel request.

CNM_CHAN_TIMEOUT_NTFY: indicates an open channel request has timed out.

Determine which application requested the channel pair.

Update the channel pair state to CPS_CLOSED and notify the requesting application with CMN_CHANNELPAIR/CMRC_CHANFAIL.

CNM_CHAN_OPEN_NTFY: indicates a peer has requested an open channel.

Determine which application requested the channel pair.

If the requesting application is not registered, reject the channel with CN_RejectChannel( ).

If the application is registered, determine if it is running. If not, launch the application. If the launch fails, reject the channel.

Store the channel handle as the incoming channel and accept the channel with CN_AcceptChannel( ).

If the outgoing channel has not been established, open the outgoing channel with CN_OpenChannel( ). If the outgoing channel open fails, close the incoming channel with CN_CloseChannel( ).

If the outgoing channel has already been established, get channel info for the incoming channel by calling CN_GetChanInfo( ). Update the channel pair state to CPS_OPEN and notify the requesting application with CMN_CHANNELPAIR/CMRC_SUCCESS.

CNM_CHAN_CLOSE_NTFY: indicates a channel has been closed.

Determine which application requested the channel pair, and find the channel handle to be closed.

Update the channel pair state to CPS_CLOSED.

If both incoming and outgoing channels are closed, notify the application of the closing channel, depending on the channel pair state.

CPS_OPEN implies CMN_CLOSECHANNELPAIR,

CPS_OPENING implies CMN_CHANNELPAIR/ CMRC_CHANFAIL

Messages

This section describes the messages for the conference manager 544 of FIG. 5.

CMN CALL

The CMN_CALL message is sent to a conferencing application when a new call is established and is defined as follows:

wParam: Unused.

lParam: Unused.

CMN CHANNELPAIR

The CMN_CHANNELPAIR message is sent to a conferencing application when a channel pair has been opened for it. The conferencing application can use these channels for VCI functions. When an application receives this message, it should register itself as the channel handler for each of the two channels. The CMN_CHANNELPAIR message is defined as follows:

wParam: Return code: CMRC_SUCCESS if cmGetChannelPair succeeded, else CMRC_CHANFAIL if cmGetChannelPair failed.

lParam: Pointer to a LPCMCHAN_INFO structure or NULL if failure.

CMN CLOSECHANNELPAIR

The CMN_CLOSECHANNELPAIR message is sent to a conference application when a channel pair has been closed and is defined as follows:

wParam: Channel pair usage id.

lParam: Unused.

CMN HANGUP

The CMN_HANGUP message is sent to a conferencing application when the current call has been terminated. The application should stop using its channels (they have been closed by CMDLL.DLL). The CMN_HANGUP messages is defined as follows:

wParam: Unused.

lParam: Unused.

Constants, Data Types, and Global Variables

This section describes the constants, data types, and global variables for the conference manager 544 of FIG. 5.

| Constants | | |
|---|---|---|
| // Maximum sizes | | |
| #define MAX_APPNAME | 12 | // size of app name 8.3 |
| #define MAX_CHAN | 32 | // max chan_pairs/app (2+e,cir +ee 5) |
| #define MAX_APPS | 1024 | // app IDs are 0 through 1023 |
| #define MAX_APPID | (MAX_APPS – 1) | |
| #define MAX_WAIT | 60 | // max wait time for spawning clients |
| // Return codes (0x0000-0x7fff) | | |
| #define CMRC_SUCCESS | 0x0000 | // successful operation |
| #define CMRC_UNKNOWNAPP | 0x0001 | // unknown application |
| #define CMRC_INVALCALLBACK | 0x0002 | // invalid callback |
| #define CMRC_NOTREGISTERED | 0x0003 | // app not registered |
| #define CMRC_INVALPTR | 0x0004 | // invalid data pointer |
| #define CMRC_BUFTOOLARGE | 0x0005 | // buffer too large |
| #define CMRC_INVALAPP | 0x0006 | // invalid application |
| #define CMRC_INVALAPPID | 0x0007 | // invalid app id |
| #define CMRC_NOMEM | 0x0008 | // not enough memory |
| #define CMRC_NOCALL | 0x0009 | // no call |
| #define CMRC_INVALUSAGEID | 0x000a | // invalid usage id |
| #define CMRC_UNKNOWNID | 0x000b | // usage id not in use |
| #define CMRC_UNKNOWNPRIORITY | 0x000c | // unknown priority |
| #define CMRC_INVALCHANINFO | 0x000d | // invalid CHAN_INFO |
| #define CMRC_INVALCMCHANINFO | 0x000e | // invalid CMCHAN_INFO |
| // callback notification messages | | |
| #define CMN_CALL | 0 | |
| #define CMN_HANGUP | 1 | |
| #define CMN_CHANNELPAIR | 2 | |
| #define CMN_CLOSECHANNELPAIR | 3 | |
| Data Types | | |

```
CM_CALLBACK
typedef BOOL ( CALLBACK*CM_CALLBACK ) ( UINT, WPARAM, LPARAM )
CMCHAN_INFO
typedef struct tagCMCHAN_INFO
{
        HCHAN       hChanin;      // input (read) channel
        HCHAN       hChanOut;     // output (write) channel
        CHAN_INFO   ChanInfo;     // channel information
        DWORD       dwTransId;    // transaction id
        BYTE        byUsageId;    // usage id
} CMCHAN_INFO;
typedef CMCHAN_INFO FAR *LPCMCHAN_INFO;
CM_RETCODE
typedef UINT CM_RETCODE
CHANNELPAIR
typedef struct {
        HCHAN       hChanin;      // Input (receive) channel
        HCHAN       hChanOut;     // Output (send) channel
        WORD        wState;       // Channel pair state:
                                  //     CPS_CLOSED
```

```
                                          //      CPS_OPENING
                                          //      CPS_OPEN
          CMCHAN_INFO        cmChanInfo;     // Channel info structure
} CHANNELPAIR;
CONFAPP
typedef struct {
          WORD               wAppId;                   // App id
          char               szAppPath[_MAX_PATH ];    // App path
          HTASK              hTask;                    // App task handle
          CM_CALLBACK        lpfnCallBack;             // App callback routine
          CHANNELPAIR        chanPairs[ MAX_CHAN ];    // App channel pairs
} CONFAPP;
LIB
typedef struct {
          HINSTANCE          hInst;           // Library instance
          BOOL               bCall;           // Call status flag (true/false)
          HCALL              hCall;           // Current call handle
          V_CBACK            vcback;          // Call notify parameter (from VCI)
          AB_CALLBACK        lpfnAbCallBack;  // Address book callback
          WORD               wAbSessionId;    // Address book session id
          FARPROC            lpfnCnCallBack;  // VCI callback routine
          LPCCB              lpCcb;           // VCI control block
          BOOL               bCnInit;         // VCI initialized flag (true/false)
          CM_CALLBACK        lpfnCallBack;    // Conference mgr callback routine
          LPCONFAPP          lpConfApps;      // Array of installed conferencing apps
          WORD               wNumApps;        // Number of installed conferencing apps
} LIB;
                                  Global Variables LIB       Lib:      // conference manager data
APPENDIX B: Conferencing API Conferencing API 506 utilizes the following data types:
HCALL             Handle to a Call
HCHAN             Handle to a Channel
HSTRM             Handle to a Stream
HSTGRP            Handle to a Stream Group
CSTATUS           VCI Function Status Code
LPAVCB            Long Pointer to an AVCB
LPCCB             Long Pointer to a CCB
LPHSTRM           Long Pointer to a STRM handle
LPHSTGRP          Long Pointer to a STGRP handle
LPV_CBACK         Long Pointer to V_CBACK structure
LPPARTINFO        Long Pointer to PARTINFO structure
ADDR              Address structure, same as TADDR in TII
LPADDR            Long Pointer to ADDR
```

Conferencing API 506 utilizes the following structures that are passed to conferencing API 506 in function calls (e.g., CF_Init, CF_CapMon) and then passed by conferencing API 506 to the audio/video managers:

```
MTYPE
>>      WORD           wField        Media type:
CCB (Configuration Control Block)
>>      WORD           wVersion      Version Number
AVCB (Audio Video Control Block)
>>      WORD           wAVType       Local or remote AVCB type
>>      Union {
                    // local AVCB
                    struct {
>>                  WORD           wAIn          Audio input hardware source
>>                  WORD           wAGain        Gain of the local microphone
>>                  WORD           wAMute        On/Off flag for audio muting
>>                  WORD           wVIn          Video input source
>>                  DWORD          dwVDRate      Maximum video data rate
>>                  WORD           wVContrast    Video contrast adjustment
>>                  WORD           wVTint        Video tint adjustment
>>                  WORD           wVBright      Video brightness adjustment
>>                  WORD           wVColor       Video color adjustment
>>                  WORD           wVMonitor     On/Off flag for local video monitoring
>>                  WORD           wVMute        On/Off flag for local video muting. As the
                                                 flag is turned on/off, it will temporarily stop or
                                                 restart the related operations, including playing
                                                 and sending, being performed on this stream
                                                 group. This can be temporarily hold one video
```

-continued

|  |  |  | stream and provide more bandwidth for other streams to use. For example, a video stream can be paused while an audio stream continues, to speed up a file transfer. |
|---|---|---|---|
| >> | } localcb | | |
|  | // remote AVCB | | |
|  | struct { | | |
| >> | WORD | wAOut | Audio output hardware destination |
| >> | WORD | wAVol | Volume of the local speaker |
| >> | WORD | wAMute | On/Off flag for audio muting |
| >> | WORD | wVOut | Video output source |
| >> | WORD | wVContrast | Video contrast adjustment |
| >> | WORD | wVTint | Video tint adjustment |
| >> | WORD | wVBright | Video brightness adjustment |
| >> | WORD | wVColor | Video color adjustment |
| >> | WORD | wVMute | On/Off flag for local video muting |
|  | } remotecb | | |
| >> } | | | |
| >> | // ADDR Information - | | the address to be used for the conf. application to make a Connection/call, via issuing the CF_MakeCall with the remote site. |
| >> | // NOTE: This is the same as the TADDR structure defined by TII. | | |
| >> | struct { | | |
| >> | WORD | AddressType | Type of Address, e.g., phone number, internet address, etc. |
| >> | WORD | AddressLength | Size of the following address buffer |
| >> | BYTE | Address[80] | Address buffer |
| >> | } | | |
| CONN_CHR (Connection Characteristics) | | | |
|  | CONNCHARACTS | | Structure defined by Comm Subsystem |
|  | WORD | Quality | Quality of the connection |
|  | WORD | BitRate | Maximum bandwidth for connection |
| PARTINFO (User Participant Information) | | | |
|  | WORD | wUserId | Unique user ID (unused) |
|  | char | Title[10] | Mr, Ms, Mrs, Dr, etc |
|  | char | LastName[64] | Last name |
|  | char | FirstName[64] | First name |
|  | char | JobPosition[64] | Pres, VP, Manager, etc |
|  | char | CompanyName[64] | Company name |
|  | char | Street[80] | Street |
|  | char | City[32] | City |
|  | char | State_Province[32] | State or province name |
|  | char | Zip_PostalCode[32] | Zip code or postal code |
|  | char | Country[32] | Country |
|  | char | Email[64] | Email address |
|  | char | Telephone1[32] | Office phone number |
|  | char | Telephone2[32] | Office phone number |
|  | char | Fax[32] | Fax number |
| V_CBACK (lparam Structure used in Callbacks) | | | |
|  | union { | | |
|  | struct { | | |
|  | LPTADDR | lpCallerAddr | Caller address |
|  | LPCONN_CHR | lpAttributes | Caller connection attributes |
|  | } V_ConReq | Connection Requested | |
|  | struct { | | |
|  | LPCONN_CHR | lpAttributes | Peer connection attributes |
|  | LPPARTINFO | lpPartInfo | Peer participant Information |
|  | LPBYTE | lpItone | Itone |
|  | } V_ConAcc | Connection Accepted | |
|  | struct { | | |
|  | DWORD | dwTransId | Channel transaction ID |
|  | HCONN | hCall | Call handle |
|  | LPCHAN_INFO | lpChanInfo | Channel info structure |
|  | } V_ChanReq | Channel Requested | |
| } V_EV | | | |

Conferencing API 506 utilizes the following constants:

Conferencing Call States:

| | |
|---|---|
| CCST_NULL | Null State |
| CCST_IDLE | Idle State |
| CCST_CONNECTED | Connected state |
| CCST_CALLING | Calling State |
| CCST_ACCEPTING | Accepting State |
| CCST_CALLED | Called state |

-continued

| | |
|---|---|
| CCST_CLOSING | Closing State |

Conferencing Channel States:

| | |
|---|---|
| CHST_READY | Ready State |
| CHST_OPEN | Opened state |
| CHST_OPENING | Opening state |
| CHST_SEND | Send state |
| CHST_RECV | Recv state |
| CHST_RESPONDING | Responding state |
| CHST_CLOSING | Closing state |

-continued

Conferencing Stream States:

| | |
|---|---|
| CSST_INIT | Init state |
| CSST_ACTIVE | Active state |
| CSST_FAILED | Failure state |

CStatus Return Values:

| | |
|---|---|
| CF_OK | // Invalid State To Make the Call |
| CF_ERR_HANDLE | // Invalid Handle |
| CF_ERR_RESOURCE | // Unexpected Resource Failure |
| CF_ERR_PRIORITY | // Invalid Priority Value |
| CF_ERR_BUFFER | // Insufficient Buffer Size |
| CF_ERR_ADDRESS | // Invalid Address/Phone Number |
| CF_ERR_FILE | // Invalid File Name or File in use |
| CF_ERR_FILE_FORMAT | // File Format Not Supported |
| CF_ERR_CALLBACK | // Invalid CALLBACK |
| CF_ERR_INIT | // Already Initialized |
| CF_ERR_NO_CHANMGR | // Invalid Channel Manager |
| CF_ERR_CHAN_INUSE | // Channel is in use |
| CF_ERR_CHAN_TRAN_TBL | // Channel Transaction Table Full |
| CF_ERR_TRAN_ID | // Invalid Transaction id |
| CF_ERR_TOO_MANY_CAP | // Too Many Capture |
| CF_ERR_IN_USE | // Resource In Use |
| CF_ERR_MAX_NUM | // Exceed the maximum number |
| CF_ERR_INV_VTHREAD | // Cannot invoke the vthread |
| CF_ERR_FIND_VTHREAD | // Cannot find the vthread window |
| CF_ERR_BEGIN_TIMEOUT | // Session Begin timed out |
| CF_ERR_BEGIN_FAIL | // Session Begin failed |

The functions utilized by conferencing API 506 are defined as follows:

Initialization and Call Services

CF_Init

This function reads conferencing configuration parameters from the initialization file, and loads and initializes the video, audio, and LAN management subsystems. This function also allows the application to choose between the messaging and the callback interfaces to return event notifications. The callback interface allows VCI to call a user-designated function to notify the application of incoming events. The messaging interface allows VCI to notify the application of incoming events by posting messages to application message queues. The parameters to the function vary according to the notification method chosen. CStatus CF_Init (LPSTR lpIniFile, WORD wFlag, CALLBACK lpCallBack, LPCCB lpCcb)

Input:

lpIniFile: The pathname to the conferencing INI file.

wFlag: Indicates the type of notification to be used:

| | |
|---|---|
| CALLBACK_FUNCTION | for callback interface |
| CALLBACK_WINDOW | for post message interface | lpCallBack: The callback routine or the message interface to return the notifications from the remote site to the application.

Output:

lpCcb: Returns the handle to the configuration control block, preallocated by the application, that contains the configuration information.

Return value:

CF_OK: for successful completion

CFB_ERR_VCI+CF_ERR_INIT: VCI already initialized

CFB_ERR_VCI+CF_ERR_MAX_NUM: too many calls in progress

CFB_ERR_VCI+CF_ERR_INV_VTHREAD: unable to spawn callback thread

CFB_ERR_VCI+CF_ERR_FIND_VTHREAD: unable to find callback thread

CFB_ERR_VID+vid error hum: error in Video Subsystem

Valid Call State to Issue:

CCST_NULL

Call State after Execution:

CCST_IDLE

Callback Routine:

FuncName (WORD wMessage, WORD wParam, LONG lParam)

wMessage: Message Type (CFM_XXXX_NTFY)

wParam: Call Handle lParam: Additional Information which is message-specific

The parameters of the callback function are equivalent to the last three parameters passed to a Microsoft® Windows™ message handler function (Win 3.1).

CF_Uninit

This function writes conferencing configuration parameters back to the initialization file, unloads, and uninitializes video, audio, and LAN management subsystems, and stops all listening on the local addresses. If a conference call is in progress, it is gracefully destroyed. CStatus CF_Uninit (LPCCB lpCcb)

Input:

lpCcb: The handle to the configuration control block that contains the configuration information.

Return value

CF_OK: for successful completion

CFB_ERR_VCI+CF_ERR_STATE: VCI already uninitialized

Valid Call State to Issue:

CCST_IDLE

Call State after Execution:

CCST_NULL

Status Message:

CFM_UNINIT_NTFY: Uninit complete

CF_MakeCall

This function makes a call to the remote site to establish video conferencing. This call will be performed asynchronously. If the call is successful, the local caller's business card information (from the Address Book) is sent to the peer. When all related operations for CF_MakeCall are complete, the callback routine (or the message) specified in CF Init will receive the result of this call (CFM_ACCEPT_NTFY, CFM_REJECT_NTFY). The peer application will receive a CFM_CALL_NTFY callback/message as a result of this call. CStatus CF_MakeCall (LPADDR lpAddress, LPCONN_CHR lpConnAttributes, LPPARTINFO lpPartInfo, WORD wCommTimeOut, WORD wCallTimeOut)

Input:

lpAddress: Pointer to the address of the destination.

lpConnAttributes: Pointer to the attributes requested for the call.

lpPartInfo: Pointer to participant information of the caller.

wCommTimeOut: Number of seconds to wait for peer to pickup the phone.

wCallTimeOut: Number of seconds to allow the call to be established.

Return Value:
  CF_OK: for successful completion
  CFB_ERR_VCI+CF_ERR_MAX_NUM+CFB_ERR_CALL: too many calls
  CFB_ERR_VCI+CF_ERR_STATE+CFB_ERR_CALL: invalid call state
  CFB_ERR_COM+comm error num: error in Comm Subsystem Valid State(s) to Issue:
  CCST_NULL State after Execution:
  CCST_CALLING Peer Messages:
  CFM_CALL_NTFY: A peer is requesting a call Status Message:
  CFM_ACCEPT_NTFY: The peer process has accepted the call
  CFM_EJECT_NTFY: The call failed CF_AcceptCall This function is issued to accept a call request, received as CFM_CALL_NTFY callback/message. The local callee's business card information (from the Address Book) is sent to the peer. Both sides will receive a CFM_ACCEPT_NTFY callback/message as a result of this call. CStatus CF_AcceptCall (HCALL hCall, LPPARTINFO lpPartInfo, WORD wCallTimeOut)

Input:
  hCall: Handle to the call (returned by the CFM_CALL_NTFY message).
  lpPartInfo: Pointer to the participant information of the callee.
  wCallTimeOut: Number of seconds to allow the call to be established.

Return Value:
  CF_OK: for successful completion
  CFB_ERR_VCI+CF_ERR_STATE+CFB_ERR_CALL: invalid call state
  CFB_ERR_VCI+CF_ERR_HANDLE+CFB_ERR_CALL: invalid call handle
  CFB_ERR_COM+comm error num: error in Comm Subsystem Valid State(s) to Issue:
  CCST_CALLED State after Execution:
  CCST_ACCEPTING Peer Messages:
  CFM_ACCEPT_NTFY: The peer has accepted the call Status Messages:
  CFM_ACCEPT_NTFY: The local accept functionality is complete CF_RejectCall Upon receiving a CFM_CALL_NTFY message, this function can be issued to reject the incoming call request. The peer will receive a CFM_REJECT_NTFY callback/message as a result of this call. CStatus CF_RejectCall (HCALL hCall)

Input:
  hCall: Handle to the call (returned by the CFM_CALL_NTFY message).

Return Value:
  CF_OK: for successful completion
  CFB_ERR_VCI+CF_ERR_STATE+CFB_ERR_CALL: invalid call state
  CFB_ERR_VCI+CF_ERR_HANDLE+CFB_ERR_CALL: invalid call handle
  CFB_ERR_COM+comm error num: error in Comm Subsystem Valid State(s) to Issue:
  CCST_CALLED State after Execution:
  CCST_IDLE Peer Messages:
  CFM_REJECT_NTFY: The peer has rejected the call CF_HangupCall This function hangs up a call that was previously established. It releases all system resources, including all types of streams, channels, and data structures, allocated during this call. CStatus CF_HangupCall (HCALL hCall)

Input:
  hCall: Handle to the call

Return Value:
  CF_OK: for successful completion
  CFB_ERR_VCI+CF_ERR_STATE+CFB_ERR_CALL: invalid call state
  CFB_ERR_VCI+CF_ERR_HANDLE+CFB_ERR_CALL: invalid call handle Valid State(s) to Issue:
  CCST_CONNECTED State after Execution:
  CCST_CLOSING Peer Message:
  CFM_HANGUP_NTFY: The peer has hung up the call Status Message:
  CFM_HANGUP_NTFY: The local hangup functionality is complete CF_GetCallInfo This function returns the current status information of the specified call. CStatus CF_GetCallInfo (HCALL hCall, LPCONN_CHR lpConnAttributes, LPWORD lpwState, LPPARTINFO lpPartInfo)

Input:
  hCall: Handle to the call

Output:
  lpwState: Current call state
  lpConnAttributes: Connection Attributes
  lpPartInfo: Peer's participant information Return Value:
  CF_OK: for successful completion
  CFB_ERR_VCI+CF_ERR_STATE+CFB_ERR_CALL: invalid call state
  CFB_ERR_VCI+CF_ERR_HANDLE+CFB_ERR_CALL: invalid call handle Valid State(s) to Issue:
  All call states State after Execution:
  Unchanged CFM_CALL_NTFY (Call request from a remote peer) Received By Callee Returned Parameters:
  wParam HCALL: Handle to the call (to be sent to CF_AcceptCall/CF_RejectCall).
  lParam LPV_CBACK: Pointer to a structure containing incoming call info Valid Call States To Receive the Notification:
  CCST_IDLE State after receiving the message:
CCST_CALLED
CFM_PROGRESS_NTFY (Call progress info) Received By Caller
Returned Parameters:
lParam DWORD: Substate of the call
Valid wSubstate Values:
CF_CALL_BUSY: working on the call
CF_CALL_RINGING: call is ringing at destination
CF_CALL_LCONNECTED: DLM is connected
CF_CALL_TCONNECTED: TII is connected
CF_CALL_FAKERINGING: fake call ringing at destination
Valid Call States to Receive the Notication:
CCST_CALLING
State after Receiving the Message:
Unchanged
CFM_ACCEPT_NTFY (Call request accepted by peer) Received By Caller/callee
Returned Parameters:
wParam HCALL: Handle to the call.
lParam LPV_CBACK: Pointer to a structure containing accepted call info
Valid Call States to Receive the Notication:
CCST_CALLING (caller) or CCST_ACCEPTING (callee)
State after Receiving the Message:
CCST_CONNECTED
CFM_REJECT_NTFY (Call rejected by peer) Received By Caller
Returned Parameters:
lParam DWORD: Substate of the call
Valid wSubstate Values:
CF_REJ_TIMEOUT: call timed out
CF_REJ_ADDRESS: bad address
CF_REJ_NETWORK_BUSY: network busy
CF_REJ_STATION_BUSY: destination rejection
CF_REJ_REJECTED: call rejected at destination comm subsystem
CF_REJ_NET_ERROR: network failure
CF_REJ_NO_RESPONSE: no response from destination
CF_REJ_INTERNAL_COMM: internal error in Comm Subsystem
CF_REJ_INTERNAL_POST_CONNECT: internal VCI error after connection established
CF_REJ_INTERNAL_PROTOCOL_FAIL: internal VCI error with PCA protocol (post connection)
Comm Subsystem Valid Call States To Receive the Notification:
CCST_CALLING
State after Receiving the Message:
CCST_IDLE
CFM_HANGUP_NTFY (Call terminated locally or remotely) Received By Caller/callee
Returned Parameters:
wParam HCALL: Handle to the call
Valid Call States to Receive the Notication:
CCST_CONNECTED or CCST_CLOSING
State after Receiving the Message:
CCST_IDLE
CFM_UNINIT_NTFY (VCI uninitialized) Received By Caller/callee
Returned Parameters:
wParam HSESS: Handle to the session
Valid Call States to Receive the Notication:
CCST_IDLE
State after Receiving the Message:
CCST_NULL
CFM_ERROR_NTFY (Error occurred) Received By Caller/callee
Returned Parameters:
lParam DWORD: Error code
Valid wSubstate Values:
CFB_ERR_COM+comm error num: error in Comm Subsystem
Valid Call States to Receive the Notication:
Any State
State after Receiving the Message:
Unchanged
Audio/Video Stream Management
CF_CapMon
This function starts the capture of video signals from the local camera and displays them in the local video window which is pre-opened by the application. Also, it starts the capture of audio signals from the local microphone. The monitor function can be turned on/off later using CF_ControlStream calls. This function allows the user to preview his/her appearance before sending the signals out to the peer.
CStatus CF_CapMon (HWND hWnd, LPHSTGRP lphStgrp)
Input:
hWnd: Handle to the local video window pre-opened by the application
Output:
lphStgrp: Pointer to the handle of a stream group being captured (local stream group)
Return Value:
CF_OK: for successful completion
CFB_ERR_VCI+CF_ERR_RESOURCE: error with internal data structures
CFB_ERR_VCI+CF_ERR_STATE: invalid stream group state
CFB_ERR_VCI+CF_ERR_STATE+CFB_ERR_STREAM: invalid stream state
CFB_ERR_AUD+audio error num: error in Audio Subsystem
CFB_ERR_VID+video error num: error in Video Subsystem
Valid State(s) to Issue:
stream state: CSST_INIT
State after Execution:
stream state: CSST_ACTIVE
CF_PlayRcvd
This function starts the reception and display (via the software play function) of remote video signals in the remote video window which is pre-opened by the application. Also, it starts the reception and playback of remote audio signals back through the local speakers. The play function that is automatically invoked as part of this function can be later turned on/off by the application by issuing calls to CF_PlayStream. Note that this function can only be correctly invoked after the call is successfully made. Otherwise, CF_ERR_STATE will be returned. CStatus CF_PlayRcvd (HWND hWnd, HCALL hCall, LPHSTGRP lphStgrp, LPAINFO lpAinfo, LPVINFO lpVinfo)

Input:
 hWnd: Handle to the remote video window pre-opened by the application
 hCall: Handle to the call
 lpAinfo: Info about audio stream
 lpVinfo: Info about video stream
Output:
 lphStgrp: Pointer to the handle to a stream group being received (remote stream group)
Return Value:
 CF_OK: for successful completion
 CFB_ERR_VCI+CF_ERR_RESOURCE: error with internal data structures
 CFB_ERR_VCI+CF_ERR_HANDLE+CFB_ERR_CALL: invalid call handle
 CFB_ERR_VCI+CF_ERR_STATE+CFB_ERR_CALL: invalid call state
 CFB_ERR_VCI+CF_ERR_STATE+CFB_ERR_STREAM: invalid stream state
 CFB_ERR_AUD+audio error num: error in Audio Subsystem
 CFB_ERR_VID+video error num: error in Video Subsystem
Valid State(s) to Issue:
 call state: CCST_CONNECTED
 stream state: CSST_INIT
State after Execution:
 call state: CCST_CONNECTED
 stream state: CSST_ACTIVE CF_PlayStream
This function starts or stops playing the captured video and audio streams of a specified stream group. CStatus CF_PlayStream (HWND hWnd, HSTGRP hStgrp, WORD wAVFlag)
Input:
 hWnd: Handle to the playback window pre-opened by the application
 hStgrp: Handle to the stream group to be modified
 wAVFlag: Start/stop flag

| AUDIO_ON | |
|---|---|
| AUDIO_OFF | |
| VIDEO_ON | |
| VIDEO_OFF | |
| AV_ON | (VIDEO_ON ¦ AUDIO_ON) |
| AV_OFF | (VIDEO_OFF ¦ AUDIO_OFF) |
| AON_VOFF | (VIDEO_OFF ¦ AUDIO_ON) |
| AOFF_VON | (VIDEO_ON ¦ AUDIO_OFF) |

Return Value:
 CF_OK: for successful completion
 CFB_ERR_VCI+CF_ERR_RESOURCE: error with internal data structures
 CFB_ERR_VCI+CF_ERR_HANDLE+CFB_ERR_STREAM: invalid stream handle
 CFB_ERR_VCI+CF_ERR_STATE+CFB_ERR_STREAM: invalid stream state
 CFB_ERR_AUD+audio error num: error in Audio Subsystem
 CFB_ERR_VID+video error num: error in Video Subsystem
Valid State(s) to Issue:
 stream state: CSST_ACTIVE
State after Execution:
 stream state: Unchanged CF_ControlStream
This function sets the parameters to control the capture or playback functions of the local or remote audio/video stream groups. This routine preferably does nothing. CStatus CF_ControlStream (HStGrp hStgrp, WORD wfield, LPAVCB lpAvcb)
Input:
 hStgrp: Handle to a stream group to be modified
 wfield: Field of the AVCB to be modified
 lpAvcb: Pointer to the AVCB
Return Value:
 CF_OK: for successful completion
Valid State(s) to Issue:
 stream state: All states except CSST_INIT
State after Execution:
 stream state: Unchanged CF_GetStreamInfo
This function returns the current stream state and the AVCB, preallocated by the application, of the specified stream group. This routine preferably does nothing. CStatus CF_GetStreamInfo (LHSTGRP hStgrp, PWORD lpwState, LPAVCB lpAvcb)
Input:
 hStgrp: Handle to a stream group
Output:
 lpwState: The current application state
 lpAvcb: The pointer to the AVCB preallocated by the application.
Return Value:
 CF_OK: for successful completion
Valid State(s) to Issue:
 stream state: All states
State after Execution:
 stream state: Unchanged CF_SendStream
This function starts or stops sending the captured audio/video streams of a specified stream group to the peer. CStatus CF_SendStream (HCALL hCall, HSTGRP hStgrp, WORD wAVFlag)
Input:
 hCall: Handle to the call
 hStgrp: Handle to the stream group
 wAVFlag: Start/stop flag

| AUDIO_ON | |
|---|---|
| AUDIO_OFF | |
| VIDEO_ON | |
| VIDEO_OFF | |
| AV_ON | (VIDEO_ON ¦ AUDIO_ON) |
| AV_OFF | (VIDEO_OFF ¦ AUDIO_OFF) |
| AON_VOFF | (VIDEO_OFF ¦ AUDIO_ON) |
| AOFF_VON | (VIDEO_ON ¦ AUDIO_OFF) |

Return Value:
 CF_OK: for successful completion
 CFB_ERR_VCI+CF_ERR_RESOURCE: error with internal data structures
 CFB_ERR_VCI+CF_ERR_HANDLE+CFB_ERR_CALL: invalid call handle
 CFB_ERR_VCI+CF_ERR_STATE+CFB_ERR_CALL: invalid call state
 CFB_ERR_VCI+CF_ERR_HANDLE+CFB_ERR_STREAM: invalid stream handle CFB_ERR_VCI+CF_ERR_STATE+CFB_ERR_STREAM: invalid stream state CFB_ERR_AUD+audio error num: error in Audio Subsystem CFB_ERR_VID+video error num: error in Video Subsystem Valid State(s) to Issue:

stream state: CCST_ACTIVE

State after Execution:

stream state: Unchanged

CF_Mute

This function starts or stops sending the captured audio/video streams of a specified stream group to the peer. CStatus CF_Mute (HCALL hCall, HSTGRP hStgrp, WORD wAVFlag)

Input:

hCall: Handle to the call hStgrp: Handle to the stream group wAVFlag: Start/stop flag

| | |
|---|---|
| AUDIO_ON | |
| AUDIO_OFF | |
| VIDEO_ON | |
| VIDEO_OFF | |
| AV_ON | (VIDEO_ON ¦ AUDIO_ON) |
| AV_OFF | (VIDEO_OFF ¦ AUDIO_OFF) |
| AON_VOFF | (VIDEO_OFF ¦ AUDIO_ON) |
| AOFF_VON | (VIDEO_ON ¦ AUDIO_OFF) |

Return Value:

CF_OK: for successful completion

CFB_ERR_VCI+CF_ERR_RESOURCE: error with internal data structures

CFB_ERR_VCI+CF_ERR_HANDLE+CFB_ERR_CALL: invalid call handle

CFB_ERR_VCI+CF_ERR_STATE+CFB_ERR_CALL: invalid call state

CFB_ERR_VCI+CF_ERR_HANDLE+CFB_ERR_STREAM: invalid stream handle

CFB_ERR_VCI+CF_ERR_STATE+CFB_ERR_STREAM: invalid stream state

CFB_ERR_AUD+audio error num: error in Audio Subsystem

CFB_ERR_VID+video error num: error in Video Subsystem

Valid State(s) to Issue:

stream state: CCST_ACTIVE

State after Execution:

stream state: Unchanged

CF_SnapStream

This function takes a snapshot of the video stream of the specified stream group and returns a still image (reference) frame in a buffer allocated internally by VCI to the application. Preferably, the only supported image format is a Microsoft® Windows™ device independent bitmap (DIB).

CStatus CF_SnapStream (HStGrp hStgrp, WORD wFormat, LPSTR FAR* lpLpVbits, LPBITMAPINFO lpBmi)

Input:

hStgrp: Handle to a stream group wFormat: Still image format lpBmi: Pointer to the BITMAPINFO structure of maximum extent (256 color)

Output:

lpLpVbits: Pointer to DIB data, allocated internally

Return Value:

CF_OK: for successful completion

CFB_ERR_VCI+CF_ERR_RESOURCE: error with internal data structures

CFB_ERR_VCI+CF_ERR_HANDLE+CFB_ERR_STREAM: invalid stream handle

CFB_ERR_VCI+CF_ERR_STATE+CFB_ERR_STREAM: invalid stream state

CFB_ERR_VID+video error num: error in Video Subsystem

Valid State(s) to Issue:

stream state: CCST_ACTIVE

State after Execution:

stream state: Unchanged

CF_GetAudVidStream

This function returns the audio and video stream handles for the specified stream group. CStatus CF_GetAudVidStream (HStGrp hStgrp, LPHSTRM lpHAStrm, LPHSTRM lpHVStrm)

Input:

hStgrp: Handle to a stream group

Output:

lpHAStrm: Handle to audio stream lpHVStrm: Handle to video stream

Return Value:

CF_OK: for successful completion

CFB_ERR_VCI+CF_ERR_RESOURCE: error with internal data structures

CFB_ERR_VCI+CF_ERR HANDLE+CFB_ERR_STREAM: invalid stream handle

Valid State(s) to Issue:

stream state: CCST_ACTIVE

State after Execution:

stream state: Unchanged

CF_DestroyStream

This function destroys the specified stream group that was created by CF_CapMon or CF_PlayRcvd. As part of the destroy process, all operations (e.g., sending/playing) being performed on the stream group will be stopped and all allocated system resources will be freed. CStatus CF_DestroyStream (HSTGRP hStgrp)

Input:

hStgrp: Handle to a stream group to be destroyed

Return Value:

CF_OK: for successful completion

CFB_ERR_VCI+CF_ERR_RESOURCE: error with internal data structures

CFB_ERR_VCI+CF_ERR_HANDLE+CFB_ERR_STREAM: invalid stream handle

Valid State(s) to Issue:

stream state: Any state except CCST_INIT

State after Execution:

stream stale: CCST_INIT

Channel Management

CF_RegisterChanMgr

This function registers a callback or an application window whose message processing function will handle notifications generated by network channel initialization operations. This function is invoked before any CF_OpenChannel calls are made. CStatus CF_RegisterChanMgr (HCALL hCall, WORD wFlag, CALLBACK cbNetCall)

Input:
  hCall: Handle to the call
  wflag: Indicates the type of notification to be used:

| CALLBACK_FUNCTION | for callback interface |
| CALLBACK_WINDOW | for post message interface | cbNetCall: Either a pointer to a callback function, or a window handle to which messages will be posted, depending on flags.
Return Value:
  CF_OK: for successful completion
  CFB_ERR_VCI+CF_ERR_STATE+CFB_ERR_CALL: invalid call state
  CFB_ERR_VCI+CF_ERR_HANDLE+CFB_ERR_CALL: invalid call handle
Valid State(s) to Issue:
  call state: CCST_CONNECTED
State after Execution:
  call state: CCST_CONNECTED
Callback Routine
  FuncName (WORD wMessage, WORD wParam, LONG lParam)
  wMessage: Message Type (CFM_XXXX_NTFY)
  wParam: Call Handle
  lParam: Additional Information which is message-specific
The parameters of the callback function are equivalent to the last three parameters passed to a Microsoft® Windows™ message handler function (Win 3.1).
CF_OpenChannel
  This routine requests to open a network channel with the peer application. The result of the action is given to the application by invoking the callback routine specified by the call to CF_RegisterChanMgr. The application specifies an ID for this transaction. This ID is passed to the callback routine or posted in a message. CStatus CF_OpenChannel (HCALL hCall, LPCHAN_INFO lpChan, DWORD dwTransID)
Input:
  hCall: Handle to the call.
  lpChan: Pointer to a channel structure. Filled by application. The structure contains:
    A channel number.
    Priority of this channel relative to other channels on this connection. Higher numbers represent higher priority.
    Timeout value for the channel
    Reliability of the channel.
    Channel specific information. See CHAN_INFO definition in TII.
  dwTransID: An application defined identifier that is returned with status messages to identify the channel request that the message belongs to.
Return Value:
  CF_OK: for successful completion
  CFB_ERR_COM+comm error num: error in Comm Subsystem
Valid State(s) to Issue:
  call state: CCST_CONNECTED
  channel state: CHST_READY
State after Execution:
  call state: CCST_CONNECTED
  channel state: CHST_OPENING
Peer Messages:
  CFM_CHAN_OPEN_NTFY: A peer is requesting a channel
Status Messages:
  CFM_CHAN_ACCEPT_NTFY: The peer accepted the channel request
  CFM_CHAN_REJECT_NTFY: The peer rejected the channel request
CF_AcceptChannel
  A peer application can issue CF_AcceptChannel in response to a CFM_CHAN_OPEN_NTFY message that has been received. The result of the CF_AcceptChannel call is a one-way network channel for receiving data. CStatus CF_AcceptChannel (HCHAN hChan, DWORD dwTransID)
Input:
  hChan: Handle to the channel
  dwTransID: A user defined identifier that was received as part of the CFM_CHAN_OPEN_NTFY message.
Return Value:
  CF_OK: for successful completion
  CFB_ERR_COM+comm error num: error in Comm Subsystem
Valid State(s) to Issue:
  call state: CCST_CONNECTED
  channel state: CHST_RESPONDING
State after Execution:
  call state: CCST_CONNECTED
  channel state: CHST_OPEN
Peer Messages:
  CFM_CHAN_ACCEPT_NTFY: The peer accepted the channel request
CF_RejectChannel
  This routine rejects a CFM_CHAN_OPEN_NTFY from the peer. CStatus CF_RejectChannel (HCHAN hChan, DWORD dwTransID)
Input:
  hChan: Handle to the channel
  dwTransID: A user defined identifier that was received as part of the CFM_CHAN_OPEN_NTFY message.
Return Value:
  CF_OK: for successful completion
  CFB_ERR_COM+comm error num: error in Comm Subsystem
Valid State(s) to Issue:
  call state: CCST_CONNECTED
  channel state: CHST_RESPONDING
State after Execution:
  call state: CCST_CONNECTED
  channel state: CHST_READY
Peer Messages:
  CFM_CHAN_REJECT_NTFY: The peer rejected the channel request
CF_RegisterChanHandler
  This function registers a callback or an application window whose message processing function will handle notifications generated by TII network channel IO activities. The channels that are opened will receive TII CHAN_DATA_SENT notifications, and the channels that are accepted will receive TII CHAN_RCV_COMPLETE notifications. CStatus CF_RegisterChanHandler (HCHAN hChan, WORD wFlag, CALLBACK cbChanHandleCall)
Input:

hChan: Handle to the channel.

wFlag: Indicates the type of notification to be used:

| | |
|---|---|
| CALLBACK_FUNCTION | for callback interface |
| CALLBACK_WINDOW | for post message interface |
| NOCALLBACK | for polled status interface. | cbChanHandleCall: Either a pointer to a callback function, or a window handle to which messages will be posted, depending on flags.

Return Value:

CF_OK: for successful completion

CFB_ERR_COM+comm error num: error in Comm Subsystem

Valid State(s) to Issue:

call state: CCST_CONNECTED channel state: CHST_OPEN

State after Execution:

call state: CCST_CONNECTED channel state: CHST_SENT (for outgoing channel)

CHST_RECV (for incoming channel)

Callback Routine

FuncName (WORD wMessage, WORD wParam, LONG lParam)

wMessage: Message Type (CFM_XXXX_NTFY)

wParam: Word parameter lParam: Long parameter

The parameters of the callback function are equivalent to the last three parameters passed to a Microsoft® Windows™ message handler function (Win 3.1).

CF_CloseChannel

This routine will close a network channel that was opened by CF_AcceptChannel or CF_OpenChannel. The handler for this channel is automatically de-registered. CStatus CF_CloseChannel (HCHAN hChan, DWORD dwTransID)

Input:

hChan: Handle to the Channel to be closed.

dwTransID: An application defined identifier that is returned with the response notification.

Return Value:

CF_OK: for successful completion

CFB_ERR_COM+comm error hum: error in Comm Subsystem

Valid State(s) to Issue:

call state: CCST_CONNECTED channel state: CHST_SEND, CHST_RECV, CHST_OPEN

State after Execution:

call state: CCST_CONNECTED channel state: CHST_CLOSING

Peer Messages:

CFM_CHAN_CLOSE_NTFY: The peer closed the channel

Status Messages:

CFM_CHAN_CLOSE_NTFY: The local close processing is complete

CF SendData

This function sends data to peer. If the channel is not reliable and there are no receive buffers posted on the peer machine, the data will be lost. CStatus CF_SendData (HCHAN hChan, LPSTR lpsBuffer, WORD Buflen, DWORD dwTransID)

Input:

hChan: Handle to the channel.

lpsBuffer: A pointer to the buffer to be sent.

Buflen: The length of the buffer in bytes.

dwTransID: This is a user defined transaction ID which will be passed to the channel handler along with other status message data to identify the transaction that the response belongs to.

Return Value:

CF_OK: for successful completion

CFB_ERR_COM+comm error num: error in Comm Subsystem

Valid State(s) to Issue:

call state: CCST_CONNECTED channel state: CHST_SEND

State after Execution:

call state: CCST_CONNECTED channel state: CHST_SEND

Peer Messages:

CHAN_RCV_COMPLETE: Data was received (TII message)

CHAN_LOST_DATA: Data was lost because of no CF_RecvData call (TII message)

Status Messages:

CHAN_DATA_SENT: Data is being sent and buffer is available for reuse (TII message)

CHAN_LOST_DATA: Data could not be sent (TII message)

CF_RecvData

Data is received through this mechanism. Normally this call is issued in order to post receive buffers to the system. When the system has received data in the given buffers, the Channel Handler will receive the TII CHAN_RCV_COMPLETE notification. CStatus CF_RecvData (HCHAN hChan, LPSTR lpsBuffer, WORD Buflen, DWORD dwTransID)

Input:

hChan: Handle to the channel lpsBuffer: A pointer to the buffer to be filled in.

Buflen: The length of the buffer in bytes. Max. bytes to receive.

dwTransID: This is a user defined transaction ID which will be passed to the channel handler along with other status message to identify the transaction that the response belongs to.

Return Value:

CF_OK: for successful completion

CFB_ERR_COM+comm error num: error in Comm Subsystem

Valid State(s) to Issue:

call state: CCST_CONNECTED channel state: CHST_RECV

State after Execution:

call state: CCST_CONNECTED channel state: CHST_RECV

Status Messages:

CHAN_RCV_COMPLETE: Indicates that data was received.

CHAN_LOST_DATA: Indicates that the buffer was too small for an incoming data message, or some other data error. The contents of the data buffer are undefined.

CF_GetChanInfo

This function will return various statistical information about a channel (e.g., bandwidth information, number of sends/second, number of receives/second). CStatus
CF_GetChanInfo (HCHAN hChan, LPCHAN_INFO
lpChanInfo)
Input:
  hChan: Handle to the specified Channel
  lpCsInfo: Pointer to a CHAN_INFO struct.
Return Value:
  CF_OK: for successful completion
  CFB_ERR_COM+comm error num: error in Comm Subsystem
Valid State(s) to Issue:
  call state: CCST_CONNECTED
  channel state: Any except CHST_NULL, CHST_READY
State after Execution:
  call state: CCST_CONNECTED
  channel state: Unchanged
CFM_CHAN_OPEN_NTFY (Channel open being requested by peer)
Returned Parameters:
  wParam HCHAN: Handle to the Channel to be used subsequently by the application.
  lParam LPCHANMGR_CB: Pointer to info about incoming channel request
Valid States To Receive the Notification:
  call state: CCST_CONNECTED
  channel state: CHST_READY
State after Receiving the Message:
  call state: CCST_CONNECTED
  channel state: CHST_RESPONDING
CFM_CHAN_ACCEPT_NTFY (Channel open request accepted by peer)
Returned Parameters:
  wparam HCHAN: Handle to the channel to be used subsequently by the app.
  lParam DWORD: TransID provided by the application, that identifies the application transaction related to this notification.
Valid States To Receive the Notification:
  call state: CCST_CONNECTED
  channel state: CHST_OPENING
State after Receiving the Message:
  call state: CCST_CONNECTED
  channel state: CHST_OPEN
CFM_CHAN_REJECT_NTFY (Channel open request rejected by peer)
Returned Parameters:
  lParam DWORD: TransID provided by the application, that identifies the application transaction related to this notification.
Valid States To Receive the Notification:
  call state: CCST_CONNECTED
  channel state: CHST_OPENING
State after Receiving the Message:
  call state: CCST_CONNECTED
  channel state: CHST_READY
CFM_CHAN_CLOSE_NTFY (Channel close being initiated locally or remotely)
Returned Parameters:
  wParam HCHAN: Handle to the Channel
  lParam DWORD: If callback is a remote Close indication, lParam=0. If callback is a response to a locally initiated CloseChannel, lParam=TransID specified by app.

Valid States To Receive the Notification:
  call state: CCST_CONNECTED
  channel state: CHST_SEND, CHST_RECV, CHST_OPEN
State after Receiving the Message:
  call state: CCST_CONNECTED
  channel state: CHST_READY APPENDIX C: Video API The description for this section is the same as the description for the section entitled "Video API Data Structures, Functions, and Messages" in U.S. patent application Ser. No. 08/157,694. One difference is in the VINFO structure type:

VINFO (Video Stream Information)

| | | |
|---|---|---|
| WORD | wType | Local or remote video stream |
| WORD | wReserved | DWORD alignment, future use |
| DWORD | dwFlags | Flags bits: various exclusive attributes |
| WORD | wContrast | Contrast adjustment |
| WORD | wTint | Color adjustment |
| WORD | wSaturation | Saturation value |
| WORD | wBrightness | Brightness adjustment |
| WORD | wDisplayRate | Monitor/playback window Blt rate; <= IRV frame rate |
| WORD | wReserved2 | DWORD alignment, future use |
| Union { | | |
| // local video stream | | |
| struct { | | |
| WORD | wCaptureSource | Video capture source (camera, file, etc.) |
| WORD | wCaptureFormat | Video capture format (IRV, YUV-9, etc.) |
| DWORD | dwCaptureDriver | Four CC code |
| WORD | wDataRate | Maximum video data rate (kbits/sec) |
| WORD | wMaxFrameRate | 1–30 |
| WORD | wWidth | Capture resolution width |
| WORD | wHeight | Capture resolution height |
| WORD | wQualityPercent | 0–100; 0 = lowest quality, least number of frames dropped; 100 = Highest quality, most number of frames dropped |
| } local | | |
| // remote video stream | | |
| struct { | | |
| WORD | wPlaybackTarget | Video playback hardware (placeholder) |
| WORD | wReserved | Alignment, future use |
| WORD | wWidth | Playback resolution width |
| WORD | wHeight | Playback resolution height |
| } remote | | |
| HASTRM | hAStrm | Associated audio stream, as needed |
| } | | |

Another difference is in the status values which are defined as follows:

| | |
|---|---|
| V_OK | Successful - no errors. |
| V_ERR_INIT | Initialization error occurred. |
| V_ERR_STATE | Specified video stream is in an invalid state for the requested operation. |
| V_ERR_RSCFAIL | Resource failure occurred; e.g., not enough memory. |
| V_ERR_DRIVER | Error has occured with a video driver. |
| V_ERR_HVSTRM | Specified video stream is invalid. |
| V_ERR_TIMER | Internal timer error occurred. |

-continued

| | |
|---|---|
| V_ERR_APP | Internal video application/task error occurred. |
| V_ERR_MEMORY | Not enough memory to execute an internal task. Close unneeded application(s) and try again. |
| V_ERR_VINFO | Specified video info structure is invalid. |
| V_ERR_FLAG | One of the specified video flags specified is invalid. |
| V_ERR_HWND | Specified window handle is invalid. |
| V_ERR_CHANID | Specified channel handle is invalid. |
| V_ERR_LPVINFO | Specified video info structure reference is invalid. |
| V_ERR_AVI4CC | Code used to specify the entry containing the AVI file name is invalid. |
| V_ERR_FOPEN | AVI file could not be opened. |
| V_ERR_AVIFORMAT | Specified file is not a valid AVI file. |
| V_ERR_GMEM | Error occurred while allocating or locking global memory. |
| V_ERR_FSEEK | Error occurred while seeking in the AVI file. (Possible file corruption) |
| V_ERR_DRVOPEN | Driver is already open. |
| V_ERR_CHANDATA | Network data channel error. |
| V_ERR_CHANCNTL | Network control channel error. |
| V_ERR_ATTRMAP | Erroneous system attributes map was supplied, suggesting no video capability. |
| V_ERR_DLL_NOT_INITED | DLL has not been loaded yet. |
| V_ERR_LESS_THAN_256 | Video requires at least 256 colors. |
| V_ERR_MISSING_DISPLAY_DRV | System.ini is missing the display.drv name. |
| V_ERR_CALIBRATION | Begin/End measurement failed. |
| V_ERR_INCONSISTENT | Measure decompress time was zero. |
| V_ERR_INTERNAL | Internal error has occurred. |

Yet another difference is the addition of the following video stream functions.

VReOpen

The VReOpen function re-opens a video stream. An info structure specifies stream attributes. Caller specifies window messages or callback function for stream event notification.

VSTATUS VReOpen (HVSTRM hVStrm, LPVINFO lpVInfo, DWORD dwCallback,
DWORD dwCallbackInstance, DWORD dwFlags, int far*lpwField)

Input:
  hVstrm: Open video stream handle to reopen with new VINFO parameters, returned if VSTATUS=V_OK.
  lpVinfo: Pointer to the video information structure VINFO with specified attributes. If a NULL LPVINFO is specified, then the default attributes set up as part of configuration are used.
  dwCallback: Specifies the address of a callback function or a handle to a window. In the case of a window, the low-order word is used. Messages sent to a callback function are similar to messages sent to a window, except they have two DWORD parameters instead of a UINT and a DWORD parameter.
  dwCallbackInstance: Specifies user instance data passed to the callback. Unused if dwCallback is a window.
  dwFlags: VOpen flags parameter; flag values OR'd into parameter. For parameter dwCallback, values are:
    CALLBACK_FUNCTION indicates callback function used.
    CALLBACK_WINDOW indicates window handle.
Output:
  VSTATUS: Returned parameter; see return values, below.
  lpwField: A field in VINFO was incorrect. This parameter is valid only when VSTATUS returns the value: V_ERR_VINFO. A −1 indicates VINFO was more generally in error.
Valid state(s) to issue:
  VST_INIT
State after successful execution (V_OK):
  VST_OPEN
Return values:

| | |
|---|---|
| V_OK | Successful return (=0). |
| V_ERR_VINFO | Invalid VINFO. |
| V_ERR_RSCFAIL | System resource failure. |
| V_ERR_HVSTRM | Specified stream handle is in error. |
| V_ERR_STATE | Capture or playback task window handle is NULL. |

VReportStats

The VReportStats function grabs the statistics which are being updated every StatUpdateRate seconds. For the statistics to be updated, the Vplay stats window is visible, either open or in icon form. The ALLSTAT structure is defined as follows:

```
typedef struct_PLAY_STATS
{
    UINT    uLeftColPos;            // X client coord to start stats at.
    UINT    uTopRowPos;             // Y client coord to start stats at.
    DWORD   dwStartTime;            // Time playing was started in ms.
    DWORD   dwPlayingTime;          // Total playing time in ms.
    DWORD   dwFramesPlayed;         // Frames received for playback in that time.
    UINT    uAvgFrameRate;          // Average frame rate over play session.
    UINT    uCurFrameRate;          // Average frame rate over last second.
    UINT    uSmallestFrame;         // Smallest frame played.
    UINT    uBiggestFrame;          // Biggest frame played.
    DWORD   dwPeriodData;           // Data collected in update period.
    DWORD   dwCurDataRate;          // Data rate of the last second (bits/sec).
    UINT    uAvgFrameSize;          // Average frame size.
    DWORD   dwPeriodDecompTime;     // Total decompress time in update period.
    UINT    uCurDecompTime;         // Average decompress time in update period.
    DWORD   dwPeriodPostTime;       // Total time from frame receipt to display start in
                                    // update period.
    UINT    uCurPostTime;           // Average post time in update period.
    DWORD   dwPeriodDisplayTime;    // Total display (blt) time in update period.
    UINT    uCurDisplayTime;        // Average display (blt) time in update period.
    DWORD   dwPeriodPlayTime;       // Total playback time in update period.
    UINT    uCurPlayTime;           // Average playback time in update period.
    long    dwPeriodAVDelta;        // Total AVSync delta in update period.
    int     uCurAVDelta;            // Average AVSync delta in update period.
    DWORD   dwDecompressOnly;       // Number of decompress-only cases
    DWORD   dwRestarts;             // Number of restarts requested
    DWORD   dwFailedDecompCnt;
}
PLAY_STATS, FAR *LPPLAY_STATS;
typedef struct
{
    PLAY_STATS MonStat;
    PLAY_STATS RemStat;
}
ALLSTATS, FAR *LPALLSTATS;
VSTATUS VReportStats(LPALLSTAT lpAllStats)
```

Output:

lpAllStats: Pointer to the ALLSTAT structure in which the stats are returned.

Valid state(s) to issue:

VST_MONITOR

VST_PLAY

State after execution:

VST_MONITOR

VST_PLAY

Return values:

V_OK Successful return

V_ERR_STATE Invalid stream state to issue this function

Still another difference is the change in the video subsystem function VCOST, which is defined as follows:

VCost

The VCost function gives the percentage utilization of the CPU to support a given video stream. The function can be called repeatedly, and at any time after the video manager is initialized (VInit called). Repeated calls can be used to determine an "optimal" configuration of local and remote video windows.

VSTATUS VCost(wRes, wDispFreq, wFrameRate, wBitRate, wFormat, dwFlags, lpwCost)

Input:

wRes: Resolution of a video display window. Defined resolutions are:

| VM_ICON_RES    | (36×36)   |
| VM_NORMAL_RES  | (160×120) |
| VM_QUARTER_RES | (320×240) |
| VM_VGA_RES     | (640×480) | wDispFreq: Display frequency of a video display window. Display frequency is a function of the FrameRate. 1=All frames; 2=Every other frame; 3=Every third frame; etc. 0=no frames displayed.

wFrameRate: Captured video frame rate (fps). For IRV, this is typically 10–15 fps.

wBitRate: Compressed frame sizes are influenced by the bit rate and the frame decompress times have a linear relationship with the frame size.

wFormat: Defines the video compression technique. Supported values are:
CAPT_FORMAT_IRV
CAPT_FORMAT_YUV
CAPT_FORMAT_MRV dwFlags: Flags which further specify specific video attributes. Suppported values are:

| LOCAL_STREAM  | (=0×1) |
| REMOTE_STREAM | (=0×2) |

These values specify whether the video in question originates locally or remotely.

Output:

lpwCost: Pointer to a WORD where a system utilization value can be returned. The value returned is a system utilization percentage. It is 0 or greater. Values greater than 100 can be returned.

Return values:

| | |
|---|---|
| V_OK | Successful return |
| V_ERR | General error |

APPENDIX D: Audio API

The description for this section is the same as the description for the section entitled "Audio API Data Structures, Functions, and Messages" in U.S. patent application Ser. No. 08/157,694. One difference is in the AINFO data type:

| AINFO (IN/OUT Information of an Audio Stream) | | |
|---|---|---|
| WORD | wType | Local or remote audio stream |
| WORD | wCompress | Index into compression table |
| DWORD | dwResolution | Resolution in milliseconds with which Audio Manager can adjust latency on an audio stream |
| DWORD | dwLatency | Milliseconds of latency from the time the audio packet is recorded to the time it is put on the network. |
| Union { | | |
| // local audio stream | | |
| struct { | | |
| WORD | wIn | Audio input hardware source |
| WORD | wGain | Gain of the local microphone. |
| WORD | wAux | Volume of the monitor audio stream. |
| WORD | wSpeakerPhone | Select Enterprise microphone or third party headset. |
| } local | | |
| // remote audio stream | | |
| struct { | | |
| WORD | wOut | Audio output hardware destination |
| WORD | wVol | Volume of the local speaker |
| } remote | | |
| } | | |

APPENDIX E: Comm API

The description for this section is the same as the description for the section entitled "Comm API Data Structures, Functions, and Messages" in U.S. patent application Ser. No. 08/157,694. One difference is in the structure for Session handler (in cases where multiple parameters are returned via lParam):

```
typedef struct tagSESS_CB {
        union   tagSESS_EV {
                struct  tagConReq {
                        HSESS           hSess;
                        LPTADDR         lpCallerAddr;
                        LPCONN_CHR      lpAttributes;
                } ConReq;
                struct  tagConAcc {
                        DWORD           dwTransId;
                        LPCONN_CHR      lpAttributes;
                        LPBYTE          lpItone
                } ConAcc;
        } SESS_EV;
} SESS_CB, FAR *LPSESS_CB;
```

Session Management

The description for this section is the same as the description for the section of the same name in U.S. patent application Ser. No. 08/157,694.

Connection Management

The description for this section is the same as the description for the section of the same name in U.S. patent application Ser. No. 08/157,694.

Providing Channel Information in Channel Requests

When an application wants to establish a channel with a remote conferencing system, an OpenChannel message is transmitted to the remote conferencing system to request that the channel be opened. The structure of the OpenChannel message is defined as follows:

TSTATUS OpenChannel (HCONN hConn, LPCHAN_INFO lpChanInfo, DWORD TransID) The long pointer lpChanInfo points to the channel information structure CHAN_INFO, which is defined as follows:

Typedef struct tagCHAN_INFO

| { | | |
|---|---|---|
| WORD | Id; | |
| WORD | State; | |
| WORD | Timeout; | |
| BYTE | Priority; | |
| BYTE | Reliability; | |
| BYTE | Info[16]; | // User Info |
| } CHAN_INFO, FAR *LPCHAN_INFO; | | | where:

Id is the application-defined channel ID number.

State is the channel establishment state as defined in the earlier section of this specification entitled "Comm Manager."

Timeout is the period of time allocated for channel establishment. If the timeout period expires before the channel is established, then channel establishment will fail.

Priority is the priority level of this channel, where the priority level signifies the relative priority between different channels on the same connection. Greater values imply higher priority levels.

Reliability is a TRUE/FALSE flag that indicates whether the channel is a reliable or unreliable channel.

Info[16] is an application-defined field that may be used to convey information to the remote conferencing system about the requested channel, such as the function of the channel.

By transmitting the channel information structure CHAN_INFO with the channel request message OpenChannel, the remote conferencing system is provided with information about the requested application channel prior to the establishment of the channel. Those skilled in the art will understand that this may eliminate the need for out-of-band communication prior to channel establishment at the application level (or certain in-band communication after the channel is established).

Data Exchange

The description for this section is the same as the description for the section of the same name in U.S. patent application Ser. No. 08/157,694.

Communications Statistics

The description for this section is the same as the description for the section of the same name in U.S. patent application Ser. No. 08/157,694.

What is claimed is:

1. A computer-implemented process for transmitting two or more types of signals from a local computer system, comprising the steps of:

(a) providing signals of a first type having a first priority;

(b) beginning to transmit the signals of the first type on a first virtual channel of a physical communications link to a remote computer system;

(c) providing signals of a second type having a second priority before the transmission of the signals of the first type is complete, wherein the second priority of the second type of signals is greater than the first priority of the first type of signals;

(d) interrupting the transmission of the signals of the first type;

(e) transmitting the signals of the second type on a second virtual channel of the communications link to the remote computer system, wherein the second virtual channel has a priority different from the first virtual channel; and (f) resuming the transmission of the signals of the first type on the first virtual channel of the communications link to the remote computer system after the transmission of the signals of the second type is complete.

2. The process of claim 1, wherein:

the local computer system establishes the first virtual channel in response to a first open channel request from the remote computer system in which the first priority is specified; and the local computer system establishes the second virtual channel in response to a second open channel request from the remote computer system in which the second priority is specified.

3. The process of claim 1, wherein the communications link is an ISDN line.

4. The process of claim 1, wherein the local computer system and the remote computer system are nodes of a conferencing network.

5. The process of claim 1, wherein the first virtual channel of the communications link and the second virtual channel of the communications link are unidirectional channels.

6. The process of claim 1, wherein:

the first type of signals are one of audio signals, data signals, video signals, and control signals; and the second type of signals are one of audio signals, data signals, video signals, and control signals, wherein the first type of signals differs from the second type of signals.

7. The process of claim 6, wherein the second type of signals are audio signals.

8. The process of claim 7, wherein the first type of signals are one of video signals, data signals, and control signals.

9. The process of claim 1, wherein:

step (b) comprises the steps of:
(1) dividing the signals of the first type into two or more first-type fragments; and
(2) transmitting a subset of the first-type fragments;

step (e) comprises the steps of:
(1) dividing the signals of the second type into one or more second-type fragments; and
(2) transmitting all of the second-type fragments; and step (f) comprises the step of transmitting the rest of the first-type fragments.

10. The process of claim 1, further comprising the steps of:

(g) providing signals of a third type having a third priority, wherein the third priority of the third type of signals is different from both the first priority of the first type of signals and the second priority of the second type of signals;

(h) interrupting the transmission of at least one of the signals of the first type and the signals of the second type;

(i) transmitting the signals of the third type; and (j) resuming the transmission interrupted in step (h) after the transmission of the signals of the third type is complete.

11. The process of claim 1, wherein:

step (b) comprises the steps of:
(1) dividing the signals of the first type into two or more first-type fragments; and
(2) transmitting a subset of the first-type fragments to a remote computer system over a communications link;

step (e) comprises the steps of:
(1) dividing the signals of the second type into one or more second-type fragments; and
(2) transmitting all of the second-type fragments to the remote computer system over the communications link;

step (f) comprises the step of transmitting the rest of the first-type fragments to the remote computer system over the communications link;

the local computer system and the remote computer system are nodes of a conferencing network;

the first type of signals are one of audio signals, data signals, video signals, and control signals; and the second type of signals are one of audio signals, data signals, video signals, and control signals, wherein the first type of signals differs from the second type of signals.

12. A local computer system for transmitting two or more types of signals, comprising:

(a) means for providing signals of a first type having a first priority;

(b) means for beginning to transmit the signals of the first type on a first virtual channel of a physical communications link to a remote computer system;

(c) means for providing signals of a second type having a second priority before the transmission of the signals of the first type is complete, wherein the second priority of the second type of signals is greater than the first priority of the first type of signals;

(d) means for interrupting the transmission of the signals of the first type;

(e) means for transmitting the signals of the second type on a second virtual channel of the communications link to the remote computer system, wherein the second virtual channel has a priority different from the first virtual channel; and (f) means for resuming the transmission of the signals of the first type on the first virtual channel of the communications link to the remote computer system after the transmission of the signal of the second type is complete.

13. The system of claim 12, wherein:

the local computer system establishes the first virtual channel in response to a first open channel request from the remote computer system in which the first priority is specified; and the local computer system establishes the second virtual channel in response to a second open channel request from the remote computer system in which the second priority is specified.

14. The system of claim 12, wherein the communications link is an ISDN line.

15. The system of claim 12, wherein the local computer system and the remote computer system are nodes of a conferencing network.

16. The system of claim 12, wherein the first virtual channel of the communications link and the second virtual channel of the communications link are unidirectional channels.

17. The system of claim 12, wherein:

the first type of signals are one of audio signals, data signals, video signals, and control signals; and the second type of signals are one of audio signals, data signals, video signals, and control signals, wherein the first type of signals differs from the second type of signals.

18. The system of claim 17, wherein the second type of signals are audio signals.

19. The system of claim 18, wherein the first type of signals are one of video signals, data signals, and control signals.

20. The system of claim 12, wherein:

means (b):
(1) divides the signals of the first type into two or more first-type fragments; and
(2) transmits a subset of the first-type fragments;

means (e):
(1) divides the signals of the second type into one or more second-type fragments; and
(2) transmits all of the second-type fragments; and means (f) transmits the rest of the first-type fragments.

21. The system of claim 12, further comprising:

(g) means for providing signals of a third type having a third priority, wherein the third priority of the third type of signals is different from both the first priority of the first type of signals and the second priority of the second type of signals;

(h) means for interrupting the transmission of at least one of the signals of the first type and the signals of the second type;

(i) means for transmitting the signals of the third type; and (j) means for resuming the transmission interrupted by means (h) after the transmission of the signals of the third type is complete.

22. The system of claim 12, wherein:

means (b):
(1) divides the signals of the first type into two or more first-type fragments; and
(2) transmits a subset of the first-type fragments to a remote computer system over a communications link;

means (e):
(1) divides the signals of the second type into one or more second-type fragments; and
(2) transmits all of the second-type fragments to the remote computer system over the communications link;

means (f) transmits the rest of the first-type fragments to the remote computer system over the communications link;

the local computer system and the remote computer system are nodes of a conferencing network;

the first type of signals are one of audio signals, data signals, video signals, and control signals; and the second type of signals are one of audio signals, data signals, video signals, and control signals, wherein the first type of signals differs from the second type of signals.

23. A local computer system for transmitting signals, comprising:

(a) first means for generating signals of a first type having a first priority;

(b) second means for generating signals of a second type having a second priority, wherein the second priority of the second type of signals is greater than the first priority of the first type of signals; and (c) a communications subsystem, electrically connected to the first means and the second means, for receiving the signals of the first type from the first means and for receiving the signals of the second type from the second means, wherein:

the communications subsystem interrupts the transmission of the signals of the first type on a first virtual channel of a physical communications link to a remote computer system when the signals of the second type are ready for transmission; and the communications subsystem resumes the transmission of the signals of the first type on the first virtual channel of the communications link to the remote computer system after the transmission of the signals of the second type on a second virtual channel of the communications link to the remote computer system is complete, wherein the second virtual channel has a priority different from the first virtual channel.

24. The system of claim 23, wherein:

the local computer system establishes the first virtual channel in response to a first open channel request from the remote computer system in which the first priority is specified; and the local computer system establishes the second virtual channel in response to a second open channel request from the remote computer system in which the second priority is specified.

25. The system of claim 23, wherein the communications link is an ISDN line.

26. The system of claim 23, wherein the local computer system and the remote computer system are nodes of a conferencing network.

27. The system of claim 23, wherein the first virtual channel of the communications link and the second virtual channel of the communications link are unidirectional channels.

28. The system of claim 23, wherein:

the first type of signals are one of audio signals, data signals, video signals, and control signals; and the second type of signals are one of audio signals, data signals, video signals, and control signals, wherein the first type of signals differs from the second type of signals.

29. The system of claim 28, wherein the second type of signals are audio signals.

30. The system of claim 29, wherein the first type of signals are one of video signals, data signals, and control signals.

31. The system of claim 23, wherein:

the communications subsystem divides the signals of the first type into two or more first-type fragments;

the communications subsystem transmits a subset of the first-type fragments;

the communications subsystem divides the signals of the second type into one or more second-type fragments;

the communications subsystem transmits all of the second-type fragments; and the communications subsystem transmits the rest of the first-type fragments.

32. The system of claim 23, further comprising:

(d) means for providing signals of a third type having a third priority to the communications subsystem, wherein the third priority of the third type of signals is different from both the first priority of the first type of signals and the second priority of the second type of signals, wherein:

the communications subsystem interrupts the transmission of at least one of the signals of the first type and the signals of the second type;

the communications subsystem transmits the signals of the third type; and the communications subsystem resumes the interrupted transmission of the at least one of the signals of the first type and the signals of the second type after the transmission of the signals of the third type is complete.

33. The system of claim 23, wherein:

the communications subsystem divides the signals of the first type into two or more first-type fragments;

the communications subsystem transmits a subset of the first-type fragments to a remote computer system over a communications link;

the communications subsystem divides the signals of the second type into one or more second-type fragments;

the communications subsystem transmits all of the second-type fragments to the remote computer system over the communications link;

the communications subsystem transmits the rest of the first-type fragments to the remote computer system over the communications link;

the local computer system and the remote computer system are nodes of a conferencing network;

the first type of signals are one of audio signals, data signals, video signals, and control signals; and the second type of signals are one of audio signals, data signals, video signals, and control signals, wherein the first type of signals differs from the second type of signals.

* * * * *